United States Patent
Uchiyama

(10) Patent No.: US 7,944,069 B2
(45) Date of Patent: May 17, 2011

(54) WIND POWER GENERATION SYSTEM, ARRANGEMENT OF PERMANENT MAGNETS, AND ELECTRICAL POWER-MECHANICAL FORCE CONVERTER

(75) Inventor: Hisakazu Uchiyama, Fukuroi (JP)

(73) Assignee: Cosmo Plant, Ltd., Shizuoka (JP)

( * ) Notice: Subject to any disclaimer, the term of this patent is extended or adjusted under 35 U.S.C. 154(b) by 0 days.

(21) Appl. No.: 12/190,852

(22) Filed: Aug. 13, 2008

(65) Prior Publication Data

US 2008/0315709 A1 Dec. 25, 2008

Related U.S. Application Data

(62) Division of application No. 10/563,869, filed as application No. PCT/JP2004/009662 on Jul. 7, 2004, now Pat. No. 7,417,334.

(30) Foreign Application Priority Data

| Jul. 8, 2003 | (JP) | 2003-193970 |
| Dec. 3, 2003 | (JP) | 2003-405235 |
| Jan. 27, 2004 | (JP) | 2004-019008 |
| Jan. 28, 2004 | (JP) | 2004-020578 |

(51) Int. Cl.
*F03D 5/04* (2006.01)

(52) U.S. Cl. .......................... 290/44; 290/55

(58) Field of Classification Search .................. 290/44, 290/55, 43, 54; 60/398; 415/4.4, 142
See application file for complete search history.

(56) References Cited

U.S. PATENT DOCUMENTS

| 4,088,352 A | | 5/1978 | Kling | |
| 4,168,439 A | | 9/1979 | Palma | |
| 4,289,970 A | | 9/1981 | Deibert | |
| 4,330,714 A | | 5/1982 | Smith | |
| 4,692,631 A | | 9/1987 | Dahl | |
| 4,720,640 A | * | 1/1988 | Anderson et al. | 290/43 |
| 5,315,159 A | | 5/1994 | Gribnau | |
| 6,064,123 A | * | 5/2000 | Gislason | 290/55 |
| 6,700,216 B1 | | 3/2004 | Vann | |
| 6,952,058 B2 | * | 10/2005 | McCoin | 290/44 |
| 7,098,552 B2 | * | 8/2006 | McCoin | 290/44 |
| 7,109,599 B2 | | 9/2006 | Watkins | |
| 7,116,006 B2 | * | 10/2006 | McCoin | 290/54 |
| 7,144,214 B2 | * | 12/2006 | Kinpara et al. | 415/4.4 |
| 7,215,037 B2 | * | 5/2007 | Scalzi | 290/55 |
| 7,215,038 B2 | | 5/2007 | Bacon | |
| 7,417,334 B2 | * | 8/2008 | Uchiyama | 290/55 |

FOREIGN PATENT DOCUMENTS

| JP | 55-164783 A | 12/1980 |
| JP | 63-12666 U | 1/1988 |
| JP | 3-10037 | 2/1991 |
| JP | 5-500995 A | 2/1993 |

(Continued)

*Primary Examiner* — Nicholas Ponomarenko
(74) *Attorney, Agent, or Firm* — Browdy and Neimark, PLLC

(57) ABSTRACT

A wind power generation system 10 comprising a frame, an impeller 12 rotatably supported by the frame, plural permanent magnets 31 aligned at equal intervals from the rotation center, and coils 32 aligned annularly on the frame. The relative motion of the permanent magnets 31 and the coils 32 in close vicinity generates electric powers by the inverse action of a linear motor. The coils 32 are mounted on the ring provided on the frame, and the permanent magnets 31 are provided on the lower end of the longitudinal blades 26 of the impeller.

6 Claims, 79 Drawing Sheets

FOREIGN PATENT DOCUMENTS

| | | |
|---|---|---|
| JP | 5-82781 U | 11/1993 |
| JP | 06-088565 A | 3/1994 |
| JP | 08-128383 A | 5/1996 |
| JP | 08-205500 A | 8/1996 |
| JP | 08-322298 A | 12/1996 |
| JP | 09-189283 A | 7/1997 |
| JP | 10-336954 A | 12/1998 |
| JP | 11-299202 A | 10/1999 |
| JP | 2000-060096 A | 2/2000 |
| JP | 2001-099046 A | 4/2001 |
| JP | 2001-132617 A | 5/2001 |
| JP | 2001-331098 A | 11/2001 |
| JP | 2002-310057 A | 10/2002 |
| JP | 2002-320364 A | 10/2002 |
| JP | 2002-339854 A | 11/2002 |
| JP | 2002-346518 | 12/2002 |
| JP | 2003-134891 A | 5/2003 |
| JP | 2003-148323 | 5/2003 |
| WO | 91-05953 | 5/1991 |

* cited by examiner

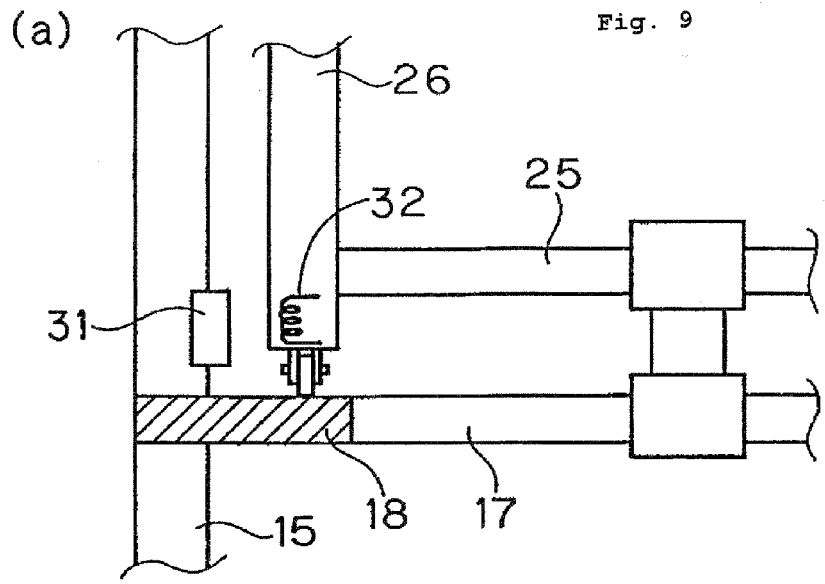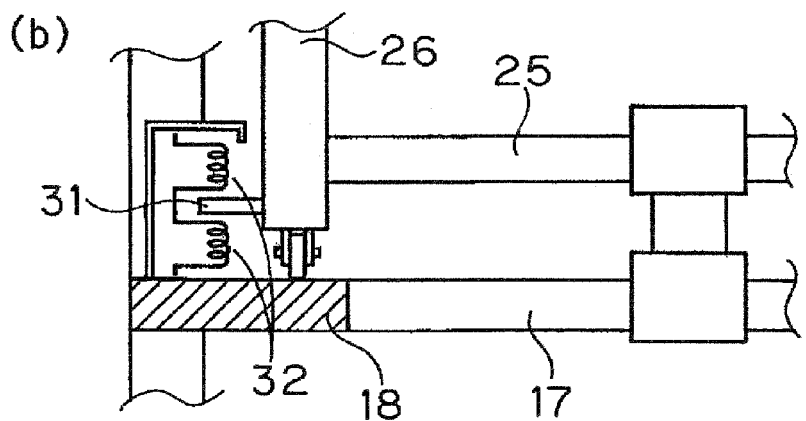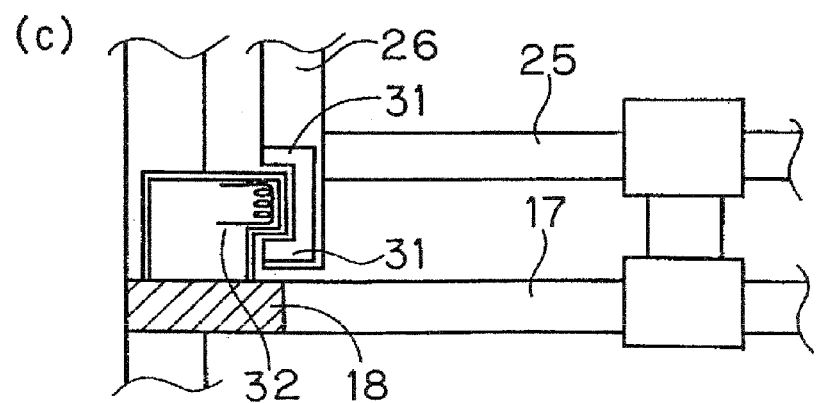
Fig. 9

Fig. 10
(a) 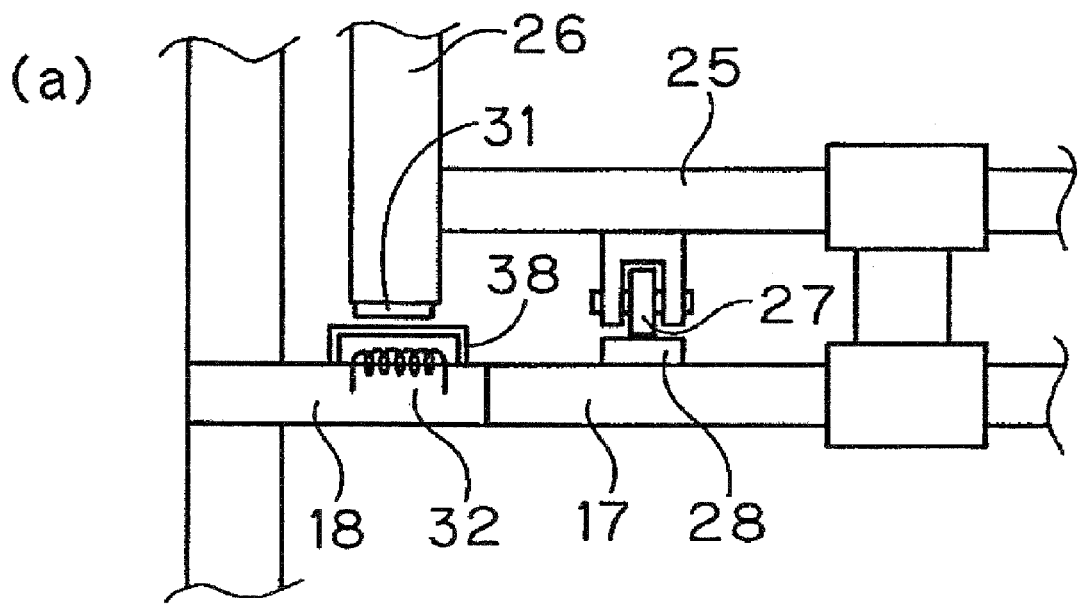
(b) 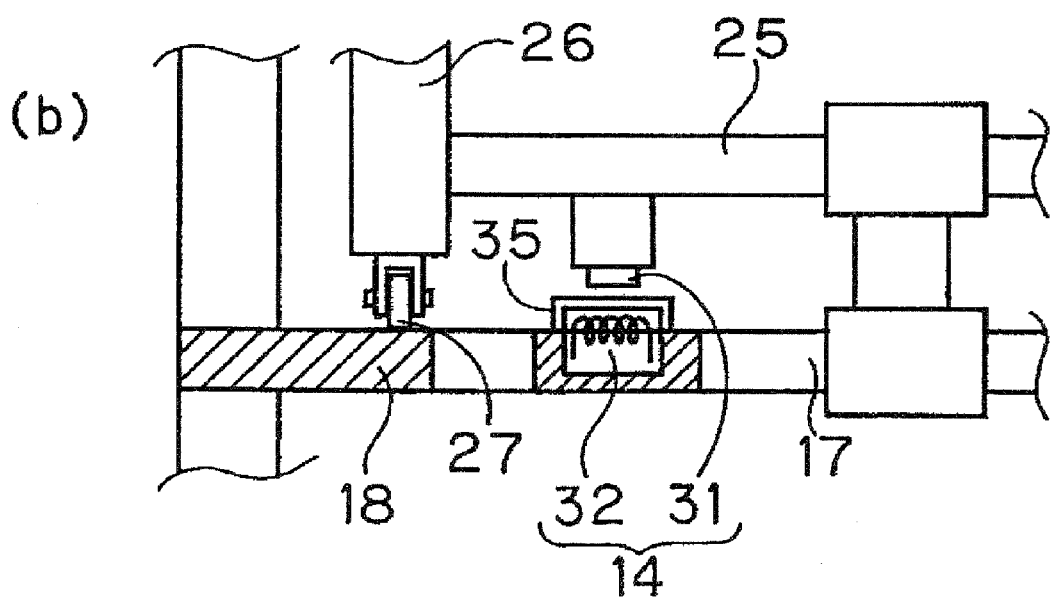

Fig. 14
(a)
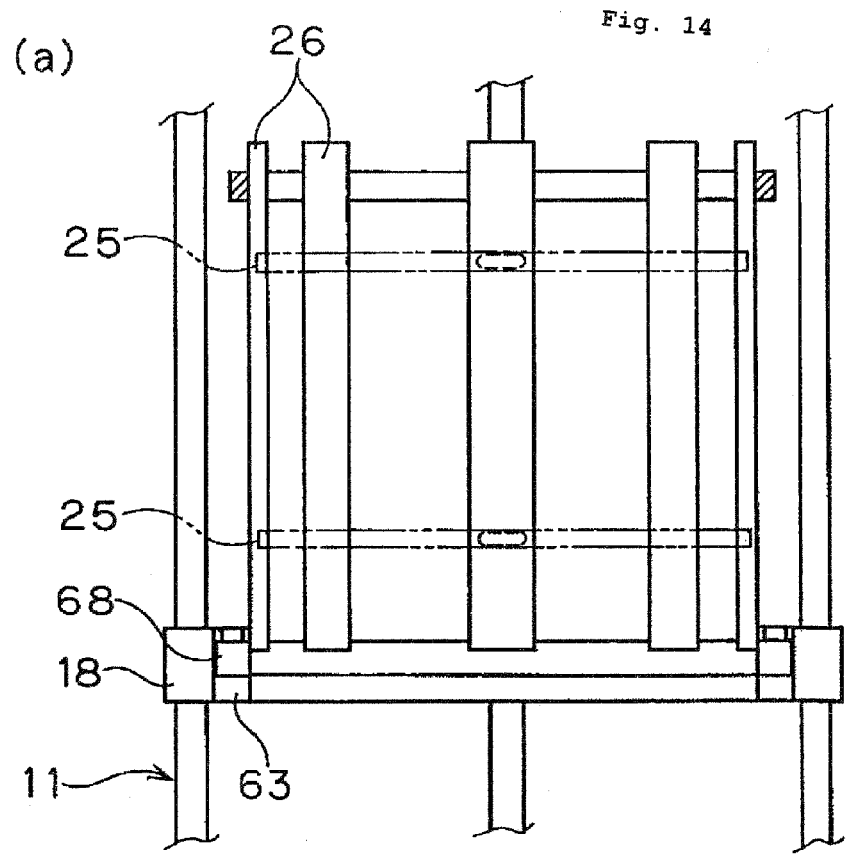
(b)
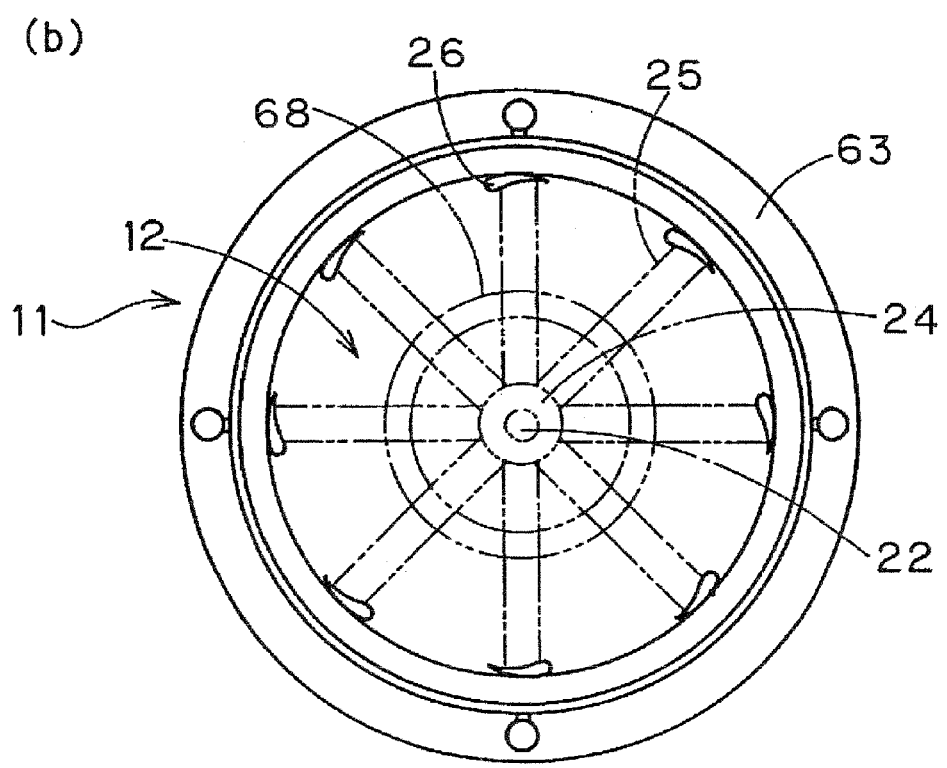

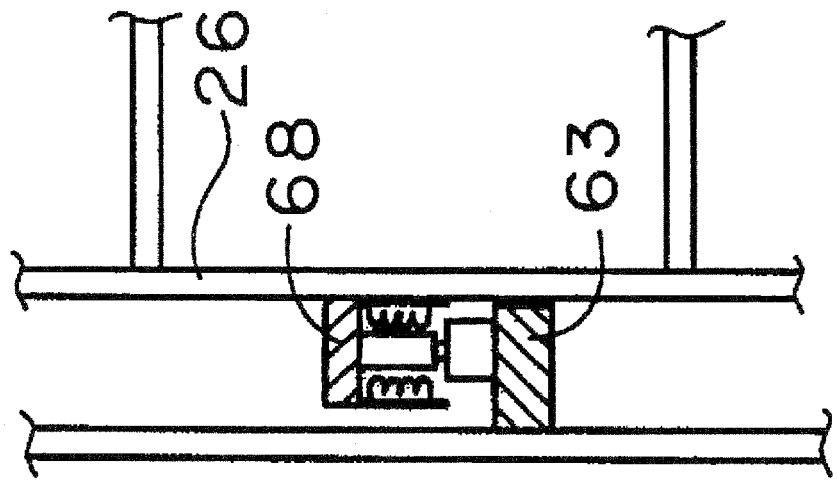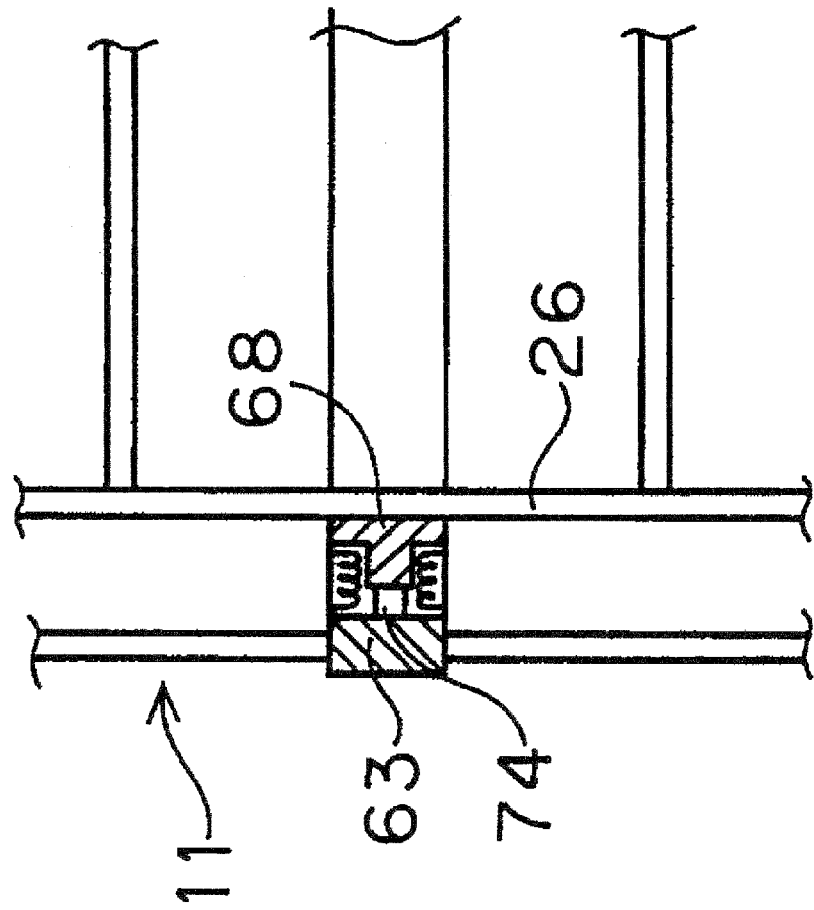
Fig. 15

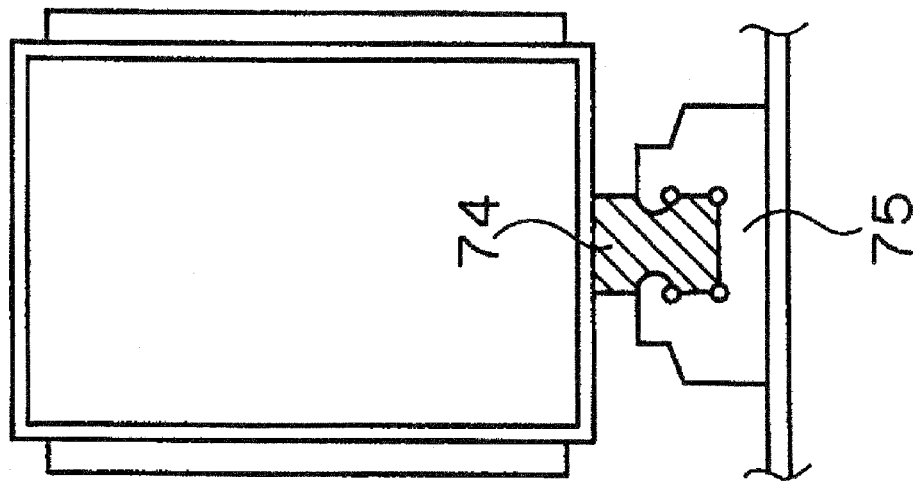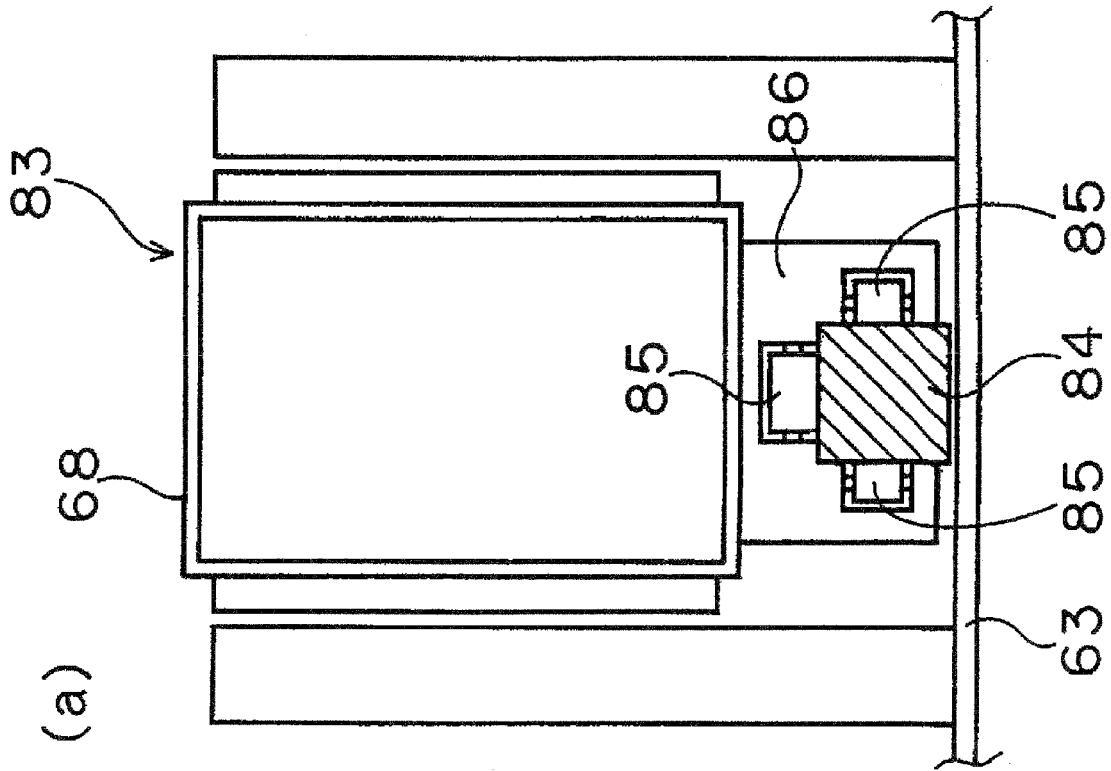

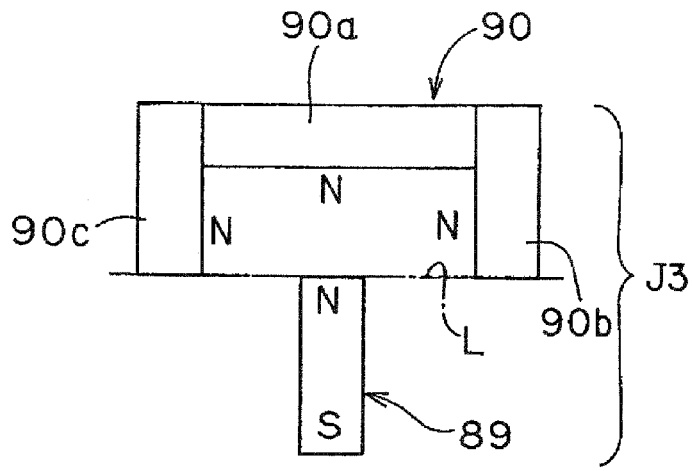
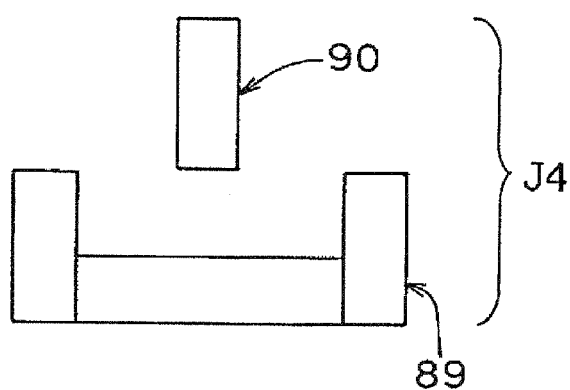
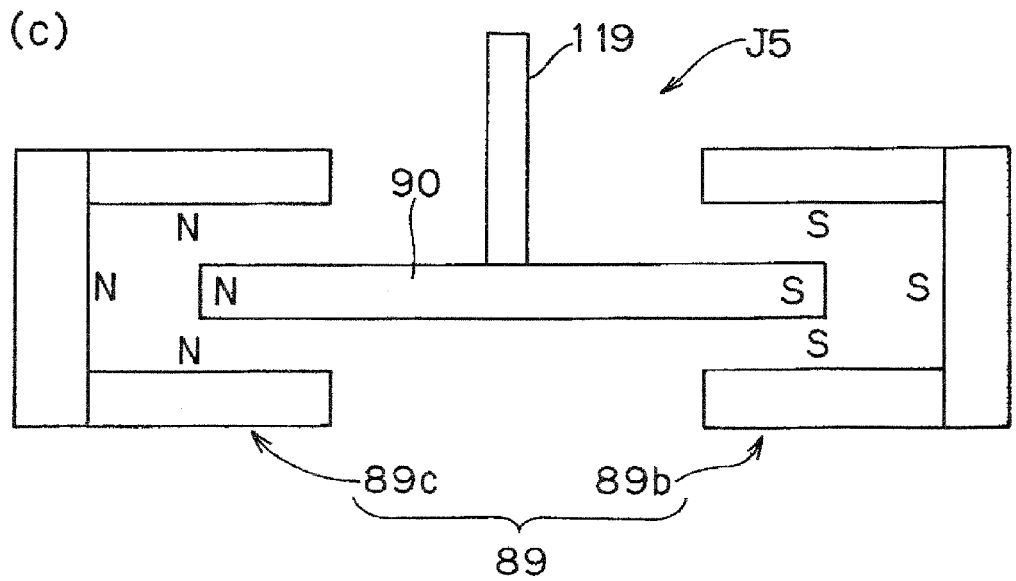
Fig. 26

Fig. 27
(a)
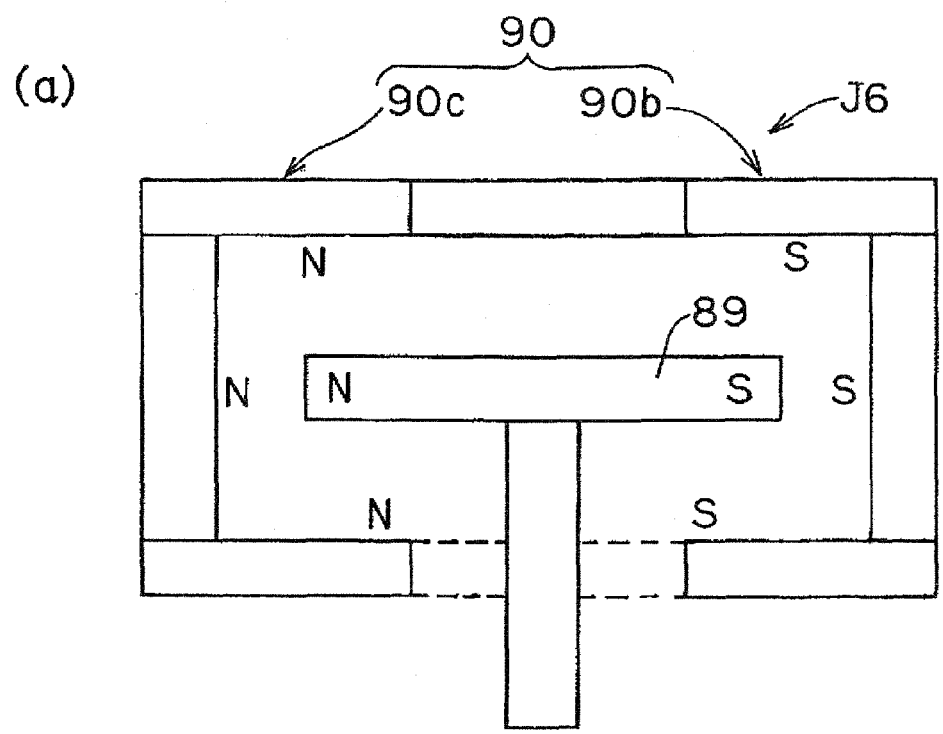
(b)
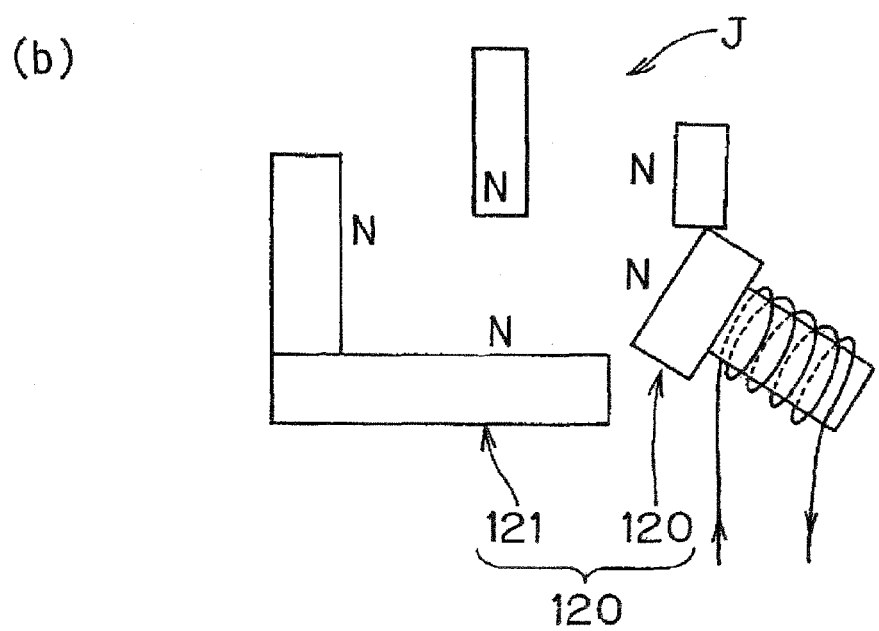

| Each phase crossing the coils of inside and outside | In the alignment of u,z,v,x,w,y (the upper stage of the inner stator of Figure 49) | In the alignment of u,z,v,x,w,y (the upper stage of the inner stator of Figure 49) |
|---|---|---|
| z phase | 6+5=11 | 6+2=8 |
| v phase | 7+3=10 | 7+1=8 |
| w phase | 10+4=14 | 10+5=15 |
| y phase | 10+4=14 | 10+3=13 |
| Sum | 49 | 44 |

Fig. 51

(a)
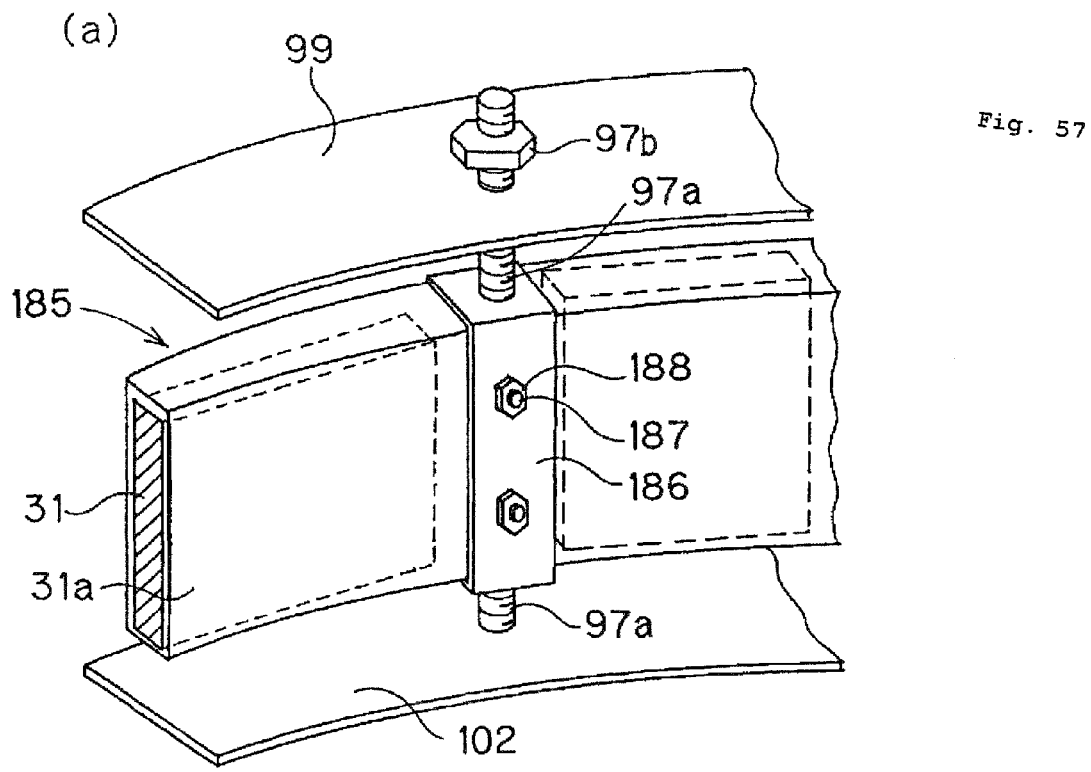
(b)         (c)
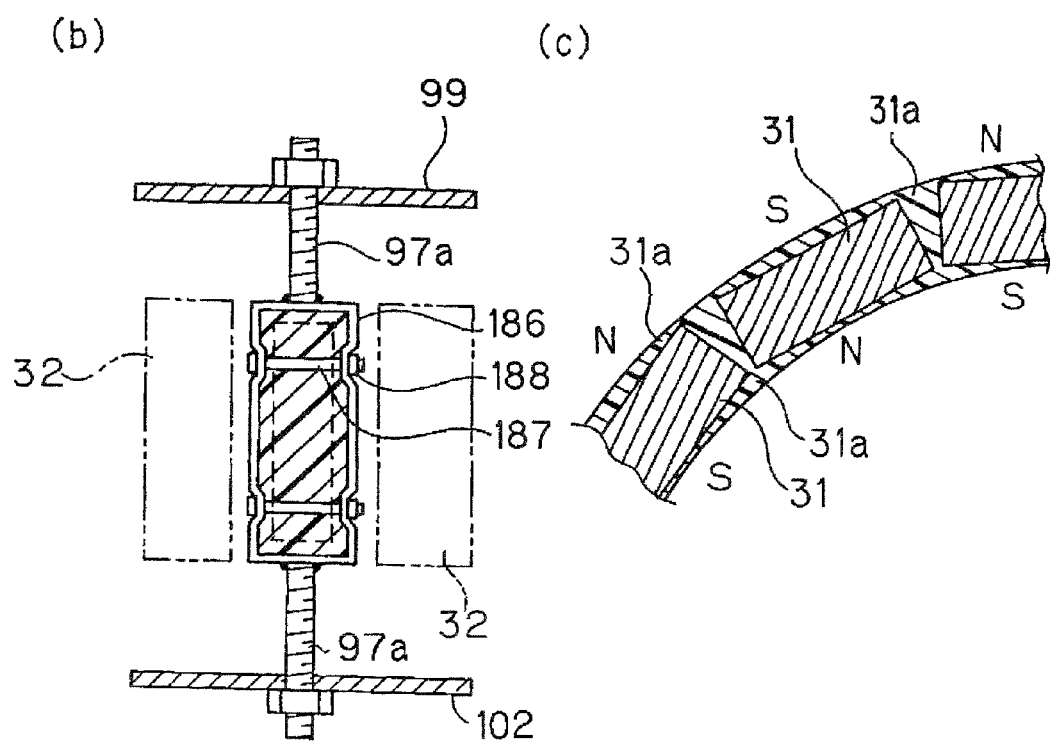
Fig. 57

Fig. 58
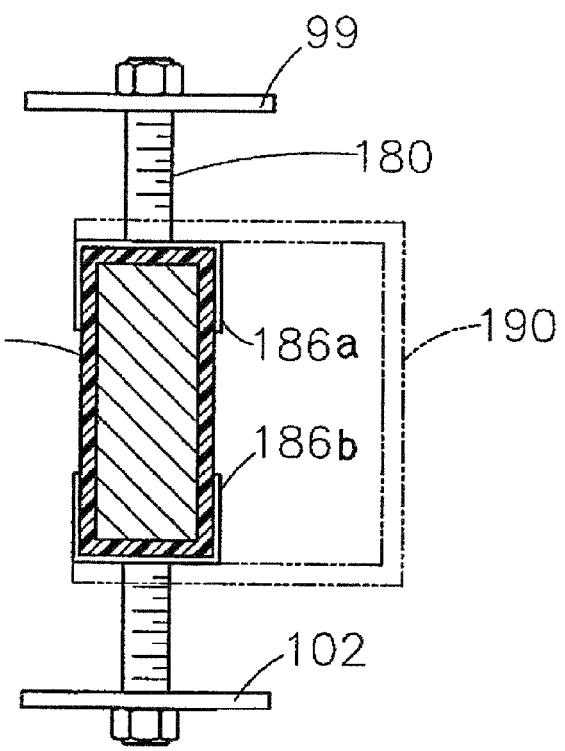
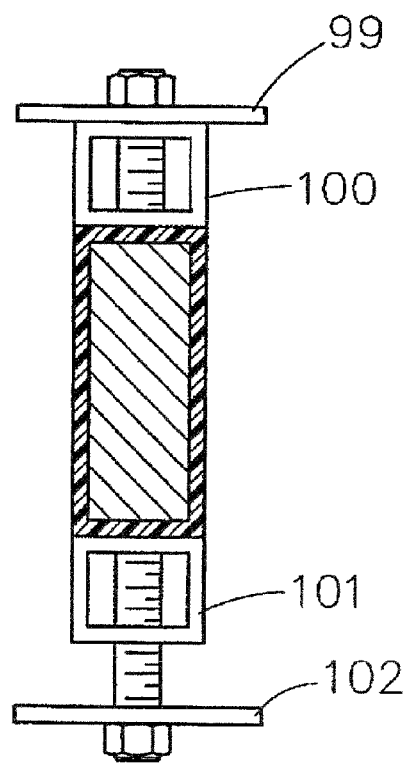

Fig. 59
(a)
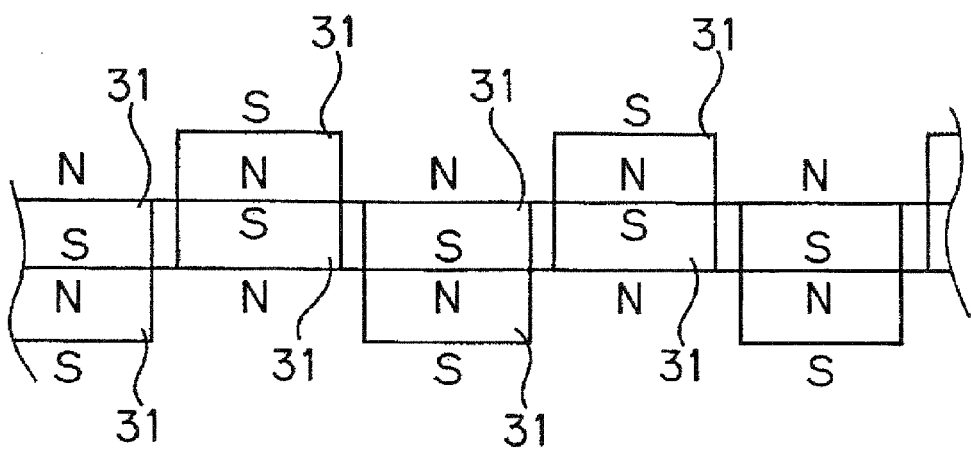
(b)
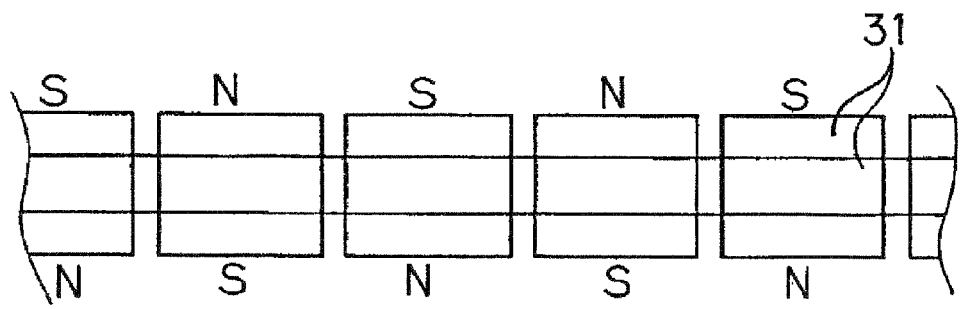
(c)
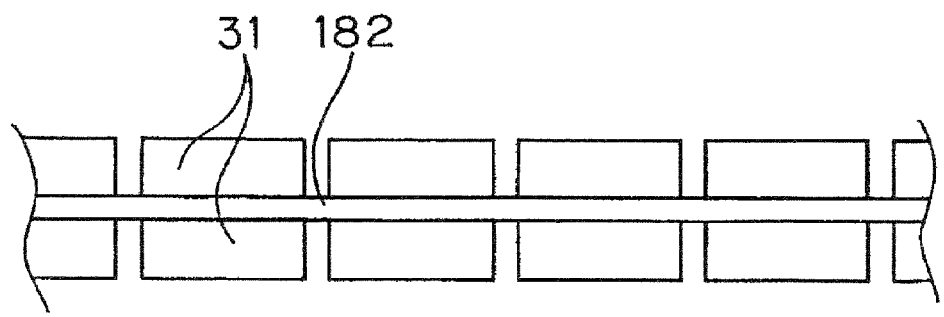

WIND POWER GENERATION SYSTEM, ARRANGEMENT OF PERMANENT MAGNETS, AND ELECTRICAL POWER-MECHANICAL FORCE CONVERTER

FIELD OF THE INVENTION

This invention relates to a wind power generation system, alignments of permanent magnets, and an electrical power-mechanical force converter, and more particularly to a power generating system employing a power generator based on the principle of linear motor, alignments of permanent magnets and an electrical power-mechanical force converter to be preferably employed in a wind power generation system.

The concept of "an electrical power-mechanical force converter" described herein includes both an apparatus provided with a function of generating electric powers by converting a mechanical energy to an electrical energy and an apparatus provided with a function of motor converting an electrical energy to a mechanical energy, and further includes an apparatus exerting both functions by operation.

BACKGROUND ARTS

In the Japanese Patent Publication No. H3-10037 (hereinafter referred to as Patent Publication 1), a wind power generator is disclosed, wherein the shaft of an impeller is connected to a ring gear; the sun gear located in the same shaft as that of the impeller is rotated via the plural planet gears meshing internally with the ring gear; the shaft of the sun gear is connected to the power generator. These ring gear, planet gears, and the sun gear compose an epicycle reduction gear, and the rotation of the impeller connected to the ring gear is speed upped by the epicycle reduction gear and transmitted to the power generator. Thus the power generator operates efficiently in the condition of low impeller rotation speed in a weak wind.

In the Japanese Unexamined Patent Publication No. 2001-132617 (hereinafter referred to as Patent Publication 2), a wind power generator is disclosed comprising the shaft of an impeller and the upper and lower impeller concentrically outside-fitted to the rotation shaft, wherein the face of wind-sails of the upper and the lower impeller are in an opposite direction each other. Since this can strongly receives winds by either the upper or the lower impeller in either directions of the wind, the power generation can be done efficiently. In addition, it is disclosed that the impeller is floated by the repelling force of magnets to be rotated under low frictions.
Patent Publication 1: Japanese Patent Publication No. H3-10037
Patent Publication 1: Japanese Unexamined Patent Publication No. 2001-132617

DISCLOSURE OF INVENTION

Winds utilized by wind power generators, being natural phenomenon, vary widely from weak winds to strong winds. Therefore, It is required for wind power generators to respond quickly to the variation. In conventional wind power generators, in order to cope with such wide range variation of winds, those having a performance capable of responding to the wide range of rotation number are employed. However, no power generator has come into practical use that can respond to the wide variation from weak winds to strong winds. The wind power generator in the above patent publication 1 intends to get efficient amplification by inputting the rotation power into the ring gear that is the output side of the planet gear reducer and outputting the power from the sun gear side. However, in a weak wind condition, it once stops due to the insufficient torque. Therefore, it cannot generate an electric power until a strong wind overcoming static friction resistances blows. Further, since it requires the transmission of torque from the peripheral longitudinal blades to the center shaft by the supporting shaft etc. the weight of the impeller becomes larger causing the rotation under a weak wind more difficult.

This invention is directed to provide a wind power generation system enabling efficient electric power generation, in which the impeller rotation does not stop under such a weak wind that conventional generators stop. Further, it is directed to provide an electric power-mechanical force converter to be used suitably in such power generation systems.

Including the wind power generators of the patent publications 1, 2, conventional wind power generators are strongly subject to the natural environmental conditions such as wind powers. Therefore their locations are constrained by geographical conditions. In order to lessen the damage caused by winds, the impellers are supported by thin frames etc. and are exposed to outside. Therefore, in case of typhoon etc. there is a possible damage of the impellers. This invention is directed to provide a power generator employing impellers, which enables to let impellers rotate independent of winds allowing easy protection against typhoon etc. and efficient generation of electric powers regardless of geographical conditions based on natural environments such as wind directions and wind powers etc.

The wind power generation system of this invention comprises a frame, an impeller rotatably supported by the frame, plural field magnets aligned at equal intervals from the center of rotation in either the frame or the impeller, and coils aligned circularly in the other, wherein the relative motion of the field magnets and the coils within close distance generates an electric power under the reverse action of a linear motor. The field magnet can be a permanent magnet or an electromagnet.

In these wind power generation system, it is preferable that the field magnets are aligned circularly around the vicinity of the periphery or medium portion of the impeller, that a ring-shaped member is provided in proximity to the field magnet in the frame, and that the coils are mounted on the ring-shaped member. The field magnets are preferable to be provided at an interval along the periphery.

Further, it is preferable that the ring-shaped member on which the coils are mounted is so provided in one pair as to place the field magnet in between and is provided circularly on the impeller, that coils mounted on the one side of the ring-shaped member and the coils mounted on the other side of the ring-shaped member are divided into plural groups of coils aligned alternatively or cyclically respectively for generating alternative currents, and that the coils mounted on the one side having a specific phase and the coils mounted on the other side having a corresponding phase with the specific phase are circumferentially staggered in the alignment, and that the coils mounted on the one side and the coils mounted on the other side having a corresponding phase with the above phase are connected in series.

It is preferable that the coils mounted on the one side and the coils mounted on the other side are divided respectively into the first coil group, the second coil group and the third coil group which are cyclically aligned so as to generate three phase alternative currents, and that the first coil group of the coils mounted on the one side is staggered so as to face the second coil group of the coils mounted on the other side or the third coil group of the coils mounted on the other side. Further, it is preferable that the ring-shaped member has plural ring pieces of given length connected into one shaped body and each ring piece comprises a core composed of superposed plural metal plates, the coils composed of a conducting wire wounded around its periphery, and a synthetic resin solidifying the core and the coils into one body.

The wind power generation system is preferable to be so composed that an annular supporting means is intervened between the periphery or the medium part of the impeller and the frame, for supporting at least a part of the weight of the impeller allowing rotation of the impeller.

Such supporting means can comprise a rolling body group or a sliding body group provided either on the frame or the impeller and a runway which contacts the rolling body group or the sliding body group provided on the other. Further, the above supporting means can comprise the first magnet group provided on the frame and the second magnet group provided on the impeller so as to repel each other against the first magnet group. And further, it is preferable that the first magnet group is aligned in substantially continuous circularity to the frame, that the impeller has plural blades aligned radially, and that the second magnet group is aligned radially to support the impellers.

In the wind power generation system of this invention, it is preferable that a space(gap)-adjusting means is provided for adjusting the gap.

Further, it is preferable that the system is so composed that in a condition of temporal weak wind power, a current is applied to a part or all of the coils to induce the linear motor action in the field magnets and the coils, thereby a rotation torque is given to the impeller.

It is preferable that the supporting means comprises an annular guide having a center disposed at the rotation center of either the frame or the impeller and a slider provided on the other and running along the guide.

The second aspect of the wind power generator of this invention comprises a frame, an impeller supported rotatably by the frame, and an electric power generator for generating electric powers by the rotation of the impeller, wherein either one of the frame or the impeller is provided with an annular guide having a center located at the rotation center of the impeller and the other is provided with a slider running along the guide.

In the case that the guide and the slider support the impeller rotatably, it is preferable that the guide and slider are those of a linear slide ball bearing. It is preferable that the annular guide has smooth guiding surfaces at its both sides, and that the slider has a guide roller rolling along the guide surfaces and rotating around the vertical shaft. It is more preferable that the center of rotation of the impeller can be set in a horizontal direction, certainly it may be set in vertical direction.

The first aspect of the electric power-mechanical force converter of the present invention comprises a moving part, and stators located at both sides of the moving part, wherein magnet parts composed of a pair of N pole and S pole on the both sides of the moving parts are so disposed as to have alternative positions of the N pole and the S pole; the S pole and the N pole, along the circumference of the moving part. In such electric power-mechanical force converter, it is preferable that the adjacent magnet parts are coupled by nonmagnetic material. In addition, the "moving part" described herein includes both the rotating one and the straight traveling one.

In an alignment of permanent magnets in which one surface of the permanent magnets is paralleled in the same pole face and magnetic bodies whose length is shorter than the thickness of the permanent magnet are intervened between the both permanent magnets.

The second aspect of the electric power-mechanical force converter of the present invention has the stators on the both sides of the magnetic pole of the moving part, and the stator coils wound round the both stator are crossed each other between the same phases. In this cases, it is preferable that the phase of the one stator coil is set to be the order of u-z-v-x-w-y, that the phase of the other stator coil is set to be the order of x-w-y-u-z-v. That they are aligned so as to face in a opposed position, and that the stator coils of the both sides are crossed each other between the same phase.

The third aspect of the wind power generation system of the present invention comprises plural blades, an annular supporting member to support the blades aligned circularly, a guide member to support the supporting member being faced to the supporting member, a field magnet provided on either the supporting member or the guide member, and a coil provided on the other to generate electric power by moving relatively to the field magnet, having no shaft at the center of the blades.

The third aspect of the electric power-mechanical force converter of the present invention comprises a moving part, stators disposed on both sides of the moving part, a repelling magnet of the moving part side disposed so as to move together with the moving part, and a repelling magnet of the stator side repelling the repelling magnet of the moving part side, wherein either the repelling magnet of the moving part side or the repelling magnet of the stator side is disposed so as to intervene the other in order to push the moving part to a neutral position. In this case, the repelling magnet of the stator side can be disposed in one pair so as to intervene the repelling magnet of the moving part. Further, the repelling magnet of the moving part side can be disposed in one pair so as to intervene the repelling magnet of the stator side.

And further, it is preferable that the gap-adjusting means automatically keeps the gap between the field magnet and the coils within a given range when the dimension of the flame or the impeller changes according to the ambient temperature change.

In this case, it is preferable that the gap-adjusting means automatically adjusts the gap between the field magnet and the coils widening the gap when in week winds and narrowing the gap when in strong winds.

Further, it is preferable that at least some of the groups of the coils in the coils are wired in series/parallel in a switchable way, generating low voltages in the parallel wiring when in weak winds and high voltages in the series wiring when in strong winds.

The electric power generator using the impeller comprises a vertical airflow path with its upper part and lower part being communicated with ambient air, an impeller rotated by an ascending airflow provided in the airflow path, and a power generator working with the rotating part of the impeller. In this electric power generator, it is preferable that the impeller rotates around the rotation shaft extending in a vertical direction, that the airflow path is so composed as to be integrated with a building, that the airflow path is composed of walls having a cylindrical shape provided with openable and closable windows, that a heat absorbing part whose temperature rises by receiving solar heat is provided inside or outside of the airflow path, and that the airflow path serves for a path for waste heat of the building.

Further, it is preferable that plural pipes composing the airflow path are aligned circularly and a power generator for side winds supported by the pipes is further provided. And further, it is preferable that plural pipes composing the airflow path are aligned circularly, that the heat absorbing part whose temperature rises by receiving solar heat is provided under the pipe column, and that the heat absorbing part and the lower part of the pipes are communicated. The heat exchange system of this invention comprises the first heat exchanger located near the ground, the second heat exchanger located at the position where the temperature is different from that of the ground, a piping to couple the first heat exchanger and the second heat exchanger making a loop, and a means to circulate the heat medium flowing in the pipes. In such heat exchange system, it is preferable that the power to drive the means to circulate the heat medium is supplied by wind powers.

The impeller is preferable to comprise one pair of the ring, blades supported by the ring, a spoke-like supporting member provided on the ring, a boss provided at the center of the supporting member. Further, the moving part is preferable to be composed of a thin rotating plate provided with the field magnet. The rotating plate can be like circular plate or cylindrical plate. Further, it is preferable that a reinforcing wall perpendicular to the rotating plate is provided on the edge of the rotating plate.

In this wind power generation system of the present invention, when the impeller rotates the field magnet and the coil provided on the frame and the impeller respectively generates an electric power by the inverse action of a linear motor. A large number of such field magnet and coil can be aligned along the periphery or mid periphery of the impeller quickening the relative speed. Further, since the electric power is generated at the periphery of the impeller, it is not necessary to transmit large power to the central part saving the weight of the impeller. Therefore, the impeller is easily rotated by a slight (weak) wind, and even the slow rotation of the impeller can generate sufficient amount of electric power by the coils.

In the wind power generator, in which field magnets are aligned circularly around the vicinity of the periphery or medium part of the impeller; a ring-shaped member is provided in proximity to the coils in the frame; and the coils are mounted on the ring-shaped member, since the coils with necessary wiring are provided on the frame, the structure is simplified. Further, since the sliding parts e.g. brushes are not necessary, the rotation resistance is low enabling easy rotation in a weak wind. And further, since the ring-shaped members provided on the frame can support the coils, the selection of the whole frame shape can be relatively optionally.

In the case that the ring-shaped member on which the coils are mounted is so provided in one pair as to place the field magnet in between and is mounted circularly on the on the impeller; the coils mounted on the one side and the coils mounted on the other side are divided into plural groups of coil aligned alternatively or cyclically respectively for generating alternative currents; the coils mounted on the one side having a specified phase and the coils mounted on the other side having a corresponding phase with the above specific phase are connected in series, the magnetic fields generated between the coils mounted on the other side and the field magnets and those generated between the coils mounted on the one side and the field magnets naturally balances. Therefore, the gap between the field magnets and the coils mounted on the other side and those between the field magnets and the coils mounted on the one side are not necessary to be so large for avoiding one-sided large force to be applied on the one or the other side.

In the case that the coils mounted on the one side and the coils mounted on the other side are divided into the first coil group, the second coil group and the third coil group circularly aligned respectively so as to generate the three phase alternative currents; the coils mounted on the one side are facing the second coil group and the third coil group of the coils mounted on the other side under a staggered arrangement, a three phase alternative current is outputted from the first coil group, second coil group, and the third coil group as the field magnets run between the coils mounted on the other side and the one side coil groups while the impeller is rotating.

In the case that the ring-shaped member has plural ring pieces of a given length connected into one shaped body, and each ring piece comprises a core composed of superposed plural metal plates, coils composed of a conducting wire wound around its periphery having a given length, and a synthetic resin solidifying the core and the coils into one body, it can be minified allowing easy manufacturing and assembling.

In the case an annular supporting means is intervened between the periphery or the medium part of the impeller and the frame for supporting at least a part of the weight of the impeller allowing rotation of the impeller, since the resistance between the shaft and the bearing is low, it can rotate in a slight wind easily without easy stopping.

In the case that the above supporting means comprises a rolling body group and a sliding body group provided either on the frame or the impeller and a runway which contacts the rolling body group or the sliding body group provided on the other, since the each rolling body and the sliding body shares the weight of the impeller furthermore lessening the friction resistance, the rotation resistance at the supporting member is lessened.

In the case that the above supporting means comprises the first magnet group provided on the frame and the second magnet group provided on the impeller so as to repel each other against those magnets, non-contact supporting can be realized reducing the rotation resistance at the supporting member. Further in the case that the first magnet group is substantially aligned in continuous circularity to the frame, that the impeller has plural blades aligned radially, and that the second magnet group is aligned radially to support the impellers, the second magnet group receives the repelling force from the first magnet group of the frame allowing efficient support stably.

In the wind power generation system provided with a gap-adjusting means for adjusting the gap between the field magnets and the coils mounted between the frame and the impeller, the space between the field magnet and the each coil can be adjusted enabling efficient electric power generation and large power generation in a low rotation number.

In the wind power generation system which is so composed that in a condition of temporal weak wind power, a current is applied to a part or all coils to generate the linear motor action in the field magnets and the coils, thereby the rotation torque being given to the impeller, it is possible to maintain the rotation of the impeller in a weak wind and to lessen the loaded resistance of power generation at the start of the rotation. Therefore, when a large static friction resistance exists, the rotation can be started smoothly allowing efficient power generation even in a weak wind.

In the case that the supporting means comprises an annular guide whose center is located at the rotation center of either the frame or the impeller and a slider running along the guide provided on the other, it can support and guide not only the weight of the impeller but also the radial force. Therefore, the strength and rigidity of the center shaft of the impeller is not necessary to be enhanced enabling to omit the shaft and the bearing and to lessen the weight of the impeller.

In the second aspect of the wind power generation system of this invention, since the support of the impeller to the frame is done by the annular guide and a slider running along the guide, the strength and rigidity of the center shaft of the impeller is not necessary to be enhanced. Therefore, it is possible to omit the shaft and the bearing and to lessen the weight of the impeller allowing easy compliance to jumboizing of the impeller.

In the system that the guide and the slider support the impeller rotatably and in the case that the guide and slider are composed of a linear slide ball bearing, the sliding resistance is small allowing smooth rotation. Further, in the case that the annular guide has smooth guiding surface at its both sides and the slider has a guide roller rolling along the guide surface and rotating around the vertical shaft, without thickening, the slider is guided securely, thereby the gap between the field magnets and the coil groups are maintained suitably allowing smooth rotation. In the case that the above composition is applied to such type of windmills in which the rotation center of the impeller is set in a horizontal direction, an electric power is efficiently generated in a constant wind direction.

In the first embodiment of the electric power-mechanical force converter of this invention, since the both side magnet poles(magnets) of the moving part is composed as a pair, the both side magnets operate in the same magnetic circuit. Therefore, when the eccentricity of moving parts occurs, the magnetic attracting force of the both side magnets balances to make the sum of the force of the whole moving parts zero, on calculation allowing no force to occur to move further the moving parts. Further, since the magnets are mounted on the same magnetic circuit, the rotor yokes between the magnet poles necessary for conventional structures are not necessary, thereby the weight of the moving parts and the width of the moving parts (width toward lateral direction in relation to the moving direction) can be effectively reduced. In the case that the neighboring magnet parts are coupled by non-magnetic metal bodies, no magnetic flux leaks to the neighbor magnetic pole.

The alignment of the permanent magnets of this invention can reduce the repelling force and attracting force of the neighboring permanent magnets, thereby allowing easy mounting of the permanent magnets to reduce on-site working hours. The reduction of the attracting force between the permanent magnets makes it easy to disassemble and check the power generator. Further, a structure to fix the permanent magnets is not necessary for a countermeasure to the repelling force of the permanent magnets.

In the second aspect of the electric power-mechanical force converter of the present invention, by crossing the stator coils of the both side of the magnetic pole pair of the rotor, a circulating current constantly flowing in the stator coils is prevented equalizing the difference of the induced voltage due to the difference of the both stator and making the generated voltage of the both stator and the load current equal. Equalizing the difference of the magnetic flux distribution of the both stators in the loaded condition can reduce the magnetic attractive force. Particularly, in the case that the alignment of the outside stator coil is set to be the order of u-z-v-x-w-y and that of the inside stator coil is set to be the order of x-w-y-u-z-v, and that they are aligned in a opposed position and the stator coils are crossed between the each same phase, the generated voltages become equal suppressing the generation of the circulating current between the both stator coils.

The third aspect of the wind power generation system of the present invention has no shaft in the central part to allow a light weight composition enabling rotation under a small amount of wind.

In the third aspect of the electric power-mechanical force converter of the present invention, the moving side repelling magnets and the stator side repelling magnets are repelled by the stator side repelling magnets or the moving side repelling magnets of the both side and are so pushed as to come to a neutral position. In other words, when they change their position coming near to the one side, the repelling force by the opposite repelling magnets become stronger to turn back them. Therefore, the moving parts move stably, and in the case that the moving parts are the rotors, they rotate stably.

In these electric power-mechanical force converter, in the case that the rotor side repelling magnets are aligned as one pair so as to intervene the repelling magnet of the moving part side, the above described stabilization is obtained in both sides of the stator with less bilateral inclination allowing more stable movement. Further, in the case that inversely the repelling magnets of the moving part side are aligned as one pair so as to intervene the repelling magnet of the stator side, the both repelling magnets of the moving part side are so pushed as to come to a neutral position by the repelling magnets of the stator side allowing smooth movement.

In the case that the gap-adjusting means automatically keeps the gap between the field magnet and the coils within a given range, when the dimension of the flame or the impeller changes according to ambient temperature change, the amount of power generation is stable.

In the case that the gap-adjusting means automatically adjusts the gap between the field magnet and the coils, widening the gap when in week winds and narrowing when in strong winds, it is possible to decrease the amount of power generation reducing rotation resistance when in week winds and to increase the amount of power generation when in strong winds enabling to raise the efficiency of the power generation.

In the power generating apparatus of the present invention, under the condition that the air flow path of the upper part and the lower part is communicated, there occurs the air pressure difference between the upper part and the lower part to yield an ascending air current. Therefore, even in the condition of calm, the impeller can be rotated by the ascending air current to generate powers.

In the case that the impeller rotates around the rotation axis extending in a vertical direction, the ascending air current is received by the whole of the impeller allowing full utilization of the rotation force yielded by the ascending air current. It may be the one that rotates around a vertical rotating shaft, in which case the upward rotating part only is exposed to the airflow path. Further, the downward rotating part can be a water wheel rotated by receiving the water.

In the case that the airflow path is integrated with a building, the ascending air flow yielded along the building can be utilized for rotating the impeller. Further, since the airflow path can be made composed by the building walls, a large electric power generator can be easily manufactured at low cost enhancing the economical efficiency.

In the case that the airflow path is composed of walls having a cylindrical shape provided with windows openable and closable, in a strong wind its windows are opened for introducing winds from side walls to strengthen the ascending air flow rotating the impeller. In a weak wind or in a too strong wind such as typhoon the side walls are closed to generate powers only by the ascending airflow. Therefore, the power generation efficiency is further enhanced protecting the impeller from strong winds.

In the case that the heat absorbing part whose temperature rises by receiving solar heat is provided outside or inside of the airflow path, the air temperature of the portion receiving the solar heat rises and the relevant air density is decreased by expansion, thereby the air of risen temperature ascends through the airflow path. Accordingly, the ascending airflow becomes stronger to enhance the power generation efficiency. As the heat absorbing part, painted surfaces from black to dark color or laminated films having those colors are used. In the case that the airflow path is composed of transparent walls, such films pervious to infrared ray coming from outside and not so pervious to those coming from inside are preferable to be used.

Further, in the case that the airflow path doubles as a path for waste heat of the building, the waste heat of air-conditioners etc. is efficiently exhausted by the airflow path strengthening the ascending airflow to enhance the efficiency of the power generation. In the case that at least some of the groups of the coil are wired in series/parallel in a switchable way; generating a low voltage in the switched parallel wiring when in weak winds; and generating a high voltage in the switched series wiring when in strong winds, electric powers are efficiently generated from weak winds to strong winds.

The heat exchange system of this invention can retrieve the heat of the heat medium which is cooled or heated by the second heat exchanger using the first heat exchanger located near the ground saving the energy used for cooling or heating. Further, utilizing the above wind power generation system for the circulation of the heat medium, more saving of the energy can be attempted.

BRIEF DESCRIPTION OF DRAWINGS

FIGS. 9a~9c are elevational cross sections of the substantial part showing further the other embodiment of the wind power generation of this invention;

FIG. 10 is an elevational cross section of the substantial part showing further the other embodiment of the wind power generation of this invention;

FIG. 14a and FIG. 14b is respectively a longitudinal section and a plane view showing whole of the wind power generation system of FIG. 12;

FIG. 15a and FIG. 15b is an elevational cross section of the substantial part showing further the other embodiment of the wind power generation of this invention;

FIG. 20a and FIG. 20b is respectively an elevational cross section of the substantial part showing further the other embodiment of the system of this invention;

FIGS. 26a~c is a cross section showing the other embodiment of the magnetic levitation structure related to the system of this invention;

FIGS. 27a~b is a cross section showing the other embodiment of the magnetic levitation structure related to the system of this invention;

FIG. 51 is a drawing showing the evaluation of generated voltages in relation to the phase order of the stator coils when the outside coils and the inside coils of this invention are crossed;

FIG. 57a is a perspective view of the substantial part of the other embodiment of the rotor related to this invention, FIG. 57b is a cross section of the substantial part, FIG. 57c is a plane cross section of the substantial part;

FIG. 58a and FIG. 58b is respectively a cross section of the substantial part showing the other embodiment of the rotor of this invention;

FIG. 59a~c is respectively a rough plane view showing further the other embodiment of the rotor of this invention;

BEST MODE FOR CARRYING OUT THE INVENTION

Figure 2:
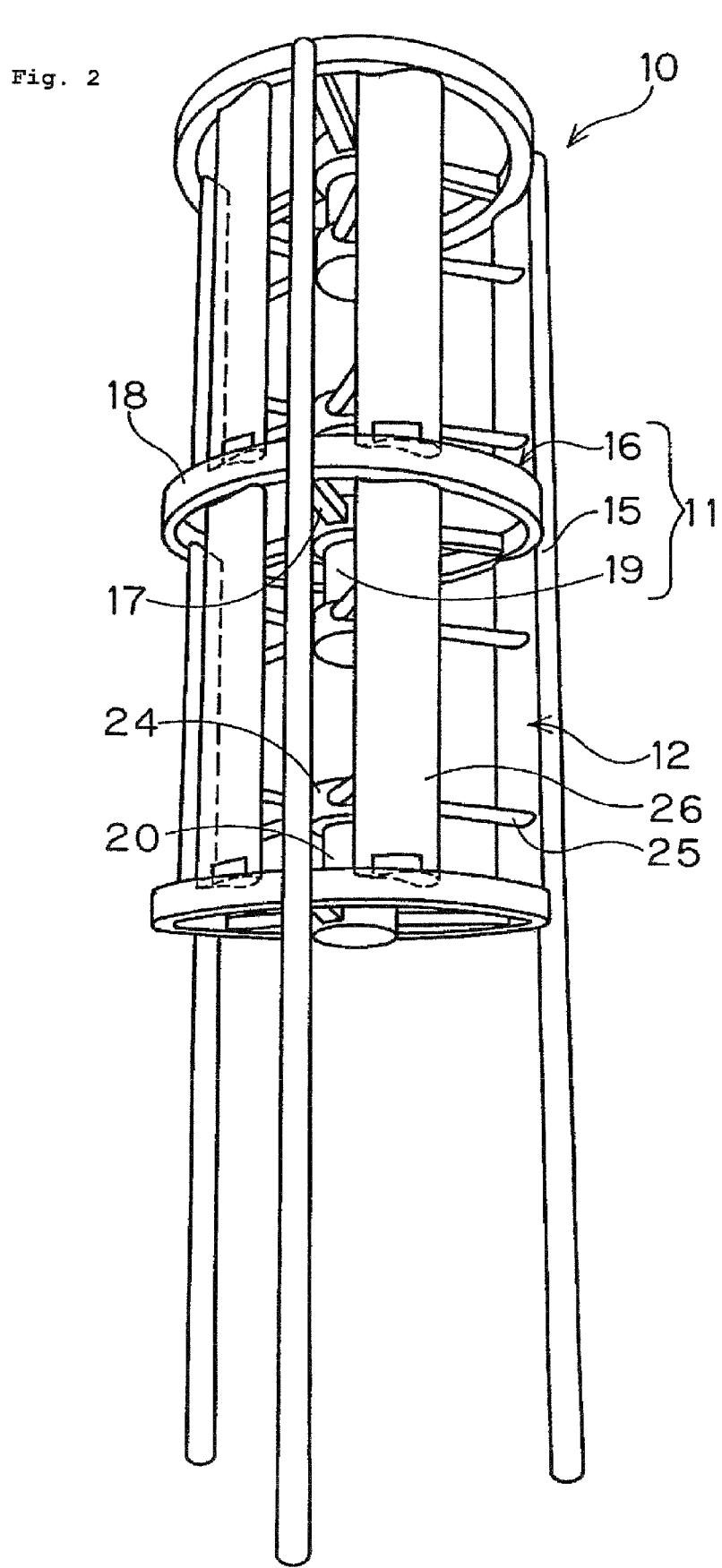
FIG. 2 is a perspective view showing whole of the wind power generation system of this invention.

At first, referencing FIG. 2, whole of the wind power generation system is described. The wind power generation system 10 shown in FIG. 2 comprises the frame 11 and the impeller 12 provided on the upper and the lower two stages in the frame, wherein the impeller 12 is provided rotatably around the shaft vertical to the frame 11. Between the lower edge of the impeller 12 and the ring 18 of the frame 11, a power generating part 14 (in other wards linear generator) generating powers under the reverse action of linear motors is provided.

Figure 3:
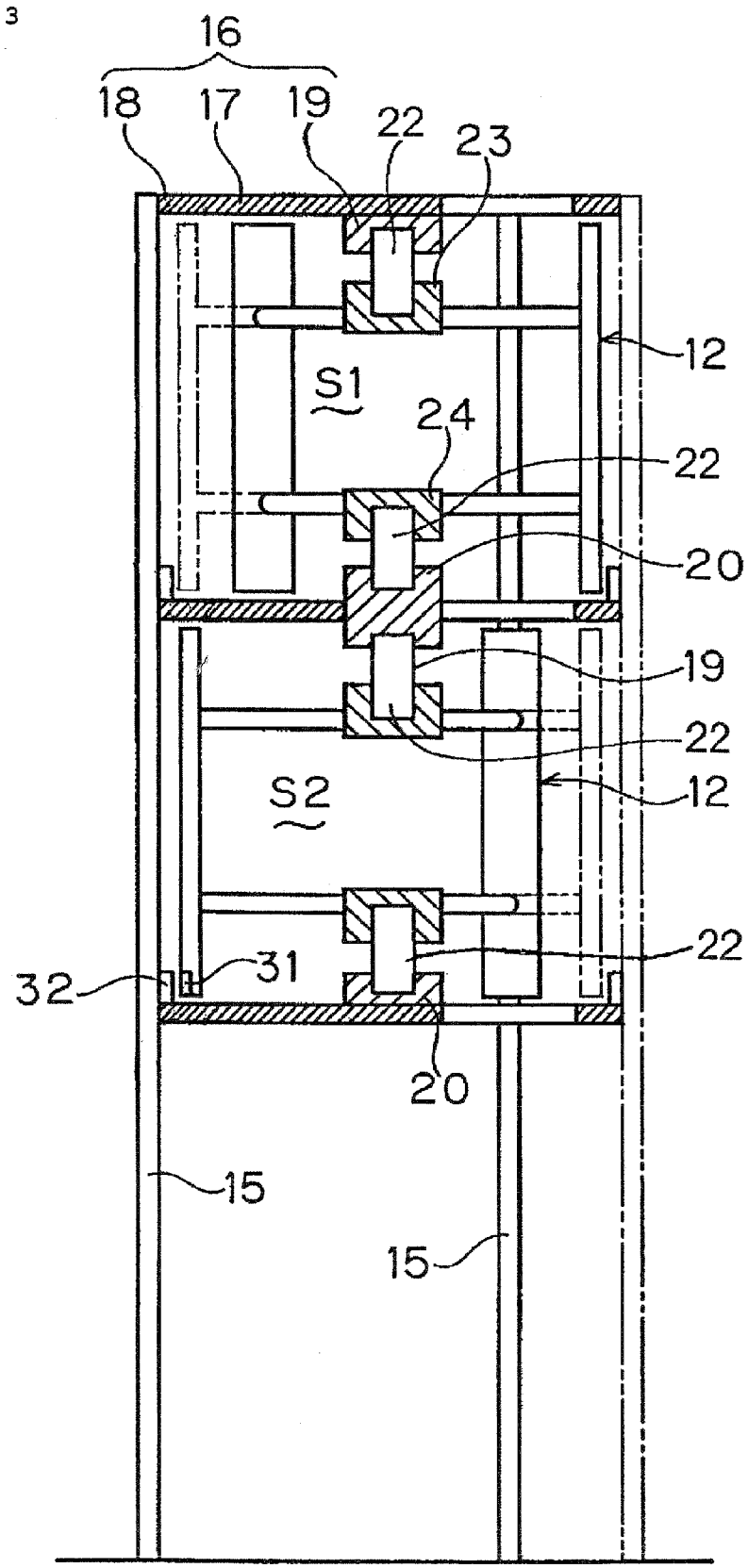
FIG. 3 is an elevational cross section of the system.
Figure 4:
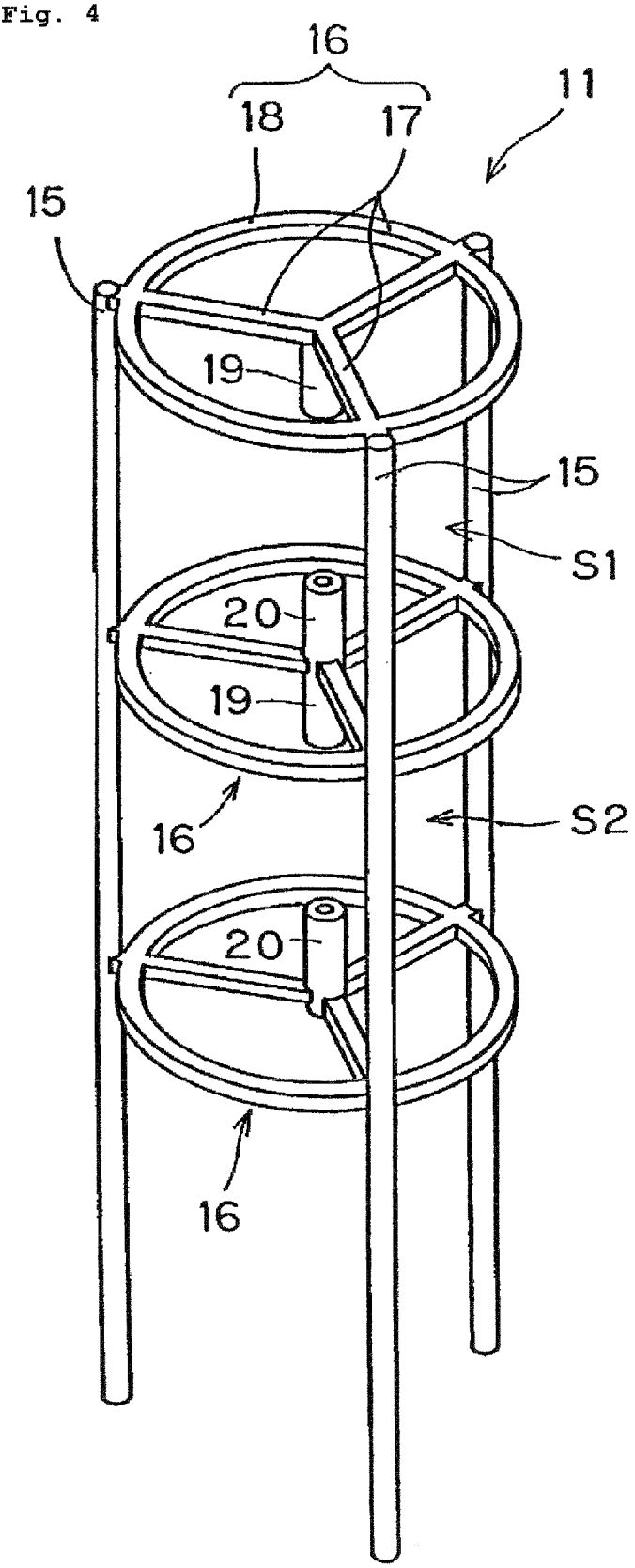
FIG. 4 is a perspective view showing the frame of the wind power generation system of FIG. 2.

As shown in FIG. 3 and FIG. 4, the frame 11 is provided with three legs 15 extending upward and downward and inter-links 16 connecting the legs at an equal interval circumferentially. The interlinks 16 are disposed at three positions; the upper edge of the legs 15, a certain degree upper position than the lower edge of the legs, and the middle position. In the spaces S1, S2 between the each interlink 16, the impellers 12 is accommodated. The interlinks 16 comprise three spokes 17 extending in radial directions and ring 18 connecting the each adjacent outside edge of these spokes 17. Further, in the center of the spoke 17 of the each interlink 16, one pair of upper and lower bearings 19, 20 to hold the impeller rotatably is provided.

Figure 5:
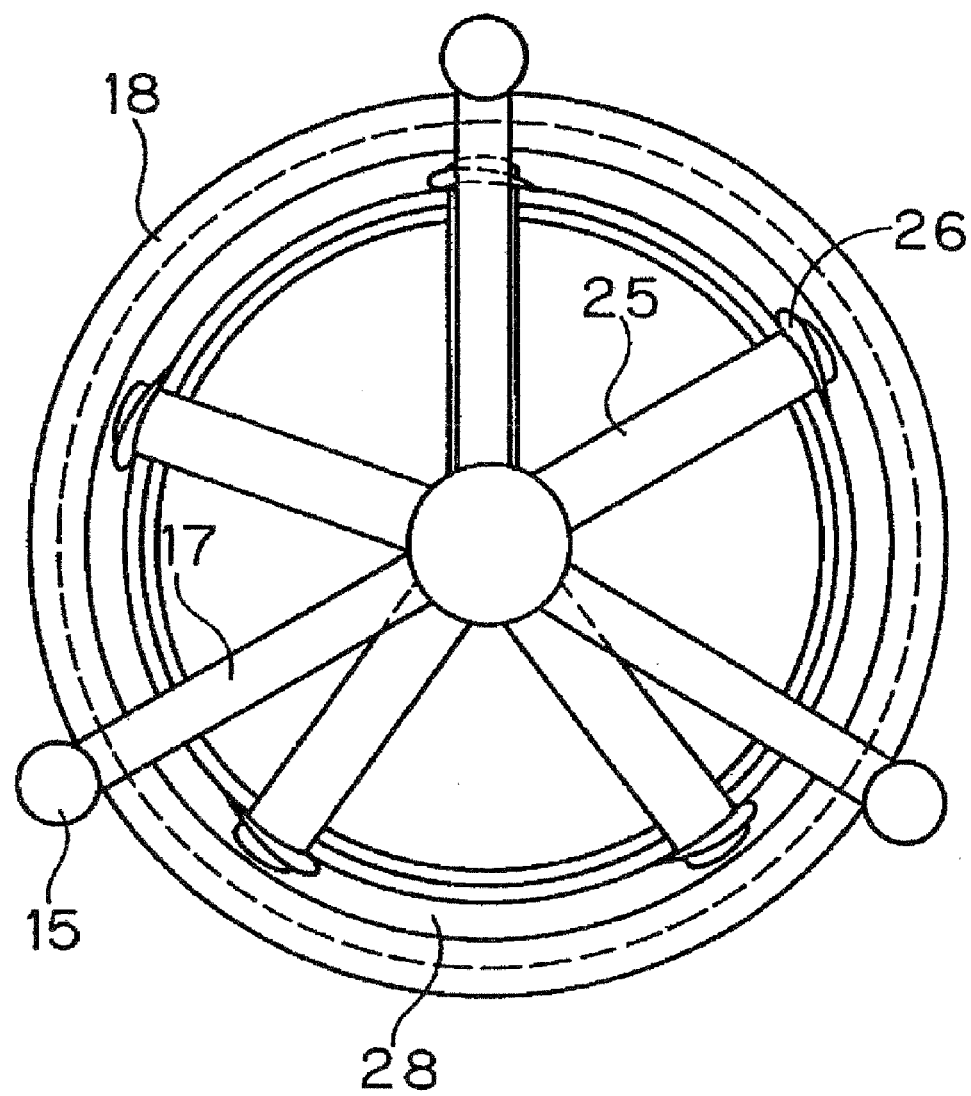
FIG. 5 is a plane view of the wind power generation system of FIG. 2.
Figure 6:
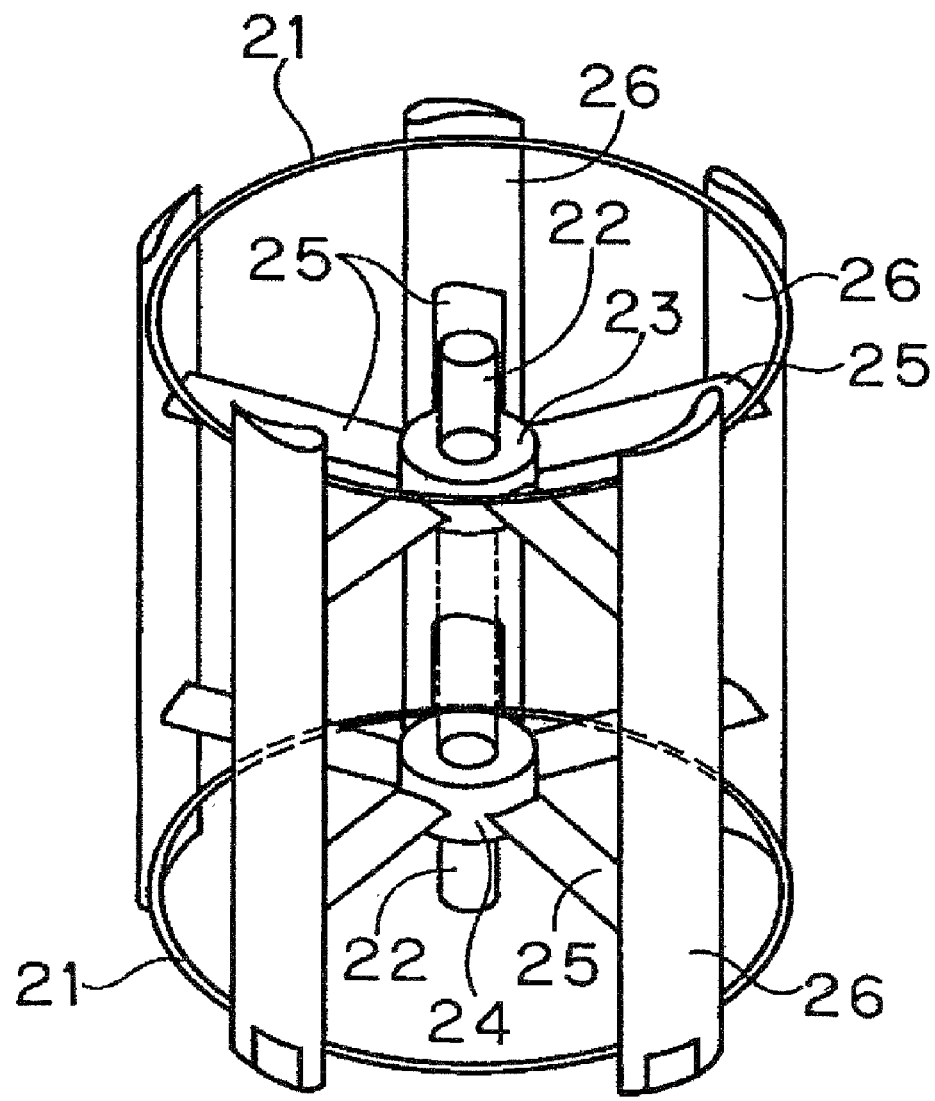
FIG. 6 is a perspective view showing the impeller of the wind power generation system of FIG. 2.

As shown in FIG. 5 and FIG. 6, the impeller 12 comprises a shaft 22 extending upward and downward, one pair of upper and lower bosses 23, 24 fixed to the shaft, five transverse blades 25 extending in the radial directions from the each boss, and the longitudinal blades 26 fixed to the front edges of the upper and lower transverse blades 25. More specifically, in this embodiment, the five longitudinal blades 26 and the doubled ten transverse blades 25 are provided. Further, the upper and the lower edges of the each longitudinal blade 26 are interconnected by a reinforcing ring 21,21 increasing the whole strength of the impeller 12. But the reinforcing ring 21,21 may be omitted. The transverse blades 25 have such a wing shape that a lift force acts upward when the shaft 22 rotates anticlockwise viewed from the top. The front edge may be inclined upward as for the direction of the rotation, and a specific wing shape and a specific inclination may be combined. Further, the inclination may be adjusted. The number of the longitudinal blades 26 can be about three or more than ten. Further, the upper and the lower shaft 22 can be coupled to make one shaft passing through upward and downward as shown in the imaginary line.

The longitudinal blades 26 have a wing shape that generates anti-clockwise moment viewed from top when the resultant force is generated by the five longitudinal blades 26 in side winds. The longitudinal blades 26 may be inclined around the vertical shaft, and their wing shapes may be combined with the inclination. Further, the inclination may be adjusted.

As shown in FIG. 3, the upper and the lower edges of the shafts 22 of the each impeller 12 are supported by the upper bearing 19 and the lower bearing 20 rotatably. In the case that the wind power generator is installed as shown in FIG. 2, the weight of the impeller 12 is supported by the lower bearing 20. However, it can be supported by wheels or by magnetic levitation. And further, it may be supported by a lift force generated by the transverse blades 25.

Figure 7:
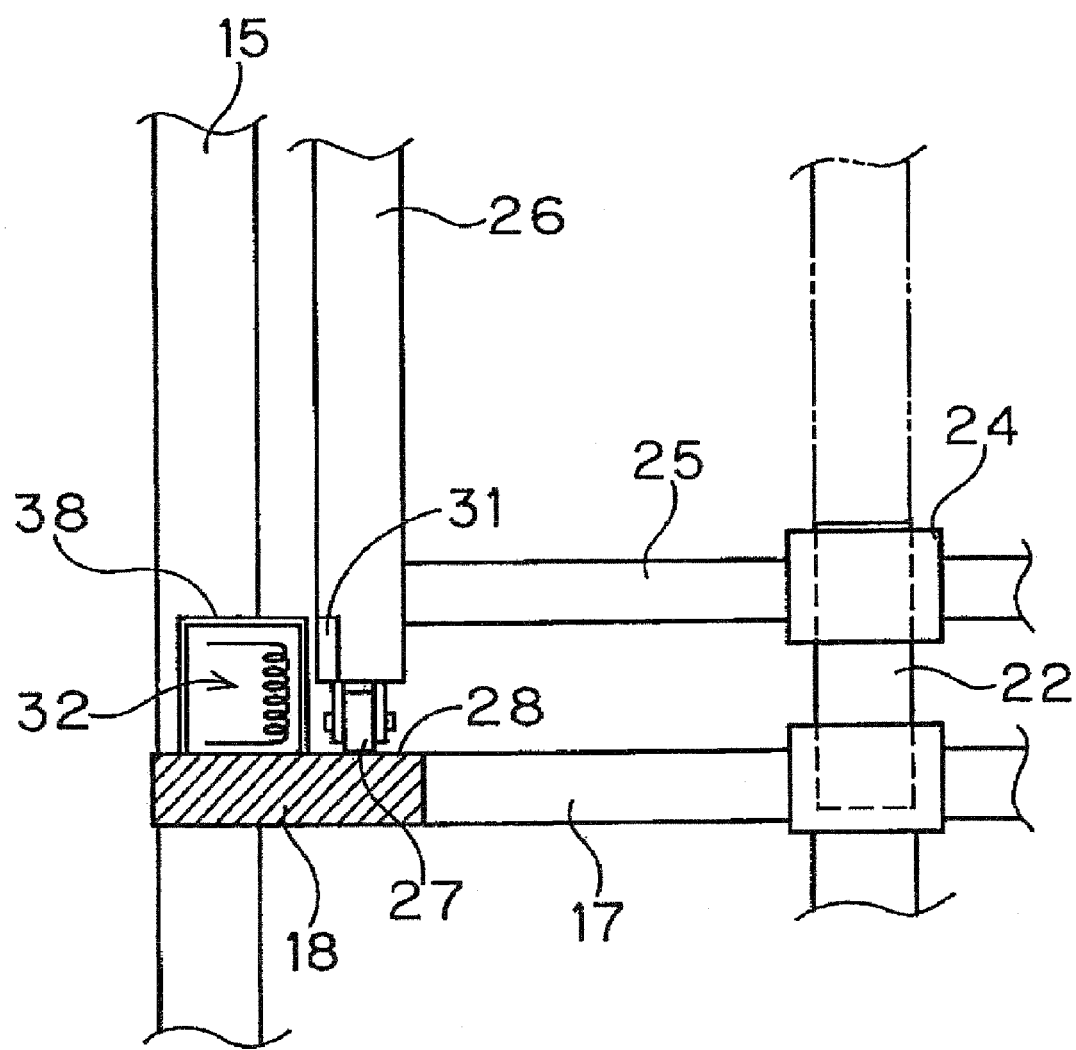
FIG. 7 is an elevational cross section of the substantial part of the wind power generation of FIG. 2.

In the embodiment shown in FIG. 7, wheels 27 are rotatably provided on the lower edges of the each longitudinal blade 26, and the inside of the ring 18 of the frame 11 serves as the annular run way 28. Thereby whole or a part of the weight of the longitudinal blades 26 and the transversal blades 25 are supported by the frame 11 via the wheel 27 reducing the load of the bearing 19, 20. Further, since the bending of the transversal blades is reduced, the action of the power generating part 14 becomes stable. This reduction of the bending enables stable rotation even in the case that the whole of the impeller 12 is composed of such lightweight material as foamed resin and fiber reinforced plastic.

Figure 1:
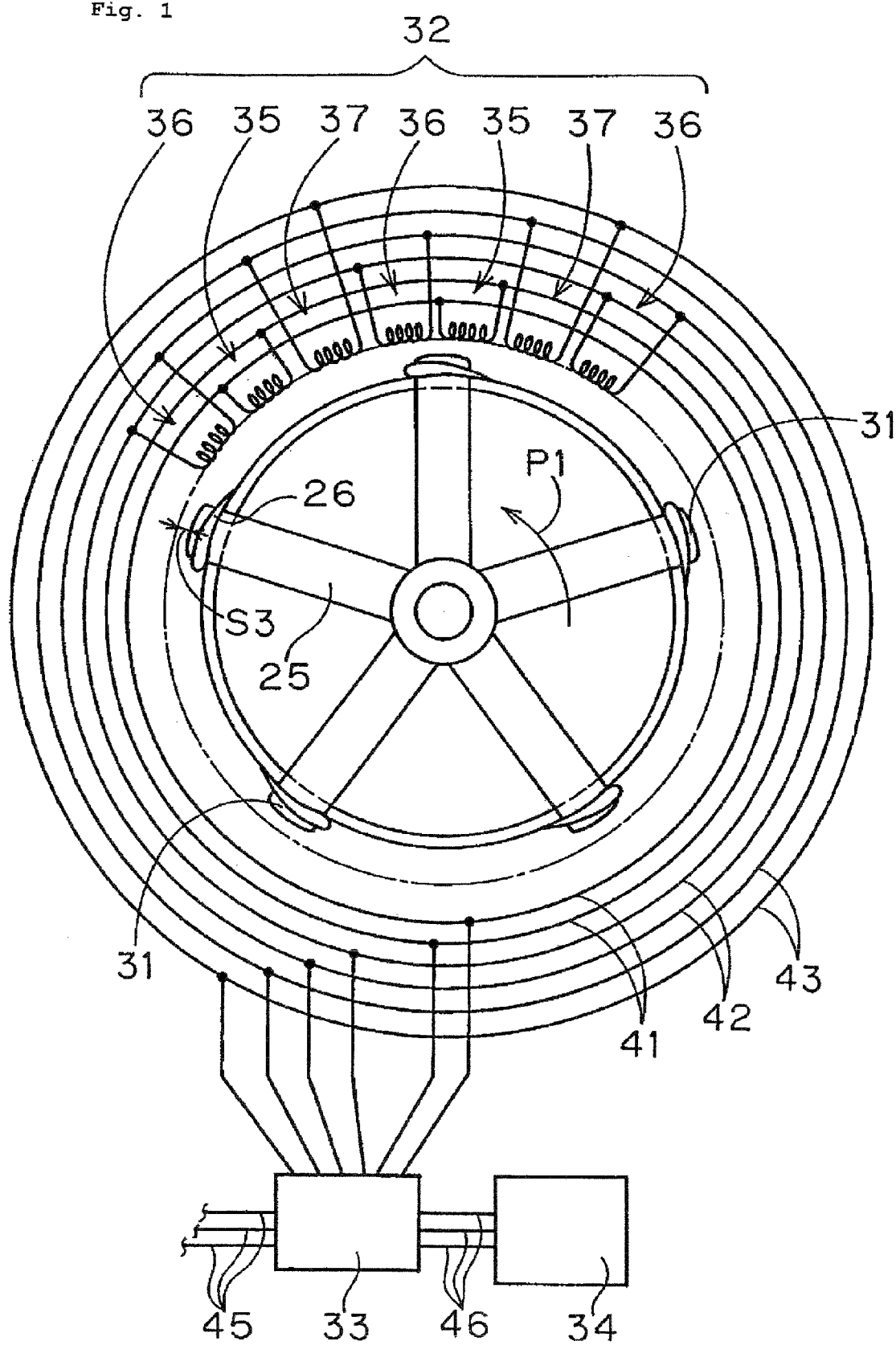
FIG. 1 is a plane view showing conceptually an embodiment of the wind power generation system of this invention.

The above power generating part 14 comprises field magnets composed by permanent magnets 31 provided in the vicinity of the lower edge of the longitudinal blade 26 of the impeller 12, a coils 32, a controller 33 shown in FIG. 1, and a storage part 34. The coils 32 are covered by an annular cover 38 as shown in FIG. 7. As the field magnets, other than permanent magnets, electromagnets can be used. However, permanent magnets are preferable because the wiring is not necessary allowing easy engineering work for installation and maintenance. But in the case of a large-scale wind power generation system, electromagnets have a merit of easy handling. In the embodiments described below, either of the permanent magnets and the electromagnets can be employed.

The coils 32 are composed of the first coil line 35, the second coil line 36, and the third coil line 37, which are lined up in sequence as three each in one block as shown in FIG. 1. The end of the each coil line 35, 36, 37 is connected to the first transmission line 41, the second transmission line 42, the third transmission line 43 in parallel respectively. But, they can be connected in series. Additionally, the transmission lines 41, 42, 43 are assumed to be two wires, the earth line can be common. The each transmission lines 41, 42, 43 are led to the controller 33 and the power can be transmitted outside by an external transmission line 45. The storage part 34 connected to the controller 33 by the transmission line 46 is a part in which a portion of the generated power is stored, and it supplies power when the power generating part 14 is used as a motor. The number of the coils 32 are preferable to be the number dividable by the number of the longitudinal blades 26. In this embodiment, being divided into three groups, it is multiple of 3×5=15 i.e. about 15 each, 30 each or 45 each. But it can be more than 60 each.

The each coils 32 are disposed at about equal intervals. The permanent magnet 31 provided at the lower edge outside surface of the longitudinal blade 26 is so disposed as to be sufficiently near the coil, wherein the gap S3 between the permanent magnet and the coil is i.e. about 1~5 mm. In the each coil of the coils 32, either an iron core may be inserted or may not be inserted.

In the wind power generation system 10 composed as above, the impeller 12 rotates in anti-clockwise direction (arrowhead P1 in FIG. 1) viewed from the top in the blowing winds. The magnetic lines of force of the permanent magnets cross the coils 32 in sequence to generate electromotive forces in the coils under the reverse action of a linear motor, thereby electric powers can be taken out from the both ends. In this embodiment, since the powers are generated in the order of the three pairs of the coil line 35, 36, 37, the electric powers are generated as three-phase alternative currents. The obtained electric powers are transmitted to the controller 33 by the transmitting wires 41, 42, 43. The controller 33 smoothes the ripple of the power or make it into a pure sine curve three phase alternative current, and send it outside. A portion of the powers is stored in the storage part 34 at the same time.

In the wind power generation system 10, since the permanent magnets 31 are mounted in the vicinity of the periphery of the impeller 12, it has a large moment of inertia requiring large rotation starting torque. However, it once starts rotation, it does not stop easily and does not change the rotation number in varying wind forces, thereby enabling stable power generation. Both the longitudinal blades which generate rotation forces by receiving winds and the power generating part 32 that is a load by the reaction of the power generation lie along the tangential line of the outer circumference of the longitudinal blade 26. Therefore, it is not necessary to transfer the torque by the transverse blades, thereby the strength of the blades can be low. Accordingly, the impeller 12 can be composed of foamed resin molding and such lightweight material as fiber reinforced plastic, thereby the rotation resistance is low allowing the high efficiency of power generation.

When the rotation number of the impeller becomes low due to the low wind force, it is preferable to be so composed that the wiring of the transmitting line 46 connected to the storage part 34 is switched by the controller 33 to supply electric powers to the coil group 32 from the storage part 34. Thereby the power generating part 14 operates as a linear motor to rotate the impeller toward the same direction allowing continuous rotation without stopping even in a low speed rotation. In the meantime, since the power generation stops, the power transmission is stopped or continued by the transmission from the storage part 34. When the strong wind blows again, the transmission line 46 of the controller 33 and the storage part 34 are returned to its former connection to generate electric powers. In this case, since the impeller has not stopped, it is not necessary to rotate the impeller against the static friction force that is loaded when starting the rotation from a halted condition. Therefore, an efficient power generation is achieved without loss of electric powers wholly. The above switching between the motor operation and the power generation can be done automatically by providing a sensor of the rotation number and detecting the increase or decrease of the rotation number compared with a given rotation number.

In the case of FIG. 1, all coils are connected at all times to any of the first transmission wire 41, the second transmission wire 42, and the third transmission wire. However, contact breaker points can be intervened between the coils and the each transmitting wire, and together, these coils may be divided into four groups, and the powers are taken out from any of the groups or selected by on/off action of the contact breakers. In this case, since the load of the rotation of the impeller 12 can be changed, it may be so controlled that in a weak wind, fewer coils generate the power, and when the wind recovers, more coils generate the power. Thereby efficient power generation over a wide range of wind forces is enabled. The number of operating coils can be increased or decreased by one each in a group, or otherwise by two each or three each. It is the better way for balancing the rotation resistance of the impeller 12 to break together the two or three coils that are positioned in symmetry to the shaft 22. Further, it is possible to generate powers by a part of coils while the other coils are operated as motors.

In the embodiment shown in FIG. 7, the wheel 27 is mounted under the lower edge of the longitudinal blade 26 and the runway 28 is provided on the frame 11 side, but contrary, the plural wheels 27 can be provided on the ring 18 of the frame 11 and a ring-shaped runway 28 contacting those wheels can be provided on the impeller 12. Further, a sleigh or a sleigh like slider can be provided and slid along the runway.

Figure 8:
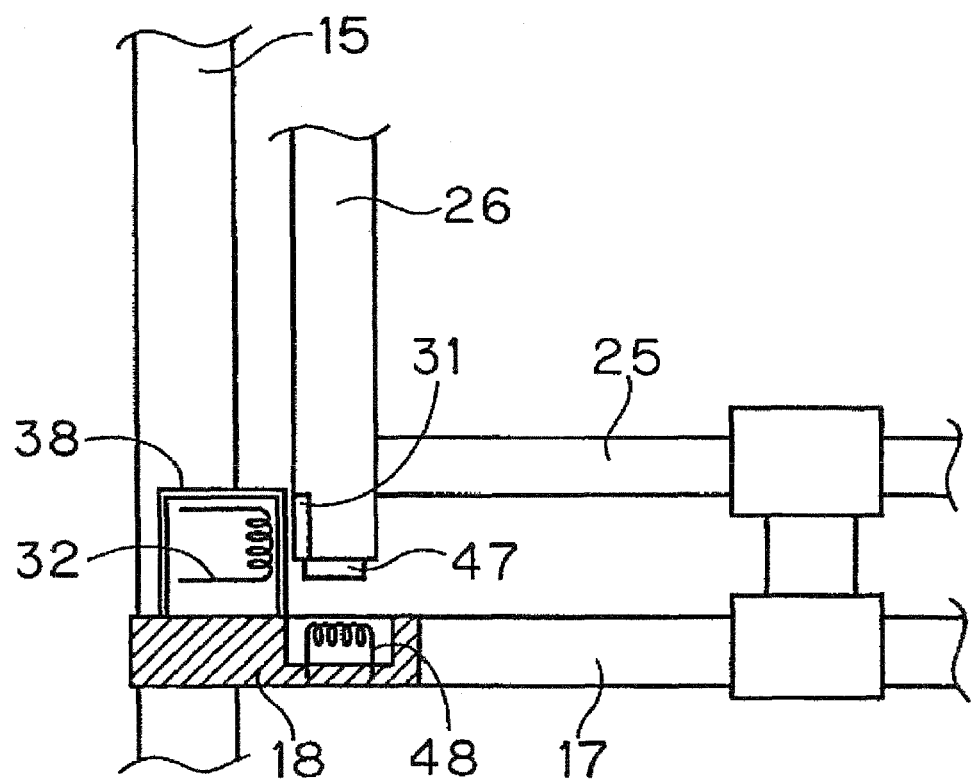
FIG. 8 is an elevational cross section of the substantial part showing further the other embodiment of the wind power generation of this invention.

In the embodiment shown in FIG. 8, the magnet 47 and the coil 48 are provided on the ring 18 of the frame 11 and the lower edge of the longitudinal blade 26 so as to face each other in a vertical direction and to repel each other. Thereby a part or whole of the weight of the impeller can be loaded on the magnetic levitation that provides contactless support of the weight with low resistance even in a high-speed rotation. A permanent magnet can be used in place of the coil 48. The magnetic levitation can be applied to the gap between the upper end of the impeller 12 and the frame 11 using its attractive force. Further, in addition to the method repelling at the lower edge of the frame, it is possible to provide magnets repelling each other between the upper end of the longitudinal blade 26 and the ring 18 of the upper frame. In this case, the impeller rotates in a height balancing the weight, and the upward and downward repelling force allowing highly stable rotation. The iron core may be inserted or not to the coil 48. The above composition of the magnetic levitation can be provided not only in the vicinity of the impeller but also in the gap between the midway of the longitudinal blade 25 and the midway of the spoke of the frame.

In the above embodiments, the coils 32 are fixed to the frame 11 side, but it can be provided on the impeller 12 side as shown in FIG. 9a. Further, as shown in FIG. 9b, the coils 32 can be divided into one pair having a gap in the radial direction, and the permanent magnet 31 etc. is passed through the gap. Contrary as shown in FIG. 9c, field magnets such as the permanent magnet 31 etc. can be provided together with a gap and the coils 32 are passed through the gap.

Further in the above embodiment, the power generating part 14 is provided between the outside of the longitudinal blade 26 and the ring 18, but as shown in FIG. 10a, it can be provided between the lower edge of the longitudinal blade 26 and the upper surface of the ring 18 facing each other in the vertical direction. In this case, the wheel 27 may be provided in the midway of the transverse blade 25 and the runway 28 may be provided in the midway of the spoke 17. In place of the wheel 27 and the runway 28, magnets for the magnetic levitation can be provided in the above both position. Further as shown in FIG. 10b, a supporting ring 52 can be provided in the midway of the transversal blade 25 and another supporting ring 53 facing the supporting ring 52 can be provided, and further a power generating part 54 comprising field magnets of the permanent magnet 31 etc. and the coils 32 can be provided in between the both supporting ring 52, 53. This composition can be provided as the second power generating part in addition to the power generating part 32 provided on the periphery of the impeller as shown in FIG. 7 etc.

Figure 11:
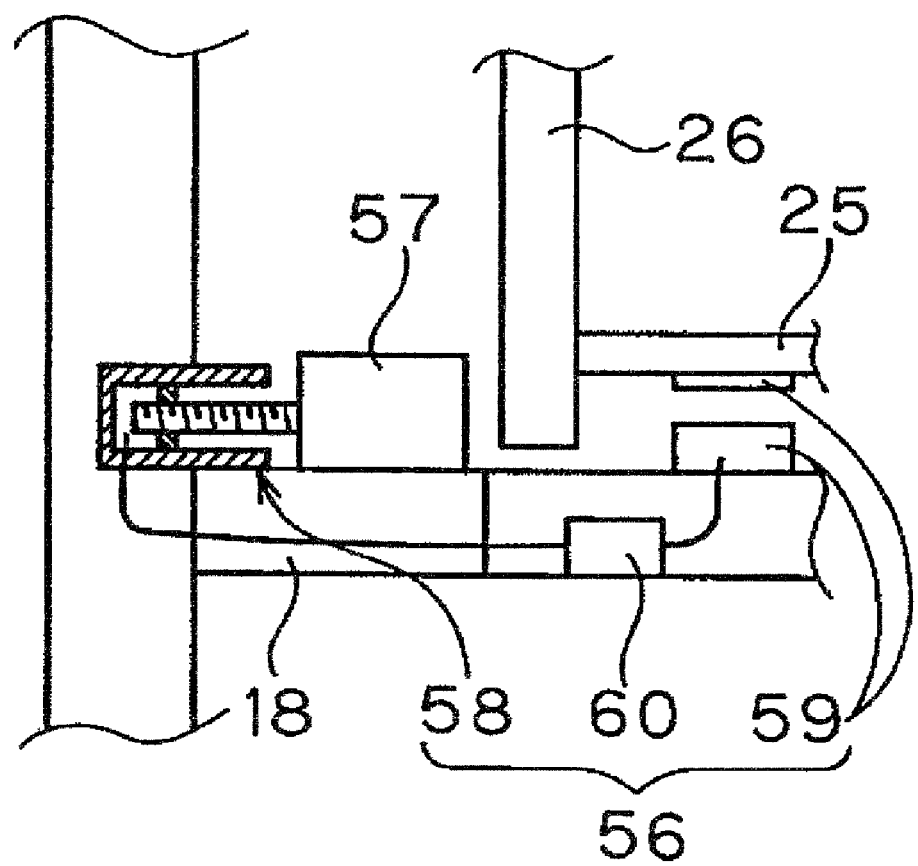
FIG. 11 is an elevational cross section of the substantial part showing further the other embodiment of the wind power generation of this invention.

As described above, the gap between the coils 32 and the permanent magnet 31 is about 1~5 mm and the both move at high speed relatively. Therefore, there is a danger of interference due to losing the gap caused by the expansion of the impeller 12 by the solar heat. Contrary, there is also a case of deterioration in power generation efficiency caused by the extension of the gap due to heat contraction. When the same materials are used for the frame 11 and the impeller 12, the thermal expansion coefficients are the same. But in the case that high strength steel is used for the frame 11 and the lightweight synthetic resin is used for the impeller 12, the increase and decrease of the gap due to the difference of the thermal expansion coefficients becomes large. FIG. 11 shows the embodiment of the gap-adjusting apparatus used in such cases.

In the gap-adjusting apparatus 56 shown in FIG. 11, the coils 32 are accommodated in a coil case 57 and the coil case is mounted movably in a radial direction to the ring 18. The gap-adjusting apparatus 56 further comprises an electric or hydraulic driving mechanism 58 to drive the coil case 57 in the radial direction to the ring, a sensor 59 to detect the expansion of the transverse blade 25, and a control device 60 to control the driving mechanism 58 following the expansion of the transverse blade 25. As the driving mechanism 58, the one that is a combination of a ball screw and a nut rotated by a motor, or the one that uses a linear motor is used. Further, it can be the one that is a combination of a fixed nut and a ball rotated by a motor.

As the sensor 59 of the expansion, for example, strain gages etc. provided respectively on the transversal blade 25 and the spoke 17 of the frame 11 are used. In this case the difference of the each detected value is computed to determine the required value of compensation. Further, it can be so composed that, for example, many light emitting diodes are provided on the transverse blade 25 and many photo sensors are aligned in the radial direction on the spoke 17 of the frame. In this case, the difference of the relative change of the length, in other words, the difference of the thermal expansion can be detected directly. The gap-adjusting apparatus 56 is usually operated in the condition of the impeller 12 being halted. But, it can be so composed as to be activated automatically while in operation.

In the wind power generation system provided with such gap-adjusting apparatus 56, the gap between the coils 32 and the permanent magnet 31 etc. does not hardly change, when the impeller expands or shrinks by solar heat and climate. Thereby, the gap between the both can be made small allowing efficient power generation. Further, it is possible to install the system in such a place where the climate of four seasons or the temperature during the day varies greatly. Furthermore, since the material of the frame and the impeller can be different, the impeller can be made of lightweight foamed resin or fiber reinforced plastic.

The wind power generation system 10 described above is, same as windmills of conventional wind power generators, installed in those places where it can receive much winds, for example, along shorelines or on a hilly land forms such as mountains and plateaus. But it can be also located in a city; on the roof of a buildings etc. When winds blow, the longitudinal blades 26 receive the winds and the impeller 12 rotates counter clockwise shown in FIG. 5. In the case that the transverse blade 25 is wing profile in its cross section or it is the type of magnetic levitation described above, upward lift forces or repelling forces are generated lessening the load of the lower bearing 20 supporting the impeller 12. Thereby the rotation resistance is reduced rotating the impeller 12 efficiently. When the impeller 12 rotates, the activated coils generate powers that are transmitted to consuming regions by the transmitting wires 36, 37 or stored in the storage 34. In the case that the regions to which the powers are transmitted are far, alternating current generators are used and the generated voltages are transformed before the transmission. But the direct current generators may also be used and the generated voltages are inverted into the alternative currents using inverters etc. and transformed once before transmission.

In the above embodiment, the upper end and the lower end of the shaft 22 are supported rotatably by the bearing 19, 20, but contrary the shaft may be provided on the bearing 19, 29 sides, and the bosses 23, 24 are rotatably supported by the shaft. Further, in the above embodiment, the longitudinal blade 26 of the impeller 12 and the bosses 23, 24 are connected by the transverse blade 25, a simple rod etc. can be employed as the supporting member, in which case no lift force is generated.

Figure 12:
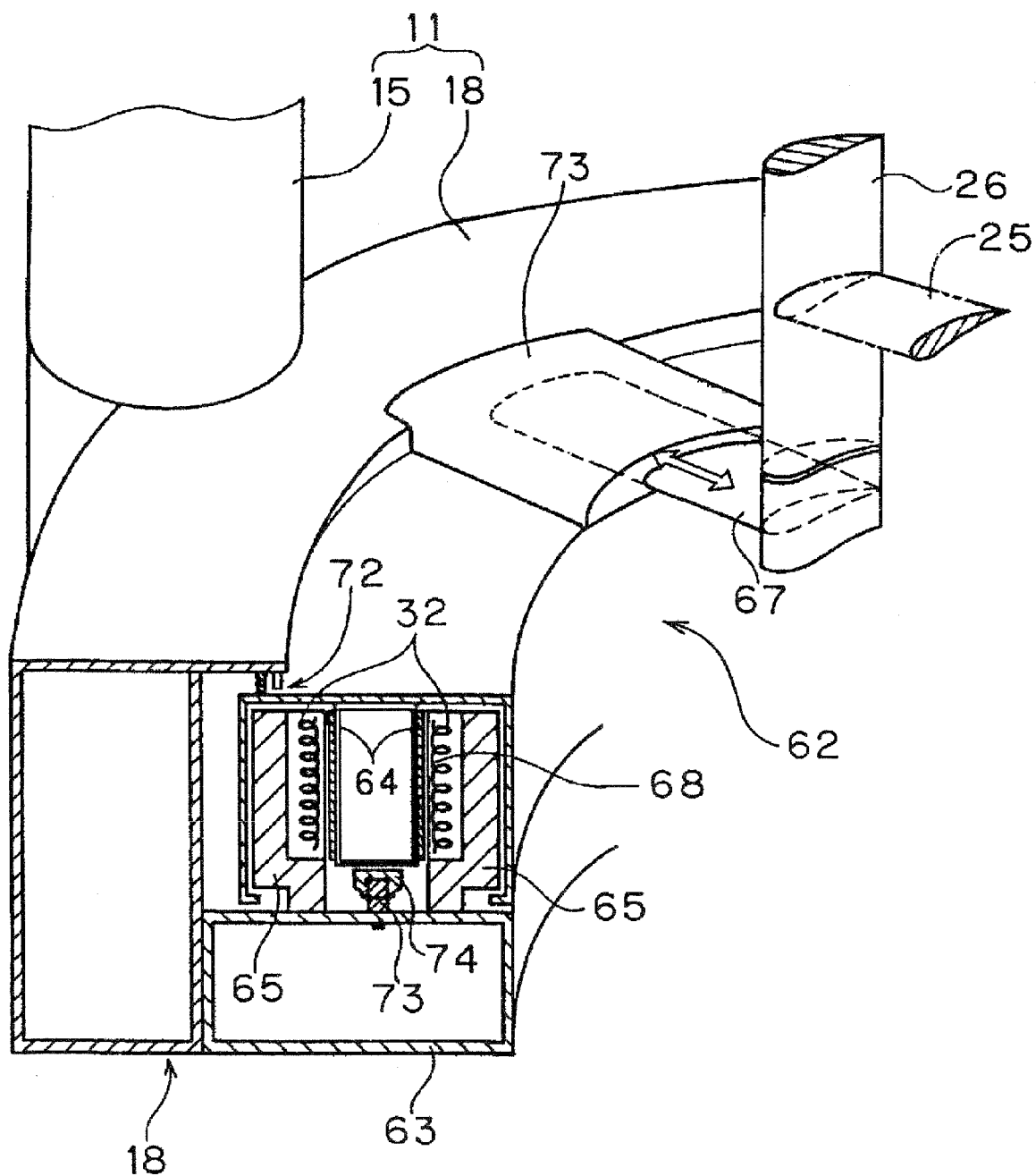
FIG. 12 is a perspective view of the substantial part showing further the other embodiment of the wind power generation of this invention.
Figure 13:
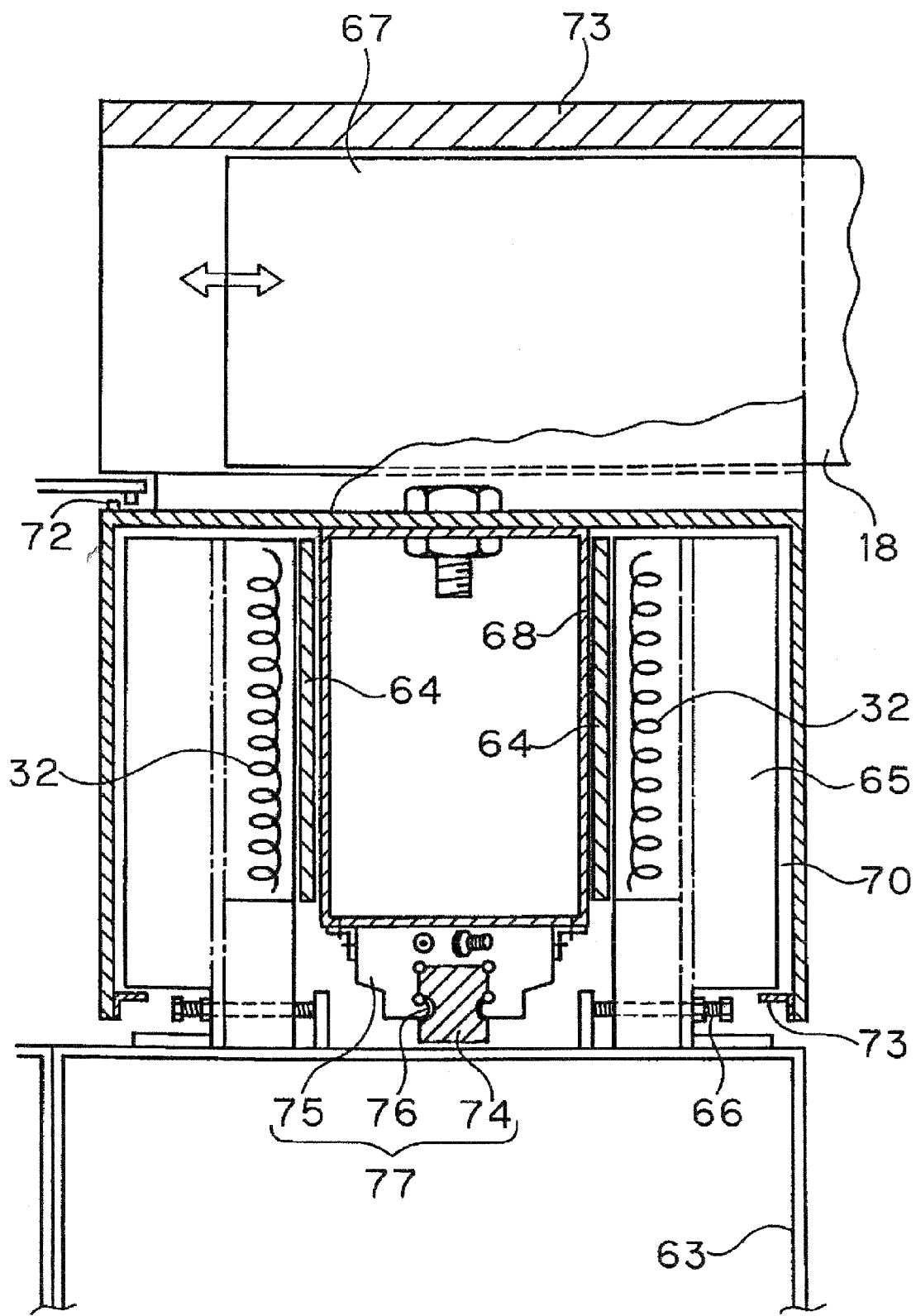
FIG. 13 is a cross section of the substantial part of the system.

In the wind power generation system 62 shown in FIG. 12 and FIG. 13, a pipe-like supporting ring 63 is mounted inside of the ring 18 of the frame 11, and two rows of coils 32 facing each other is aligned on the supporting ring 63 with gaps in between them. In between the gap, a group of permanent magnets 64 mounted on the impeller 12 are disposed as the field magnets. As the field magnets, electromagnets can also be employed. Particularly in a large system, there is a case that electromagnets are preferable. The coils 32 are mounted on the supporting ring 63 using a bracket 65. The position of the bracket 65 is made to be adjustable in the direction of the impeller (in FIG. 13, lateral direction) by an adjusting screw 66.

On the other hand, a blade supporting arm 67 is provided outward from the lower end of the longitudinal blade 26, and the magnets 64, 64 are fixed to the outer periphery and the inner periphery of a reinforcing ring 68 mounted on the blade supporting member 67. The reinforcing ring 68 is constructed to be ring-shape (see FIG. 14b) by bending a rectangular pipe and fixed by screws 70a etc. to the under surface of a cover 70 having U-shaped cross section. The cover 70 covers the outside of the bracket 65 on which the coils 32 are mounted and protects the coils from rainwater. Further labyrinth seals 72, 72 are provided between the upper surface of the outside ring 18 the supporting ring 63 and the cover 70, and also between the lower edge of the cover 70 and the bracket 65 for preventing the invasion of rainwater.

On the upper surface of the reinforcing ring 68, a blade supporting member 73 is mounted tucking the top surface of the cover 70. The blade-supporting arm 67 is fitted to the blade-supporting member 73 slidably along its long side, thereby the reinforcing ring 68 and the transverse blade (reference numeral 25 in FIG. 12) are set free in thermal expansion and thermal shrink. In place of the transverse blade, a supporting stay can be employed. As the blade-supporting arm 67 and the blade-supporting member 73, fiber reinforced resin (FRP) etc. is used. The slidable supporting structure of the blade-supporting arm 73 by the blade-supporting member 73 or the adjusting screw 66 compose a simple gap-adjusting apparatus.

On the supporting ring 63, an annular guide 74 is disposed concentrically with the impeller passing through about the center of the two row coils 32, and fixed to the supporting ring 63 by screws etc. Plural slider 75 is provided slidably on the guide 74 and the under surface of the reinforcing ring 68 is fixed to the slider 75. In this embodiment, as the guide 74 and the slider 75, those of so called a linear slide ball bearings are employed. But the guide 74 is bent in a lateral direction, and plural bent guide pieces are assembled to compose an annular orbit.

The linear slide ball bearing has the same structure as the ball spline etc. More specifically, in the slider side, numerous endless ball rack rails are provided, and the balls held by the rack rails appear at the surface of the slider in their "toward process" and hide in their "backward" process. The ball groups appeared at the surface hold the sliders 75 so as not to slip out from the guides 74 by meshing with the engaging groove 74a etc, and guide the slider 75 smoothly along the guide 74 rolling with low friction. As such a linear slide bearing, LM guide made by THK corp. etc. can be used.

The number of the slider 75 is not particularly restricted, but it is preferable that in the vicinity of the blade-supporting member 73 supporting the impeller 12, they are aligned densely, and in other portion non-densely. However, they may be aligned at equal pitches. By employing such guide structure 77, the impeller 12 is slidably supported to the frame 11 around the self-shaft. Accordingly, as shown in FIG. 14a and FIG. 14b, it is not necessary to provide a shaft (see reference numeral 22 of FIG. 3) or a bearing. Further, the rotation torque of the winds received by the longitudinal blade 26 is transmitted to the relative movement of the coils 32 and the permanent magnets 64 via the blade-supporting arm 87, the blade supporting member 73, and the reinforcing ring 68, without going through the transverse blade. Therefore, the impeller 12 can be rotated against the resistance generated by the power generation and the friction resistance by the linear guide, thereby the powers are generated under the inverse principle of a linear motor.

In the above embodiment, the transverse blades and the shafts are not provided, but as shown in the imaginary line in FIG. 14a and FIG. 14b, the transverse blades 25 can be provided and the impeller 12 can be supported by the boss 24 and the shaft 22. In the case that such transverse blades 25 are provided as shown in the imaginary line in FIG. 14b, the reinforcing ring 68 and the supporting ring can be provided on the midway of the transversal blade 25, and further, it is possible to support the impeller 12 slidably by the slider mounted on these reinforcing ring 68 and the guides provided on the supporting ring. In this case also, by mounting permanent magnets on the reinforcing ring 68 and by mounting the coils on the supporting ring, powers can be generated under the inverse principle of linear motors.

As shown in FIG. 15a and FIG. 15b, the reinforcing ring 68 can be mounted at the vertical medium position of the longitudinal blade 26, and the supporting ring 63 can be provided on the corresponding position to the frame 11. In the system shown in FIG. 15a, the slider is mounted on the reinforcing ring 68 in a lateral direction and the guide 74 to guide the slider is mounted inside of the supporting ring 63. Further, the coils are mounted inside of the supporting ring 63 and the permanent magnets are mounted on the upper and lower side of the reinforcing ring 68. On the other hand, in the system shown in FIG. 15b, the reinforcing ring 68 is disposed on the supporting ring 63, and the sliders, guides, coils and the permanent magnets are disposed same as shown in FIG. 13. In such system, even an impeller longer than is wide can be stably held.

Figure 16:
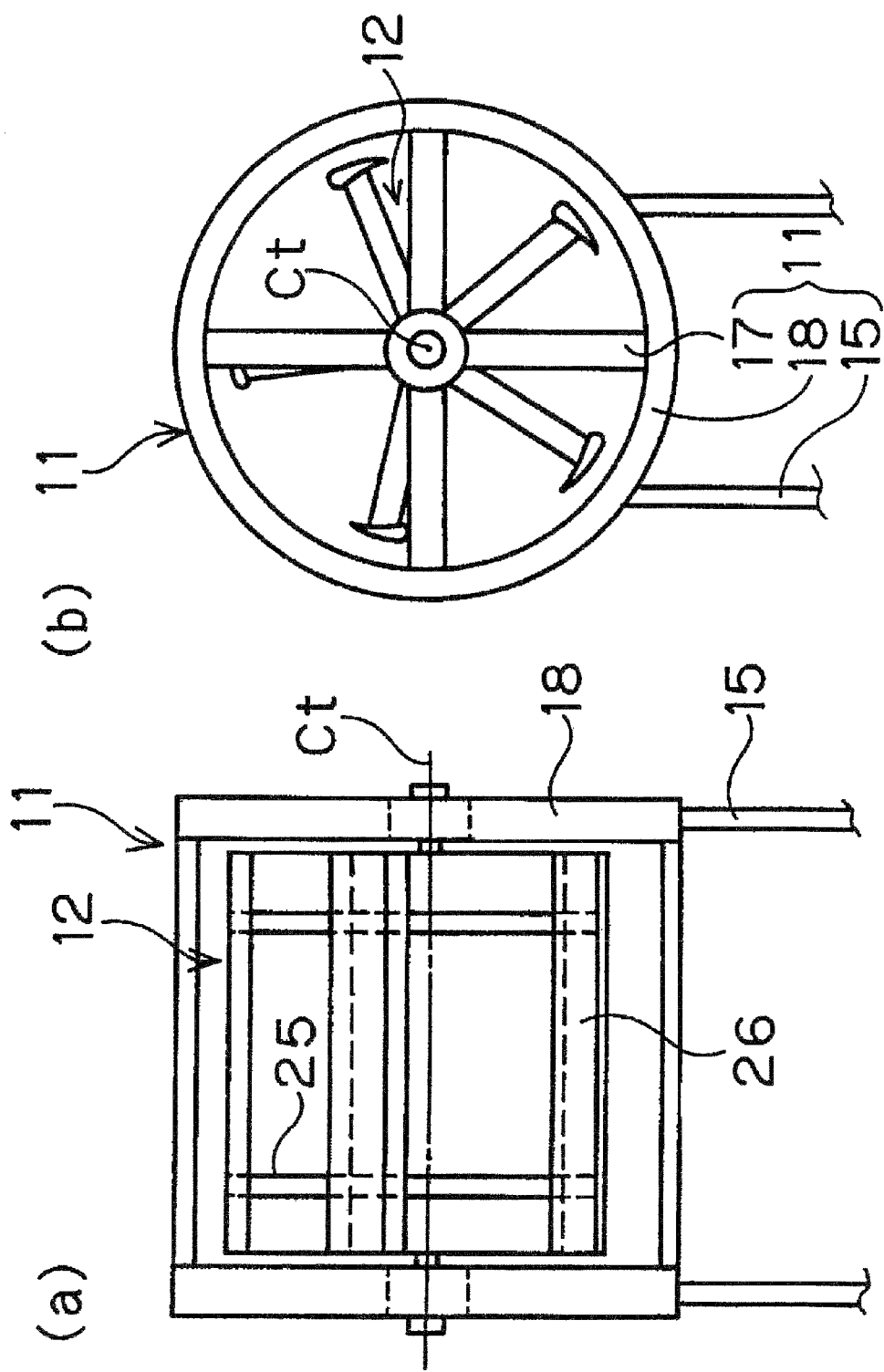
FIG. 16a and FIG. 16b is a front view and a side view showing further the other embodiment of the wind power generation of this invention.

In the above embodiment, the impeller is rotated around the rotation center extending vertically, but as shown in FIG. 16a and FIG. 16b, the impeller can be held so that the rotation center Ct extends horizontally. This is substantially the same as the wind power generation system shown in FIG. 3 etc. in the impellers and their supporting structures excepting only the composition of the frame 11 composed of the rings 18, legs 15 and the spokes 17 etc. Since in such transverse type of windmill is restricted in the direction of winds to rotate the impeller, it is preferable to be installed in a land where the wind direction is constant. Further, since this type is easy to be installed in plural systems in the axial direction, it is suitable for a large-scale power generation system.

Figure 17:
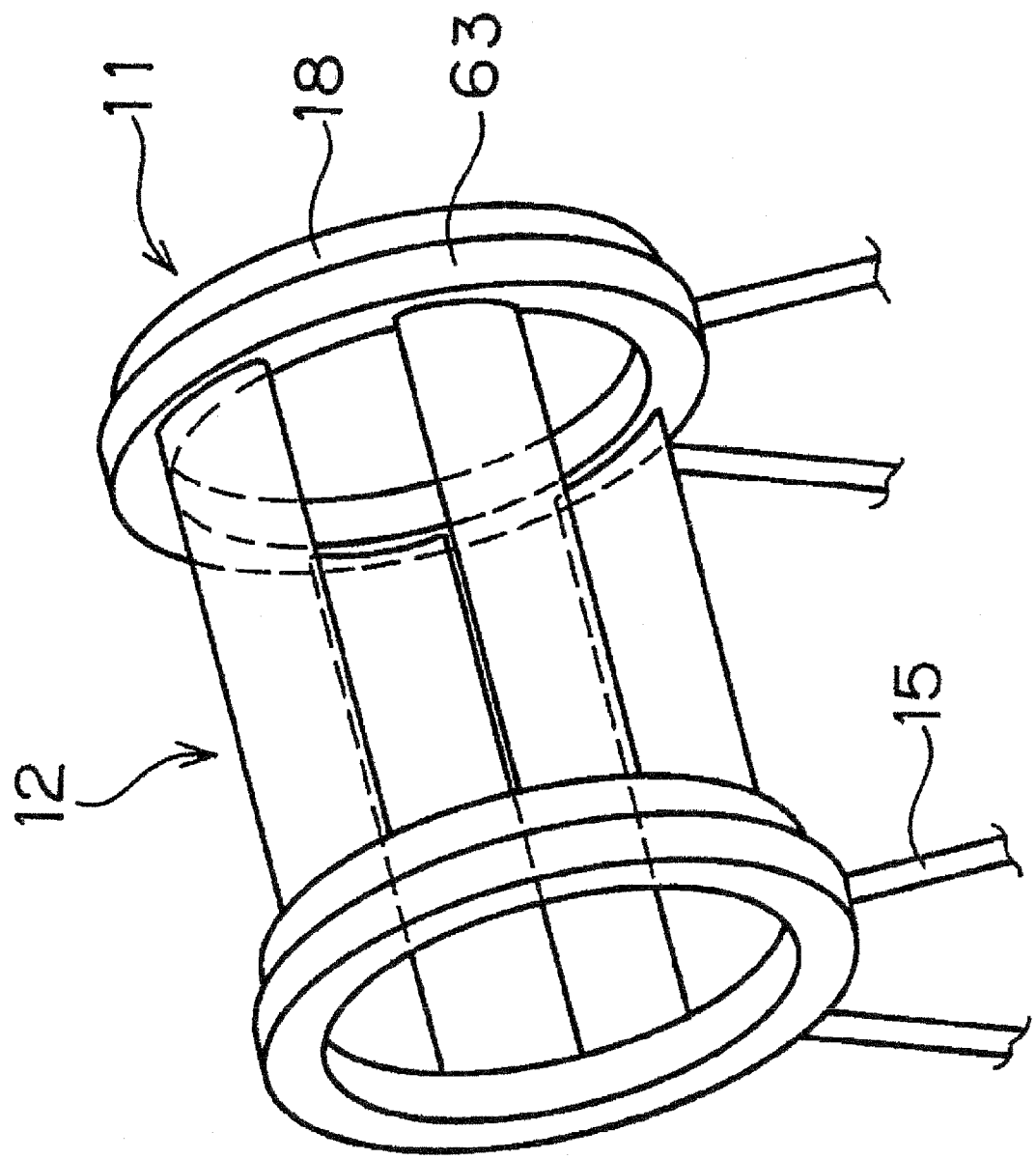
FIG. 17 is a perspective view showing further the other embodiment of the system of this invention.
Figure 18:
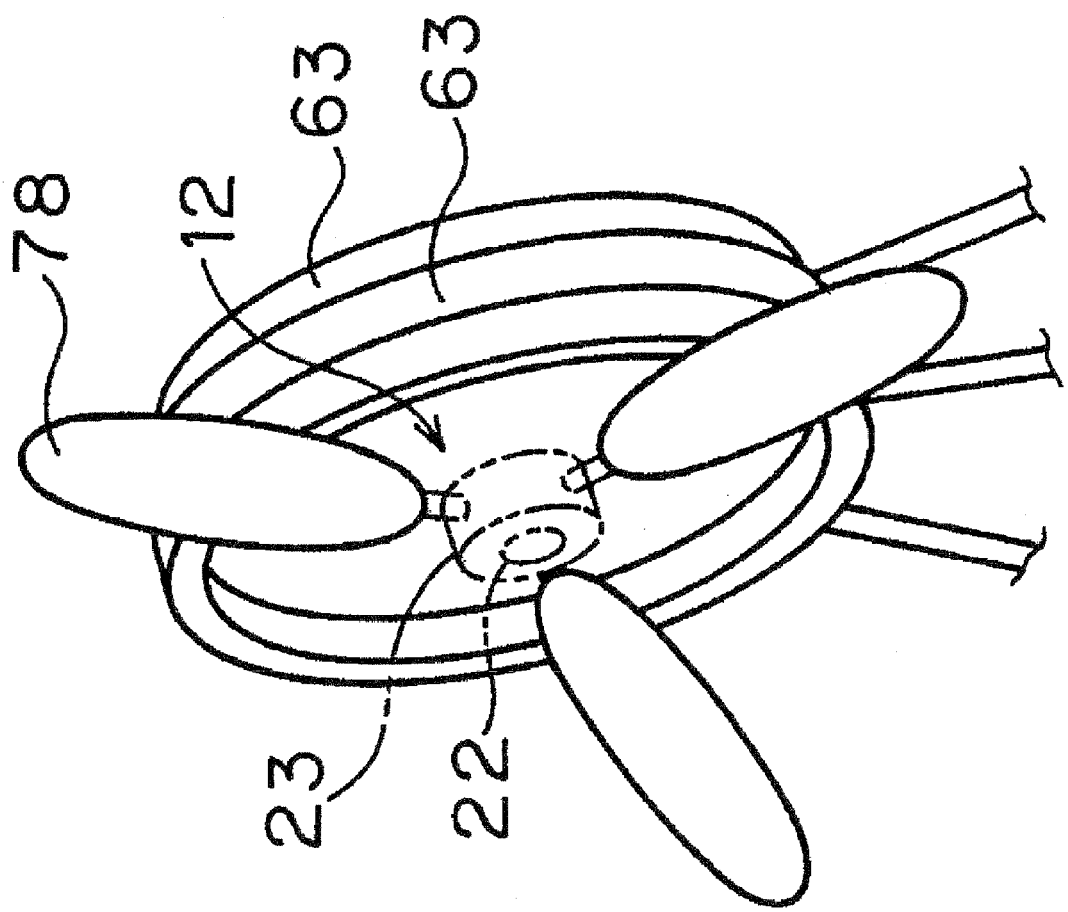
FIG. 18 is a perspective view showing further the other embodiment of the system of this invention.

FIG. 17 shows the case that the wind power generator is provided with a transverse type windmill, wherein a slide guide is intervened between the ring 18 provided on the frame 11 and the reinforcing ring 63 provided on the impeller 12, the center shaft and the transverse blades being omitted. In such system, a guide structure 77 composed of the guide and the slider same as the case shown in FIG. 13 is preferable to be employed The wind power generation system of transverse type shown in FIG. 18 employs an impeller 12 provided radially with plural propeller blades 78. In this system also, the impeller 12 can be rotatably supported by the frame 11, intervening the guide structure described above between the reinforcing ring 68 provided on the impeller 12 and the supporting ring 63 provided on the frame 11. Further, as shown in the imaginary line, the boss 23 provided on the center of the impeller 12 can be supported rotatably by the shaft 22. Furthermore, the shaft provided on the center of the impeller 12 can be rotatably supported by the bearing provided on the frame 11. In these cases, by the combination of the coils intervened between the reinforcing ring 68 and the supporting ring 63 with the facing field magnets such as permanent magnets etc. powers can be generated under the inverse principle of a linear motor.

Figure 19:
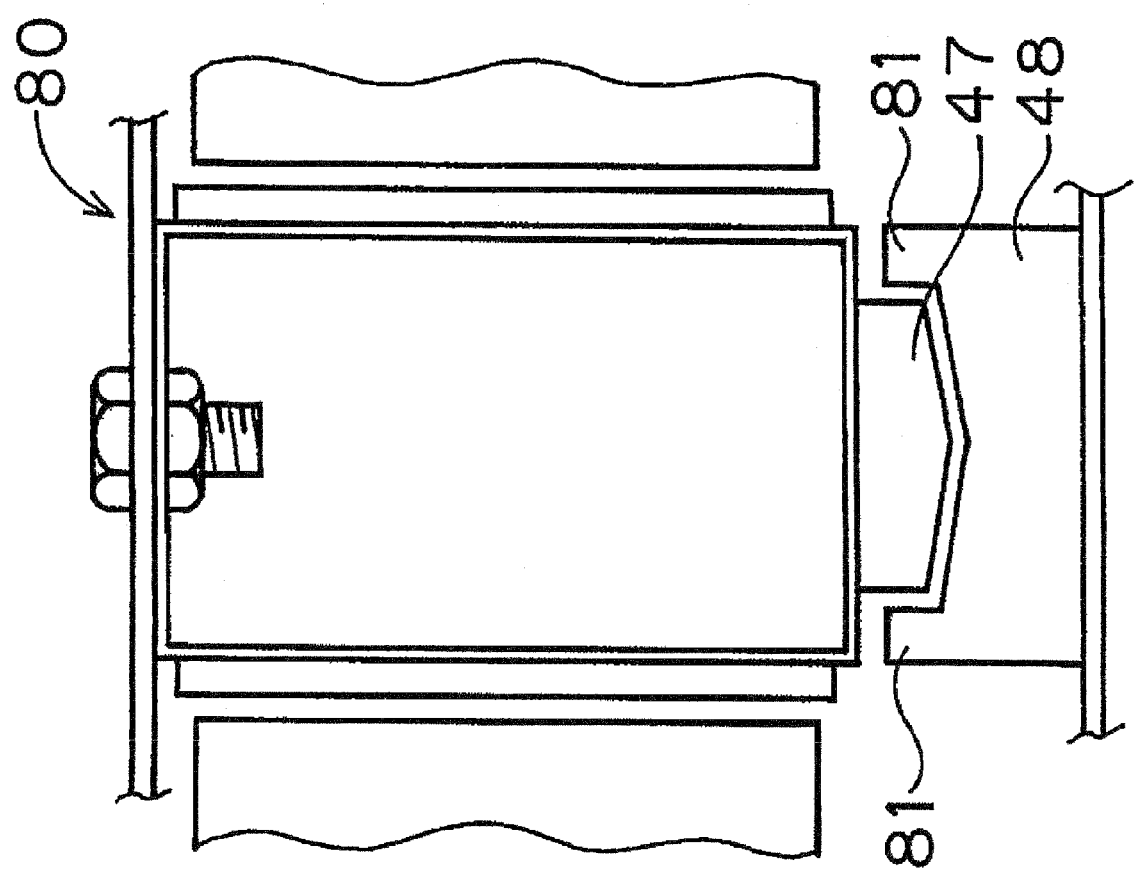
FIG. 19 is an elevational cross section of the substantial part showing further the other embodiment of the system of this invention.

FIG. 19 shows an embodiment of the guide structure 80 using the magnetic levitation. In this guide structure 80, a magnet 47, particularly the permanent magnet is guided in a horizontal direction by a guide projection 81 provided outside of the electromagnet (coil 48), and in its vertical direction, the magnetic levitation by permanent magnets and electromagnets is used. Other parts have the same structure as the above described power generation systems. This composition has small rotation resistance allowing high efficiency power generation. Further, the rotating upper magnets can be electromagnets and the lower stator side magnets can be permanent magnets. Furthermore, either of the upper and lower magnets can be permanent magnets or electromagnets.

The guide structure 83 shown in FIG. 20a comprises an annular guide 84 and a slider 86 provided with a roller 85 which is so disposed as to enclose the both sides and upper side of the annular guide and rolls along the guide. The number of the slider 86 may be about the same as that of the slider of the above described linear ball bearing. By intervening this guide structure 83 between the reinforcing ring 68 mounted on the impeller 12 and the supporting ring 63 mounted on the frame 11, the impeller 12 can be supported slidably on the frame 11.

In the guide structure shown in FIG. 20b, the guide 74 for the linear slide ball bearing is mounted on the reinforcing ring side 68 and the slider 75 guided by the guide 74 is mounted on the supporting ring 63 side. The other composition is same as that shown in FIG. 13. This composition has a merit of high strength and rigidity although the weight of the impeller 12 is increased, because the guide 74 is provided on the impeller 12. The above combination of the annular guide 74 for linear slide ball bearing and the slider 75 sliding (actually rolling) on the annular guide can be applied not only to power generation systems provided with a power generator generating powers under the inverse principle of linear motor but also to other power generation system employing other power generators, achieving the same effects. For example, an annular tooth row is provided on the periphery or on the midway of the impeller, and plural conventional generators which are provided with a gear meshing with the tooth row can be aligned annually on the frame 11 (particularly on the ring 18). In a power generation system having a rotating shaft 22 in the center of the impeller, the input axis of the conventional power generator can be input to the shaft 22.

Figure 21:
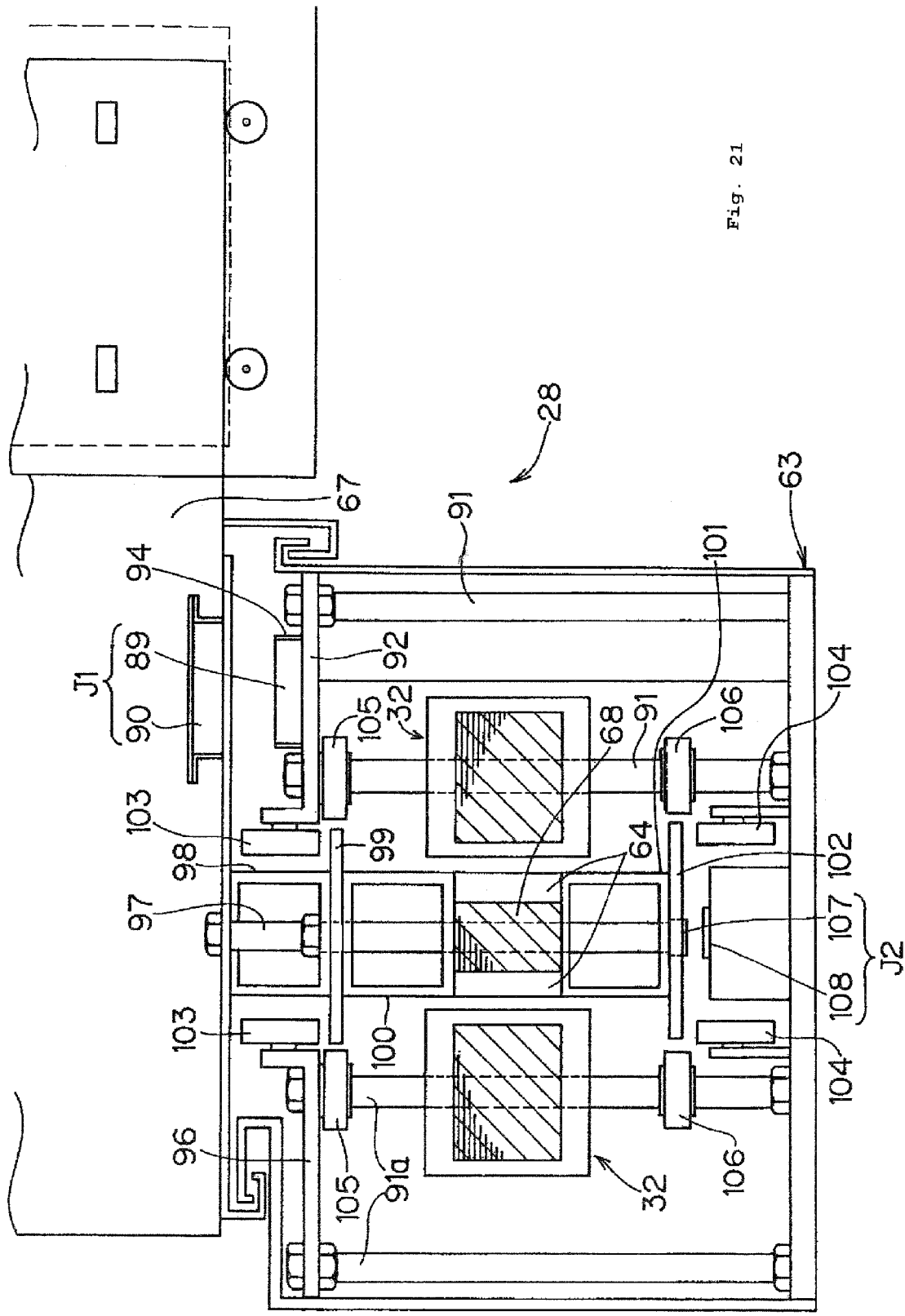
FIG. 21 is a cross section of the substantial part showing further the other embodiment of the system of this invention.

In the wind power generation system 88 shown in FIG. 21, a magnetic levitation structure J1 is provided, in which the permanent magnets 89 mounted on the ring 63 and the permanent magnets 90 mounted under the blade holding arm 67 are faced together. Thereby it can support the weight of the impeller by the mutual repelling force of the permanent magnets 89, 90. More specifically, in this embodiment, plural rows of supporting rods 91 are standing on the radially inside (right of FIG. 21) of the platy supporting ring 63, and an inner ring 92 is fixed to the upper end, and on the upper face of the inner ring 92 many permanent magnets 89 are annually aligned. And the under surface of the blade holding arm 67, several permanent magnets 90 are mounted. Further in this embodiment, as shown in FIG. 22, the inner ring plate 92 is composed by disposing annually plural rectangular inner plates 92a, and on the inside of the one inner plate 92a, for example plural, three, rectangular permanent magnets 89 are aligned at a given interval with those gaps being intervened by an iron piece 93 to be attracted by magnets.

Those permanent magnets 89 and the iron pieces 93 are secured by a frame body 94. The direction of the magnets 89 is the same. In other words the upper side is aligned as the same N Pole or S pole. The reason why the iron pieces 93 are intervened is that when the permanent magnets 90 are neighbored each other, a strong repelling force acts (for example, in the case of FIG. 42, about 10 N) causing hard work to be needed in mounting. When the iron pieces 93 are intervened, the each permanent magnet 89 magnetically stick to the iron piece 93, the magnet groups are magnetically stuck into one body via the iron pieces 93 allowing easy work in mounting. Further, for the permanent magnets 90 aligned under the blade holding arm 67, the iron pieces are intervened together with gaps, and in between the gap, they are mounted on the blade holding arm 67 so as to be enclosed by the frame body 95.

Figure 22:
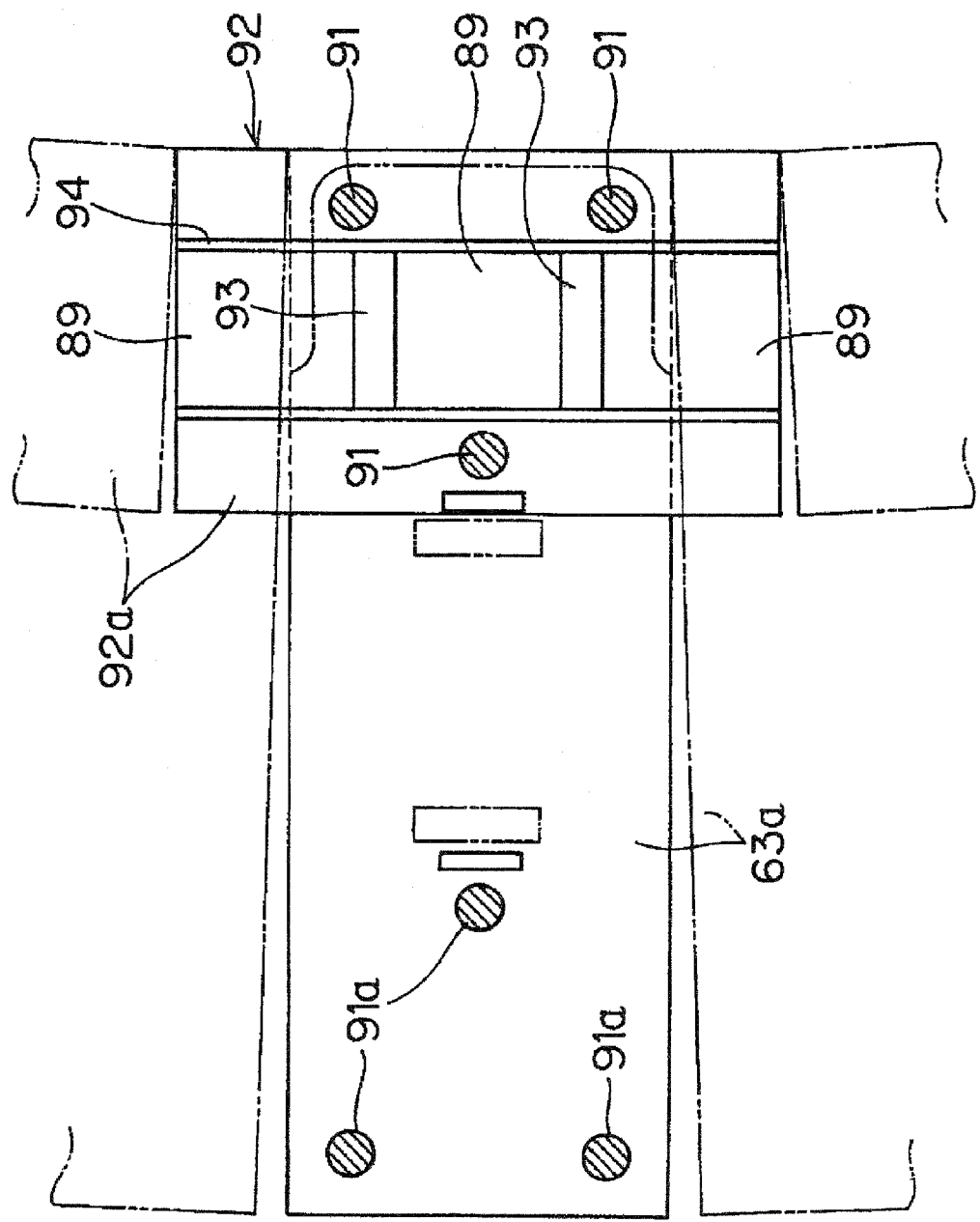
FIG. 22 is a X X II-X X II line cross section of FIG. 21.

The above described supporting ring 63 is, as shown in FIG. 22, composed of a rectangular plate 63a of a given width and is aligned annually. The supporting rod 91 supports the inner ring plate 92 with total two rows; one row inside and another row outside. Further, in this wind power generation system 88, two rows of the supporting rod 91a are standing outside of the supporting ring 63 to fix the outside ring plate 96 at its upper end. And further, on the inside row of the outside supporting rod 91a and on the outside row of the inside supporting rod 91, the coils 32, 32 composing the stator are mounted at the vertically medium position of the each rod. Between the both, a rotor provided with the permanent magnets 64 is disposed and fixed to the impeller.

Figure 23:
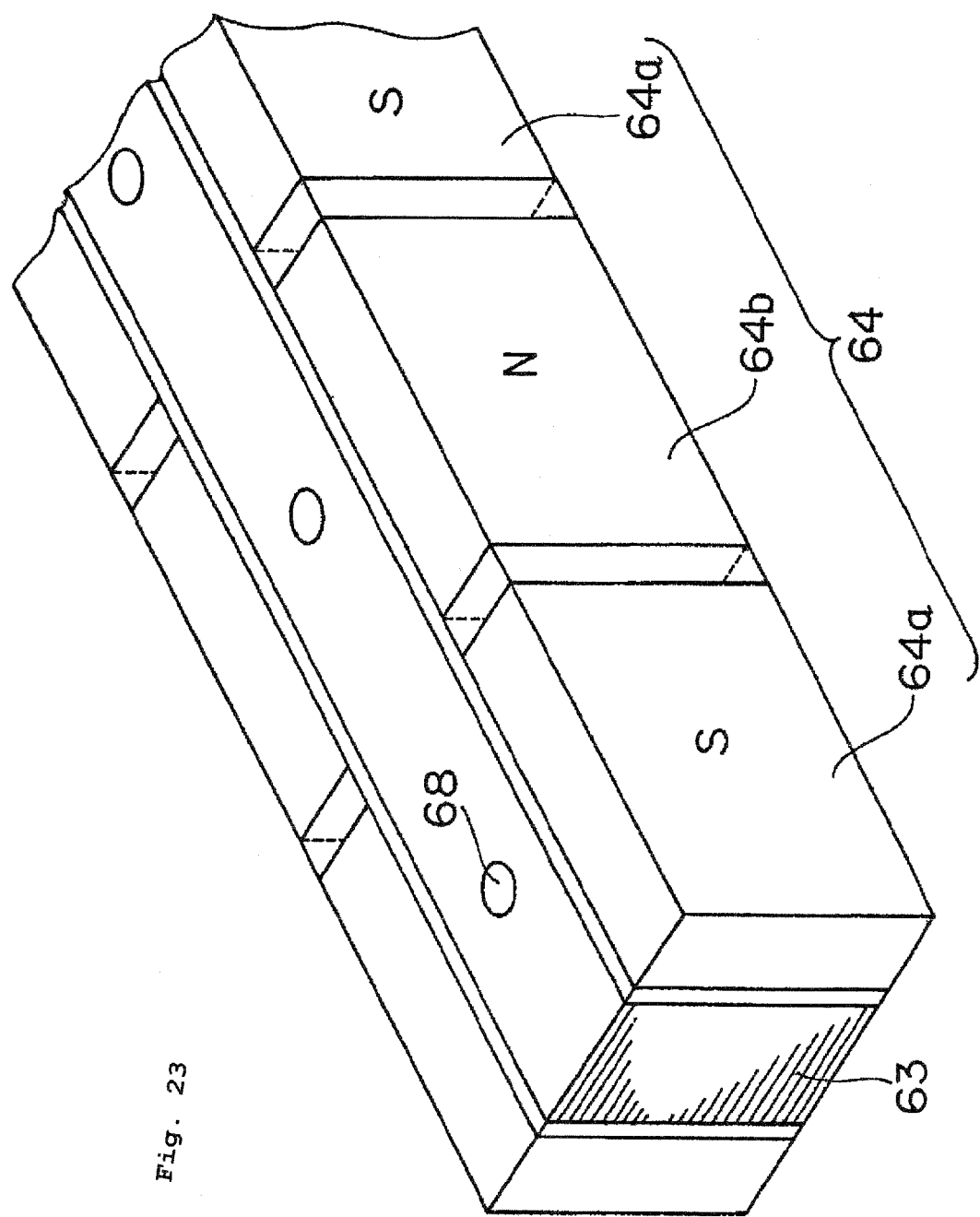
FIG. 23 is a perspective view showing the embodiments of the rotor and the stator of the system of this invention.

The above permanent magnets 64 have a rectangular shape as shown in FIG. 23, and are aligned and fixed to the both sides together with a gap; inside and outside of the medium reinforcing ring 68. The iron pieces are preferable to be intervened in between those gaps. The permanent magnets 64 are so aligned that 64a whose inside is N pole and 64b whose inside is S pole are aligned alternatively. It is the same about the out side permanent magnets 64, and usually the inside permanent magnet pole and the corresponding outside magnet pole are made to be the same pole. In the medium part of the reinforcing ring 68, a vertical through hole 68a is formed and a hanging rod 97 is let thorough the hole 68a as shown in FIG. 21.

The hanging rod 97 penetrates an upper end spacer 98, an upper guide circular plate 99, an upper spacer 100, the reinforcing ring(core) 68, a lower spacer 101, and a lower side circular plate 102 from the top and fasten them altogether to fix. The upper end spacer 98, the upper spacer 100, and the lower spacer 101 can be composed of non-magnetic metal such as stainless steel etc. In the outer periphery of the inside ring plate 92 and the inner edge of the outside ring plate 96, the facing guide rollers 103, 103 are slidably supported together with a gap to the upper face of the upper guide circular plate 99. Further, in the lower supporting ring 63, the facing guide rollers 104, 104 are slidably supported together with a gap to the lower face of the lower guide circular plate 102. The rotation center of the guide rollers 103, 104 is disposed horizontally in the radial direction of the impeller. Those guide rollers 103, 104 and the upper and the lower circular plate 99, 102 compose a safety mechanism to keep a minimum gap so as to prevent the rotor and the stator from contacting when the rotor moves up and down due to disorder of the magnetic levitation.

Figure 24:
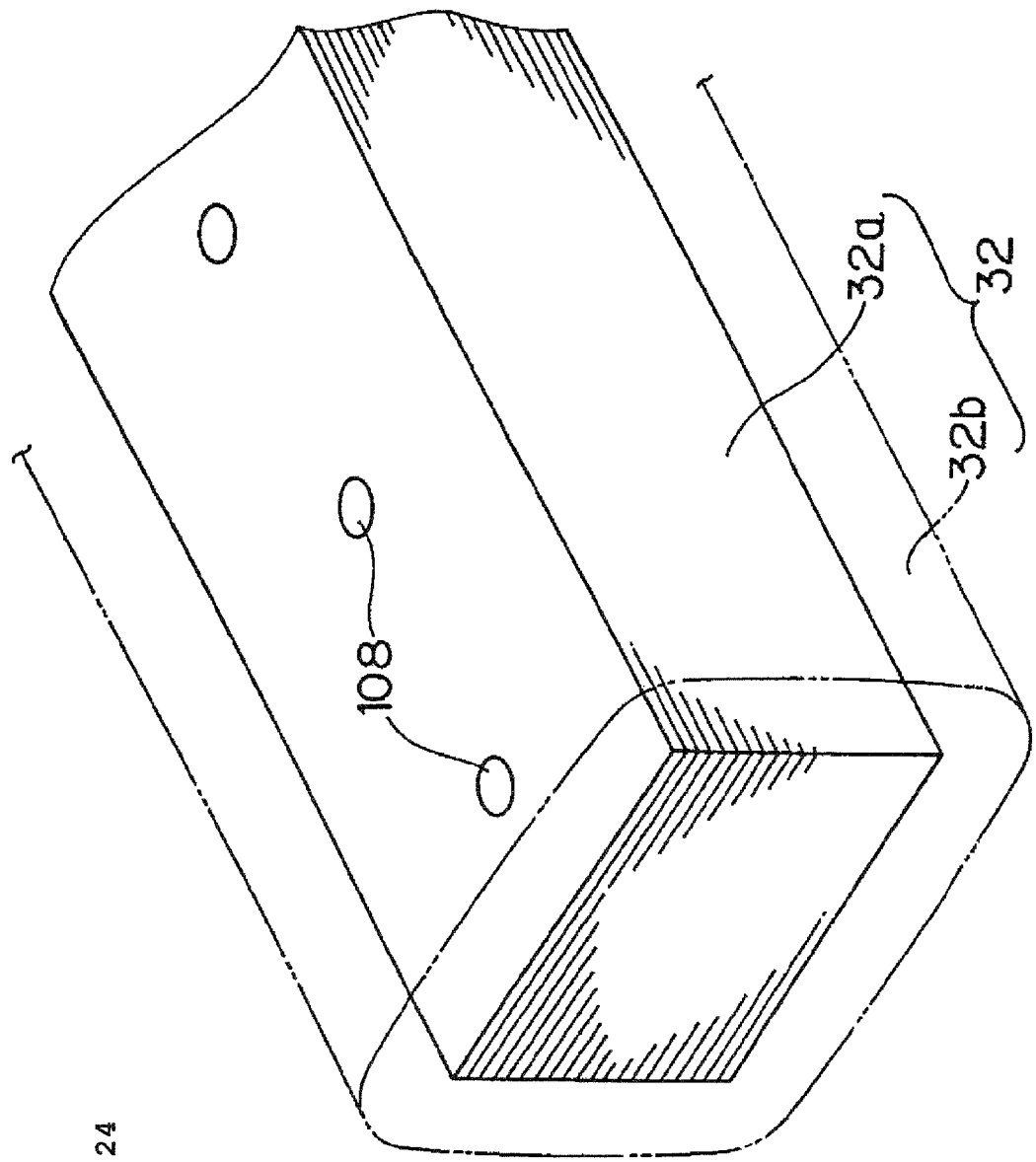
FIG. 24 is a perspective view showing the embodiment of the rotor and the stator of the system of this invention.

The coils 32 are so made that an electric wire 32b is wounded around the periphery of the core which are formed by superposing many silicon steel plates etc. as shown in FIG. 24. The hole 108 is vertically formed to let through the supporting rod 91, 91a. And, as shown in FIG. 21, the coils are fixed to the vertically medium part of the supporting rod 91,91a and supported. Further, in the upper part of the supporting rod 91,91a supporting the coils 32, the guide roller 105, 106 are rotatably provided facing the outer periphery or the inner periphery of the upper guide circular plate 99 with a gap. Furthermore, in the lower part of the supporting rod 91, 91a supporting the coils 32, the guide roller 106, 106 are rotatably provided facing the outer periphery or the inner periphery of the lower guide circular plate 102 with a gap. Those guide rollers 105,106 and the upper and the lower circular plate 99, 102 compose a safety mechanism to keep a suitable gap between the stator and the rotor when the rotor moves outward or inward radially. In FIG. 23 and FIG. 24, the rotor and the stator is formed by a straight member respectively. In the wind power generation system, these straight members are angled in some degree and aligned in polygon to form annular rotors and stators. Thus, the interconnection of many members to form an annular member allows easy handling. Further, the components of the each stators and rotors may be bent in some degree to form an annular shape when they are interconnected. The rotors and stators are preferable to be solidified by glass-fiber reinforced resin for shaping into a desired dimension so as not to interfere with each other or with other surrounding components while in rotation.

Further, in the wind power generation system 88 shown in FIG. 21, an auxiliary magnetic levitation structure J2 for supporting the weight of the impeller, particularly that of the rotor is provided by disposing magnet group 107, 108 repelling each other at the lower edge of the hanging rod 97 or at the gap of the under surface of the lower guide circular plate 102. More specifically, the above described magnetic levitation structure J1 provided on the upper part can support the weight of the longitudinal blades just under those blades, because the permanent magnets of the one-side wheel are provided at every blade holding arm 67. But it cannot support fully the weight of the rotors in between the longitudinal blades. Therefore, by the auxiliary magnetic levitation structure J2, the weight of the rotor in between the longitudinal blades is supported.

Figure 25:
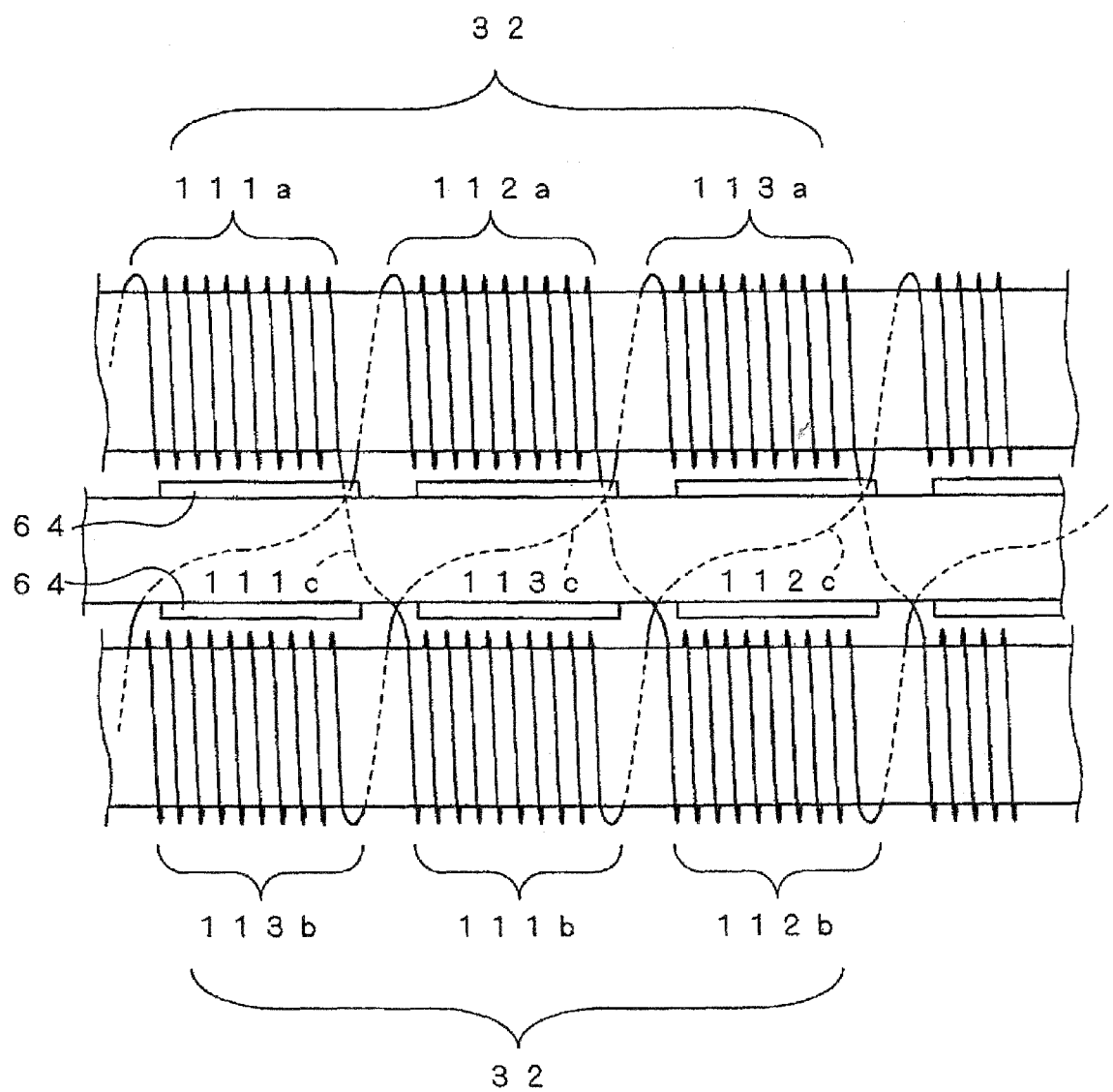
FIG. 25 is a wiring diagram showing the wiring of the field coils of the stator of the system of this invention.

Next, referencing FIG. 25, the alignment and the wiring of the stator coils 32 are described. The coils 32 of the outer and the inner stator are composed of three pairs of the coil groups 111a, 112a, 113a, 111b, 112b, 113b respectively so as to obtain three phase alternative currents. The inner first coil group 111a and the outer first coil group 111b are so aligned as to be staggered by every one block in the longitudinal direction, and the end of the inner first coil group 111a and the end of the outer first coil group 111b are connected by the connecting wire 111c. It is the same for the second coil group and the third coil group. The turns of the each coil are the same number.

When the permanent magnets 64 of the rotor run in one direction in between the coils 32 of the stator composed as above, the magnetic field of the permanent magnets 64 gives the coils of the stator the magnetic field variation of about sine curve, thereby alternative currents are generated in the each coils 32. Accordingly, the alternative currents can be output from the each coils 32. In this embodiment, the alternative currents are output from the first coil group, the second coil group, and the third coil group.

When the currents flow in the each coils as above, a magnetic field is generated in the coils 32 of the stator generating attractive forces and repelling forces between the magnetic field and the permanent magnets 64 of the stator. However, since the inner and the outer corresponding coils are mutually connected by the connecting wire 111c, 112c, 113c, the inward tensile force and the outward pushing force balance. More specifically, when the current of the inner first coil group 111a decreases, the current of the outer first coil group 111b decreases equally, the inward tensile force and the outward pushing force balance. Similarly, the force among the second coil group 112a and 112b, and the force among the third coil group 113a and 113b mutually balance. Thereby, the rotor runs keeping roughly a constant gap to the stator enabling smooth rotation wholly when the rotation number changes.

In the magnetic levitation structure J3 shown in FIG. 26a, the permanent 90 mounted on the rotating impeller side, for example, on the blade holding arm has about an U-shaped cross section opened downward. The permanent magnet 89 mounted on the fixed frame side, for example, on the supporting ring has a shape of the longitudinal plate. Such a permanent magnet 90 having a U-shaped cross section can be obtained by combining the central platy magnet 90a disposed horizontally and the inner and the outer platy magnets 90b, 90c disposed vertically so as to be, for example, the N pole inside. In this case, the upper end of the opposite longitudinal magnet 89 is also set to be the same N pole. In the case that the inside of the U-shaped magnet 90 is set to be S pole, the upper end of the longitudinal magnet is also set to be S pole. And then, in a base condition, the front edge of the permanent magnet 89 of the stator is approximately brought into line with the line 1, connecting the front edge of the permanent magnet 90 of the rotor each other. In addition, this is the same with that of magnetic levitation structure J1 shown in FIG. 21 at the point that the permanent magnets 90 of the stator side are aligned circularly almost without a break and that the permanent magnets 89 of the rotor side are provided on only the blade holding arm portion. But, in the stator side they may be partially provided, and in the rotor side they may be aligned circularly almost without a break.

In the magnetic levitation structure J3 composed as above, since the N pole of the central magnet 90a of the rotor side and the N pole of the upper edge of the permanent magnet 89 of the stator side repel, the weight of the impeller can be supported. Further, in the case that a force toward the center is applied, since the inside magnet 90b and the longitudinal magnet 89 repel, a force to respond to the above force is generated. Contrary in the case that a force toward outside is applied, a force to turn back acts between the outside magnet 90c and the longitudinal magnet 89 will be generated. Therefore, this magnetic levitation structure J3 has a function to keep at all times its base condition. The width of the permanent magnet 90 of the rotor side may be, as to be found from FIG. 22, the same as that of the blade holding arm saving the magnets. Further, since platy magnets may be employed, it can be easily constructed using magnets available in the market.

In the embodiment shown in FIG. 8, the magnet 47 and the coil 48 are provided on the ring 18 of the frame 11 and the lower edge of the longitudinal blade 26 so as to face each other in a vertical direction and to repel each other. Thereby a part or whole of the weight of the impeller can be loaded on the magnetic levitation that provides contactless support of the weight with low resistance even in a high-speed rotation. A permanent magnet can be used in place of the coil 48. The magnetic levitation can be applied to the gap between the upper end of the impeller 12 and the frame 11 using its attractive force. Further, in addition to the method repelling at the lower edge of the frame, it is possible to provide magnets repelling each other between the upper end of the longitudinal blade 26 and the ring 18 of the upper frame. In this case, the impeller rotates in a height balancing the weight, and the upward and downward repelling force allowing highly stable rotation. The iron core may be inserted or not to the coil 48. The above composition of the magnetic levitation can be provided not only in the vicinity of the impeller but also in the gap between the midway of the longitudinal blade 25 and the midway of the spoke of the frame.

In the above embodiments, the coils 32 are fixed to the frame 11 side, but it can be provided on the impeller 12 side as shown in FIG. 9a. Further, as shown in FIG. 9b, the coils 32 can be divided into one pair having a gap in the radial direction, and the permanent magnet 31 etc. is passed through the gap. Contrary as shown in FIG. 9c, field magnets such as the permanent magnet 31 etc. can be provided together with a gap and the coils 32 are passed through the gap.

Further in the above embodiment, the power generating part 14 is provided between the outside of the longitudinal blade 26 and the ring 18, but as shown in FIG. 10a, it can be provided between the lower edge of the longitudinal blade 26 and the upper surface of the ring 18 facing each other in the vertical direction. In this case, the wheel 27 may be provided in the midway of the transverse blade 25 and the runway 28 may be provided in the midway of the spoke 17. In place of the wheel 27 and the runway 28, magnets for the magnetic levitation can be provided in the above both position. Further as shown in FIG. 10b, a supporting ring 52 can be provided in the midway of the transversal blade 25 and another supporting ring 53 facing the supporting ring 52 can be provided, and further a power generating part 54 comprising field magnets of the permanent magnet 31 etc. and the coils 32 can be provided in between the both supporting ring 52, 53. This composition can be provided as the second power generating part in addition to the power generating part 32 provided on the periphery of the impeller as shown in FIG. 7 etc.

As described above, the gap between the coils 32 and the permanent magnet 31 is about 1~5 mm and the both move at high speed relatively. Therefore, there is a danger of interference due to losing the gap caused by the expansion of the impeller 12 by the solar heat. Contrary, there is also a case of deterioration in power generation efficiency caused by the extension of the gap due to heat contraction. When the same materials are used for the frame 11 and the impeller 12, the thermal expansion coefficients are the same. But in the case that high strength steel is used for the frame 11 and the lightweight synthetic resin is used for the impeller 12, the increase and decrease of the gap due to the difference of the thermal expansion coefficients becomes large. FIG. 11 shows the embodiment of the gap-adjusting apparatus used in such cases.

In the gap-adjusting apparatus 56 shown in FIG. 11, the coils 32 are accommodated in a coil case 57 and the coil case is mounted movably in a radial direction to the ring 18. The gap-adjusting apparatus 56 further comprises an electric or hydraulic driving mechanism 58 to drive the coil case 57 in the radial direction to the ring, a sensor 59 to detect the expansion of the transverse blade 25, and a control device 60 to control the driving mechanism 58 following the expansion of the transverse blade 25. As the driving mechanism 58, the one that is a combination of a ball screw and a nut rotated by a motor, or the one that uses a linear motor is used. Further, it can be the one that is a combination of a fixed nut and a ball rotated by a motor.

As the sensor 59 of the expansion, for example, strain gages etc. provided respectively on the transversal blade 25 and the spoke 17 of the frame 11 are used. In this case the difference of the each detected value is computed to determine the required value of compensation. Further, it can be so composed that, for example, many light emitting diodes are provided on the transverse blade 25 and many photo sensors are aligned in the radial direction on the spoke 17 of the frame. In this case, the difference of the relative change of the length, in other words, the difference of the thermal expansion can be detected directly. The gap-adjusting apparatus 56 is usually operated in the condition of the impeller 12 being halted. But, it can be so composed as to be activated automatically while in operation.

In the wind power generation system provided with such gap-adjusting apparatus 56, the gap between the coils 32 and the permanent magnet 31 etc. does not hardly change, when the impeller expands or shrinks by solar heat and climate. Thereby, the gap between the both can be made small allowing efficient power generation. Further, it is possible to install the system in such a place where the climate of four seasons or the temperature during the day varies greatly. Furthermore, since the material of the frame and the impeller can be different, the impeller can be made of lightweight foamed resin or fiber reinforced plastic.

The wind power generation system 10 described above is, same as windmills of conventional wind power generators, installed in those places where it can receive much winds, for example, along shorelines or on a hilly land forms such as mountains and plateaus. But it can be also located in a city; on the roof of a buildings etc. When winds blow, the longitudinal blades 26 receive the winds and the impeller 12 rotates counter clockwise shown in FIG. 5. In the case that the transverse blade 25 is wing profile in its cross section or it is the type of magnetic levitation described above, upward lift forces or repelling forces are generated lessening the load of the lower bearing 20 supporting the impeller 12. Thereby the rotation resistance is reduced rotating the impeller 12 efficiently. When the impeller 12 rotates, the activated coils generate powers that are transmitted to consuming regions by the transmitting wires 36, 37 or stored in the storage 34. In the case that the regions to which the powers are transmitted are far, alternating current generators are used and the generated voltages are transformed before the transmission. But the direct current generators may also be used and the generated voltages are inverted into the alternative currents using inverters etc. and transformed once before transmission.

In the above embodiment, the upper end and the lower end of the shaft 22 are supported rotatably by the bearing 19, 20, but contrary the shaft may be provided on the bearing 19, 29 sides, and the bosses 23, 24 are rotatably supported by the shaft. Further, in the above embodiment, the longitudinal blade 26 of the impeller 12 and the bosses 23, 24 are connected by the transverse blade 2*a*, a simple rod etc. can be employed as the supporting member, in which case no lift force is generated.

In the wind power generation system 62 shown in FIG. 12 and FIG. 13, a pipe-like supporting ring 63 is mounted inside of the ring 18 of the frame 11, and two rows of coils 32 facing each other is aligned on the supporting ring 63 with gaps in between them. In between the gap, a group of permanent magnets 64 mounted on the impeller 12 are disposed as the field magnets. As the field magnets, electromagnets can also be employed. Particularly in a large system, there is a case that electromagnets are preferable. The coils 32 are mounted on the supporting ring 63 using a bracket 65. The position of the bracket 65 is made to be adjustable in the direction of the impeller (in FIG. 13, lateral direction) by an adjusting screw 66.

On the other hand, a blade supporting arm 67 is provided outward from the lower end of the longitudinal blade 26, and the magnets 64, 64 are fixed to the outer periphery and the inner periphery of a reinforcing ring 68 mounted on the blade supporting member 67. The reinforcing ring 68 is constructed to be ring-shape (see FIG. 14*b*) by bending a rectangular pipe and fixed by screws 70*a* etc. to the under surface of a cover 70 having U-shaped cross section. The cover 70 covers the outside of the bracket 65 on which the coils 32 are mounted and protects the coils from rainwater. Further labyrinth seals 72,72 are provided between the upper surface of the outside ring 18 the supporting ring 63 and the cover 70, and also between the lower edge of the cover 70 and the bracket 65 for preventing the invasion of rainwater.

On the upper surface of the reinforcing ring 68, a blade supporting member 73 is mounted tucking the top surface of the cover 70. The blade-supporting arm 67 is fitted to the blade-supporting member 73 slidably along its long side, thereby the reinforcing ring 68 and the transverse blade (reference numeral 25 in FIG. 12) are set free in thermal expansion and thermal shrink. In place of the transverse blade, a supporting stay can be employed. As the blade-supporting arm 67 and the blade-supporting member 73, fiber reinforced resin (FRP) etc. is used. The slidable supporting structure of the blade-supporting arm 73 by the blade-supporting member 73 or the adjusting screw 66 compose a simple gap-adjusting apparatus.

On the supporting ring 63, an annular guide 74 is disposed concentrically with the impeller passing through about the center of the two row coils 32, and fixed to the supporting ring 63 by screws etc. Plural slider 75 is provided slidably on the guide 74 and the under surface of the reinforcing ring 68 is fixed to the slider 75. In this embodiment, as the guide 74 and the slider 75, those of so called a linear slide ball bearings are employed. But the guide 74 is bent in a lateral direction, and plural bent guide pieces are assembled to compose an annular orbit.

The linear slide ball bearing has the same structure as the ball spline etc. More specifically, in the slider side, numerous endless ball rack rails are provided, and the balls held by the rack rails appear at the surface of the slider in their "toward process" and hide in their "backward" process. The ball groups appeared at the surface hold the sliders 75 so as not to slip out from the guides 74 by meshing with the engaging groove 74*a* etc, and guide the slider 75 smoothly along the guide 74 rolling with low friction. As such a linear slide bearing, LM guide made by THK corp. etc. can be used.

The number of the slider 75 is not particularly restricted, but it is preferable that in the vicinity of the blade-supporting member 73 supporting the impeller 12, they are aligned densely, and in other portion non-densely. However, they may be aligned at equal pitches. By employing such guide structure 77, the impeller 12 is slidably supported to the frame 11 around the self-shaft. Accordingly, as shown in FIG. 14*a* and FIG. 14*b*, it is not necessary to provide a shaft (see reference numeral 22 of FIG. 3) or a bearing. Further, the rotation torque of the winds received by the longitudinal blade 26 is transmitted to the relative movement of the coils 32 and the permanent magnets 64 via the blade-supporting arm 87, the blade supporting member 73, and the reinforcing ring 68, without going through the transverse blade. Therefore, the impeller 12 can be rotated against the resistance generated by the power generation and the friction resistance by the linear guide, thereby the powers are generated under the inverse principle of a linear motor.

In the above embodiment, the transverse blades and the shafts are not provided, but as shown in the imaginary line in FIG. 14*a* and FIG. 14*b*, the transverse blades 25 can be provided and the impeller 12 can be supported by the boss 24 and the shaft 22. In the case that such transverse blades 25 are provided as shown in the imaginary line in FIG. 14*b*, the reinforcing ring 68 and the supporting ring can be provided on the midway of the transversal blade 25, and further, it is possible to support the impeller 12 slidably by the slider mounted on these reinforcing ring 68 and the guides provided on the supporting ring. In this case also, by mounting permanent magnets on the reinforcing ring 68 and by mounting the coils on the supporting ring, powers can be generated under the inverse principle of linear motors.

As shown in FIG. 15*a* and FIG. 15*b*, the reinforcing ring 68 can be mounted at the vertical medium position of the longitudinal blade 26, and the supporting ring 63 can be provided on the corresponding position to the frame 11. In the system shown in FIG. 15*a*, the slider is mounted on the reinforcing ring 68 in a lateral direction and the guide 74 to guide the slider is mounted inside of the supporting ring 63. Further, the coils are mounted inside of the supporting ring 63 and the permanent magnets are mounted on the upper and lower side of the reinforcing ring 68. On the other hand, in the system shown in FIG. 15*b*, the reinforcing ring 68 is disposed on the supporting ring 63, and the sliders, guides, coils and the permanent magnets are disposed same as shown in FIG. 13. In such system, even an impeller longer than is wide can be stably held.

In the above embodiment, the impeller is rotated around the rotation center extending vertically, but as shown in FIG. 16*a* and FIG. 16*b*, the impeller can be held so that the rotation center Ct extends horizontally. This is substantially the same as the wind power generation system shown in FIG. 3 etc. in the impellers and their supporting structures excepting only the composition of the frame 11 composed of the rings 18, legs 15 and the spokes 17 etc. Since in such transverse type of windmill is restricted in the direction of winds to rotate the impeller, it is preferable to be installed in a land where the wind direction is constant. Further, since this type is easy to be installed in plural systems in the axial direction, it is suitable for a large-scale power generation system.

FIG. 17 shows the case that the wind power generator is provided with a transverse type windmill, wherein a slide guide is intervened between the ring 18 provided on the frame 11 and the reinforcing ring 63 provided on the impeller 12, the center shaft and the transverse blades being omitted. In such a system, a guide structure 77 composed of the guide and the slider same as the case shown in FIG. 13 is preferable to be employed The wind power generation system of transverse type shown in FIG. 18 employs an impeller 12 provided radially with plural propeller blades 78. In this system also, the impeller 12 can be rotatably supported by the frame 11, intervening the guide structure described above between the reinforcing ring 68 provided on the impeller 12 and the supporting ring 63 provided on the frame 11. Further, as shown in the imaginary line, the boss 23 provided on the center of the impeller 12 can be supported rotatably by the shaft 22. Furthermore, the shaft provided on the center of the impeller 12 can be rotatably supported by the bearing provided on the frame 11. In these cases, by the combination of the coils intervened between the reinforcing ring 68 and the supporting ring 63 with the facing field magnets such as permanent magnets etc. powers can be generated under the inverse principle of a linear motor.

FIG. 19 shows an embodiment of the guide structure 80 using the magnetic levitation. In this guide structure 80, a magnet 47, particularly the permanent magnet is guided in a horizontal direction by a guide projection 81 provided outside of the electromagnet (coil 48), and in its vertical direction, the magnetic levitation by permanent magnets and electromagnets is used. Other parts have the same structure as the above described power generation systems. This composition has small rotation resistance allowing high efficiency power generation. Further, the rotating upper magnets can be electromagnets and the lower stator side magnets can be permanent magnets. Furthermore, either of the upper and lower magnets can be permanent magnets or electromagnets.

The guide structure 83 shown in FIG. 20a comprises an annular guide 84 and a slider 86 provided with a roller 85 which is so disposed as to enclose the both sides and upper side of the annular guide and rolls along the guide. The number of the slider 86 may be about the same as that of the slider of the above described linear ball bearing. By intervening this guide structure 83 between the reinforcing ring 68 mounted on the impeller 12 and the supporting ring 63 mounted on the frame 11, the impeller 12 can be supported slidably on the frame 11.

In the guide structure shown in FIG. 20b, the guide 74 for the linear slide ball bearing is mounted on the reinforcing ring side 68 and the slider 75 guided by the guide 74 is mounted on the supporting ring 63 side. The other composition is same as that shown in FIG. 13. This composition has a merit of high strength and rigidity although the weight of the impeller 12 is increased, because the guide 74 is provided on the impeller 12. The above combination of the annular guide 74 for linear slide ball bearing and the slider 75 sliding (actually rolling) on the annular guide can be applied not only to power generation systems provided with a power generator generating powers under the inverse principle of linear motor but also to other power generation system employing other power generators, achieving the same effects. For example, an annular tooth row is provided on the periphery or on the midway of the impeller, and plural conventional generators which are provided with a gear meshing with the tooth row can be aligned annually on the frame 11 (particularly on the ring 18). In a power generation system having a rotating shaft 22 in the center of the impeller, the input axis of the conventional power generator can be input to the shaft 22.

In the wind power generation system 88 shown in FIG. 21, a magnetic levitation structure J1 is provided, in which the permanent magnets 89 mounted on the ring 63 and the permanent magnets 90 mounted under the blade holding arm 67 are faced together. Thereby it can support the weight of the impeller by the mutual repelling force of the permanent magnets 89, 90. More specifically, in this embodiment, plural rows of supporting rods 91 are standing on the radially inside (right of FIG. 21) of the platy supporting ring 63, and an inner ring 92 is fixed to the upper end, and on the upper face of the inner ring 92 many permanent magnets 89 are annually aligned. And the under surface of the blade holding arm 67, several permanent magnets 90 are mounted. Further in this embodiment, as shown in FIG. 22, the inner ring plate 92 is composed by disposing annually plural rectangular inner plates 92a, and on the inside of the one inner plate 92a, for example plural, three, rectangular permanent magnets 89 are aligned at a given interval with those gaps being intervened by an iron piece 93 to be attracted by magnets.

Those permanent magnets 89 and the iron pieces 93 are secured by a frame body 94. The direction of the magnets 89 is the same. In other words the upper side is aligned as the same N Pole or S pole. The reason why the iron pieces 93 are intervened is that when the permanent magnets 90 are neighbored each other, a strong repelling force acts (for example, in the case of FIG. 42, about 10 N) causing hard work to be needed in mounting. When the iron pieces 93 are intervened, the each permanent magnet 89 magnetically stick to the iron-piece 93, the magnet groups are magnetically stuck into one body via the iron pieces 93 allowing easy work in mounting. Further, for the permanent magnets 90 aligned under the blade holding arm 67, the iron pieces are intervened together with gaps, and in between the gap, they are mounted on the blade holding arm 67 so as to be enclosed by the frame body 95.

The above described supporting ring 63 is, as shown in FIG. 22, composed of a rectangular plate 63a of a given width and is aligned annually. The supporting rod 91 supports the inner ring plate 92 with total two rows; one row inside and another row outside. Further, in this wind power generation system 88, two rows of the supporting rod 91a are standing outside of the supporting ring 63 to fix the outside ring plate 96 at its upper end. And further, on the inside row of the outside supporting rod 91a and on the outside row of the inside supporting rod 91, the coils 32, 32 composing the stator are mounted at the vertically medium position of the each rod. Between the both, a rotor provided with the permanent magnets 64 is disposed and fixed to the impeller.

The above permanent magnets 64 have a rectangular shape as shown in FIG. 23, and are aligned and fixed to the both sides together with a gap; inside and outside of the medium reinforcing ring 68. The iron pieces are preferable to be intervened in between those gaps. The permanent magnets 64 are so aligned that 64a whose inside is N pole and 64b whose inside is S pole are aligned alternatively. It is the same about the out side permanent magnets 64, and usually the inside permanent magnet pole and the corresponding outside magnet pole are made to be the same pole. In the medium part of the reinforcing ring 68, a vertical through hole 68a is formed and a hanging rod 97 is let thorough the hole 68a as shown in FIG. 21.

The hanging rod 97 penetrates an upper end spacer 98, an upper guide circular plate 99, an upper spacer 100, the reinforcing ring(core) 68, a lower spacer 101, and a lower side circular plate 102 from the top and fasten them altogether to fix. The upper end spacer 98, the upper spacer 100, and the lower spacer 101 can be composed of non-magnetic metal such as stainless steel etc. In the outer periphery of the inside ring plate 92 and the inner edge of the outside ring plate 96, the facing guide rollers 103,103 are slidably supported together with a gap to the upper face of the upper guide circular plate 99. Further, in the lower supporting ring 63, the facing guide rollers 104,104 are slidably supported together with a gap to the lower face of the lower guide circular plate 102. The rotation center of the guide rollers 103, 104 is disposed horizontally in the radial direction of the impeller. Those guide rollers 103,104 and the upper and the lower circular plate 99, 102 compose a safety mechanism to keep a minimum gap so as to prevent the rotor and the stator from contacting when the rotor moves up and down due to disorder of the magnetic levitation.

The coils 32 are so made that an electric wire 32b is wounded around the periphery of the core which are formed by superposing many silicon steel plates etc. as shown in FIG. 24. The hole 108 is vertically formed to let through the supporting rod 91, 91a. And, as shown in FIG. 21, the coils are fixed to the vertically medium part of the supporting rod 91,91a and supported. Further, in the upper part of the supporting rod 91,91a supporting the coils 32, the guide roller 105, 106 are rotatably provided facing the outer periphery or the inner periphery of the upper guide circular plate 99 with a gap. Furthermore, in the lower part of the supporting rod 91, 91a supporting the coils 32, the guide roller 106, 106 are rotatably provided facing the outer periphery or the inner periphery of the lower guide circular plate 102 with a gap. Those guide rollers 105,106 and the upper and the lower circular plate 99, 102 compose a safety mechanism to keep a suitable gap between the stator and the rotor when the rotor moves outward or inward radially. In FIG. 23 and FIG. 24, the rotor and the stator is formed by a straight member respectively. In the wind power generation system, these straight members are angled in some degree and aligned in polygon to form annular rotors and stators. Thus, the interconnection of many members to form an annular member allows easy handling. Further, the components of the each stators and rotors may be bent in some degree to form an annular shape when they are interconnected. The rotors and stators are preferable to be solidified by glass-fiber reinforced resin for shaping into a desired dimension so as not to interfere with each other or with other surrounding components while in rotation.

Further, in the wind power generation system 88 shown in FIG. 21, an auxiliary magnetic levitation structure J2 for supporting the weight of the impeller, particularly that of the rotor is provided by disposing magnet group 107, 108 repelling each other at the lower edge of the hanging rod 97 or at the gap of the under surface of the lower guide circular plate 102. More specifically, the above described magnetic levitation structure J1 provided on the upper part can support the weight of the longitudinal blades just under those blades, because the permanent magnets of the one-side wheel are provided at every blade holding arm 67. But it cannot support fully the weight of the rotors in between the longitudinal blades. Therefore, by the auxiliary magnetic levitation structure J2, the weight of the rotor in between the longitudinal blades is supported.

Next, referencing FIG. 25, the alignment and the wiring of the stator coils 32 are described. The coils 32 of the outer and the inner stator are composed of three pairs of the coil groups 111a, 112a, 113a, 111b, 112b, 113b respectively so as to obtain three phase alternative currents. The inner first coil group 111a and the outer first coil group 111b are so aligned as to be staggered by every one block in the longitudinal direction, and the end of the inner first coil group 111a and the end of the outer first coil group 111b are connected by the connecting wire 111c. It is the same for the second coil group and the third coil group. The turns of the each coil are the same number.

When the permanent magnets 64 of the rotor run in one direction in between the coils 32 of the stator composed as above, the magnetic field of the permanent magnets 64 gives the coils of the stator the magnetic field variation of about sine curve, thereby alternative currents are generated in the each coils 32. Accordingly, the alternative currents can be output from the each coils 32. In this embodiment, the alternative currents are output from the first coil group, the second coil group, and the third coil group.

When the currents flow in the each coils as above, a magnetic field is generated in the coils 32 of the stator generating attractive forces and repelling forces between the magnetic field and the permanent magnets 64 of the stator. However, since the inner and the outer corresponding coils are mutually connected by the connecting wire 111c, 112c, 113c, the inward tensile force and the outward pushing force balance. More specifically, when the current of the inner first coil group 111a decreases, the current of the outer first coil group 111b decreases equally, the inward tensile force and the outward pushing force balance. Similarly, the force among the second coil group 112a and 112b, and the force among the third coil group 113a and 113b mutually balance. Thereby, the rotor runs keeping roughly a constant gap to the stator enabling smooth rotation wholly when the rotation number changes.

In the magnetic levitation structure J3 shown in FIG. 26a, the permanent 90 mounted on the rotating impeller side, for example, on the blade holding arm has about an U-shaped cross section opened downward. The permanent magnet 89 mounted on the fixed frame side, for example, on the supporting ring has a shape of the longitudinal plate. Such a permanent magnet 90 having a U-shaped cross section can be obtained by combining the central platy magnet 90a disposed horizontally and the inner and the outer platy magnets 90b, 90c disposed vertically so as to be, for example, the N pole inside. In this case, the upper end of the opposite longitudinal magnet 89 is also set to be the same N pole. In the case that the inside of the U-shaped magnet 90 is set to be S pole, the upper end of the longitudinal magnet is also set to be S pole. And then, in a base condition, the front edge of the permanent magnet 89 of the stator is approximately brought into line with the line L connecting the front edge of the permanent magnet 90 of the rotor each other. In addition, this is the same with that of magnetic levitation structure J1 shown in FIG. 21 at the point that the permanent magnets 90 of the stator side are aligned circularly almost without a break and that the permanent magnets 89 of the rotor side are provided on only the blade holding arm portion. But, in the stator side they may be partially provided, and in the rotor side they may be aligned circularly almost without a break.

In the magnetic levitation structure J3 composed as above, since the N pole of the central magnet 90a of the rotor side and the N pole of the upper edge of the permanent magnet 89 of the stator side repel, the weight of the impeller can be supported. Further, in the case that a force toward the center is applied, since the inside magnet 90b and the longitudinal magnet 89 repel, a force to respond to the above force is generated. Contrary in the case that a force toward outside is applied, a force to turn back acts between the outside magnet 90c and the longitudinal magnet 89 will be generated. Therefore, this magnetic levitation structure J3 has a function to keep at all times its base condition. The width of the permanent magnet 90 of the rotor side may be, as to be found from FIG. 22, the same as that of the blade holding arm saving the magnets. Further, since platy magnets may be employed, it can be easily constructed using magnets available in the market.

The magnetic levitation structure J4 shown in FIG. 26b is, contrary to the case of FIG. 26a, the longitudinal permanent magnet 90 is provided in the rotor side and the U-shaped permanent magnet 89 is provided in the stator side. This magnetic levitation structure J4 is, same as the magnetic levitation structure J3 shown in FIG. 26a, has both of the function; the magnetic levitation of the impeller; and the upholding action of the center, providing substantially the same effect.

The magnetic levitation structure J5 shown in FIG. 26c is composed of the outer magnet 89c having an inward-opened U-shaped cross section and the inner magnet 89b having an outward-opened U-shaped cross section. As the rotor side permanent magnet 90, a platy magnet disposed horizontally in between the permanent magnet of the stator side is used. The rotor side permanent magnet 90 is mounted on, for example, the blade holding arm etc. using the supporting member 119 composed of non-magnetic material, for example, stainless steel etc. In the case that the inside of the outer U-shaped magnet 90c is set to be N pole; the inside of the inner U-shaped magnet 90b is set contrary to be S pole; and the rotor side permanent magnet 90 is set to be N pole in its out side end and S pole in its inside end, thereby the action of strong upward magnetic levitation and upholding of the center can be brought out.

The magnetic levitation structure J6 shown in FIG. 27a employs, contrary to the magnetic levitation structure J5 of FIG. 26c the each magnet 90c, 90b having U-shaped cross section is disposed outside and inside as the rotor side permanent magnet 90. And further the platy magnet disposed horizontally is employed as the stator side magnet 89. In this embodiment, a member composed of non-magnetic material such as stainless steel interconnects the each upper part of the outer magnet 90c and the inner magnet 90b of the rotor side allowing easy handling.

The magnetic levitation structure J7 shown in FIG. 27b employs, a combination of the upward-opened U-shaped magnet 121 and the electromagnet 122 intervened in between them as the stator side permanent magnet 120. This composition can adjust the magnetic force of the electromagnet 122 by controlling the current flow in the coil enabling the adjustment of magnetic levitation force.

Figure 28:
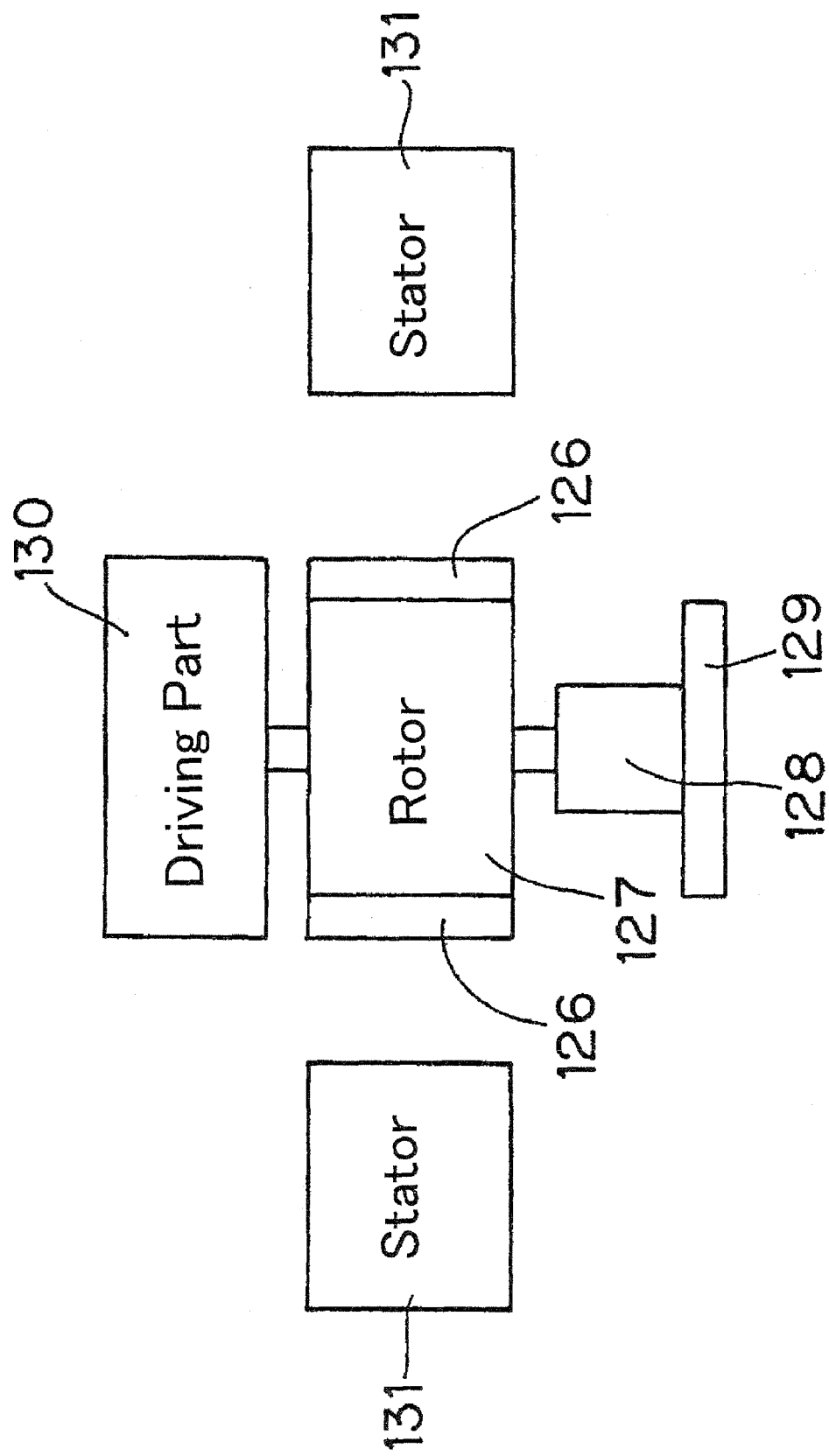
FIG. 28 is a cross section showing the first embodiment of the electric power-mechanical converter of this invention.

Next, referencing FIGS. 28~36, the first embodiment of the electric power-mechanical force converter of this invention is described. FIG. 28 shows a block drawing (cross section) of the power generator having magnetic poles in the both sides as shown in FIG. 21 in the previous embodiment of the wind power generation system. The mechanical power-electric power converter comprises a rotor 127 having permanent magnets 126 in the both sides, bearings 128 supporting the shaft of the rotor 127, a pedestal 129 to support the bearing 129, the driving part 130 composed of the impeller 12 to rotate the rotor 127, and the stator 131 facing the permanent magnets 126 of the rotor 127. In place of the bearing 128, the above described magnetic levitation by permanent magnets may be used. The mechanical power-electric power converter extends perpendicular to the paper. When it is applied to a wind power generator, it is aligned annularly, but it may be aligned in straight line or in gradual curve. The following description is the case of annular alignment.

The rotors 127 of the power generator having the two stator 131 on the both sides of the rotor 127 are doughnut-type rotors and distributed circularly. In such power generators, the difference between the outer diameter and the inner diameter of the rotor 127 is required to be small in order to reduce the size of the stator 131, and the weight of the rotor is required to be light in order to reduce the load of the bearing of the rotor 127.

Figure 29:
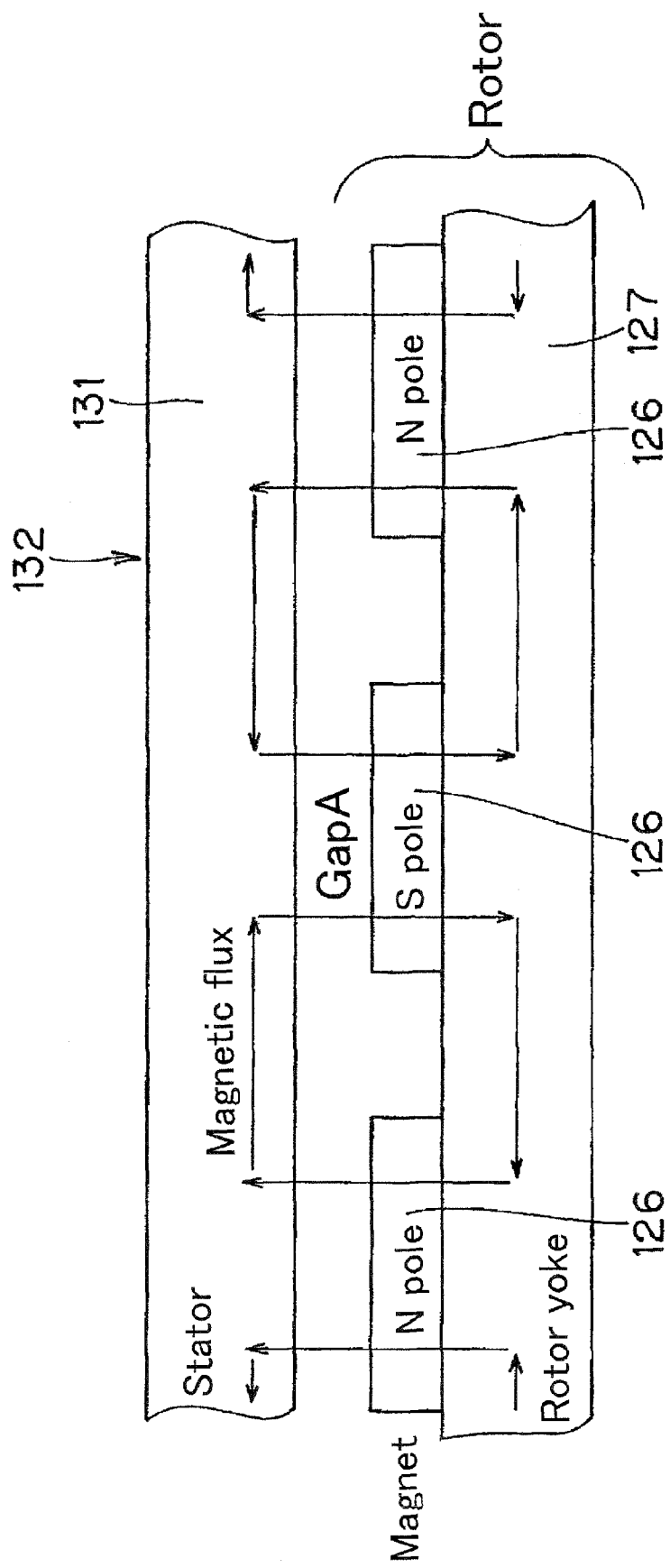
FIG. 29 is an explanatory drawing showing the structure of the magnetic pole and the rotor yoke part of the power generator related to this invention.

FIG. 29 shows the structure of a rotor yoke part 132 of the power generator having the stator 131 in one side. To the elements having the same function as FIG. 28 are given the same number. In the surface of the rotor 127 facing the stator 131, the permanent magnets 126 are disposed so as to be N pole and S pole alternatively. The arrowhead shows the magnetic flux. The rotor 127 of the power generator having the stator in one side needs a magnetic circuit made of iron so as to make it easy for the magnetic flux to pass between the magnetic N pole and the magnetic S pole. The width of the magnetic circuit of the rotor 127 is half of the magnetic pole width (the width of the permanent magnet 126).

Figure 30:
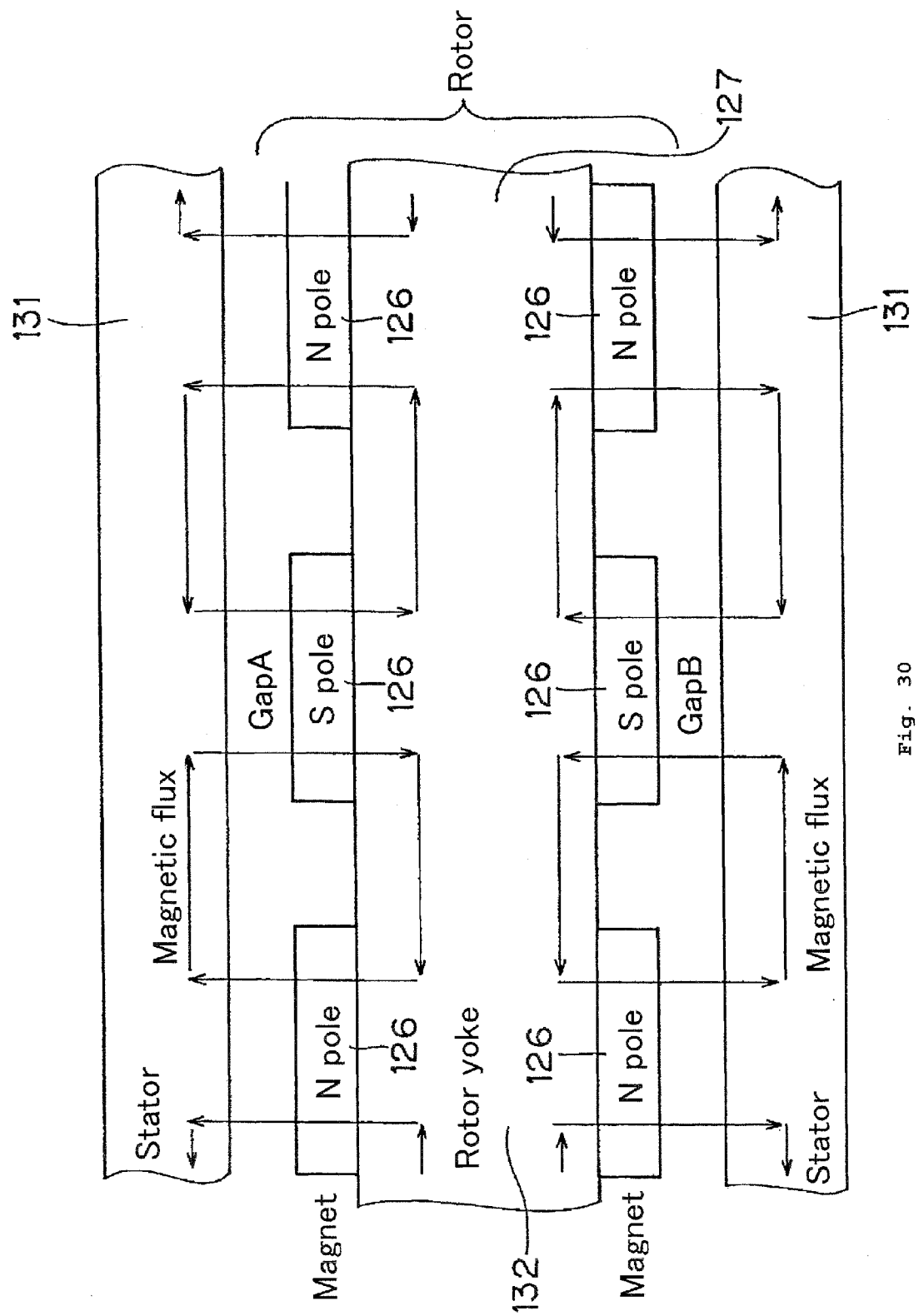
FIG. 30 is a structural drawing showing the other embodiment of the power generator related to this invention having the stators on the both sides.

On the other hand, in the case that in the power generator having the stator 131 on the both sides of the rotator 127, the rotor 127 having magnetic poles(permanent magnet 126) on the both sides is composed as shown in FIG. 30, it becomes necessary to have a rotor yoke 132 having a large width in the radial direction. Accordingly, the difference between the outer and inner diameter becomes large requiring double rotor yoke 132, thereby the weight of the rotor 127 becomes large.

Figure 31:
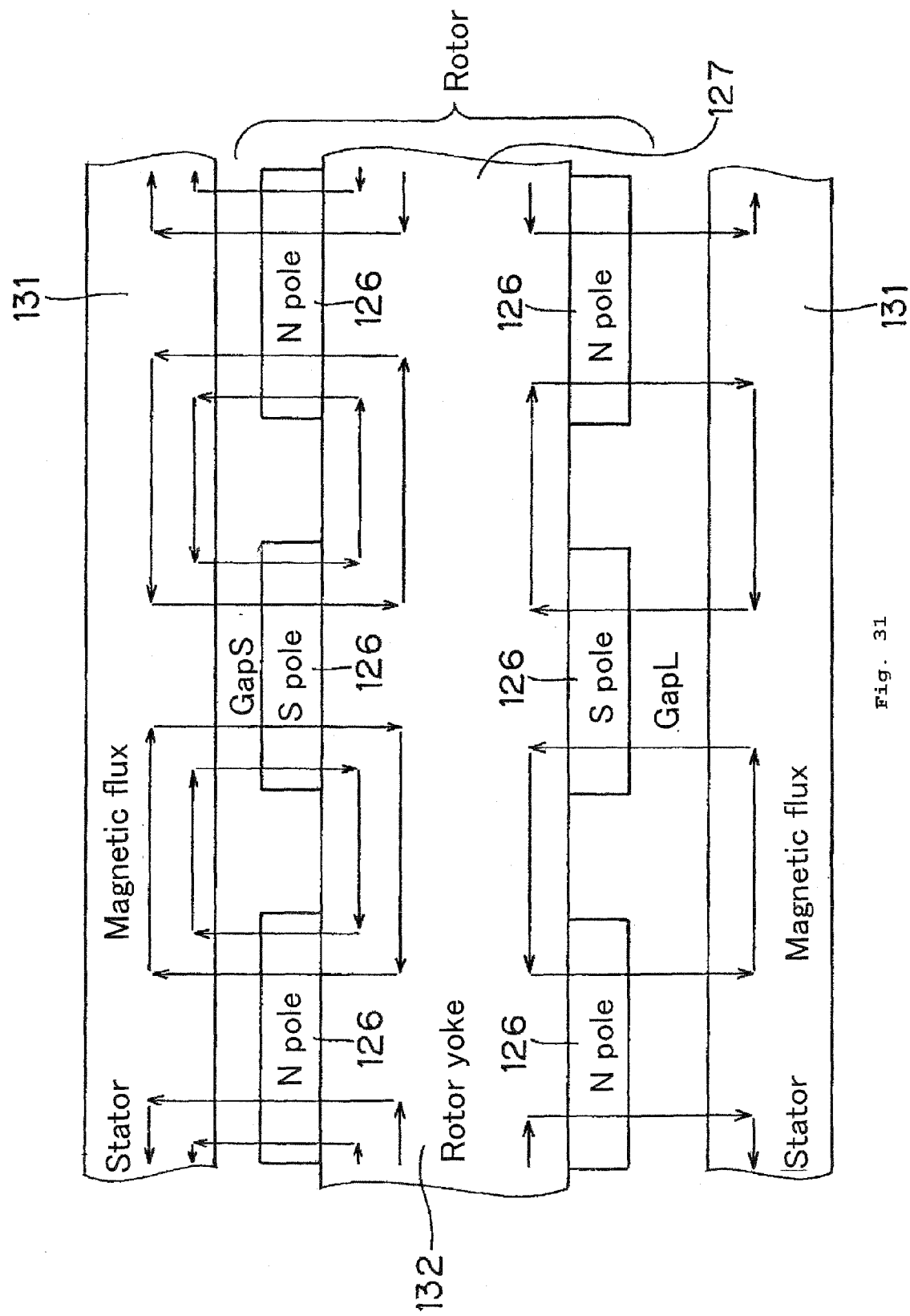
FIG. 31 is an explanatory drawing showing the case in which deflection of the shaft occurred in a power generator related to this invention, of which the both side magnetic poles of the rotor are composed of conventional structures.

When the permanent magnets 126 are used in this composition of having magnetic poles on the both side of the rotor 127, and in the case that eccentricity of the shaft(the rotator 127 to approach the stator 131 side) occurs, since the gap between the stator 131 and the rotor 127 becomes narrow, and since the approaching permanent magnet 126 has an own yoke part in the rotor 127, the consuming ampere turn decreases and the amount of the generated magnetic flux of the permanent magnets 126 increases dependent only upon the own magnetic resistance, having no relation to the permanent magnets 126 of the remaining rotor 127 sides. Further, since the remaining sides have own yoke parts, the generation of the amount of the generated magnetic flux of the permanent magnets 126 decreases. This is shown in FIG. 31. Thus, the magnetic attraction force of the upper rotor 127 of FIG. 31 acting radially increases, and the rotor 127 moves further toward the upper stator 131 side. This force is described in the formula.

Figure 32:
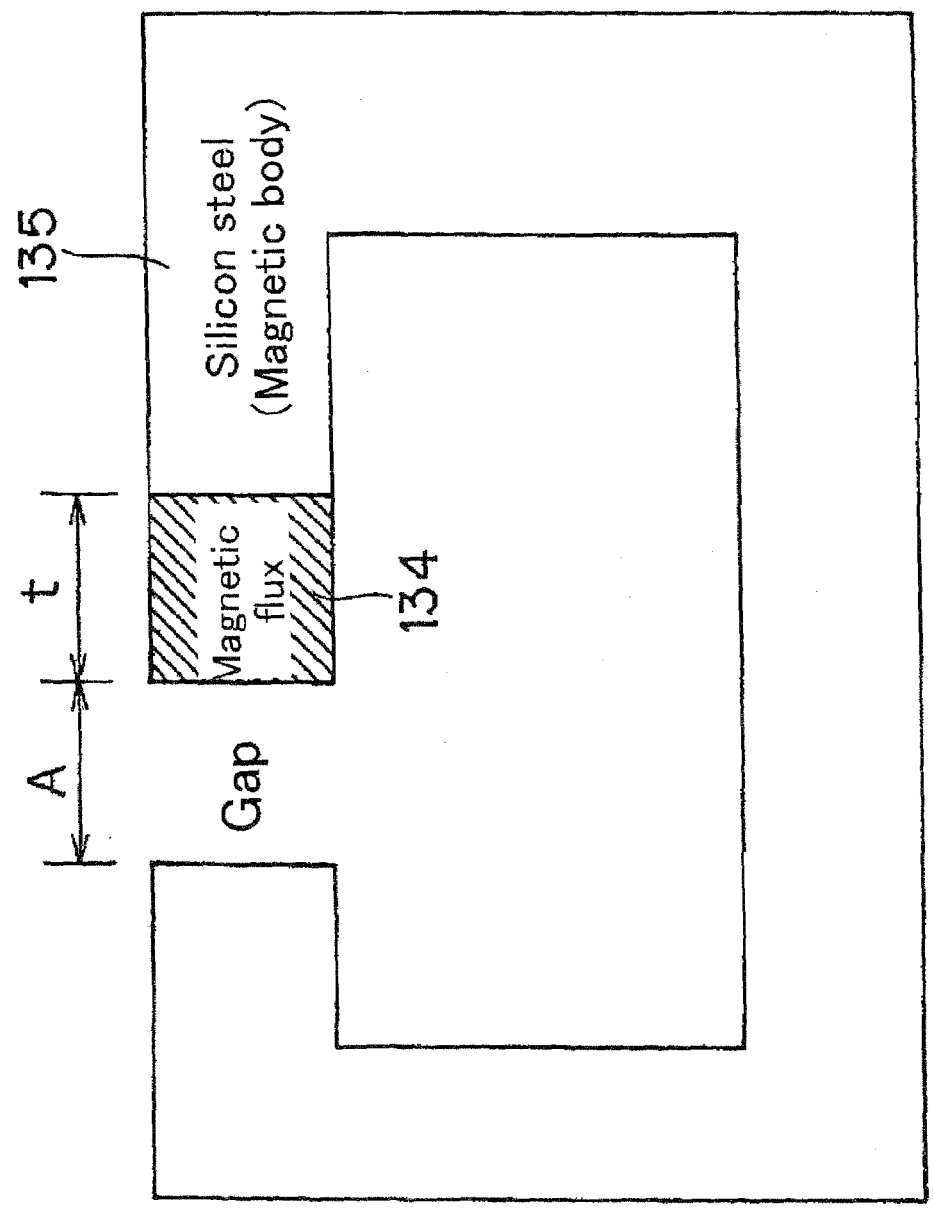
FIG. 32 is an explanatory drawing showing a model magnetic circuit of the rotor using the permanent magnet of this invention.

FIG. 32 shows a magnetic flux circuit of a model of a rotating machine using a permanent magnet 134, in which a permanent magnet 134 is disposed at the facing one side of the front edge of the magnetic body 135 composed of rough U-shaped silicon steel plate, and a gap is provided between this permanent magnet 134 and the other front edge of the magnetic body 135. The gap magnetic flux density B generated by the permanent magnet 134 is generally given as follows in the physical relation ship shown in FIG. 32;

$$B = Br \cdot (t/\mu)/(t/\mu + A) \quad (1)$$

(where, Br: remnant flux density of the permanent magnet 134, t: thickness of the permanent magnet 134, μ: magnetic permeability of the permanent magnet 134, A: length of the gap)

In the rotor structure having yoke parts on the both sides, the magnetic attractive force of the outer magnet P1 and that of the inner magnet P2 are, assuming that the thickness t of the magnet (the permanent magnet 134) is 10.5 mm, the gap A to be 10 mm, and k is the area of the pole, as follows;

$$P1 = k \cdot ((Br \cdot (t/\mu)/(t/\mu) + A))^2 \quad (2)$$
$$= k \cdot (Br)^2/4$$

$$P2 = k \cdot ((Br \cdot (t/\mu)/(t/\mu) + A))^2 \quad (3)$$
$$= k \cdot (Br)^2/4$$

Therefore, the magnetic attractive forces at the same gap are the same, and the rotor 127 will not move.

whereas, when the rotor 127 shift 5 mm form the center and approaches to the rotor 127 side, the P1, P2 of the rotor 127 (when the upper gap is narrowed in FIG. 31) are described bellow;

$$P1 = k \cdot ((Br \cdot (t/\mu)/(t/\mu) + A))^2 \quad (4)$$
$$= k \cdot (Br)^2 * 4/9$$

$$P2 = k \cdot ((Br \cdot (t/\mu)/(t/\mu) + A))^2 \quad (3)$$
$$= k \cdot (Br)^2 * 4/25$$

Thus, there occurs the difference of the magnetic attractive force acting toward the further eccentricity of the rotor 127.

Further, the attractive force in the case of having magnetic poles (the permanent magnet 126) on the both side of the rotor 127 is twice as high as that of the power generator having the magnetic pole (the permanent magnet 126) only on one side of the rotor 127, because there are also magnetic poles (the permanent magnet 126) on the both sides of the rotor 127 in the 180 degree position to the rotation center. Accordingly, manufacturing the power generator having the magnetic poles of the permanent magnets 126 on the both sides of the rotor 127 under the same concept of the structure having the magnetic poles on the one side causes a problem of the large weight of the rotor and the large attractive force in the condition of shaft eccentricity. The problem of the concept of this structure is the large weight of the rotor 127 and the large attractive force in the condition of the shaft eccentricity, i.e. the composition of the rotor 127. More specifically, the problem is in the composition of the rotor 127; the rotor yoke parts 132 are needed doubly in the structure of the rotor 127. Therefore, it becomes conceivable to reduce the width of the rotor yoke parts 132 and to share the rotor yoke parts 132.

The reduction of the width of the yoke parts 132 can reduce the weight, but it increases the magnetic resistance of the yoke parts 132 decreasing the ability of the permanent magnets 126, thereby the problem can not be solved. In the sharing of the rotor yoke parts 132, it is conceivable to shift a half of the pole pitch of the pole of the outer pole and the inner pole of the rotor 127 to reduce the weight, but this sharing cannot solve the problem of the large attractive force, because the outer and the inner poles move independently.

Accordingly, when unifying both of the outer and the inner magnetic circuits of the rotor 127 is realized so that, even in the condition of the eccentricity, the both magnets of the rotor 127 do not move in their independent magnetic circuit, it becomes possible to make the rotor yokes 132 to be the same and to reduce the weight decreasing the magnetic attractive force. Therefore, the problem is to unify the magnetic circuit of the outer and the inner permanent magnets 126 of the rotor 127.

Figure 33:
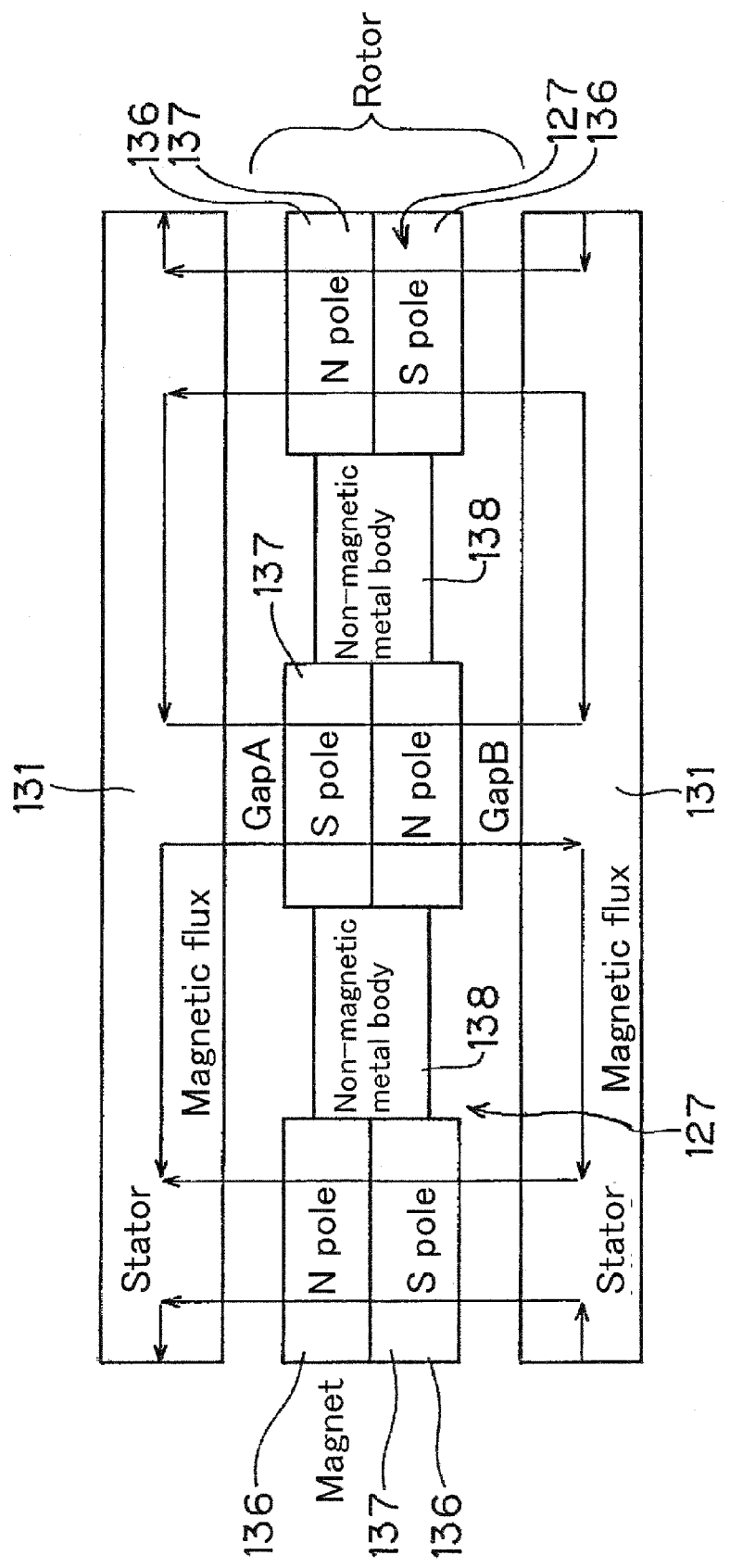
FIG. 33 is an explanatory drawing showing the case in which one magnetic circuit is formed in between the both stators by making the both sides magnets of the rotor of this invention into one pair.

Consequently, by making the N pole and the S pole of the permanent magnets which are the both magnetic pole of the rotor 127 into one pair, unifying the magnetic circuit can be devised. This composition is shown in FIG. 33. In FIG. 33, the magnetic part 137 in which the magnets 136, 136 of the N pole and the S pole are made into one pair are aligned circumferentially so as to form the rotor 127 by disposing the S pole and the N pole of the magnet parts 137 to be alternatively positioned in the each opposite side, and the rotor 131 is disposed on the both sides of the rotor 127. This composition allows the same magnetic field to pass through the both magnet parts 137 of the rotor 127 and the both stator 131 equalizing the magnetic flux density of the both sides and the magnetic attractive force.

Figure 34:
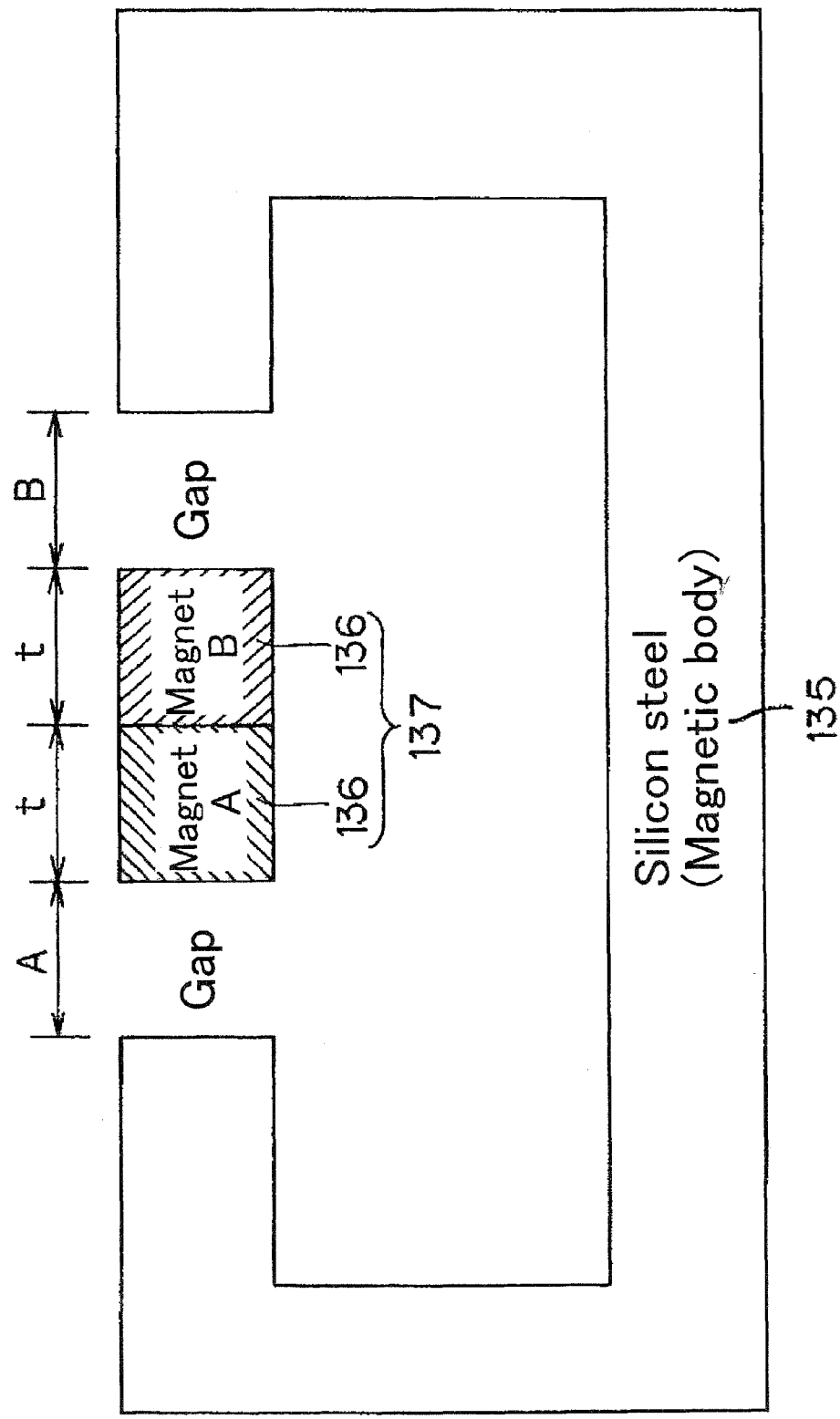
FIG. 34 is a model drawing of the magnetic circuit in the case that the magnet of this invention is set to be one pair.

A modeling of this condition is shown in FIG. 34. The magnetic flux density of the poles of the both sides is shown as follows; since the two magnets (magnetic parts 137) are in the same magnetic circuit, the magnet thickness and the gap are added together as follows;

$$B = Br \cdot (2t/\mu)/(2t/\mu + A + B) \quad (6)$$

(where, Br: residual density of the magnet, t: the magnet thickness, μ: magnetic permeability of the magnet, A and B: the gap length)

At the moment, let the thickness t of the magnet A and the magnet B be 10.5 mm, μ be 1.05, the gap A and the gap B be 10 mm, the magnetic attractive force P1, P2 acting on the both side magnets of the rotor 127 is shown as follows;

$$P1 = k \cdot ((Br \cdot (2t/\mu)/(2t/\mu + A + B))^2 \quad (7)$$
$$= k \cdot (Br)^2/4$$

$$P2 = k \cdot ((Br \cdot (2t/\mu)/(2t/\mu + A + B))^2 \quad (8)$$
$$= k \cdot (Br)^2/4$$

Further, let there be 5 mm eccentricity of the rotation shaft of the rotor 127 (let the magnet A and the magnet B approached 5 mm to the gap A side), the attractive force P1, P2 are the same, because the gap (A−5)+(B+5) remains to be original A+B.

Consequently, since the magnetic attractive force of the both side magnets balances at the both sides of the rotor 127, the force received wholly by the rotor 127 becomes zero, thereby it is shown on calculation that no force to move the rotor 127 further to the radial direction in the eccentricity is generated.

Further, as shown in FIG. 33, by coupling the adjacent magnets with a non-magnetic metal in the circumference of the rotor 127, the leakage of magnetic flux to the adjacent magnets can be zeroed.

The composition unifying the magnetic circuit by pairing the N pole and the S pole of the both side magnets 136,136 of the rotor 127 allows to couple the adjacent magnets in the circumference of the rotor 127 using non-magnetic metal body 138. This saves conventional iron magnetic circuits and generates the effect that the magnetic attractive force is not generated on calculation wholly when the eccentricity of the shaft of the rotor 127 occurs. Furthermore, it brings forth the effect that the rotor yoke parts between the adjacent magnets in circumference needed for the above described rotation machine becomes unnecessary.

Figure 35:
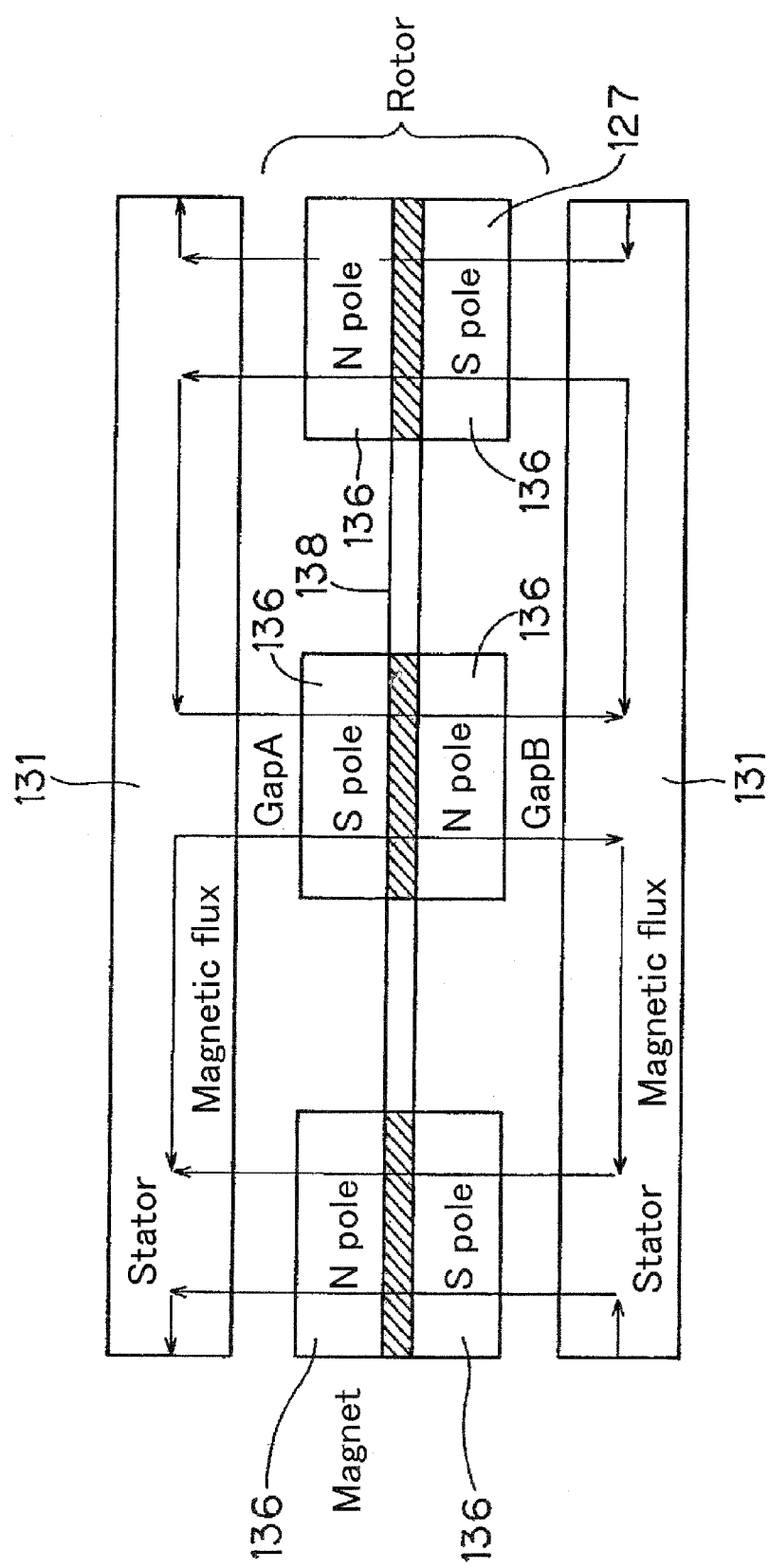
FIG. 35 is a drawing of the tangible configuration of the electric power-mechanical force converter of this invention.

The practical embodiment is shown in FIG. 35. As shown in the figure, there are each stator 131 in the both sides of the rotor 127 and the rotor 127 is mounted on the non-magnetic metal body 138 provided with the magnets 136, 136 of N pole and S pole circumferentially. The non-magnetic metal body 138 couples the circumferentially adjacent magnets 136,136 (the magnet part 137) of the rotor 127. Coupling the both side magnets 136, 136 with a magnetic metal body in place of the non-magnetic metal body 138 reduces the magnetic resistance between the both side magnets 136,136. Since the magnetic metal between the both side magnets 136,136 of the rotor 127 are in the same magnetic circuit as the both side magnets 136, 136 of the rotor 127, and since its action differs from the iron magnetic circuit existing along the circumference of the structure shown in FIG. 31, it has no relation with the principle of this invention.

Figure 36:
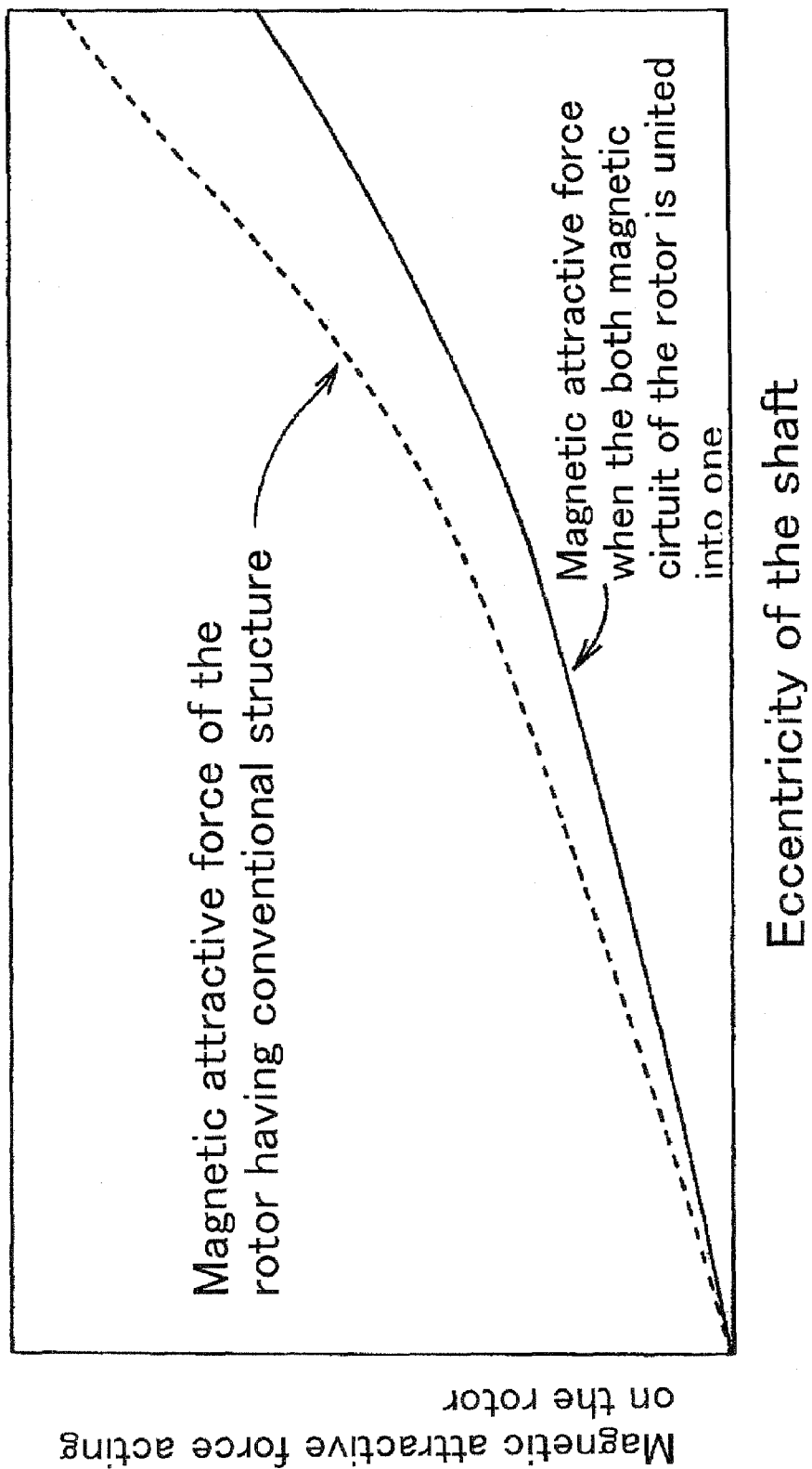
FIG. 36 is a graph showing a calculated result of the magnetic attracting force using the finite element method.

Theoretically, as shown in the formula (6) and the formula (7), the attractive force generated by the both side magnet 136,136 of the rotor 127 are the same. However, in practice, since the magnetic flux has a property to extend in space so as to reduce its flux density, and since the stator 131 exists in circumference, the constant k of the magnetic area of the above formula (6) and the formula (7) differs between that of the distant side and the near side of the rotor 127. In the near side k becomes large, and in the distant side k becomes small. So the amount of the attractive force generated at the near side is larger than the amount of the attractive force generated at the distant side. This secondary phenomenon has no relation to the principle of this invention. But the calculated result of the attractive force including the secondary phenomenon using the field analysis by finite element method is shown in FIG. 36. This calculation is performed assuming that the both side magnet dimension and the gap shown in FIG. 35 is the same and that the size of the adjacent iron rotor yoke part in circumference in FIG. 32 is half the width of the magnet. As shown in the result, the attractive force of the structure shown in FIG. 35 is smaller than that of the conventional structure.

Thus in this embodiment, since the both side magnets of the rotor 127 are paired, the both side magnets 136,136 work in the same magnetic circuit balancing the attractive force of the magnets 136,136 and zeroing wholly the force of the rotor 127, thereby no force to move further the rotor 127 occurs on calculation when the eccentricity of the rotor occurs. Further, since the magnets 136, 136 are mounted on the same magnetic circuit, the rotor yoke parts considered being necessary between adjacent magnets for conventional structures are not needed. This embodiment has the effects to reduce the weight of the rotor 127 and the radial width of the rotor 127.

Figure 37:
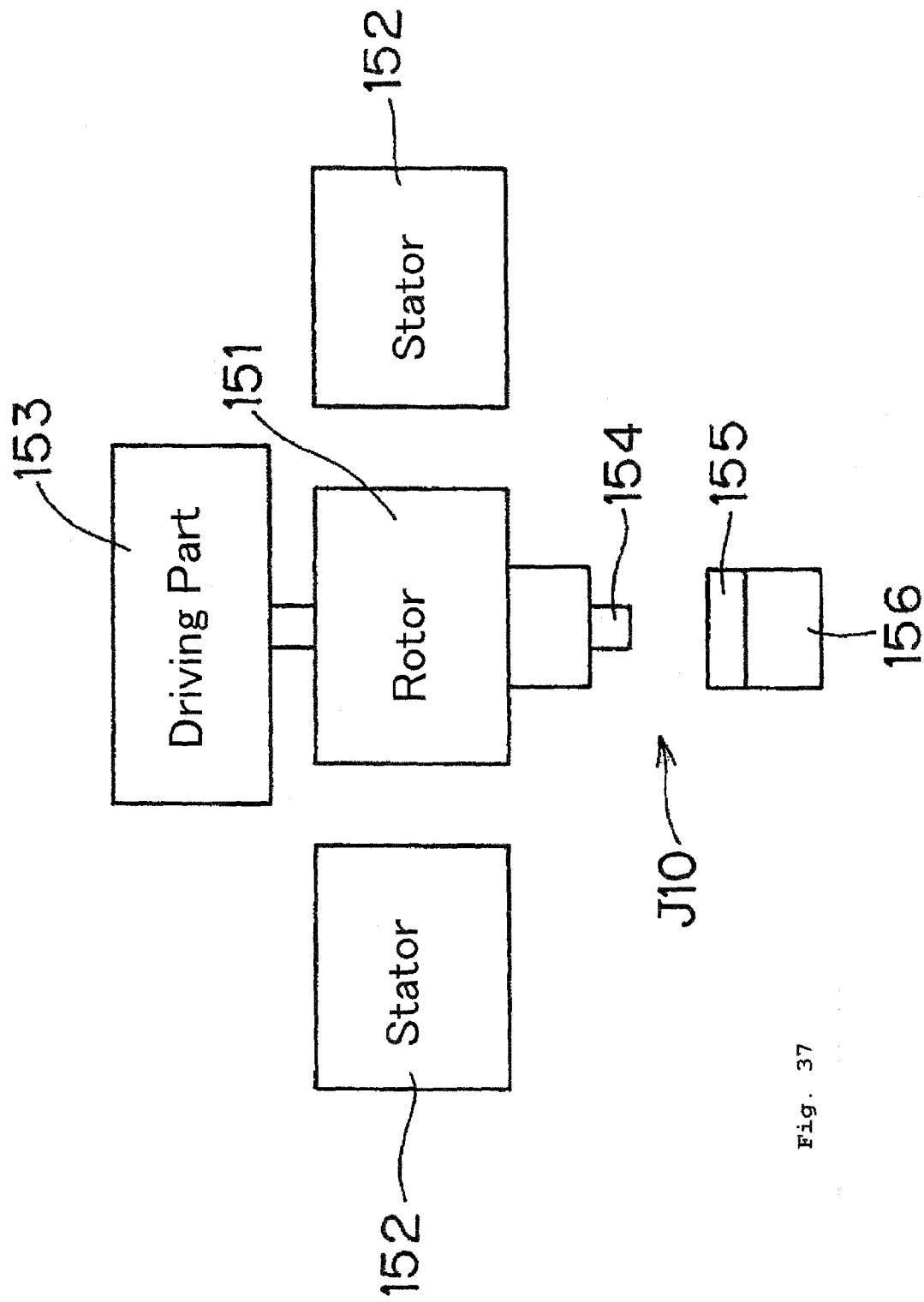
FIG. 37 is a cross section of an embodiment of the magnetic levitation apparatus provided with the alignment of the permanent magnets of this invention.

Next, referencing FIGS. 37 to 44, the embodiment of the alignment of the permanent magnets of this invention is described. In the following embodiment, an application of this alignment of the permanent magnets of this invention to a magnetic levitation apparatus is described. However, this alignment of the permanent magnets can be applied not only to this but also to the various compositions in which plural magnets are so aligned as to be the same poles in the same direction. FIG. 37 shows the magnetic levitation structure of the rotor having the stator in the both sides, wherein the rotor 151 rotated by the driving part 153 similar to the previous embodiment has the stator 152 on it both sides and the rotor 151, which floats by the magnetic levitation structure J10. This magnetic levitation structure J10 is composed of the permanent magnet 154 of the rotor 151 side and the permanent magnet 155 fixed to the pedestal 156 side, and the permanent magnet 154 and the facing sides of the permanent magnet 165 are mutually N poles and S poles repelling each other.

As shown in FIG. 37, the rotor 151 of the power generator having the stator 152 on both sides are disposed horizontally and distributed in circumference. Since the rotor 151 of the power generator having such structure can be installed horizontally as described above, it can be magnetically levitated by the permanent magnets 154, 155. For handling the permanent magnets 154, 155, they are so made as to be removable even though they are adhere to the near magnetic metals. Or else, when the permanent magnets 154, 155 are mounted via non-magnetic body such as aluminum material etc., the aluminum material etc. is necessary to be removed. Since aluminum etc. is necessary for mounting the permanent magnets 154, 155, a space is required for the mounting, although the space can not be utilized efficiently.

Figure 38:
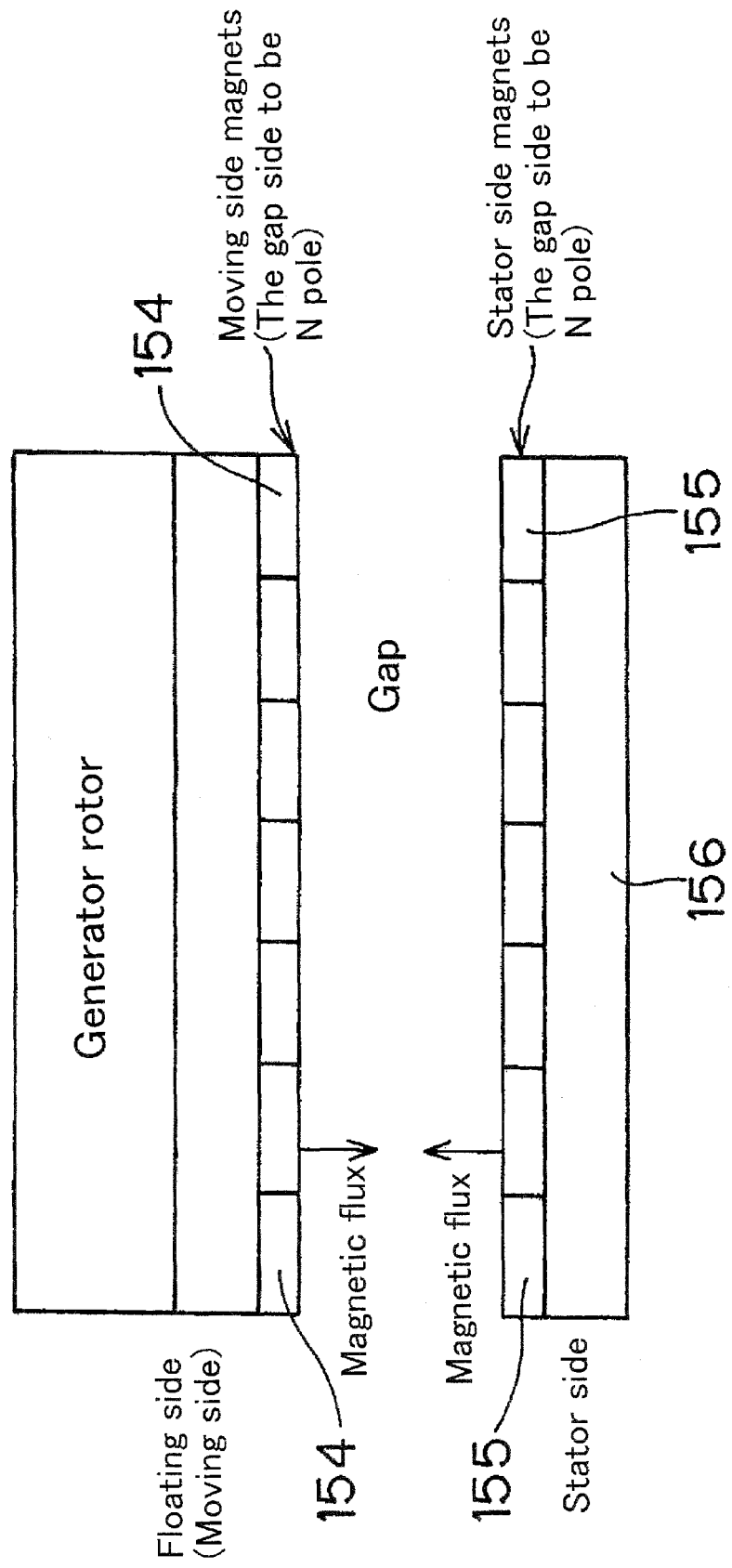
FIG. 38 is an explanatory drawing showing a part of the magnetic levitation apparatus.

Also, in the case that the rotor 151 moves in the condition being magnetically levitated by the repelling forces of the permanent magnets 154, 155, a large number of magnets (the permanent magnets 154, 155) are required to be mounted on the stator side and the rotor side leaving no space in between. Since the high performance magnets have a limit in its maximum size, a large number of the magnets are required. As shown in FIG. 38, for the magnetic levitation, the same pole of the magnet (the permanent magnet 154, 155) must be disposed in a lateral direction. In FIG. 38, the gap side of the permanent magnet 154 of the moving side is set to be N pole and the gap side of the permanent magnet 155 of the rotor side is set to be S pole to get the repelling force.

Figure 39:
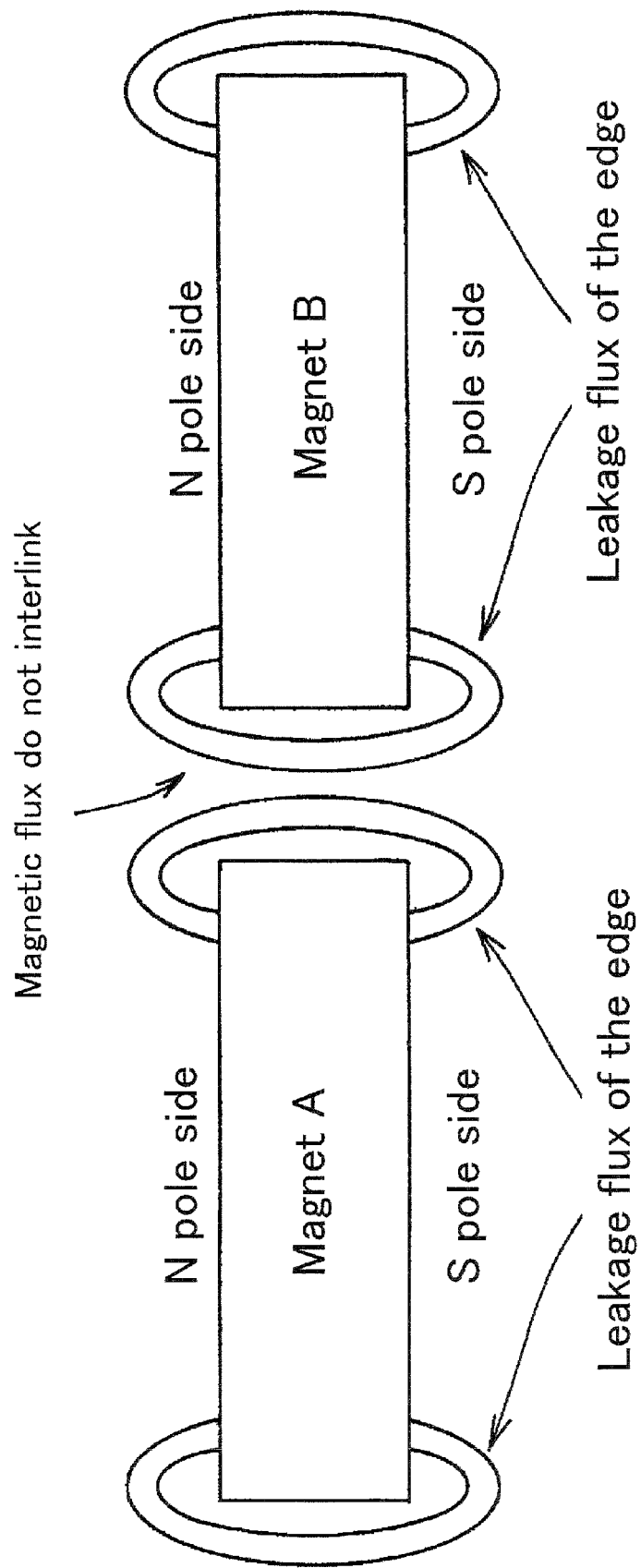
FIG. 39 is an explanatory drawing showing the magnetic flux distribution of the fluid when the two high performance magnets come close.

However, as shown in FIG. 39, when the sides of the magnet having the same pole in the same direction come close, there occurs a repelling force making the parallel mounting difficult, thereby a large amount of man power is required to fix them. FIG. 39 shows the fluid of the magnetic flux distribution of the both magnets A, B when the high performance magnets A and B come close. When the magnet A and the magnet B come close, there occurs a repelling force, because the magnetic fluxes generated from the same N poles (the leakage flux at the edge in the figure) approach (does not interlink). Therefore, it is difficult to hold the magnets A, B in close proximity.

Figure 40:
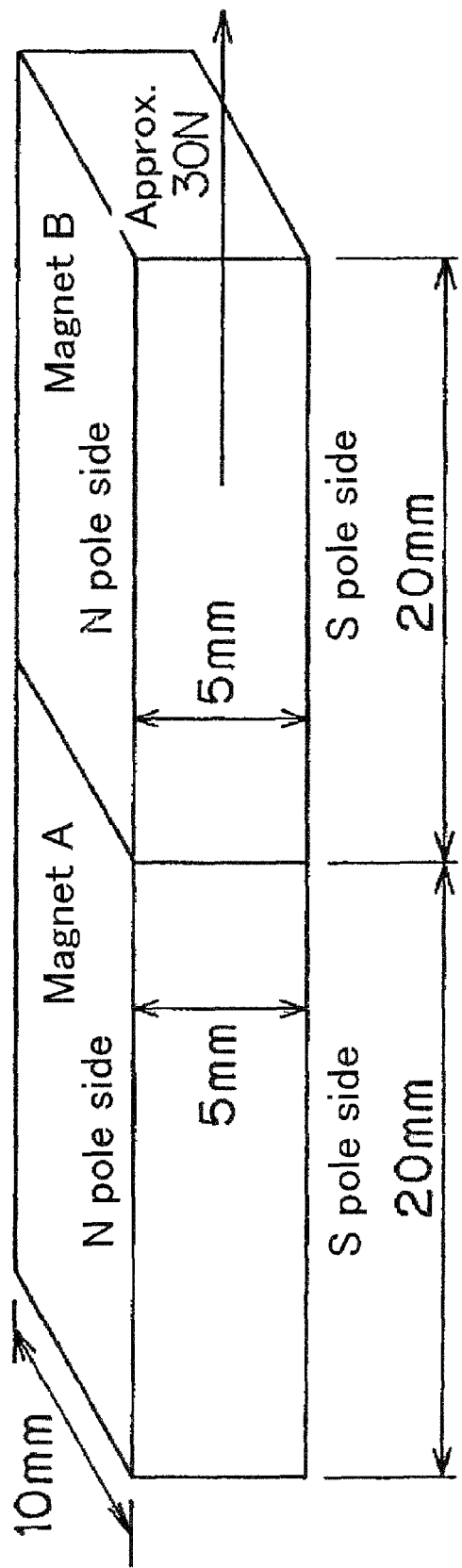
FIG. 40 is an explanatory drawing showing the repelling force of the high performance magnets of this invention laid in the air.

FIG. 40 describes the repelling force (the magnet A to be fixed) of the high performance magnets A, B placed in air. In the case that the thickness of the magnet A, B is 5 mm, length is 20 mm, and the width is 19 mm, and the magnet B is stuck to the edge of the magnet A, the repelling force acting on the magnet B is about 30 N making it difficult to hold the magnet by man power for a long time.

It increases the time required for removing the non-magnetic member for fixing the magnets so as to prevent the installed magnets from springing out in whole disassembling and checking of the equipment. Further, when the assembling and disassembling work is carried out on site, not in the factory using the facilities, it may require longer time. Thus, it takes times to install high performance magnets in the equipment (wind power generation system etc.).

Thus, the deterioration of workability in installing high performance magnets is caused by the leakage of the magnetic flux due to the high performance of the magnets generating attractive forces between the adjacent magnetic material. The generation of attractive force caused by the magnetic flux toward the planned direction or the repelling force between the magnets for the levitation is also the purpose of the use of the high performance magnets. And it is functionally necessary to take measures against this attractive force generated by the magnetic flux, and it is not to be a problem. However, the magnetic flux passing through the side of the magnets which are out of a given direction is a leakage magnetic flux, and the workability can be improved provided that the generation of the unnecessary attractive force between the adjacent magnetic material due to the leakage magnetic flux is prevented, or the generating of the unnecessary repelling force between the magnets directed toward the same direction is prevented.

It is publicly known that if the permanent magnets are mounted on a magnetic body such as iron, the attractive force of the magnetic body out side of the magnetic body decreases. Depending of this known fact, for example, the side of one cm cubic magnet is simply enclosed by a thick iron having several cm thickness, no unconsidered attractive force is generated, but the weight to be carried in the working area increases deteriorating the workability on the other hand. Further, as shown in FIG. 41, when a separate high performance magnet is disposed adjacent to that in which a magnet is enclosed by a magnetic body, a large attractive force is generated needing a large force to split.

Figure 41:
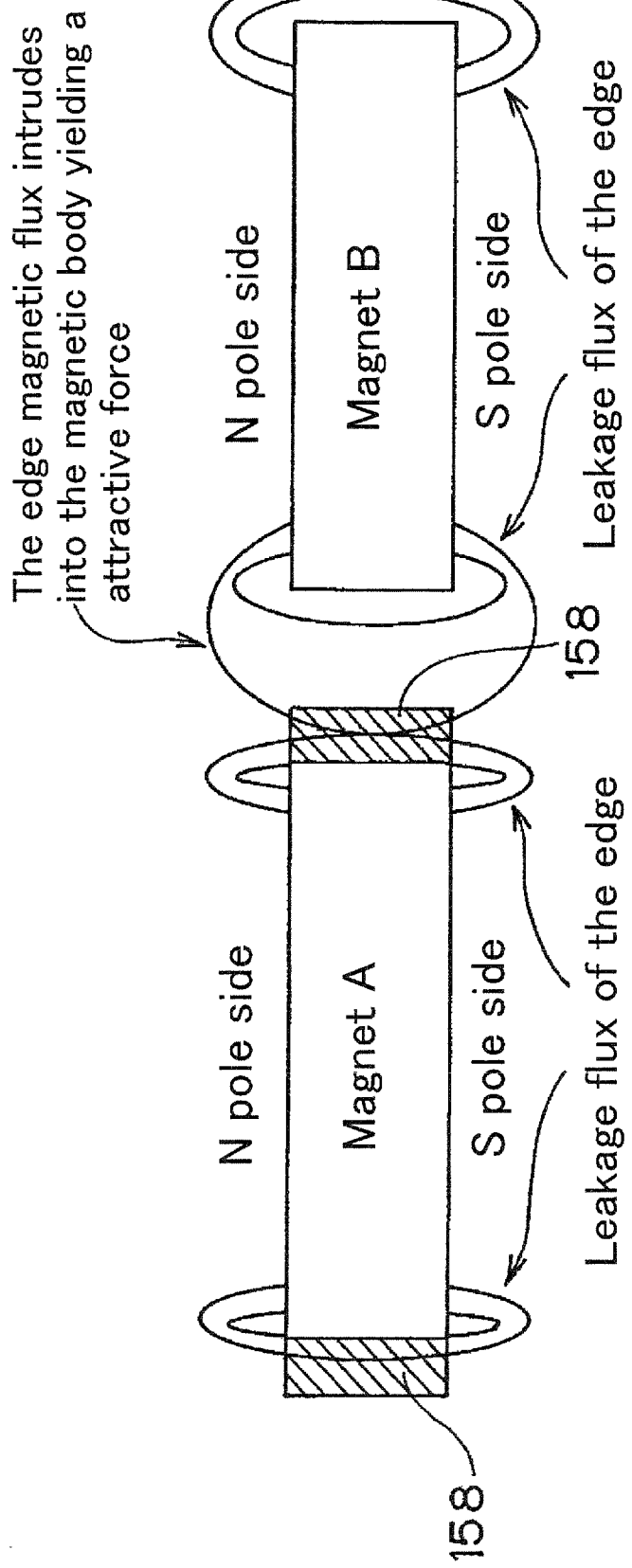
FIG. 41 is an explanatory drawing showing the magnetic flux distribution of the edge when magnetic bodies are mounted on the sides of the magnet of this invention.
Figure 42:
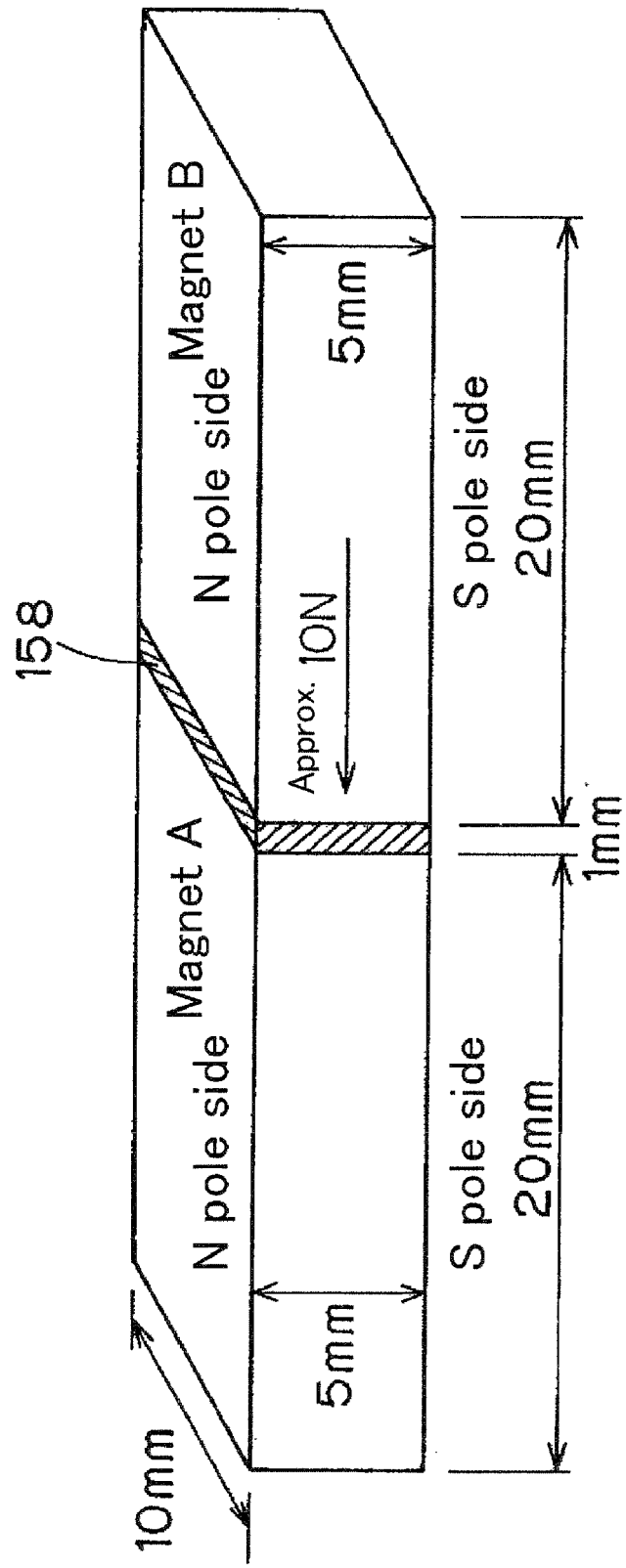
FIG. 42 is an explanatory drawing showing the attractive force when a magnetic body is sandwiched between the two high performance magnets of this invention laid in the air.

FIG. 41 shows the magnetic flux distribution of the edge when the magnetic body 158 is mounted to the side of the magnet A; the magnetic flux of the edge of the magnet B intrudes into the magnetic body 158 generating an attractive force. FIG. 42 shows the attractive force when the magnetic body 158 is sandwiched between the high performance magnet A and the magnet B placed in air. In FIG. 42, when the size of the both magnets are made to be 5 mm in thickness, 20 mm in length, 10 mm in width and that of the magnetic body 158 is made to be 5 mm in thickness, 1 mm in length, 10 mm in width, the attractive force that the magnet B receives from the magnetic body 158 side is about 30N requiring a large force to split the magnet B from the magnetic body 158, thereby the splitting of the magnet A, B is difficult.

Further, in the magnetic levitation of repelling type, when the magnetic body mounted to the magnet side protrudes from the surface of the magnets, the magnetic flux of the other end magnet concentrates on this surface reducing the repelling force for levitation.

Accordingly, it becomes a problem to obtain a magnetic body mounted on the side of a magnet reducing the attractive force and the repelling force when the same pole sides of the high performance magnets are come close, or to obtain the thickness of a thin magnetic body which composes a magnetic body enclosing the magnet side and being aligned densely to the magnets.

Figure 43:
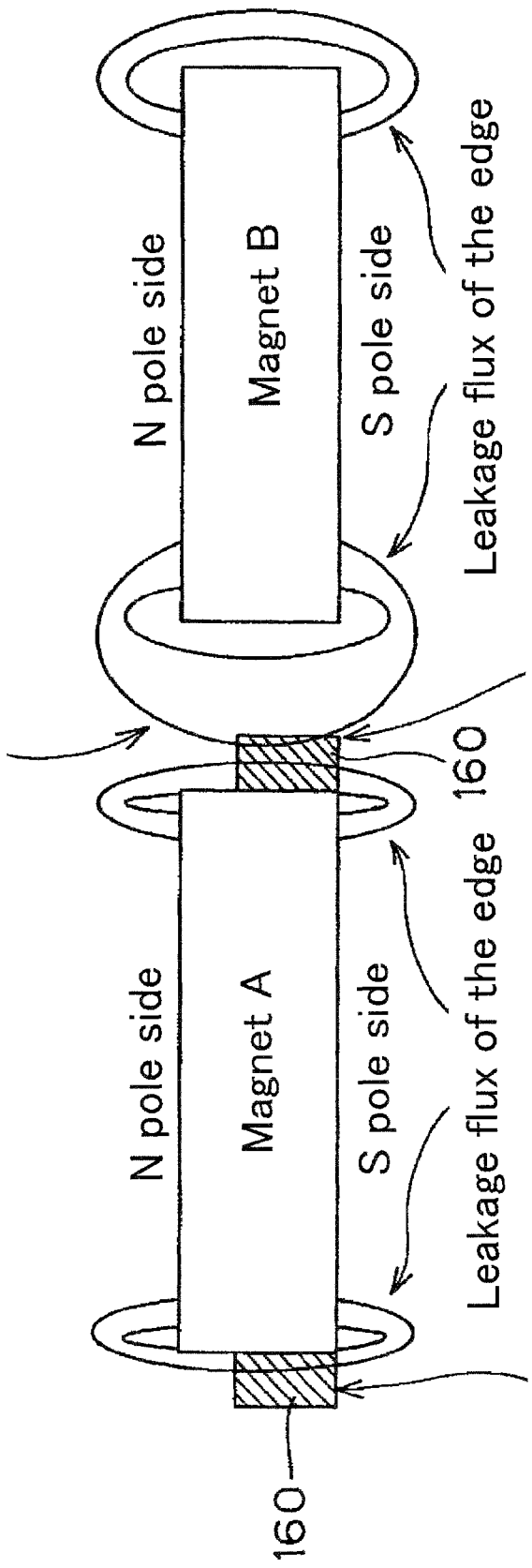
FIG. 43 is an explanatory drawing showing the magnetic flux distribution of the edge when magnetic bodies are mounted on the sides of the magnet of this invention.

When the high performance magnets come close in the same pole sides, they repel, and when a magnetic body is mounted to the high performance magnet, they attract each other and difficult to split. Provided that the condition of repelling and attracting is generated by the use of magnetic body, there will be no generation of the repelling and attracting in the case of close alignment of high performance magnets having the same pole surface. Therefore, as shown in FIG. 43, the height of the magnetic body 160 is made to be shorter than the thickness of the magnets so that a part of the magnetic flux leaks along the outside of the magnetic body 160 of the magnet side.

Figure 44:
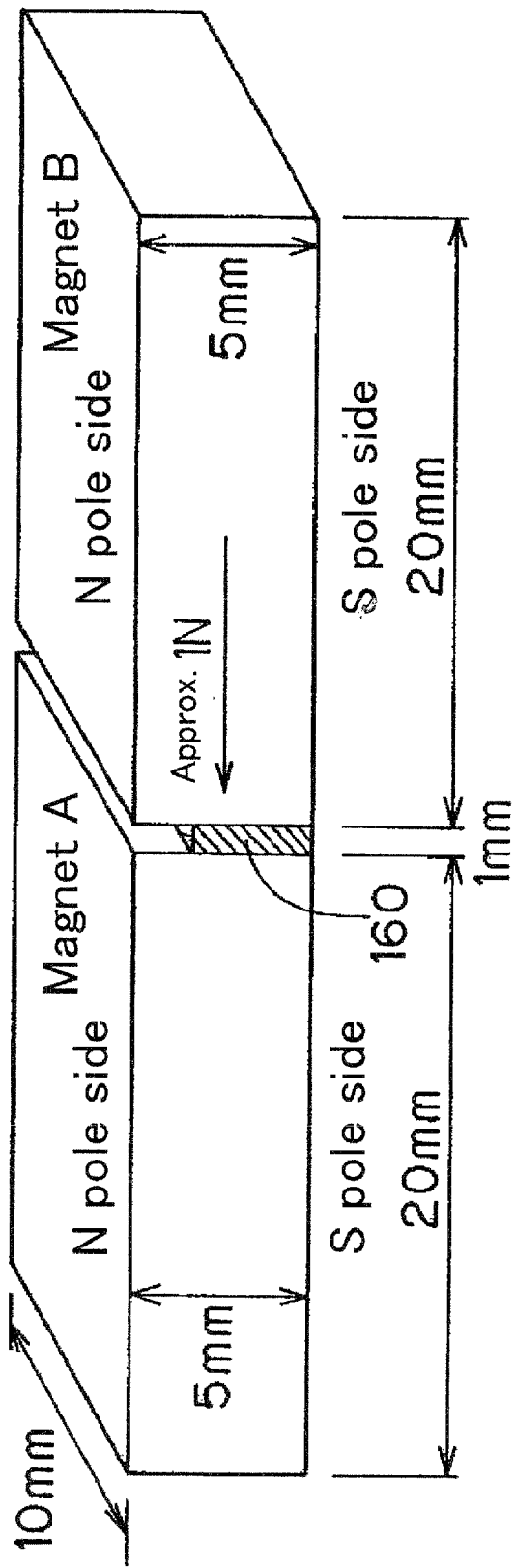
FIG. 44 is an explanatory drawing showing the attractive force when a magnetic body is sandwiched between the two high performance magnets of this invention laid in the air.

As shown in FIG. 44, the magnetic body 160, a part of which is cut down, is sandwiched between the high performance magnet A and B. The leakage fluxes from the high performance magnet A and B leaked from the part lacking of the height of the magnetic body 160 repel each other generating the repelling force, and in the part of the magnetic body 160, the high performance magnet A and B attract each other through the magnetic body. Therefore, it is possible to determine the height and the thickness of the magnetic body 160 so as to balance the repelling force and the attractive force depending on the magnet A and B using magnetic field analysis, thereby the problem can be solved.

Thus, the artifice to mount the magnetic the body 160 shorter than the thickness of the high performance magnet A, B to the sides of the magnet A and B brings forth the effect to balance repelling force and the attractive force of the adjacent magnet A, B. The length of the magnetic body 160 is shorter than the length of the magnet A and B exhibiting the condition of the magnets being aligned densely. Further, since the magnetic body 160 is kept back inside from the surface of the magnet A, B, it has an effect that the flux from the floating side magnet 154 and the fixed side magnet 155 do not concentrate on this part posing no adverse effect on the magnetic levitation.

FIG. 44 shows the practical embodiment in which the magnetic body 160 having shorter length than the thickness of the magnet A, B is mounted on the side of the magnet A, B, where the length of the magnetic body 160 is about 1 mm and is shorter than the length 20 mm of the magnet A, B. Therefore, it is near the condition of many magnets being densely aligned. The calculated results of the magnetic field analysis in this alignment are shown in FIG. 44.

When the magnetic body 160 (thickness 3.8 mm, length 1 mm, width 10 mm) whose length is 1.2 mm shorter than the thickness 5 mm of the magnet A, B is mounted on the surface of the magnet A, the force acting on the magnet B is an attractive force of about 1N. This force is smaller than the repelling force (FIG. 40) of about 30N compared with that acting when the same size of the magnet A and the magnet B shown in FIG. 44 are contacted without intervention of the magnetic body 160. And it is smaller than the repelling force (FIG. 42) of about 10N when the magnetic body having the same thickness as the magnet is intervened. Accordingly, the intervention of the magnetic body 160 shorter than the thickness of the magnet allows easy installation of the magnets saving the necessary structure to fix the magnets as a peculiar measure for the repelling force.

Thus, since in this embodiment the magnetic bodies shorter than the thickness of the high performance magnet A, B (the permanent magnet 154,155) are mounted on the side of the said magnet A, B in order to reduce the repelling force and the attractive force of the adjacent magnet A, B, the installation of the magnet A, B (the permanent magnet 154,155) becomes easy, thereby the working hours for the on-site assembling can be reduced. Further, the disassembling and checking work of the power generator is made easy because the attractive force between the magnet A, B is reduced. Furthermore, it has various effects such as saving the structure required to fix the magnet A, B as a measure for the repelling force.

The magnetic bodies 160 as shown in FIG. 44 are intervened between the many magnets 154 of the moving side shown in FIG. 38. Similarly, the magnetic bodies 160 are intervened between the many magnets 155 of the stator side.

Figure 45:
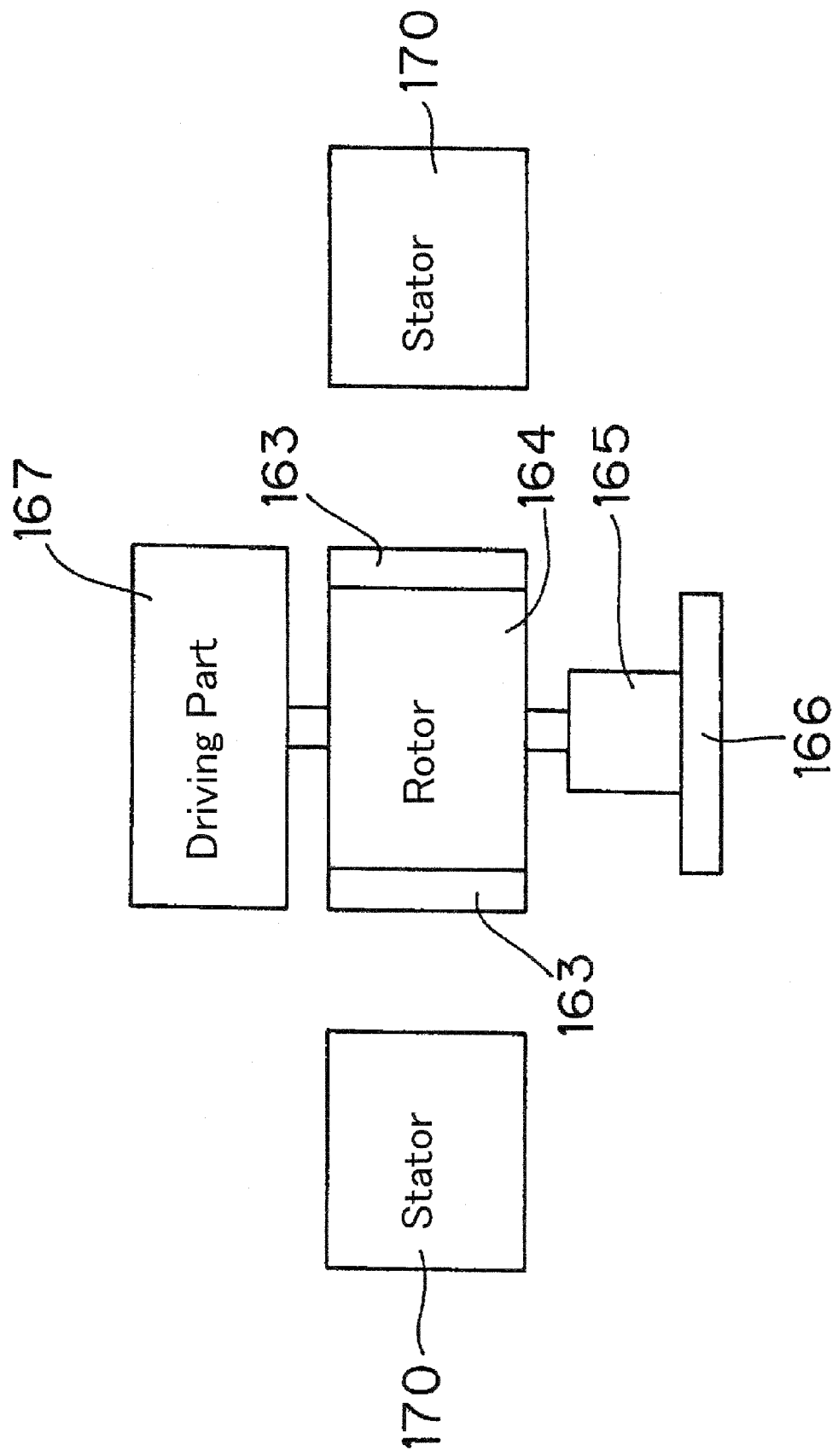
FIG. 45 is a structural cross section showing the second embodiment the electric power-mechanical force converter of this invention.

Next, referencing FIGS. 45~51, the third embodiment of the electric power-mechanical force converter of this invention is described. FIG. 45 shows a block diagram of the power generator as shown in FIG. 21 having the rotor that has the poles in both sides in the previous embodiment of the wind power generation system. The power generator comprises the rotor 164 having the permanent magnets 163 in the both sides, the bearing part 165 which supports the rotor 164 at its shaft, the pedestal 166 to support the bearing part 165, the prime mover 167 composed of the impeller 12 etc. which rotates the rotor 164, the stators 170 facing the permanent magnet 163 of the rotor 164. In place of the above bearing part 165, the above described magnetic levitation structure may be employed.

Figure 46:
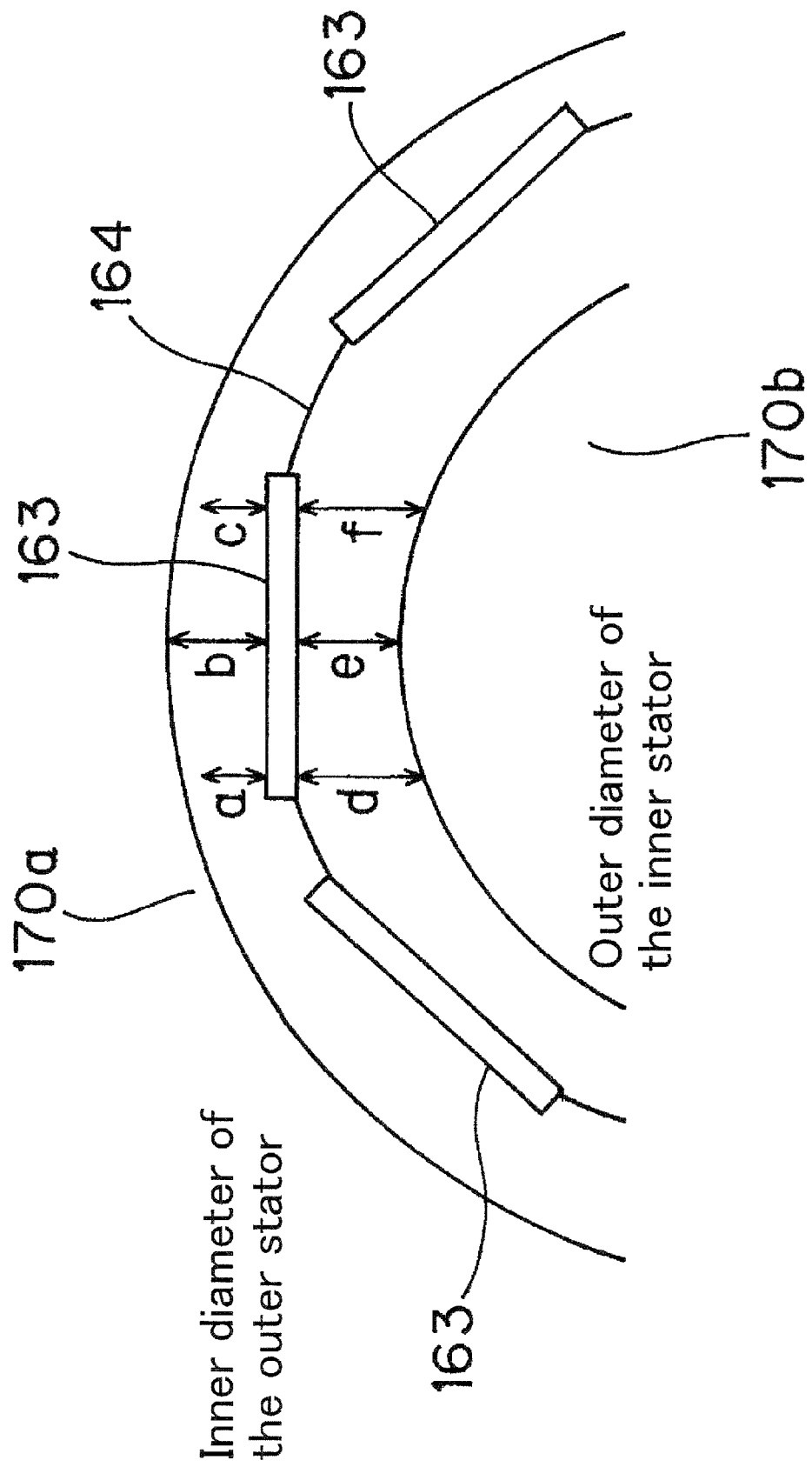
FIG. 46 is an explanatory drawing for studying the distance between the outside stator and the inside stator of the rotor magnets of this invention.

In the power generator having the stator 170 in the both sides of the rotor 164, even if the outer and the inner stator coil is aligned geometrically, the magnetic flux distribution of the outer stator 170a and the inner stator 170b differs as shown in FIG. 46. It generates a possibility of the difference in the waveforms, peak values, and the phases of the U phase, V phase, W phase between the outer stator 170a and the inner stator 170b.

FIG. 46 shows the distance between the outer stator 170a and the inner stator 170b of the magnet 163 of the rotor 164, and it also shows the difference of the magnetic flux distribution of the magnet 163 between the outer stator 170*a* and the inner stator 170*b* owing to the difference of the distance. In FIG. 46, when the magnet is made to be rectangular parallelepiped, the distances between the magnet and the outer stator 170*a* and the inner stator 170*b* are expressed as follows;

- a: the distance between the one end of the magnet 163 and the outer stator 170*a*
- b: the distance between the center of the magnet 163 and the outer stator 170*a*
- c: the distance between the other end of the magnet 163 and the outer stator 170*a*
- d: the distance between the one end of the magnet 163 and the inner stator 170*b*
- e: the distance between the center of the magnet 163 and the inner stator 170*b*
- f: the distance between the other end of the magnet 163 and the inner stator 170*b*

In this condition, the distance between the magnet 163 and the outer stator 170*a* is given as follows;

$$b>a, b>c, a=c$$

and the outer diameter of the inner stator 170*b* is given as follows;

$$d>e, f>e, d=f$$

and when b=e is given, the above expression is given as a≦b≦d.

Figure 47:
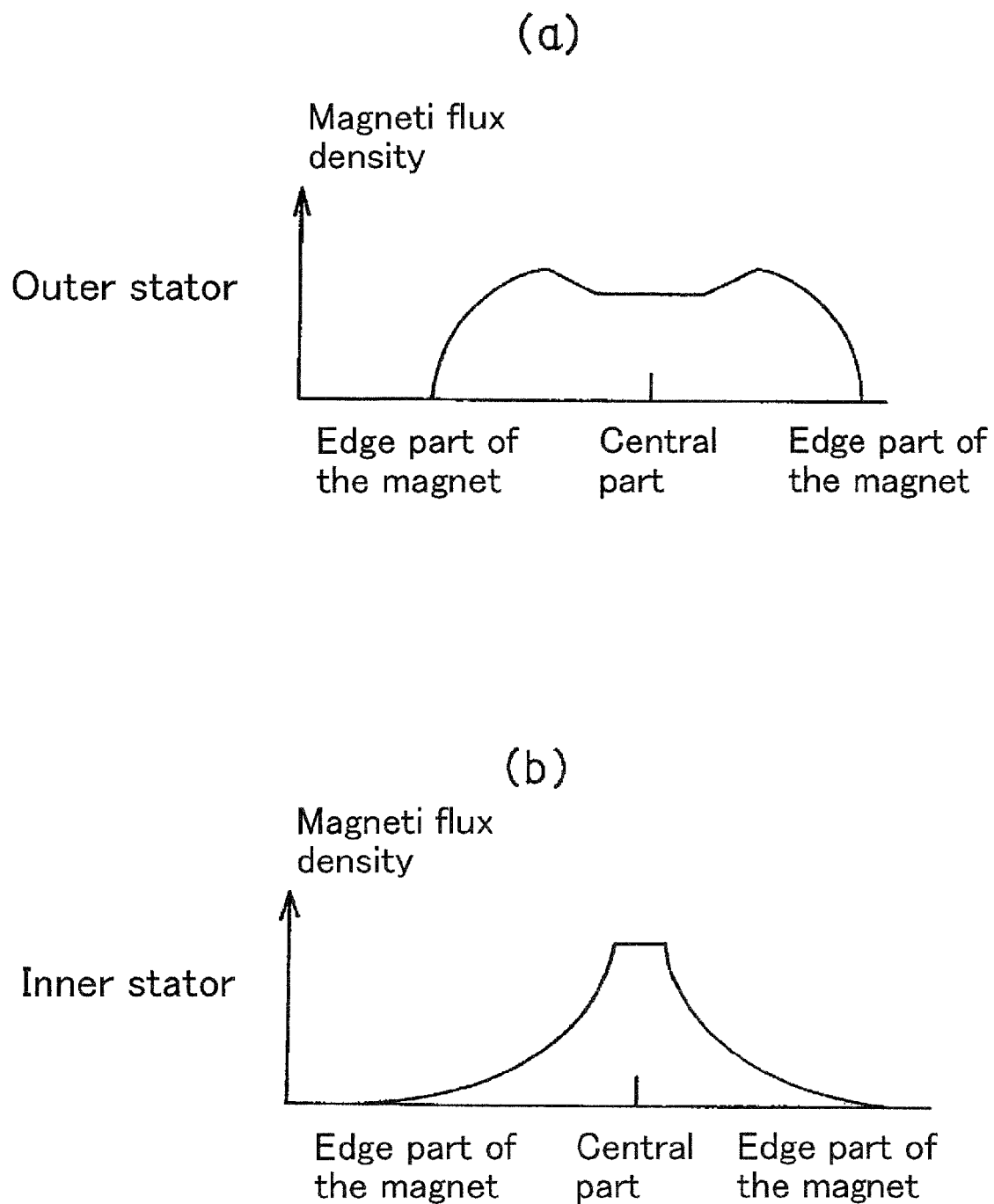
FIG. 47 is a drawing showing the magnetic flux distribution of the inside stator and the outside stator of this invention.

This means that the magnetic path length is different with the portion of the magnet 163, and that the magnetic flux distribution is different at the outer stator 170*a* and at the inner stator 170*b*. FIG. 47 shows the estimated distribution of the magnetic flux.

FIG. 47*a* shows the magnetic flux distribution of the outer stator 170*a* and FIG. 47*b* shows the magnetic flux distribution of the inner stator 170*b*. As shown in FIG. 46, in the gap between the outer stator 170*a* and the inner stator 170*b*, since the magnetic path length is different with the portion of the magnet 163, the magnetic flux distribution of the both stator 170*a*, 170*b* are different as shown in FIG. 47.

As shown in FIG. 47, the magnetic distribution of the outer stator 170*a* is estimated to be like trapezoid and that of the inner stator 170*b* is estimated to be triangular form. Accordingly, the peak values and the wave forms induced in the coils of the outer stator 170*a* and the inner stator 170*b* are anticipated to be different, and the difference in the peak values and the wave forms of the outer stator 170*a* and the inner stator 170*b* may possibly make the phase of the fundamental component of the induced voltage of the outer stator 170*a* and the inner stator 170*b* different.

In the power generator having the stator 170 on the both sides of the rotor 164, when the magnetic fluxes B crossing the outer and the inner coils are the same, the generated voltage e1 of the outer stator 170*a* and the generated voltage e2 of the inner stator 170*b* are expressed as follows;

$$e1 = B \cdot 1 \cdot v1$$

$$e2 = B \cdot 1 \cdot v2$$

where the sign 1 is the length of the coil, and v1, v2 are the speed of the magnetic flux crossing the outer and the inner coils.

Here, v1=v2·r1/r2, where r1 is the inner diameter of the outer stator 170*a*, and r2 is the outer diameter of the inner stator 170*b*. Thus in the power generator having the stator 170 on the both sides of the rotor 164, the speed of the magnetic flux crossing the coils are different in the outside and the inside, thereby the generated voltages are different. Further, in the above description the fluxes in the outer and the inner stator coil are assumed to be the same, but as described above, these are not the same. Therefore, when they are connected simply, there may be a possibility that a circulating current flows between the outer and the inner coils causing unnecessary losses and further increase of the temperature.

Here are some compliments; in conventional power generators, since the stator is disposed in the outer diameter side, the geometrical and periodic alignment of the pole of the stator and the rotor in circumference does not generate the phase difference because the generated voltages of the U phase, V phase, W phase are in the same one side circumference.

Further, commonly in power generators using permanent magnets, in the side where the rotor poles become close due to the eccentricity, since the gap size becomes narrow reducing the expending ampere turn of the magnets, the balance of magneto motive force collapses. Thereby in the close-in side the magnetic flux of the stator surface becomes larger than that generated by the larger magneto motive force in the condition prior to the close-in condition expanding the area of high magnetic flux density. Further, in the receded side, the magnetic flux density decreases and its area become narrower. Thus, there occurred the difference of the magnetic attractive force on which the rotor acts, furthering the eccentricity toward the close-in side. Contrary to this, in the power generator having the poles on the both sides of the rotor and having the stator on the both sides of the rotor, a measure is taken regarding the pole structure to reduce this. But as shown in FIG. 46 and FIG. 47, there is still a possibility to come close further toward the side of eccentricity because it is not inherently inequable in the magnetic flux distribution.

The problems of the power generators having the stators of the both sides of the rotor are summed up as follows;
(1) There occurs the difference of the magnitude and the phase of the generated voltage of the outer and the inner stator 170. Therefore, connecting the wire of the stator coil causes a circulating current between the both stator 170*a*, 170*b* generating a constant loss.
(2) In the eccentricity of the stator 164, there is a possibility of further eccentricity toward the direction of the eccentricity, causing further the difference of the generated voltage of the both sides stator 170*a*, 170*b*.

Since the cause is attributable to the shape of the magnet 163, it may be possible to determine the appropriate magnet shape by analyzing the magnetic flux distribution. But considering the times, costs, and the costs to make the die for an appropriate magnet shape, it is not economical. Further, since it is anticipated that as for the problem of the generated voltage in the eccentricity of the rotor 164, the normal magnet shapes can not cover, therefore, the problem can not be solved only by the magnet side.

Accordingly, in order to solve the problem, it is necessary in the stator side to reduce the difference of the generated voltage and the magnetic attractive force caused by the difference of the magnetic flux distribution. It is the challenge to find a solution in the stator side.

Since the problem is caused by the difference of the magnetic flux distribution of the both side stators, a means to solve the problem may be to wind the stator coil in order to generate the voltage taking the difference of distribution into account. Since this power generator has the stator on both sides, when the same phase stator coils are crossed, the generated voltages become the same in the normal condition of no-eccentricity. Even in the eccentric condition of the rotor 164, if the generated voltage is the same as that of the normal condition, the degree to go into further eccentric condition is reduced. Such crossing may be carried out in the stator coils.

In the case of permanent magnets, the magnetic flux density of a magnet is determined by a consuming ampere turn of magnetic circuit of a magnet and the armature reaction of a stator. The consuming ampere-turn of the magnetic circuit is mostly determined by the magnitude of the gap between the stator 170a, 170b and the magnet 163 as shown in FIG. 46. The magnetic flux density by the stator 170a, 170b in the case of the eccentricity of the rotor 164 is studied in the gap size between the magnet 163 and the stator 170a, 170b as shown in FIG. 48.

Figure 48:
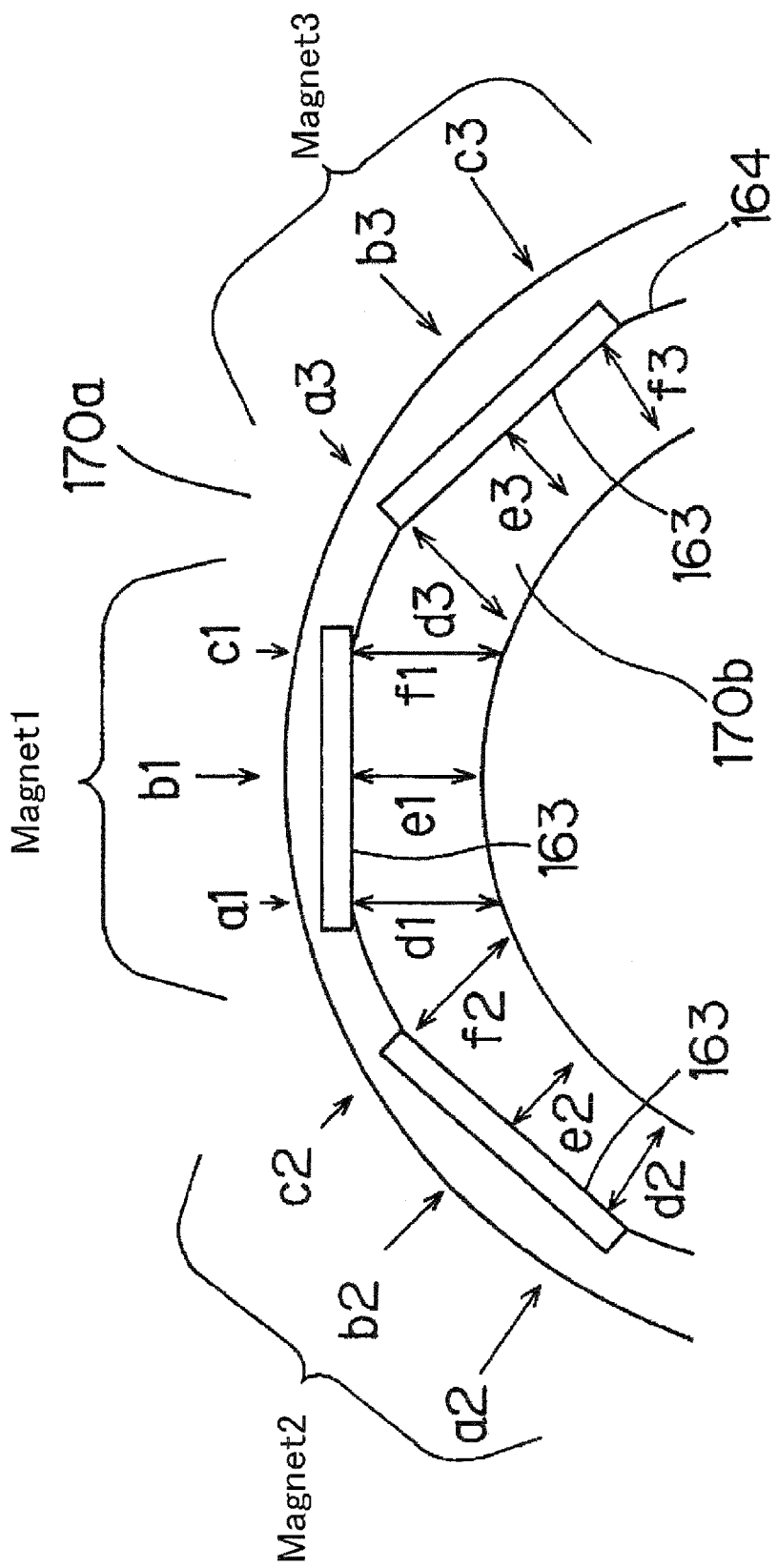
FIG. 48 is an explanatory drawing showing the distance between the outside stator of the rotor magnets and the inside stator of this invention.

FIG. 48 is the figure for studying the distance(gap) of the outer stator 170a and the inner stator 170b of the magnet 163 of the rotor 164 side. In the figure, when the magnet 163 is made to be rectangular parallelepiped, the distance between the magnet 163 and the stator 170a and 170b is defined as follows; where the numbers of the magnets 163 are referred to as magnet 1, magnet 2, magnet 3 and the suffixes 1, 2, 3 of a1, a2, and a3 are correspondent to the magnet number 1~3.

- a: The distance between the one end of the magnet and the outer stator 170a
- b: The distance between the center of the magnet and the outer stator 170a
- c: The distance between the other end of the magnet and the outer stator 170a
- d: The distance between the one end of the magnet and the inner stator 170b
- e: The distance between the center of the magnet and the inner stator 170b
- f: The distance between the other end of the magnet and the inner stator 170b The order of the magnitude of the distance of the magnet 163 and the stator 170a,170b in the eccentric condition of the rotor 164 is as follows;

$$a1<b1<c2<a2<b2<e2<d2<f2<e1<d1$$

and $$a1=c1, d1=f1, f2=d3, e2=e3, d2=f3$$

Therefore, the order of the magnetic flux density of the each part of the magnet 163 is in reverse of the above as follows;

$$a1>b1>c2>a2>b2>e2>d2>f2>e1>d1$$

Figure 49:
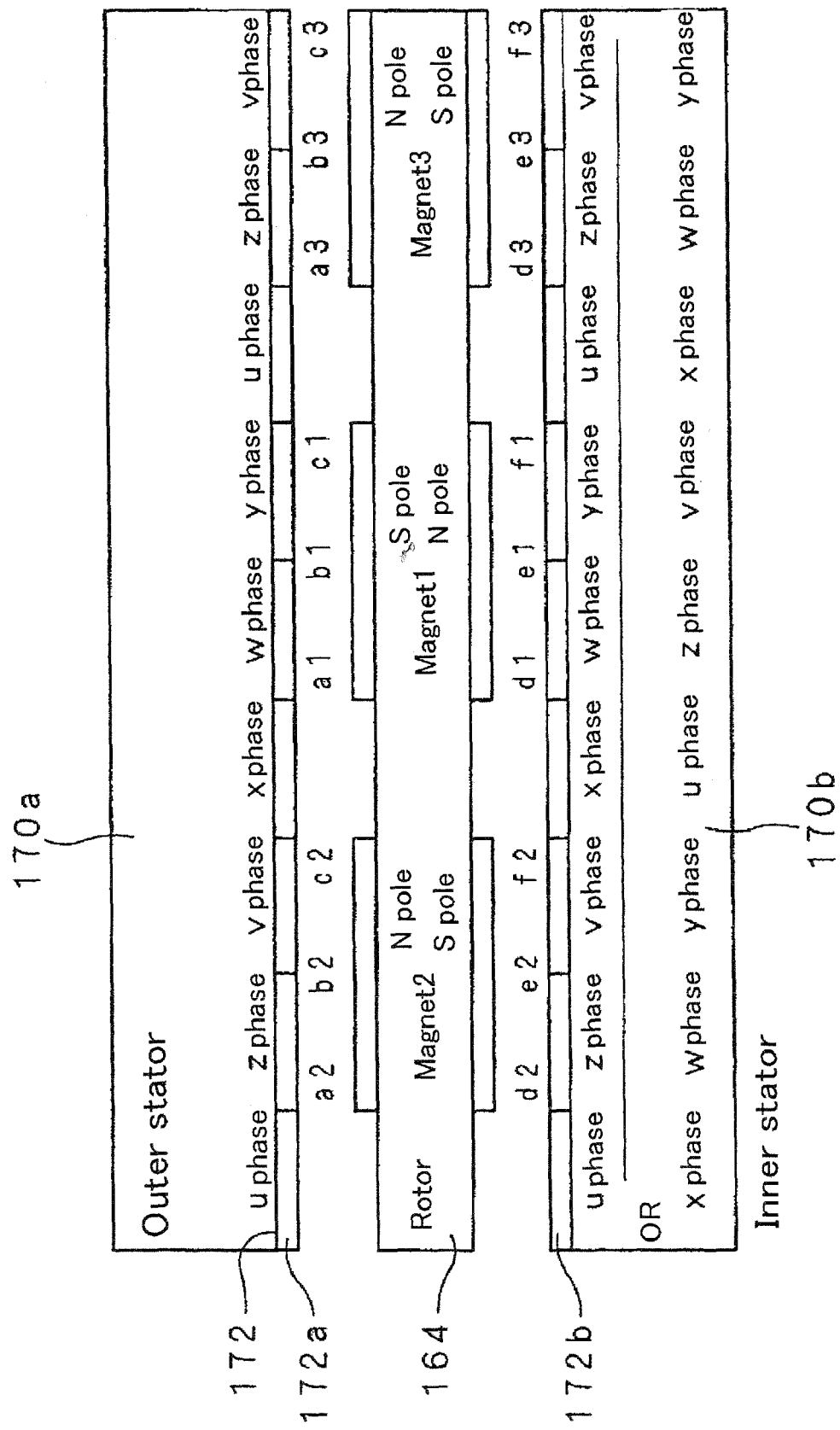
FIG. 49 is a model drawing showing the alignment of the stator coils of this invention.

FIG. 49 shows the alignment of the stator coils 172, wherein the stator coils 172 are disposed in the phase order of u-z-v-x-w-y. When the stator coils 172 of the outer stator 70a are aligned in this order, in the case that magnets (magnets 163 (magnet 1, magnet 2, magnet 3)) are mounted on the rotor 164 as shown in FIG. 49, the alignment of the stator coils 172 of the inner stator 170b are in the phase order of u-z-v-x-w-y and that of x-w-y-u-z-v. When this stator coils 172 are aligned as above, the positions of the magnets 163 and the gap parts a, b, c, d, are shown in FIG. 49.

Figure 50:
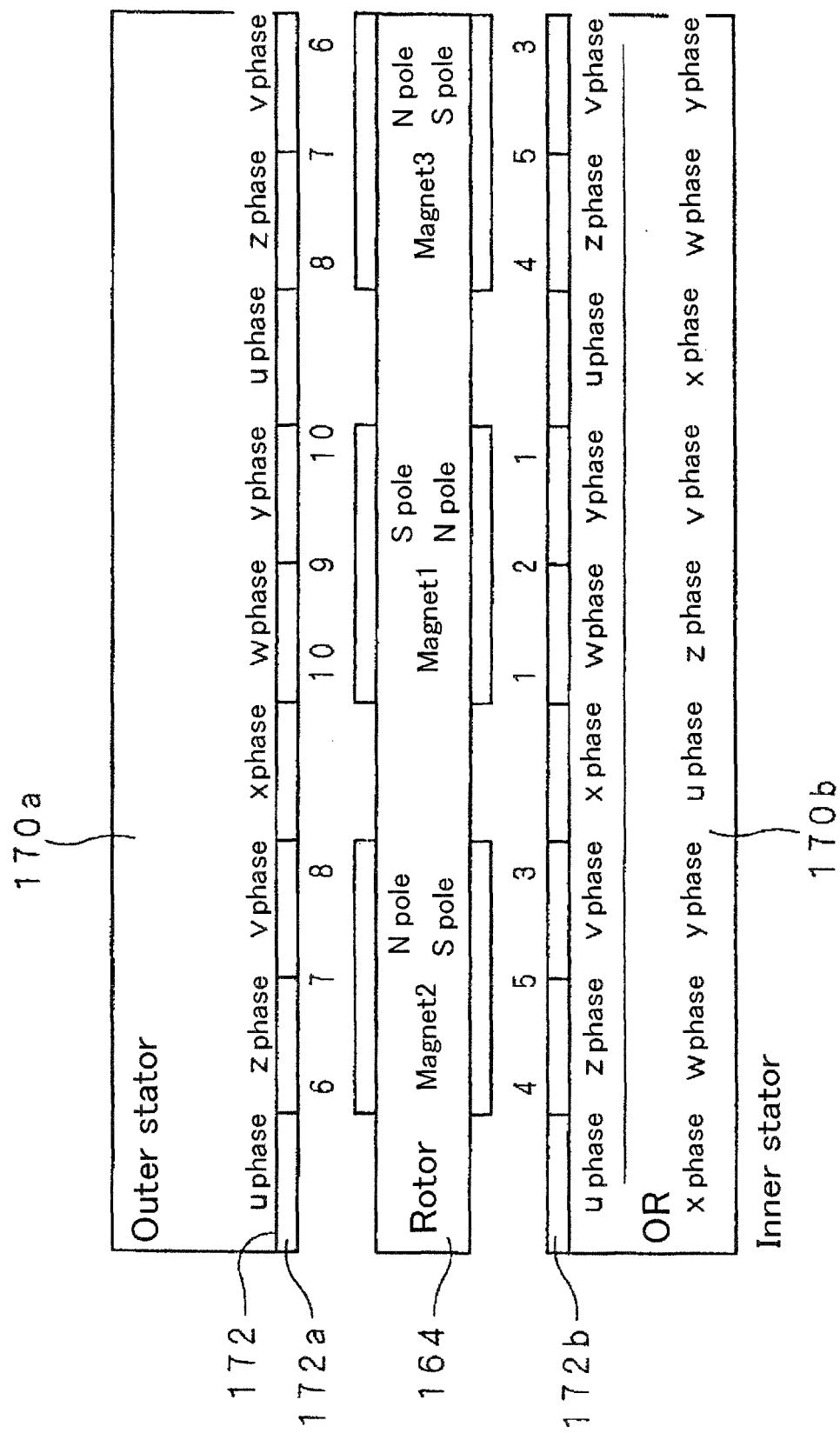
FIG. 50 is a model drawing showing the thickness of the magnetic flux and the position of the magnets of this invention.

FIG. 50 shows the positions of the magnets 163 and the magnitude of the magnetic flux density, wherein the magnitude is shown in FIG. 50 with respect to the each part of the magnets 163, tentatively a1 being set to be 10, and b1 being set to be 9. Since in this condition, d2 and f3 are in the about normal gap distance, the flux density can be assumed to be 4 in the normal condition. As shown in FIG. 50, the induced voltages are found to be different in the every phase. Considering the case of eccentricity in the rotor 164, it is found that the simple crossing of the both stator coils 172 is impossible.

The evaluation of the generated voltage(summed flux density) in the case that the outer stator coil 172a and the inner stator coil 172b are crossed based on the model of FIG. 49 and FIG. 50 is shown in FIG. 51, wherein the crossing of the stator coils 172 is done between the same phases. From the above facts, it comes out that in the case of the stator coils 172 being crossed, the generated voltage in the eccentric condition is related to the phase order of the outer stator coils 172a and the phase order of the inner stator coils 172b. In this condition; the normal condition being 8, the phase order of the generated voltage of the each phase is near 8 i.e.; in the case of x-w-y-u-z-v, no large voltage is generated wholly and the current flow in the coils 172 is small. In the alignment u-z-v-x-w-y of the stator coils 172, a large voltage is generated and the current in the stator coil 172 is large.

Figure 52:
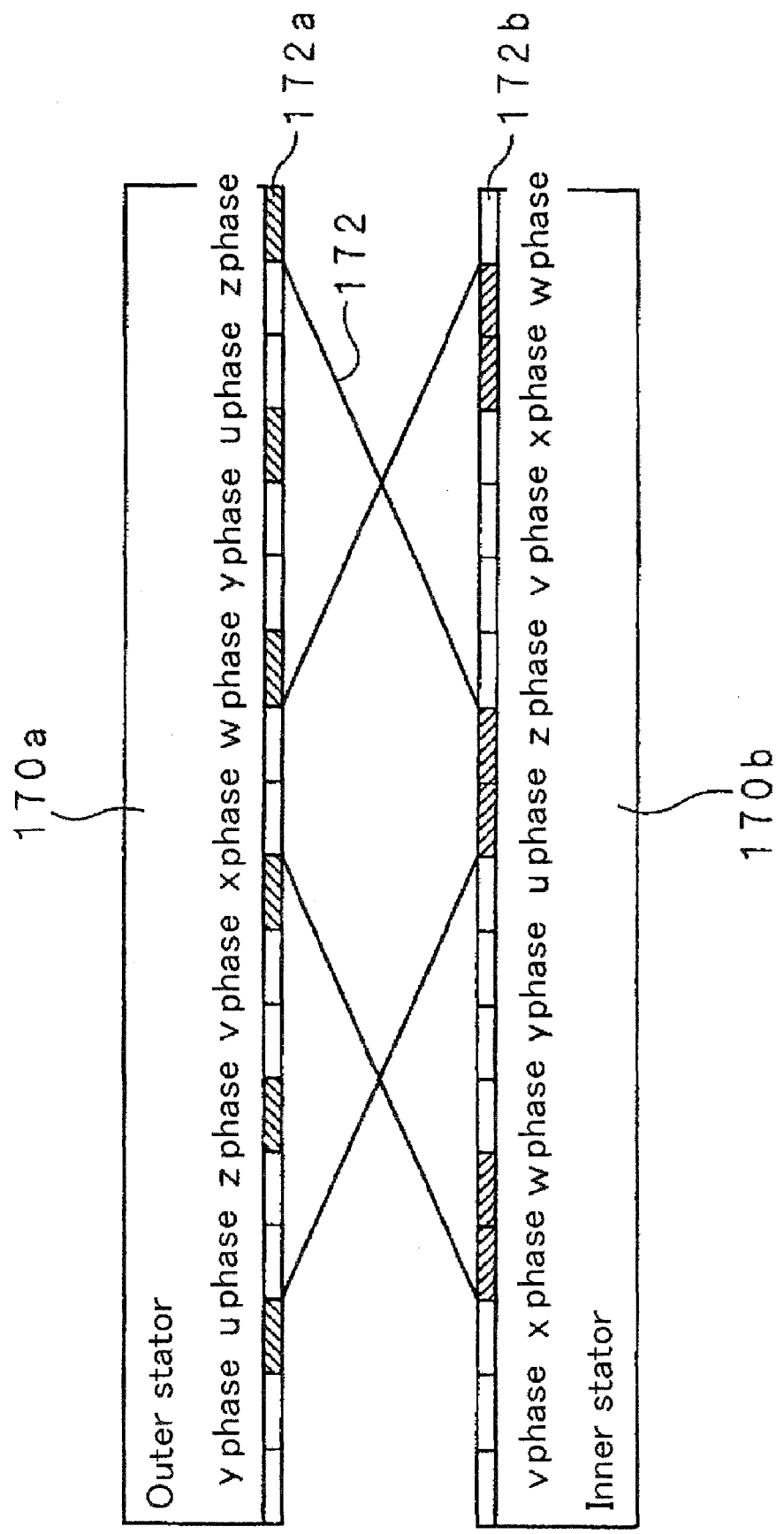
FIG. 52 is a pattern diagram showing the crossing of the stator coils of this invention.
Figure 53:
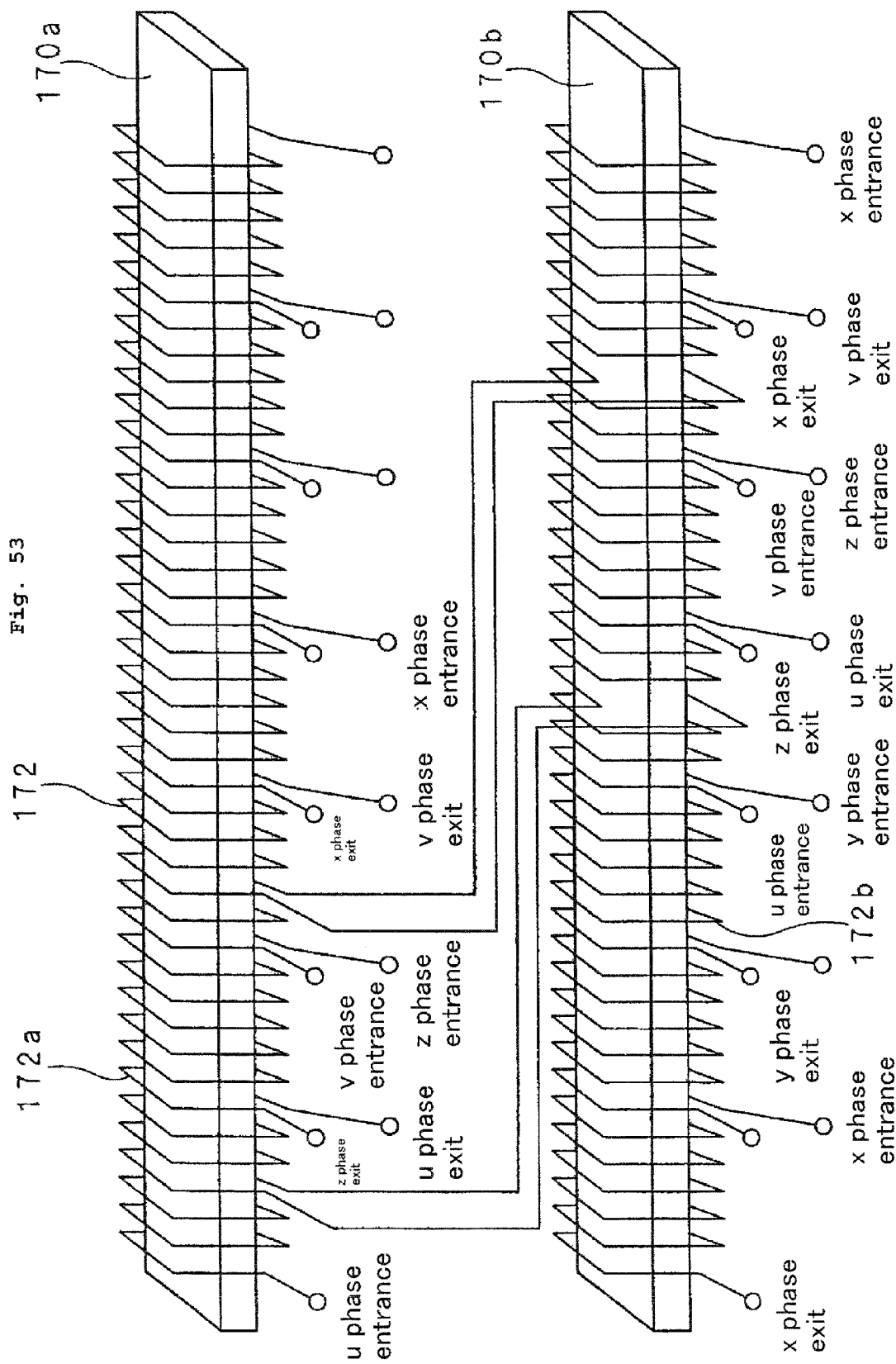
FIG. 53 is a wiring diagram of the tangible wiring method of the stator coils of this invention.

FIG. 52 shows the case in which the alignment of the outer stator coils 172a are u-z-v-x-w-y and that of the inner stator coils 172b are x-w-y-z-v, and these aligned coils are faced and crossed between the each same phases. FIG. 53 shows a practical wiring of the stator coils 172 to the outer stator 170a and the inner stator 170b, wherein the phase order is changed 180 degree for the outer and the inner stators.

Thus the difference of the induced voltage due to the difference of the flux density of the both stator 170a, 170b is reduced by crossing the both stator coils of the pole pair of the rotor 164 to prevent the constant flow of the circulating current of the both stator coils 172. The generated voltage of the both stator 170a, 170b are also made to be the same to equalize the load current flow, and equalizing the magnetic flux distribution of the both stator 170a, 170b in the loaded condition, the attractive force can be reduced. Particularly, the outer stator coils 172a are aligned to be u-z-v-x-w-y, and the inner stator coil 172b are aligned to be x-w-y-u-z-v, and these alignment of the coils are faced and the stator coils 172 are crossed between the each same phases, the generated voltages become equal to suppress the generation of the circulating current between the both stator coils 172.

In the above embodiment of the electrical electric power-mechanical force converter, in order to be applicable to any wind power generator, the description is made about the pair of the rotator aligned circularly and the circular stator on its both sides, but a right and left pair of the stator is aligned in a straight line or in a meandering line, and a given length of a moving part can be run in between them, thereby a linear generator is composed. Further, in the above embodiment, a power generator used for a wind power generator is described, but it can be used as a power generator using other motive energy. Inversely, it can be used as a motor by flowing alternative currents in the coils of the stator. In the case being used as a motor, it can be used as a rotating alternative current motor for a power source. Further, in the case being used as a linear motor, it can be used as a power source for various carriers, vehicles, amusement park rides such as roller coasters.

Figure 54:
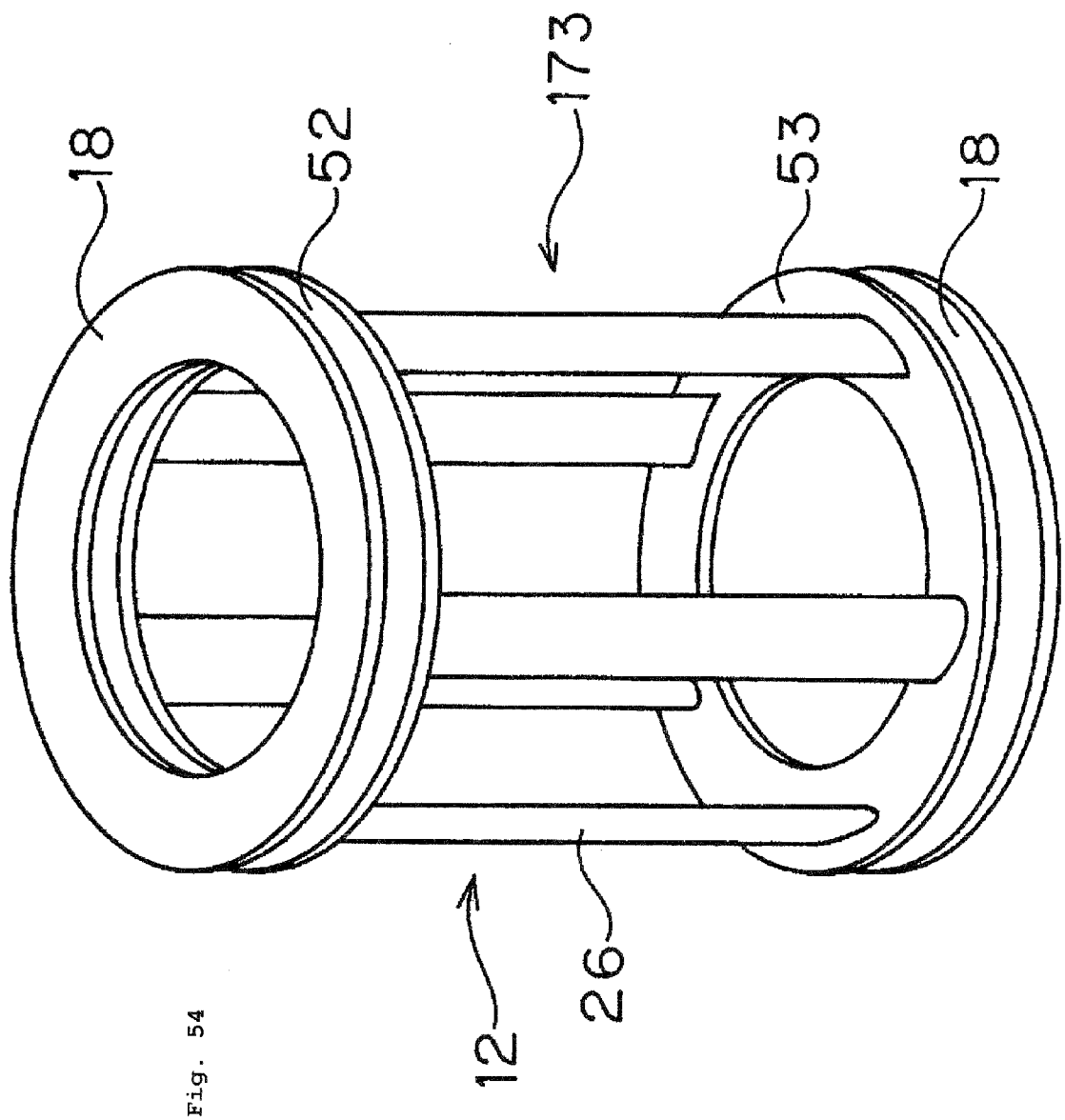
FIG. 54 is a perspective view showing the other embodiment of the impeller of this invention.

FIG. 54 shows an impeller 173 not provided with shafts or bearings in its center same as the impeller 12 shown in FIGS. 14a, 14b. It does not also have transverse blades provided radially. In the impeller 12 in FIGS. 14a, 14b, the longitudinal blades 26 are provided on the inner periphery of the supporting rings, but in the impeller 173 in FIG. 54, the upper end and the lower end of the plural longitudinal blades 26 are interlinked by the supporting ring 52, 53 to form a cage-type wholly. In the cage-type impeller 173, the supporting ring 52, 53 of the upper and the lower end can be running-freely supported by the ring 18 of the frame. On the supporting ring 52, 53 and on the ring 18 to support them, the power generators shown in FIG. 12 etc. are provided respectively. The power generator may be provided on either the upper or the lower side only. In other words, in the supporting ring 52, 53 and the ring 18, the field magnet is provided on the one side and the coils are provided on the other side.

Figure 55:
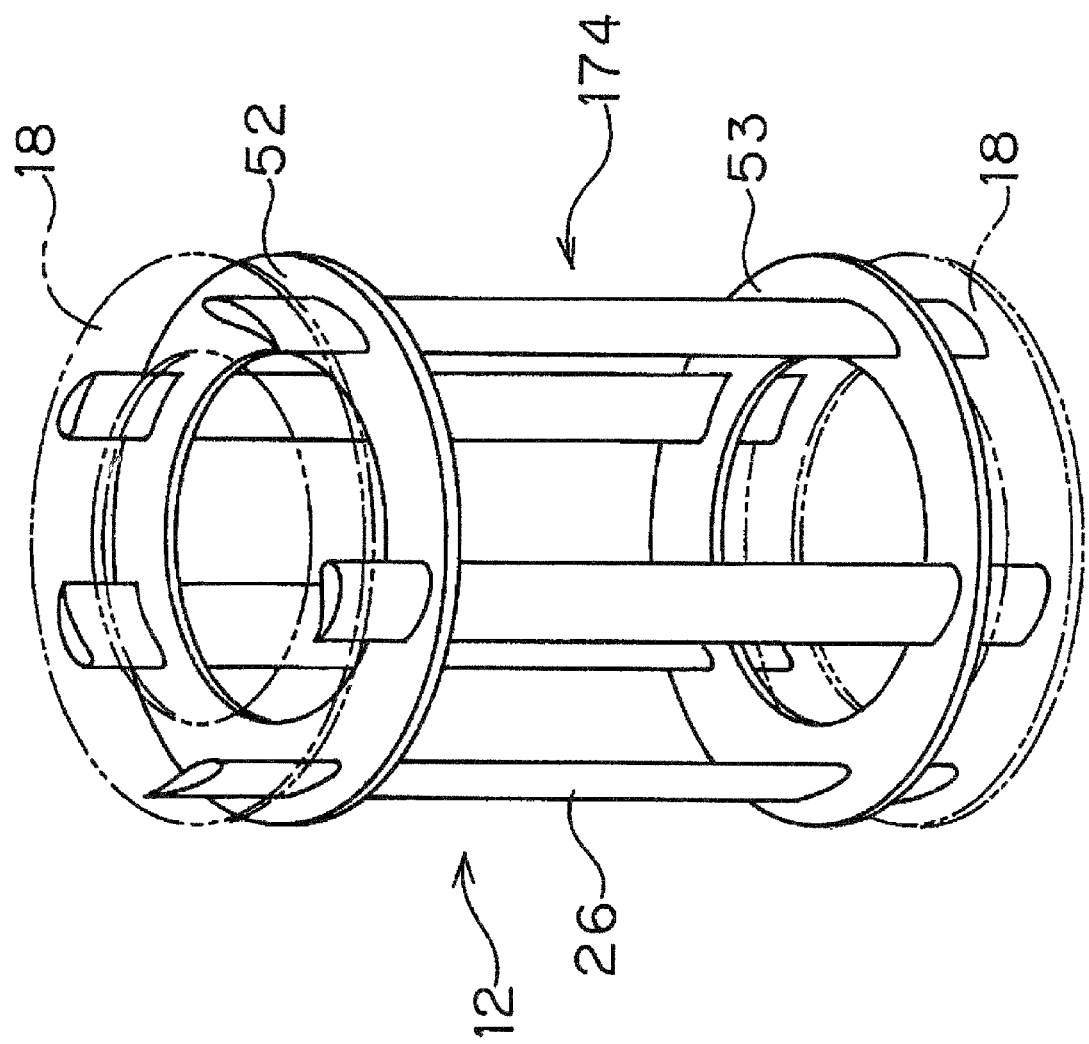
FIG. 55 is a perspective view showing further the other embodiment of the impeller of this invention.

The impeller 174 shown in FIG. 55 is a cage type wholly, wherein the proximity of the upper end and the lower end of the longitudinal blades 26 penetrates the supporting ring 52, 53, about same as the impeller 173 of FIG. 54. This type also has no transverse blade and no center shaft. The ring 18 of the frame is provided so as to face the upper end and the lower end of the longitudinal blade 26 respectively.

Figure 56:
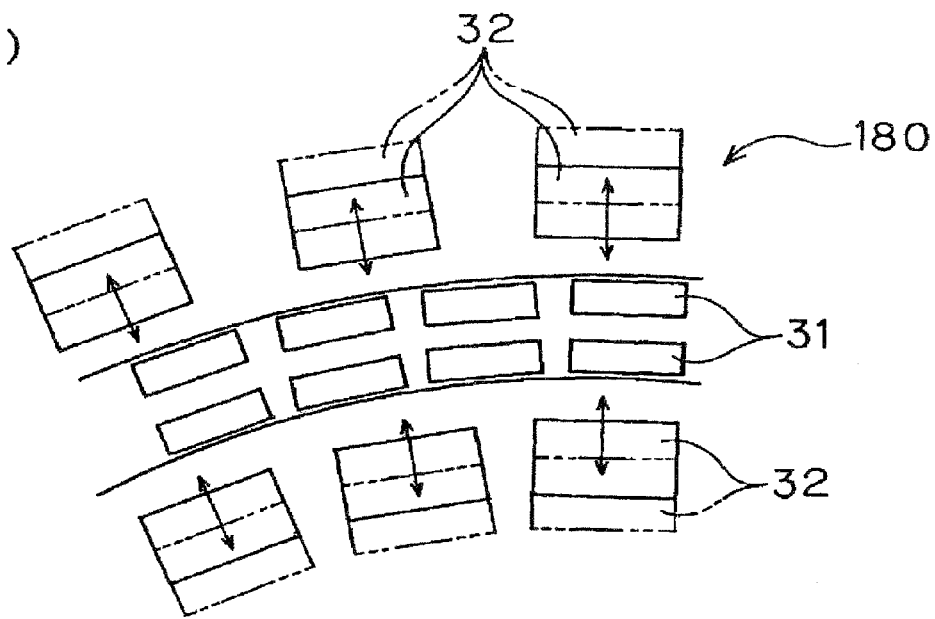
FIGS. 56a, 56b, 56c is respectively a rough plane view, a cross section and a rough plane view showing the other embodiment of the power generating part related to this invention.
Figure 56:
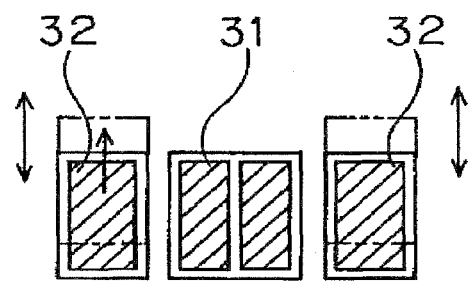
Figure 56:
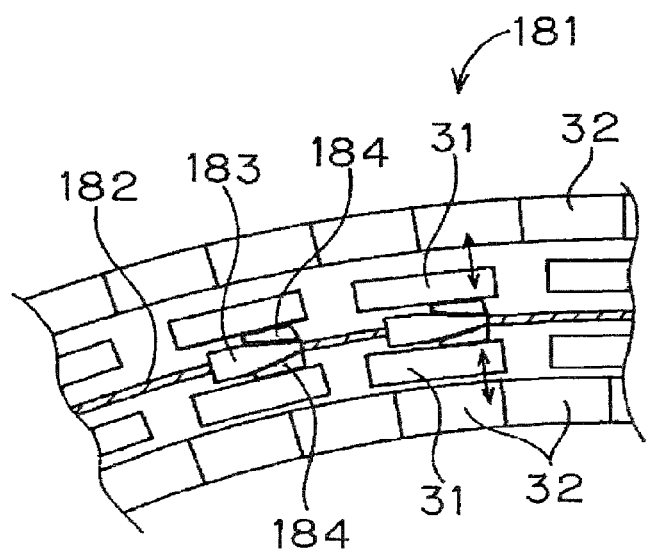

In the above embodiment, the stators are disposed on the both sides of the rotor(moving parts) and fixed to the frames or the rings fixed to the frames, but as the power generating part 180 shown in FIG. 56a, it can be so composed that the coils(stators) 32 are adjustable in their positions in a radial direction(width direction). Such composition can be realized by making the supporting rod 91, 91a supporting the coil groups 32 in FIG. 21 to be movable inward or outward in a radial direction and to be fixable in the moved position. In this type, the amount of power generation decreases when the gap between the stator and the rotor is adjusted to be wider by moving the outer coils 32 outside and the inner coils inside. The amount of generated power increases when the gap is adjusted to be narrower. In the case of the stator aligned annularly, many stators are disposed together with gaps between them. In the case that they are moved inward radially, the gaps become narrower, but in a normal adjustable range there occurs no problem. Further, in FIG. 56, they are aligned annularly, but they can be aligned linearly as linear motors.

As the power generating part shown in FIG. 56b, it may be so composed that the coils(stator) 32 can be adjustable in their positions upward or down ward. In this case also, when the position of the stator and the rotor are set apart upward and downward, the amount of power generation decreases, and they are set near upward and downward, the amount of power generation increases. Further, the radial position adjustment (width direction) shown in FIG. 56a and the upward and downward position adjustment shown in FIG. 56b may be combined. Such position adjustment mechanisms may be adjusted in installation or maintenance, but they may be adjusted by remote control using a drive source such as a motor etc. In this case, it is possible to compose an automatic adjustment system responding to, for example, the required powers or the wind powers.

The power generating part 181 shown in FIG. 56c is provided with a rotor in which the permanent magnets (field magnets) 31 being radially adjustable in their positions are mounted on the outside and the inside of the center part supporting frame 182. Such adjustment mechanism can be realized by so composing that, for example, wedge members 183 provided on the supporting frame 182 and the wedge members 184 provided on the permanent magnets 31 can be adjusted slidably and be fixed at the adjusted position. Further, other position adjustment mechanism such as screws can be used. In such composition that the width (thickness) of the permanent magnet 31 of the rotor is adjustable, when the gaps between the coils (stators) 32 and the permanent magnets 31 of the rotors are increased, the amount of generated power decreases, and when the gap are decreased, the amount of generated power increases. Accordingly, the amount of power generation can be adjusted responding to the required powers or the wind powers.

The rotors shown in FIG. 23 etc. are so composed that the permanent magnets are attached to the inside and outside of the core made of laminated silicon steel, and molded integrally with glass reinforced resin. But, as shown in FIG. 57a, in place of the outside permanent magnet and the inside magnet, one permanent magnet 31 may serve as both of the magnets. In this rotor, a holding frame 186 is mounted between the platy upper guide circular plate 99 and the lower guide circular plate 102 to hold the permanent magnet 31. Above and below the holding frame 186 respectively, hanging rods 97a are fixed by welding etc., and the hanging rods 97a are fixed to the upper guide circular plate 99 and the lower guide circular plate 102 by nuts 97b. In the rotor 185, as shown in FIG. 57c, straight angle permanent magnets 31 are aligned in polygon and molded annularly with fiber reinforced synthetic resin 31a reinforced by glass fiber and carbon fiber. Radial through holes are formed in the portion of the fiber reinforced synthetic resin 31a in between the adjacent permanent magnets 31, and they are fixed to the supporting frame 186 using bolts 187 and nuts 188 as shown in FIG. 57b. The permanent magnets 31 are so aligned that N poles and S poles are alternatively directed outward as shown in FIG. 57c.

Since a thin model rotor 185 shown in FIG. 57a uses one permanent magnet as both of the outer magnets and the inner magnets, reducing weight and cost greatly without loss of the power generation capability. In addition, it is preferable to form a concave part in the supporting frame 186 and insert the head of the bolt 187 and the nut 188 in order to reduce the protrusion of the bolt 187 and the nut 188. The above hanging rods 97a, 97a are separated above and below, but it can be held by one hanging rod penetrating the fiber reinforced synthetic resin 31a above and below.

In FIG. 57a etc., the holding frame 186 holds the circumference of the permanent magnet 31, but, as shown in FIG. 58a, only the upper end and the lower end of the permanent magnet 31 may be held by the holding frame 186a,186b. The U-shaped outer holding frame 190 can hold these holding frames. Further, as shown in FIG. 58b, the permanent magnet 31 can be held by placing the upper end and the lower end of the permanent magnet 31 in between by a rectangular pipe like upper guide circular plate 99 and a lower guide circular plate 102 via an upper spacer 100 and a lower spacer 101.

In the rotor(or the moving part) shown in FIG. 59a, additional permanent magnets 31 are attached alternatively in the right side and the back side to the similar center part as the rotor 185 shown in FIG. 57a. Providing these additional permanent magnets 31 increases the weight, but it can increase the magnetic force to increase the amount of power generation.

FIG. 59b shows the case in which the permanent magnets 31 are attached to the both surfaces to bring into three line in the similar center part as the rotor shown in FIG. 58a. The surface magnetic pole of the permanent magnets 31 are so aligned that the S pole and the N pole appears alternatively in the surface and the polarity is reversed in the right side and the back side. This composition also can increase the magnetic force to increase the amount of power generation.

In the rotor(or the moving part) shown in FIG. 59c, about similar to the rotor shown in FIG. 56c, the permanent magnet 31 is mounted on the right surface or back surface of the supporting frame 182. the permanent magnets 31 in each side are so aligned that the N pole and the S pole appears outside alternatively, and that they are in an opposite pole each other in the right surface and the back surface. This rotor (moving part) also decreases the weight and increases the amount of power generation. Any of the rotors shown in FIG. 59a, FIG. 59b, and FIG. 59c is preferable to be integrated by charging the gaps and the surfaces of the permanent magnets 31 with fiber reinforced synthetic resin.

In the above embodiment of the wind power generator, the impeller and the rotor(or moving part) are mechanically and tightly coupled, but they can be coupled by a flexible cord or a "string". In this case, the tractive driving force can be transmitted to the rotor via a code. Further, it can respond flexibly to the expansion and contraction of the transverse blades etc. supporting the impeller. Furthermore, the impeller and the rotor can be coupled by a link, in which case one end of the link is coupled to the impeller rotatably, and the other end is coupled to the rotor (or the moving part) rotatably. In the case that the impeller and the rotor are coupled by the string or the link flexibly, the center of the impeller is stabilized by providing the spoke-like supporting members such as transverse blades etc. on the impeller or by providing other guide mechanism or supporting means.

In the electric power-mechanical force converter 190 shown in FIG. 60, a structural member is expanded above and below the rotor 185 of FIG. 57 to make it the cylindrical rotating plate 191 and roller guides 192 are provided near the upper and the lower end of the rotating plate. Further, moving side repelling magnets 193,194 are disposed on the upper part and the lower part of the rotating plate 191 separately to the permanent magnet 31 for power generation. Furthermore, upper side stator side repelling magnets 195, 195 are disposed inside and outside of the upper part repelling magnet 193, and the lower side stator side repelling magnets 196, 196 are disposed inside and outside of the lower side moving side repelling magnet 194. The each repelling magnet is usually composed of a permanent magnet but it may be an electromagnet. The stator side repelling magnet 195,196 are supported so that the gap to the rotating plates 191 is adjustable by the means of bolts 197 and nuts 198.

In the electric power-mechanical force converter 190 composed as above, the rotation center is secured by the guide roller 192, but it requires a degree of the gap between the guide roller 192 and the rotating plate 191. When it is rotated in this condition, the rotating plate tends to swing over to right and left. In this case, since the moving side repelling magnet 193, 194 are sandwiched by the stator side repelling magnet 195, 196 disposed on the both sides, when it moves to one side, the reverse repelling force becomes stronger to thrust it back to the original position where the right and left forces balance, thereby the stable rotation is maintained.

Figure 60:
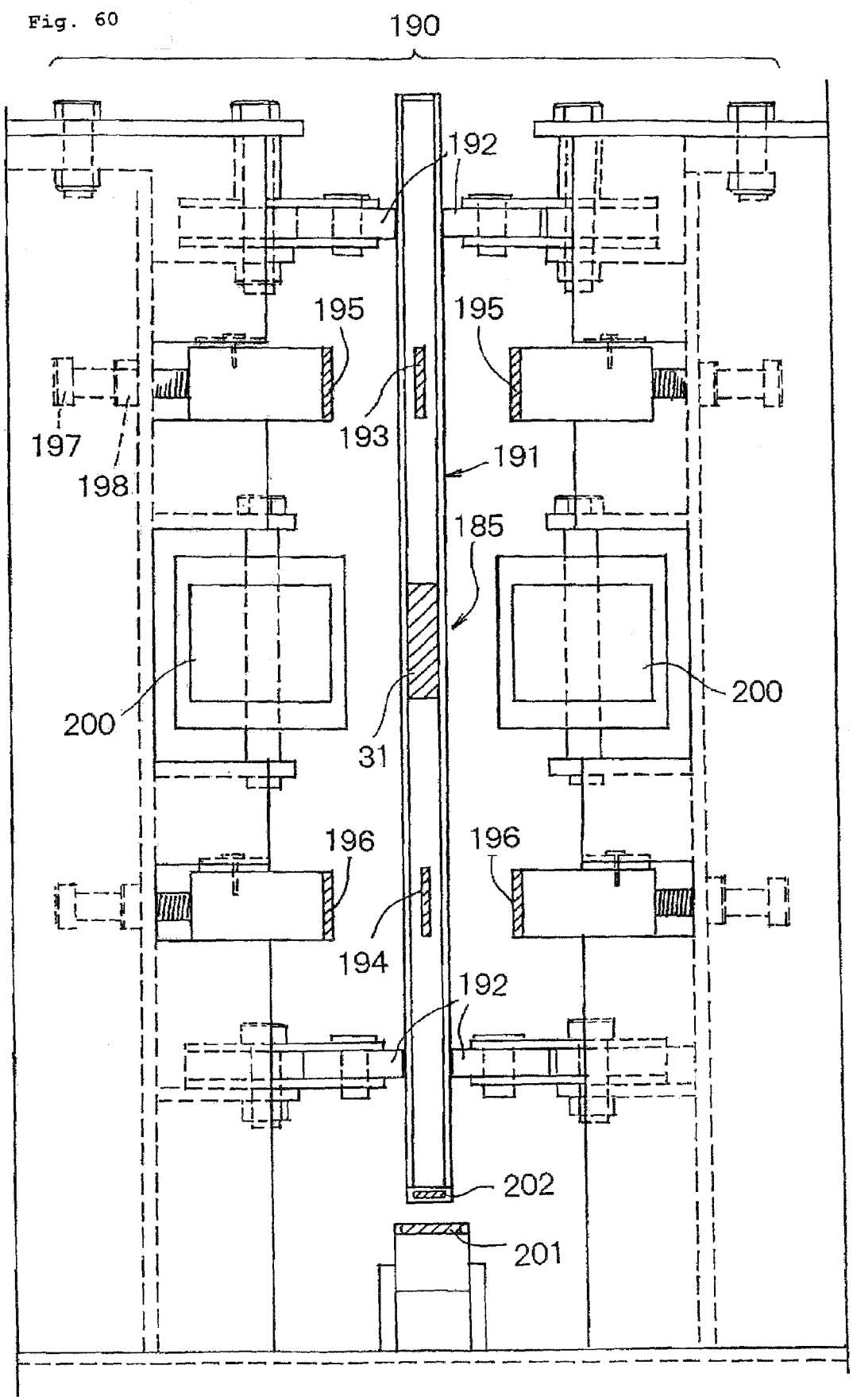
FIG. 60 is a cross section showing further the other embodiment of the electric power-mechanical force converter of this invention.

The electric power-mechanical force converter 190 shown in FIG. 60 is usable as a wind power generator by mounting a impeller on the upper end of the cylindrical rotating plate 191 (See FIG. 12, FIG. 21) Inversely, it can be used as a motor by applying an alternative current to the stator forming a rotating magnetic field. Further, it can be used in a linear motor car etc. of translational movement. In the case of rotating machine, the center shaft may be provided, but it can be a coreless rotating machine without center shaft.

Figure 61:
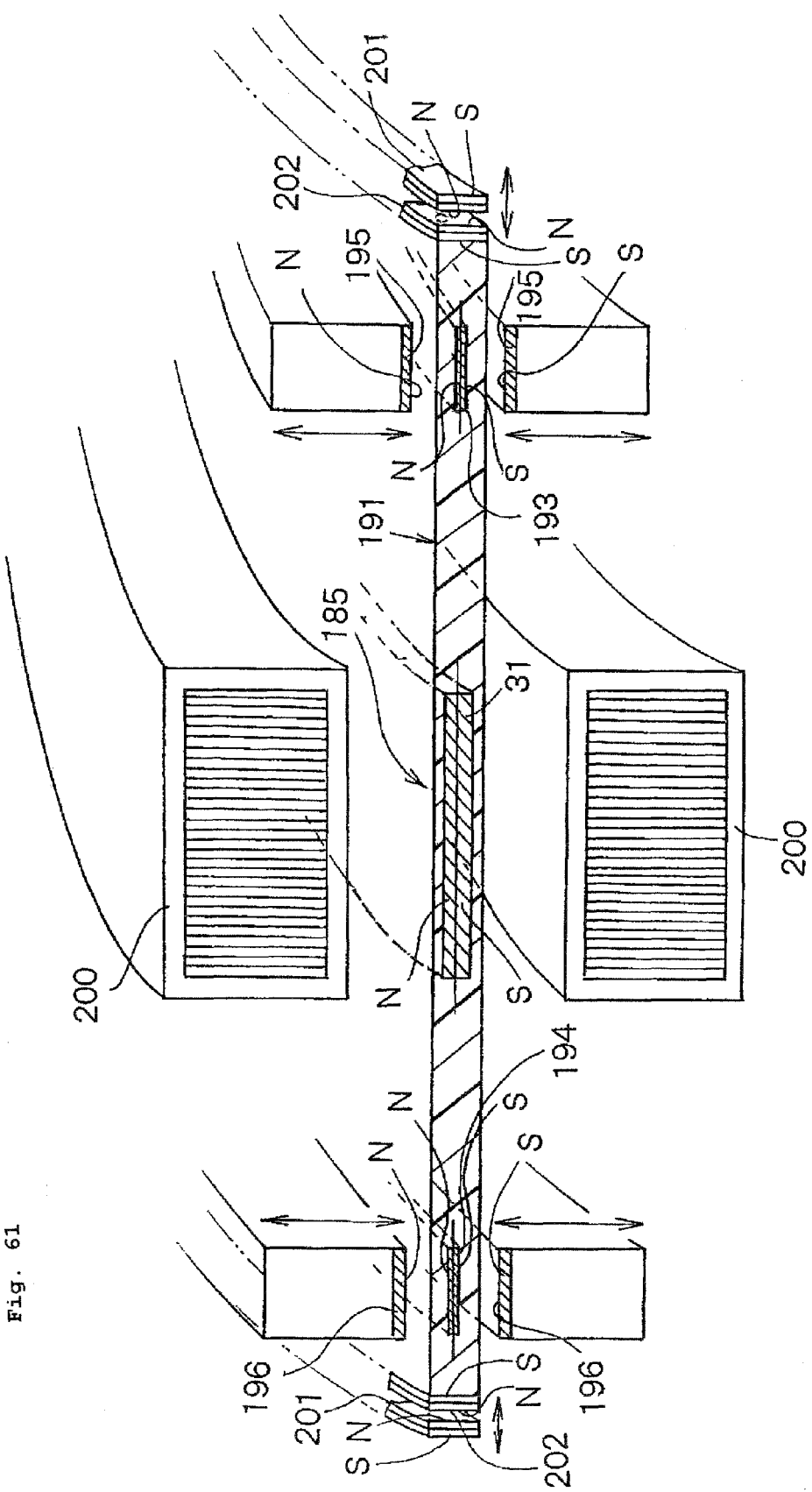
FIG. 61 is a perspective cross section of the substantial part showing an embodiment of the wind power generator using the electric power-mechanical power converter.
Figure 62:
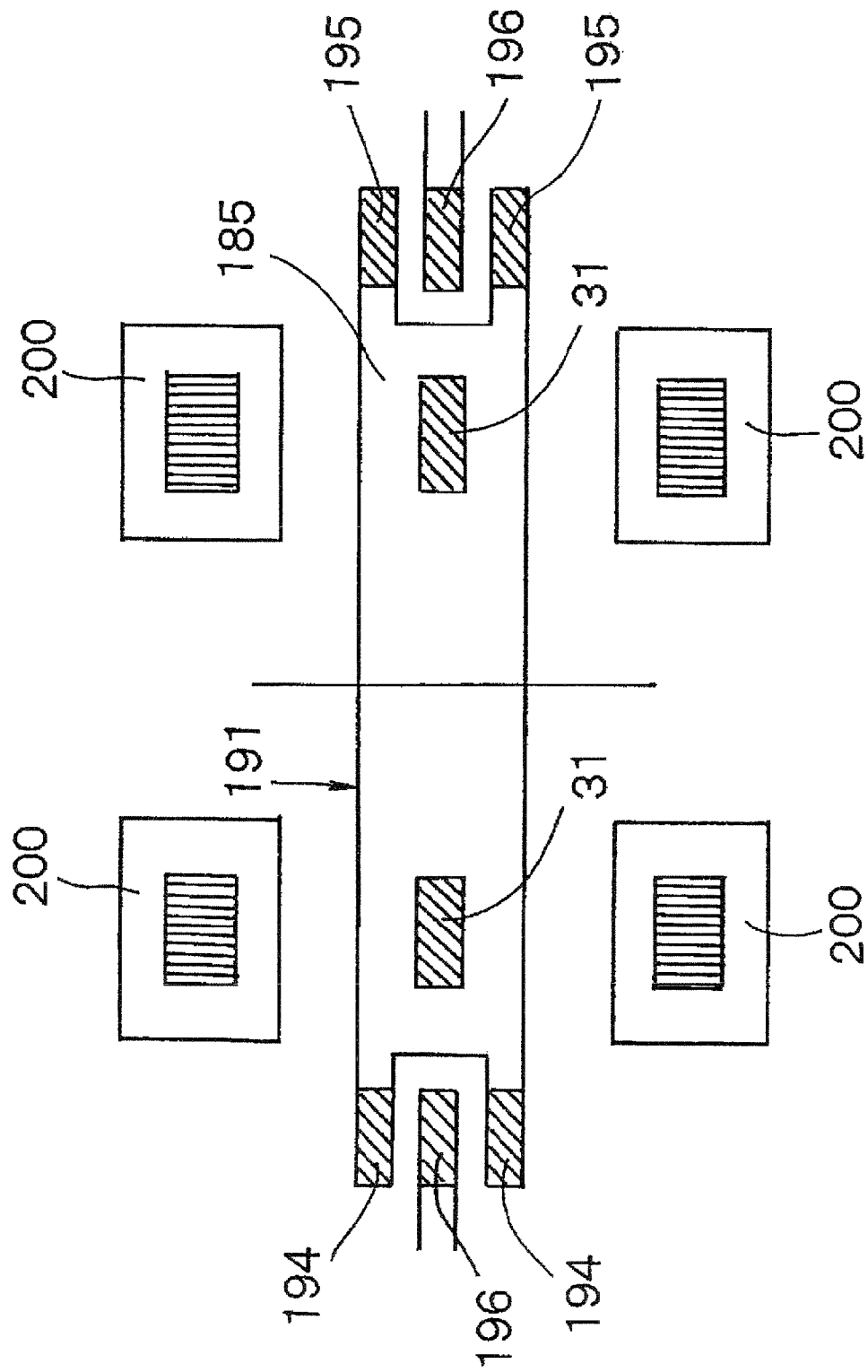
FIG. 62 is a perspective cross section of the substantial part showing an embodiment of the wind power generator using the electric power-mechanical force converter.

In the electric power-mechanical force converter 190 shown in FIG. 60, the stator 200 housing the coil, and the stator side repelling magnet 195, 196 are disposed inside and outside of the cylindrical rotating plate 191. But as the wind power generator shown in FIG. 61, the rotating plate 191 may be discoid (disc like) with its center cut off, and the stator 200 and the stator side repelling magnets 195, 196 can be disposed on the upper and lower side of the rotating plate. In the case of FIG. 60, the space in a radial direction can be reduced and in the case of FIG. 61, the space in a vertical direction can be reduced. Such composition as employing the disk type rotating plate can be used in the wind power generator or motors, rotating machines as shown in FIG. 12 or FIG. 21 etc.

In the above embodiment, the stator 200 and the rotating plate 191 are made like circular ring having continuous limb respectively, but in the case that the stator 20 is continuously disposed, the rotor(moving part) 191 may be provided partially, for example, in the portion only where there are impellers. Contrary, in the case that the rotating plate 191 is continuously provided, the stator 200 may be provided partially.

Figure 63:
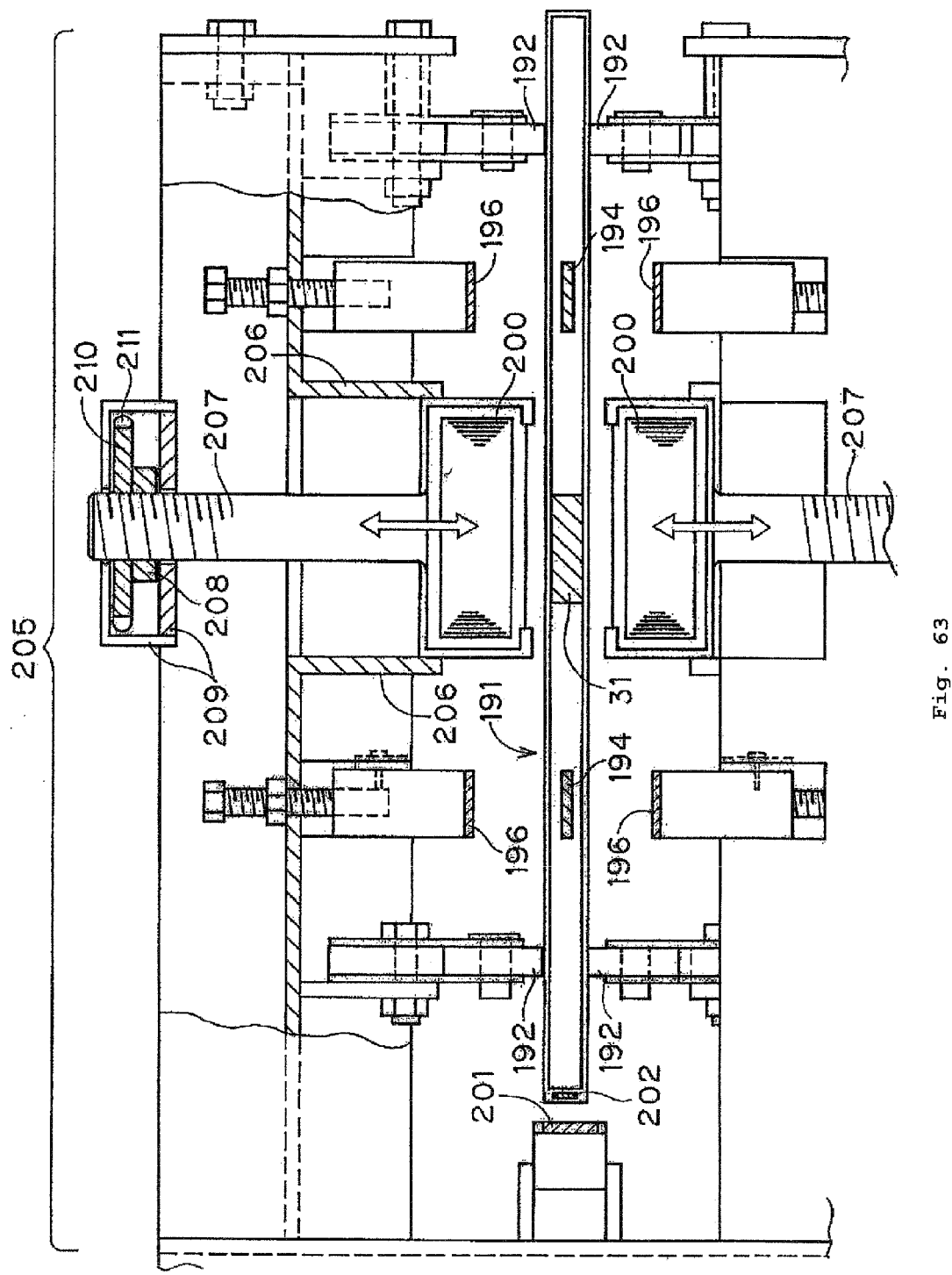
FIG. 63 is a perspective cross section of showing further the other embodiment of the electric power-mechanical force converter.

In the wind power generation system (electric power-mechanical force converter) 205 shown in FIG. 63, the gap between the stator 200 and the rotating plate (moving part) 191 are made to be adjustable. The upper and the lower stator 200 is so disposed as to be not rotatable and to be vertically slidable. And a screw shaft 207 is fixed to the backside of the stator and the screw shaft 207 is supported by a bracket 209 using a nut 208. When the nut 208 rotates in one direction, the screw shaft 207 ascends extending the distance between the stator 200 and the rotating plate 109, and when it rotates in the reverse direction, the distance becomes small.

Figure 64:
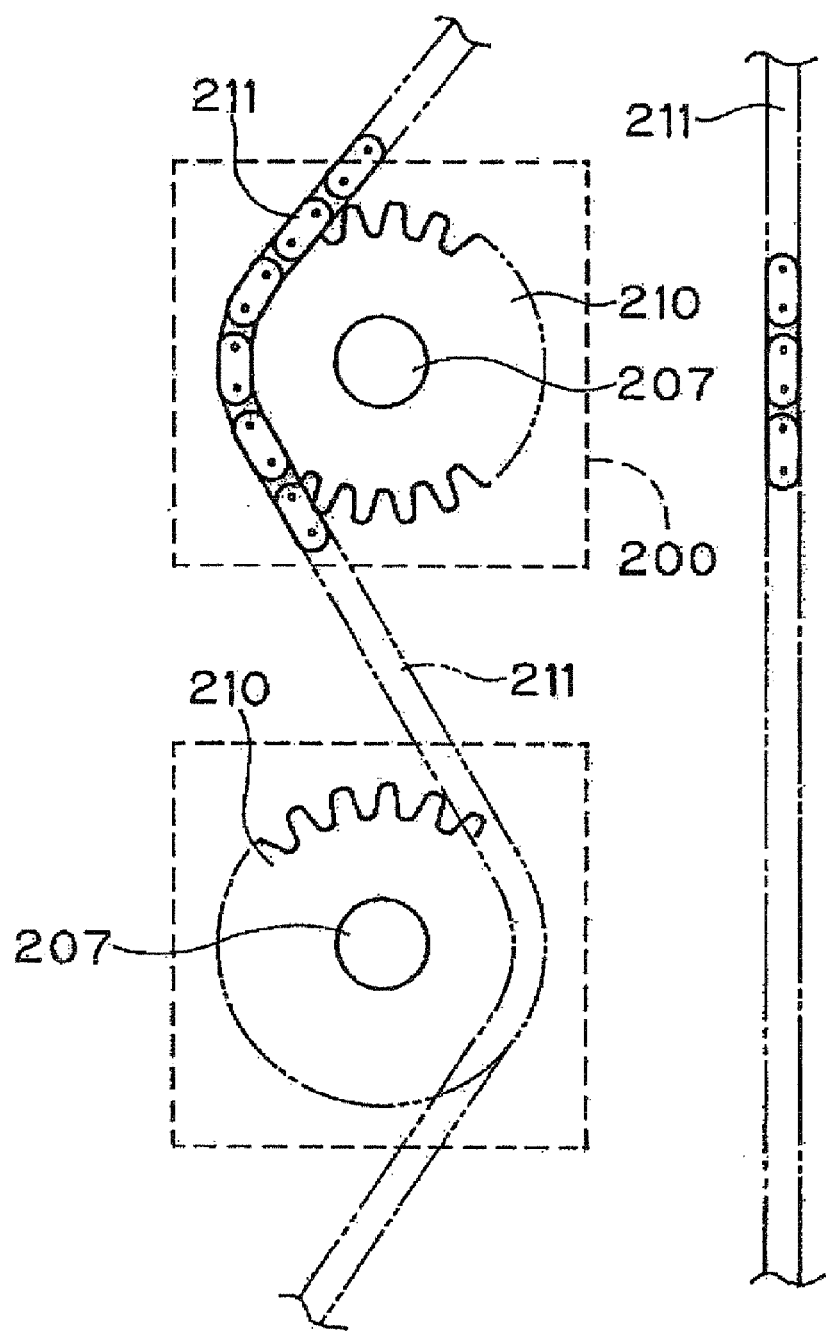
FIG. 64 is a plane view of the substantial part showing around the sprocket of FIG. 63.

Further in this embodiment, the nut 208 is integrated with a sprocket 210 or coupled to a sprocket 210 and the sprocket 210 is rotated by a chain 211 shown in FIG. 64. The sprocket 210 and the chain 211 are so engaged that plural sprockets 210 engage with the chain at intervals of one each from the opposite side, accordingly the chain 211 runs, so to say, stumblingly or zigzag. Thereby they engage heavily enhancing the force transmission efficiency from the chain 211 to the sprocket 210.

Along with the zigzag alignment of the chain 211, the screw of the above screw shaft 207 is so aligned that right-hand screws and left-hand screw are alternative at the every adjacent stator 200. In addition, it is not necessary to connect all stators 200 by the one chain 211, but the one chain 211 may be provided per suitable number of the stator.

Not shown in FIG. 63, but the lower side stator 200 is also composed similarly by the sprockets and the chain vertically adjustable in their positions. The upper side sprockets 210 and the lower side sprockets are so coincided that when the upper stators 200 ascend the lower side stators 200 descend, and when the upper side stators 200 descend the lower side stators 200 ascend. The each chain 211 can be driven by drive sprockets coupled to the adjusting motors not shown in the drawing. Further, as shown in FIG. 63, the return chain 211 is passed through the side of the sprocket, but it may be passed through the under side to make it possible to drive coincidentally the upper and the lower sprocket 210 by the same loop of the chain 211.

The above wind power generator 205 are so composed that the motor to drive the chain 211 is automatically controlled based on a sensor or a detector for detecting the amount of power generation, for example, an electric measuring instrument such as a voltage meter or a current meter. More specifically, when the wind power is week or the amount of power generation is small, the motor is rotated so as to make the distance between the stator 200 and the rotating plate 191 large. When the distance between the stator 200 and the rotating plate 191 becomes large, the interaction between the stator 200 and the rotating plate 191 becomes week reducing the amount of power generation, thereby the resistance loaded by the power generation is reduced facilitating the rotation in week winds or in an initial rotation.

On the other hand, when the wind forces become strong or the amount of power generation becomes large, the adjusting motor is rotated so as to make the distance between the stator 200 and the rotating plate 191 small. When the distance between the stator 200 and the rotating plate 191 becomes small, the interaction between the stator 200 and the rotating plate 191 becomes strong increasing the amount of power generation. Thereby, the resistance loaded by the power generation increases, but in strong wind forces, the rotation can be maintained. The wind power generator 205 shown in FIG. 63 facilitates smooth rotation in the initial rotation and continuation of efficient power generation both in week wind forces and strong wind forces.

Additionally, the same effects are obtained when the nut 208 is fixed to the stator side and the screw shaft 207 is mounted on the sprocket 210. In place of the screw-nut mechanism, other rotation-translatory movement conversion mechanism such as rack and pinion mechanism etc. can be employed. Further, other than the horizontal disk type wind power generators as shown in FIG. 63, the adjusting mechanism similar to FIG. 63 to adjust the gap between the rotor and the stator automatically can be employed, for example, in the wind power generator employing the cylindrical rotor shown in FIG. 56a, FIG. 60 etc.

Figure 65:
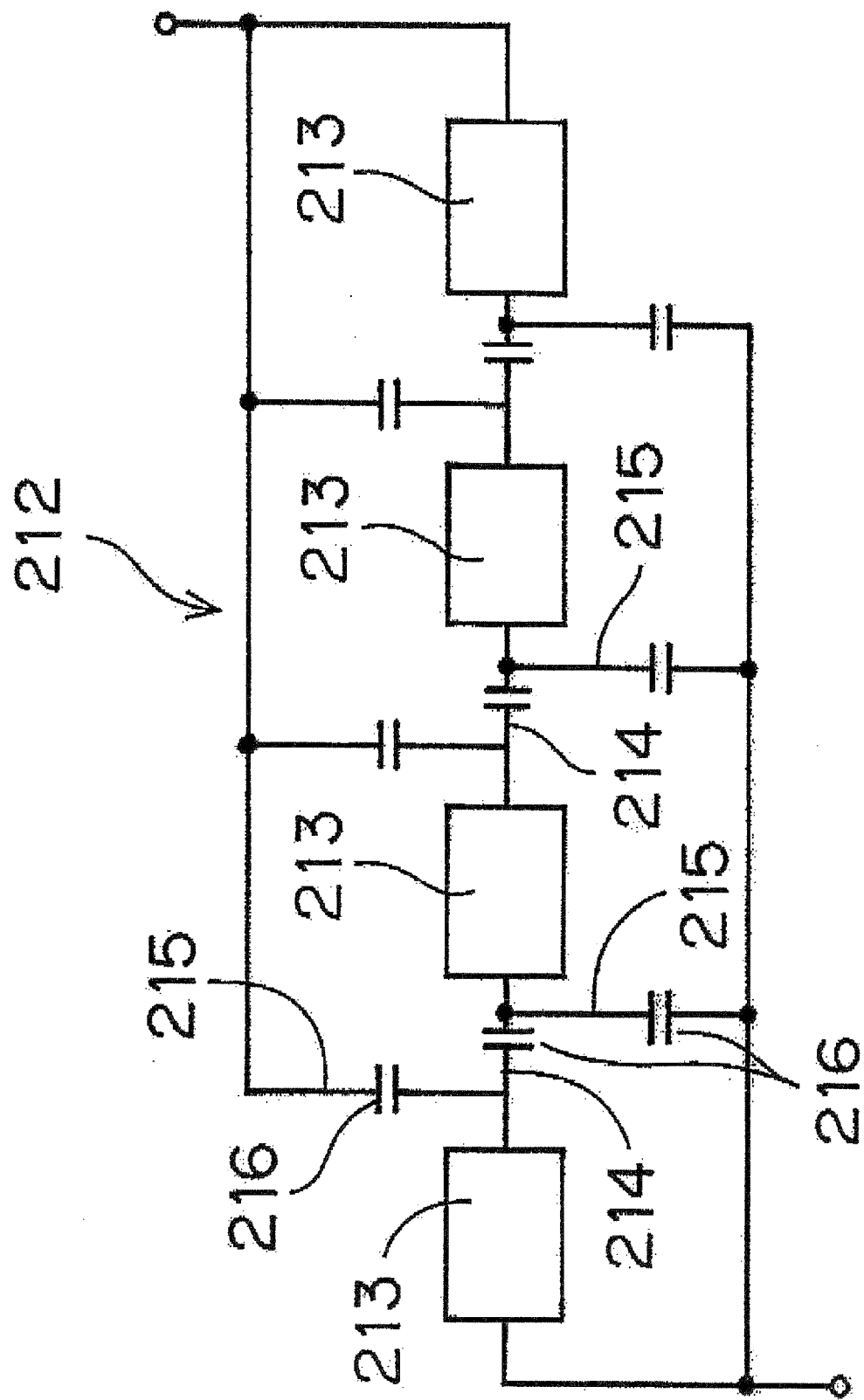
FIG. 65 is a block diagram showing the other embodiment of the wind power generator related to this invention.

The wind power generation system 212 shown in FIG. 65 comprises a series circuit 214 to connect the coil 213 of the stator 200 in series, a parallel circuit 215 to connect it in parallel, and a selecting means 216 such as a relay or a circuit-breaker to select the circuits. In the initial stage of the rotation or in weak wind forces, the power is generated using the parallel circuit 215, and in strong wind forces it is switched to the series circuit 214. Accordingly, in weak wind forces, the generated voltage is low loading the windmill with small rotation resistance, and contrary in strong wind forces, the generated voltage becomes high with high power generation efficiency.

In FIG. 65, the coils are not distinguished by every phase for easy understanding, but practically the coils distinguished by every phase as shown in FIG. 1 and FIG. 49 are employed in accordance with the alternative current to be generated.

Figure 66:
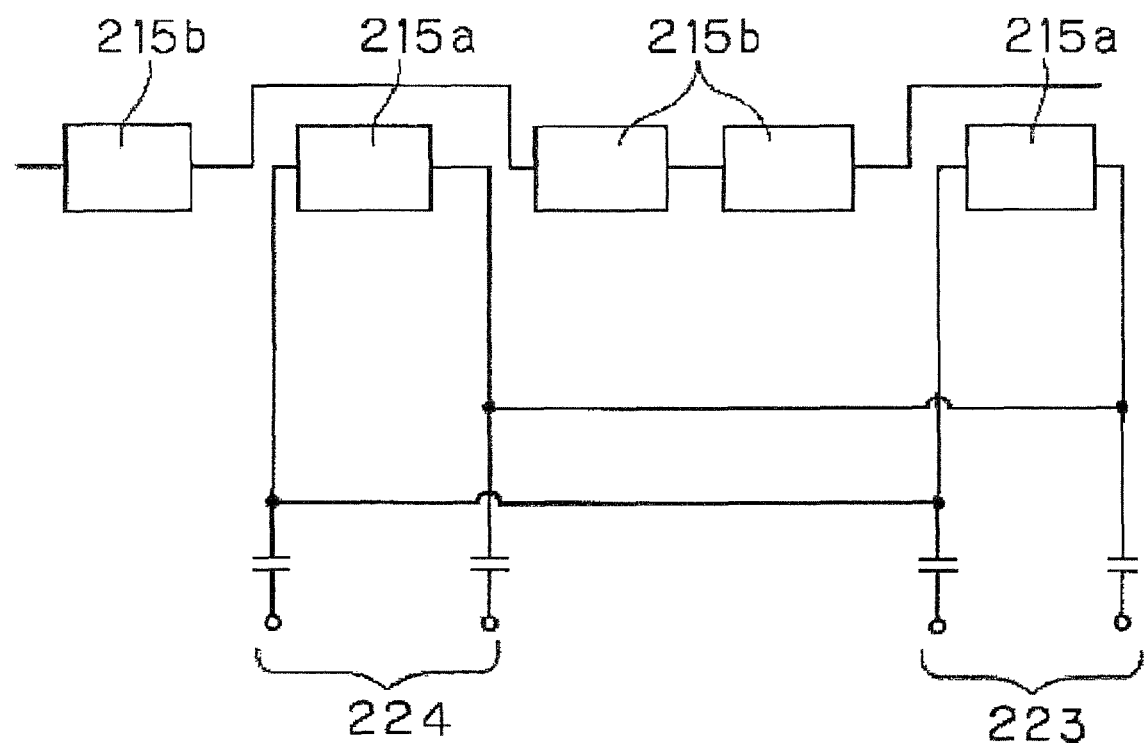
FIG. 66 is a block diagram showing the other embodiment of the wind power generator related to this invention.

FIG. 66 shows the composition in which some coils 215a among plural coils are separated from the other coils 215b and the specific coil 215a can be switched from a power generating circuit 217 for extracting the generated power to a motor circuit 218 used as a motor by applying the power inversely. Thereby in the initial rotation stage of the impeller or in weak wind forces, the specific coil 215a can be operated as a motor to rotate the impeller forcibly. And then, when the rotation speed reaches to an extent or in strong wind, the specific coil 215a is used for the power generation. Thus, the initial rotation becomes smooth and high efficiency of the power generation is achieved in a high rotation speed.

Figure 67:
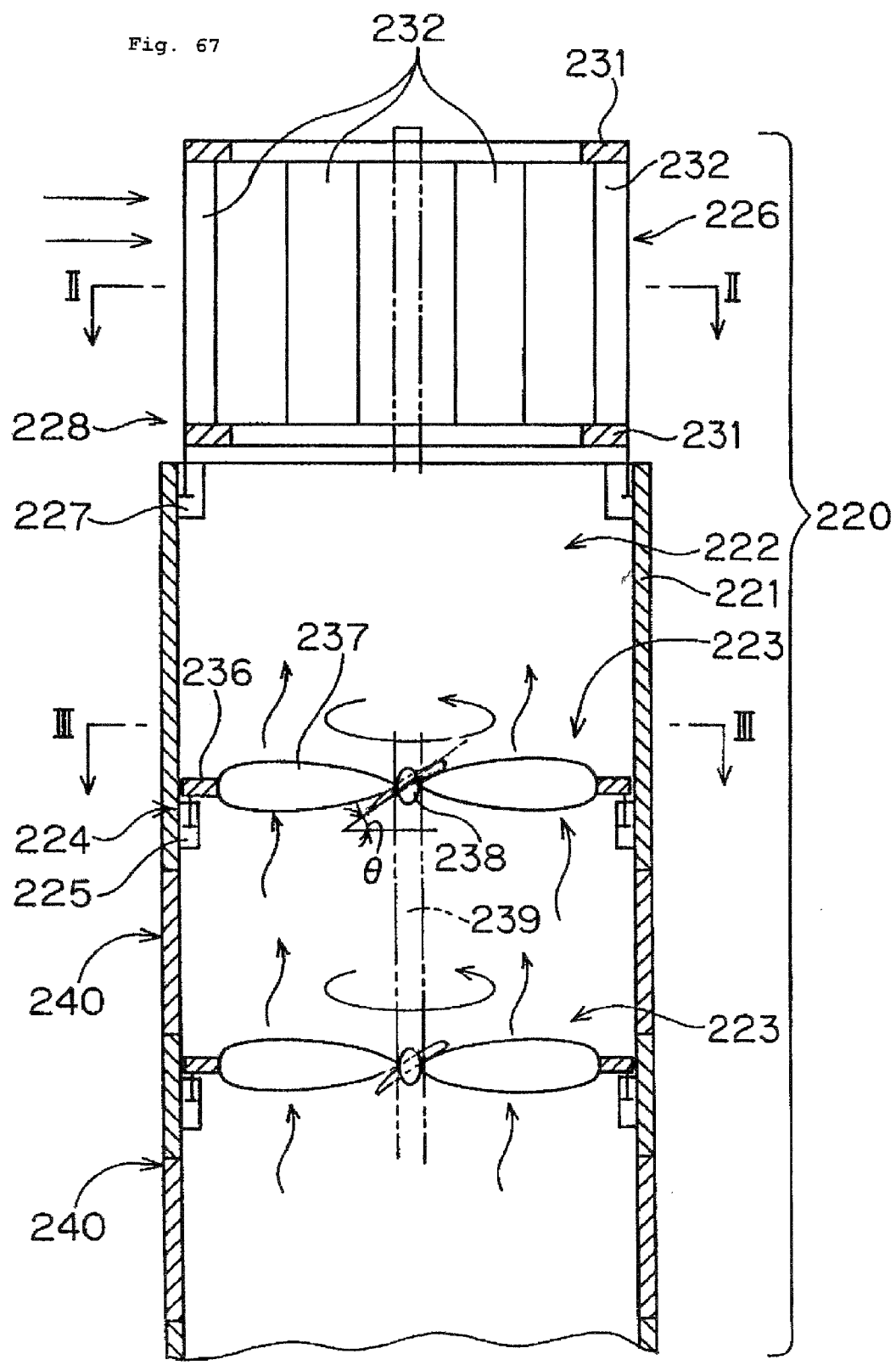
FIG. 67 is a rough cross section showing the basic embodiment of the power generator of this invention.
Figure 70:
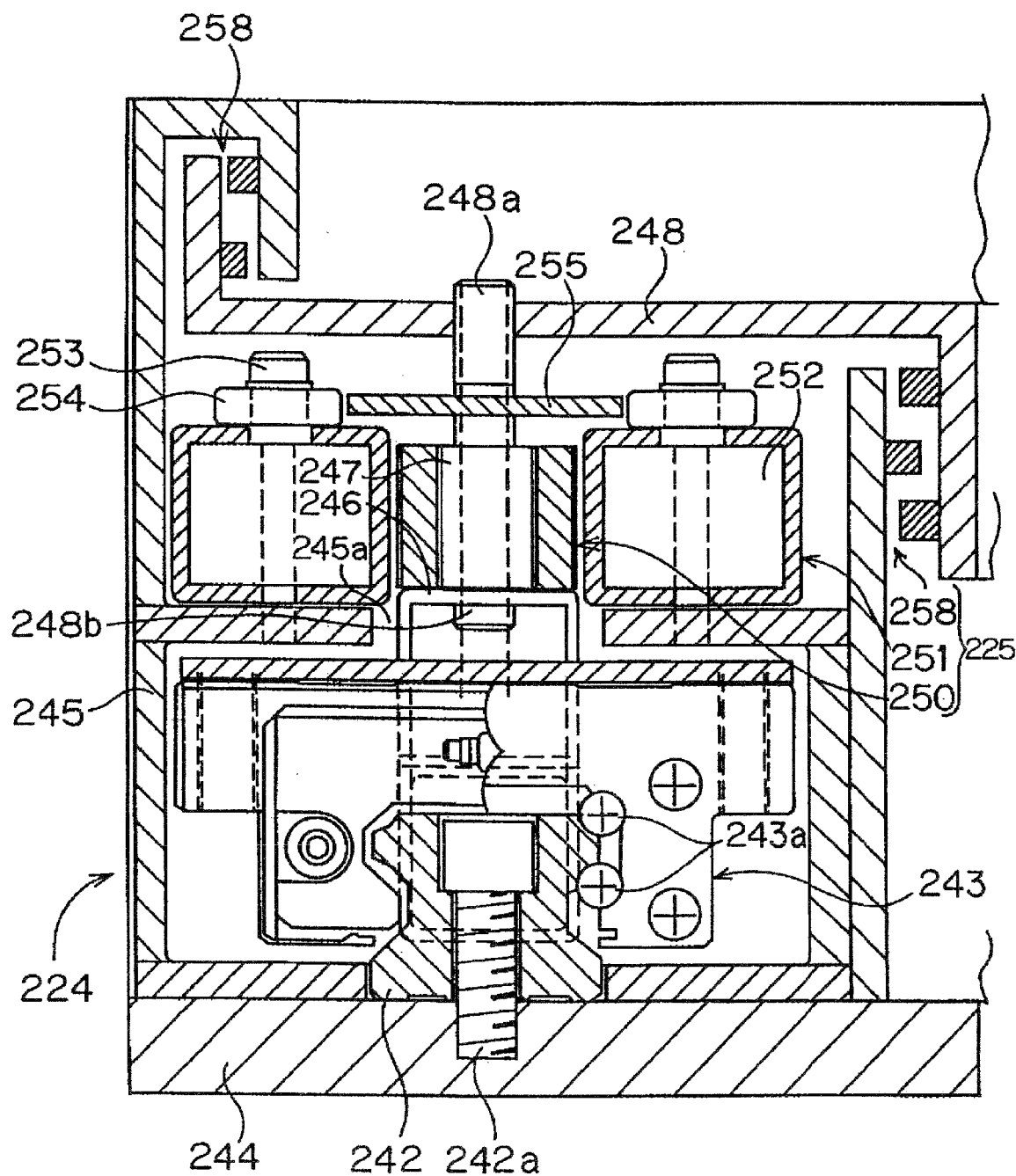
FIG. 70 is a cross section showing an embodiment of the supporting structure and the power generator related to this invention.

The power generator 220 shown in FIG. 67 comprises a cylindrical wall body 221 extending upward and downward, an impeller 223 disposed in a air flow path 222 and rotated by ascending airflow, and a linear type power generator 225 provided on a supporting part 224 (see FIG. 70). Further in this embodiment, on the upper end of the cylindrical wall body 221, an impeller 226 for side winds rotated by side winds and the second power generator 227 are provided additionally. The wall body 221 is cylindrical, and inside of the body, plural supporting parts 224 are aligned in a vertical direction. The each supporting part 224 slidably or rotatably supports the periphery of the impeller 223 rotated by the ascending airflow. In the vicinity of the upper end of the wall body 221, a supporting part 228 that supports slidably or rotatably the periphery of the impeller 226 for side winds is provided. The power generator 225 and the second power generator 227 are preferable to be linear type, but it may be the power generator of the normal rotation type whose input shaft is the rotation axis.

Figure 68:
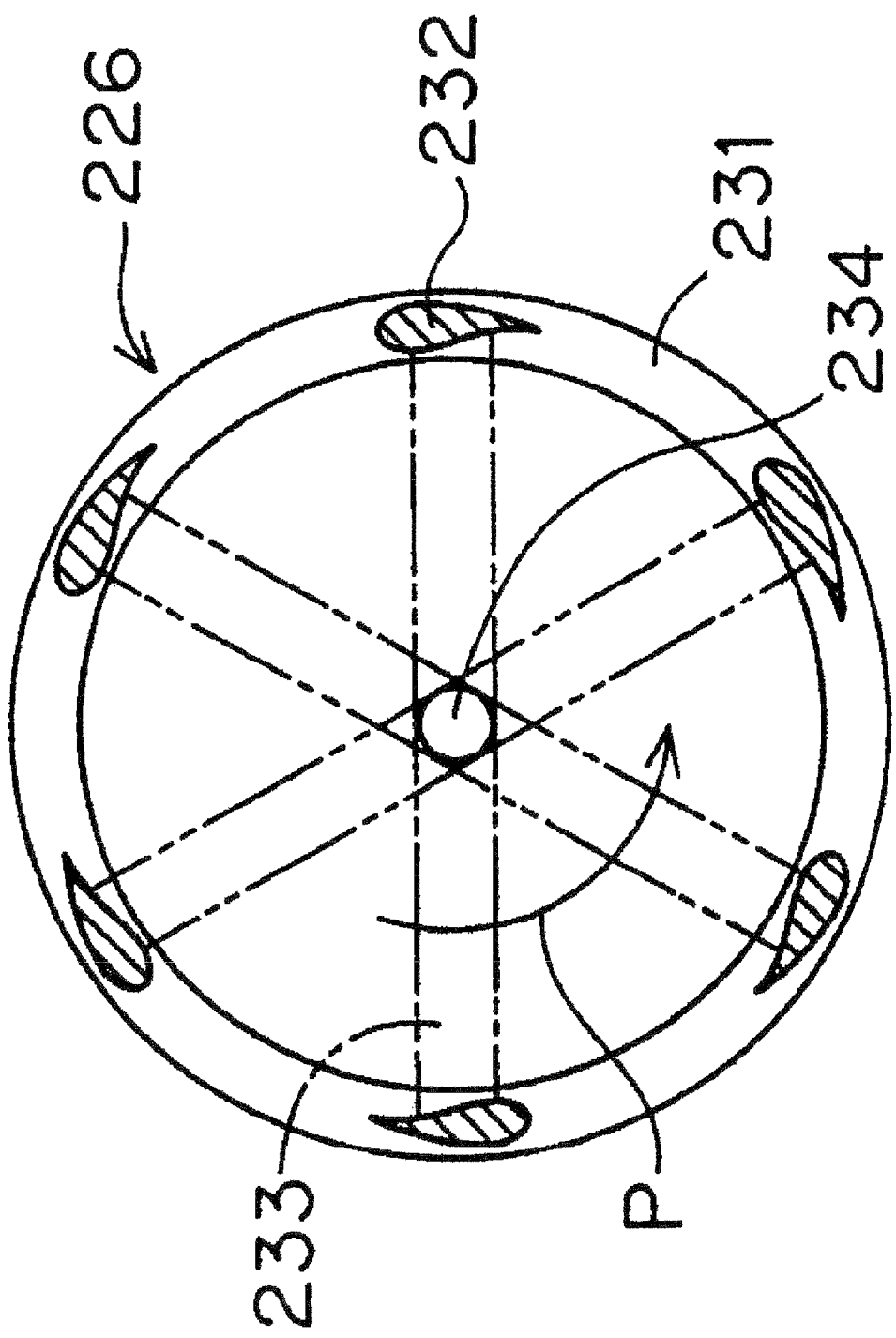
FIG. 68 is a II-II line cross section of FIG. 67.

The above impeller 226 for side winds comprises a ring-shaped supporting loop 231 provided on the upper and the lower end and plural longitudinal blades 232 aligned in between the supporting loops. The longitudinal blades 232 are aligned along the supporting loop 231, and each longitudinal blade has the wing profile directed to the same direction in relation to the rotative direction as shown in FIG. 68.

Therefore, the longitudinal blades 232 rotate in one direction (for example, arrowhead direction P), when the impeller 232 receives the winds from the side. In the case of FIG. 68, the center part of the impeller 226 is hollowed out, but stringers or transverse blades 223 to interconnect the longitudinal blades 232 may be provided, as shown in imaginary lines. Further a rotation support shaft 234 can be provided in the center of the stringer or the transverse blade. In the case that the transverse blade 233 is used, it is preferable to be wing profile to receive a lifting force by rotation.

Figure 69:
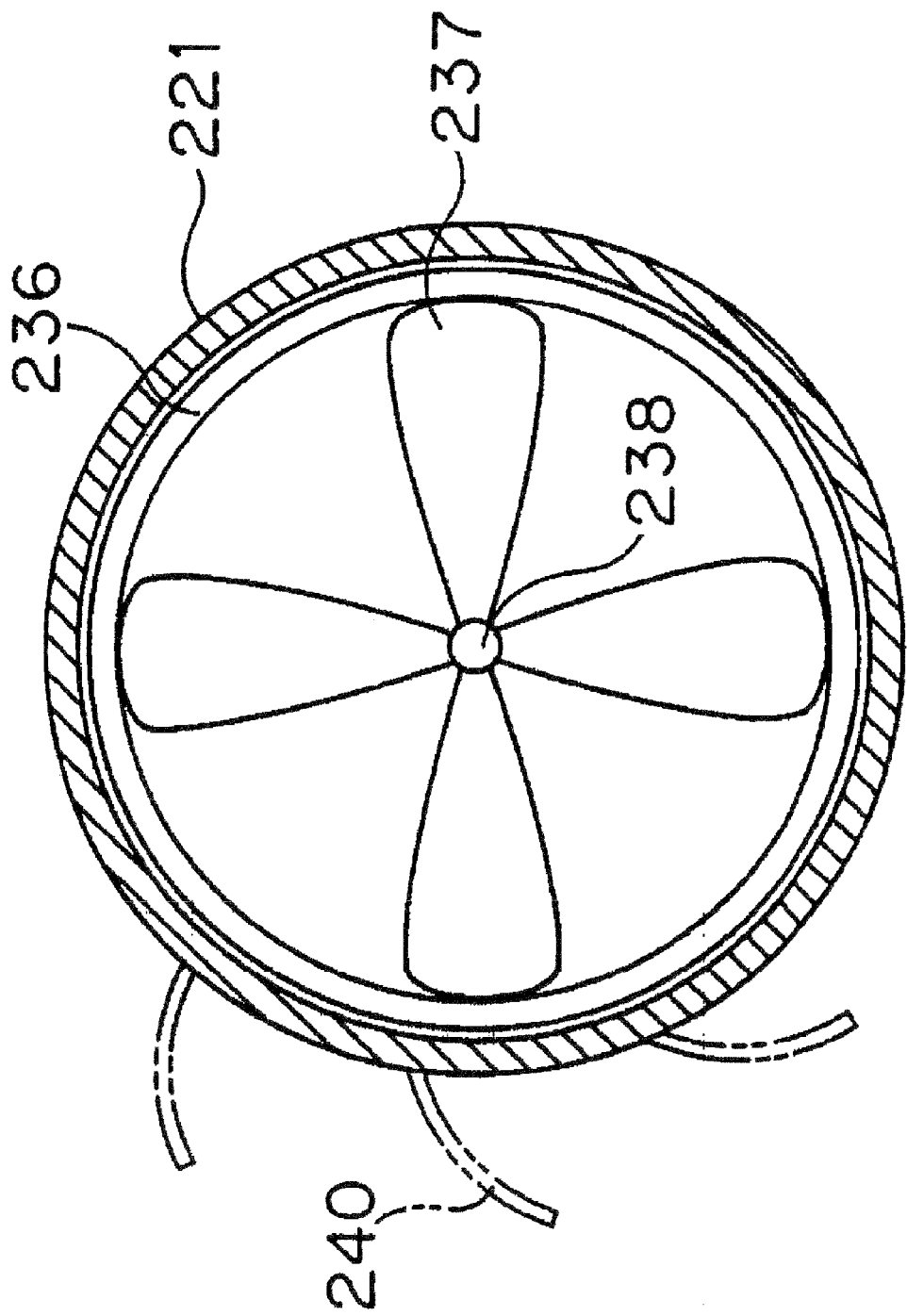
FIG. 69 is a III-III line cross section of FIG. 67.

The above impeller 223 for ascending airflow comprises the ring-shaped supporting loop 236 and the transverse blades 237 radially aligned in the loop as shown in FIG. 67. The each transverse blade 237 is mounted on the supporting loop 236 with a given oblique angle θ. Further, as shown in FIG. 69, the each transverse blade 237 may be broadened toward out side. In the center of the transverse blade 237, a center rod 238 to interconnect the center sides of the transverse blades 237 extending radially is provided. The center rod 238 can be omitted. In addition, the center part of the upper and the lower impellers 223 may be interconnected by an interconnecting rod 239. In this case, a bunch of the upper and the lower impellers 223 rotates all at once in the same direction at the same rotation number. An extent of 2~20 each of the impellers 223 are aligned vertically in the one set of the power generator 220, and in some cases several tens each of them are aligned. In the case that center rod 238 or the interconnecting rod 239 is employed, the input shaft of the rotating power generator can be connected to it.

Further, in the power generator 220 shown in FIG. 67, openable and closable doors or windows 240 are provided on the wall body 221. The windows 240 may be sliding windows or hinged windows. The windows 240 are preferable to be provided on the medium portion of the upper and the lower impellers 223. In addition, it may be provided intensively on the lower portion of the wall body 221 and nothing on the upper part. The windows 240 are located circumferentially at several positions and openable individually. The opening and closing of the window 240 is performed by motor drives etc. and usually it is opened and closed by remote control from an operation room. They may be automatically opened at a desirable operation speed of the outside wind of the wall body (for example from several meters/second to 20 meters/second) by detecting the wind speed, and automatically closed when it exceeds a lower limit(for example, several meters/second) or a higher limit(for example, 20 meters/second).

The outer diameter of the wall body 221 of the power generator 220 is not particularly limited and it can be from several meters to several tens meters and depending on the circumstances it can be several kilometers. The height of the wall body 221 can be from several tens meters to several kilometers.

In the power generator 220 composed as above, the upper end of the airflow path 222 provided in the wall body 221 is opened to atmospheric air, and usually the vicinity of the lower end is also open to atmospheric air. But it is possible to make the upper end and the lower end communicated/shut off freely. The upper end and the lower end are opened and the midway windows 240 are closed, in which case ascending airflow is generated in the airflow path 222 by the difference of the atmospheric pressure of the upper air and the surface pressure. Resultantly, plural impellers 223 rotate and the linear type power generators 225 provided on the supporting part 224 to support them generate powers. The generated powers are transmitted to demand areas via frequency adjusters using regular transmission lines. In the case that the power generators 225 are DC type, the powers are converted into appropriate alternative currents before transmission. Since the ascending airflow is generated all the time independent of winds, a basic amount of power generation is secured.

Further in the above power generator 220, the upper end impellers 226 of the wall body 221 for side winds rotate when wind blows and the second power generators 227 generate power, thereby the amount of power generation increases. In addition, when the side winds are properly large and the power generation efficiency is higher than that by the ascending airflow dependant on the atmospheric pressure difference, windows 240 toward the wind is opened and the side winds are introduced into the airflow path 222. Thereby the side winds introduced into the airflow path 222 are converted into the ascending airflow to increase the power generation efficiency. When direction of the wind changes, it is so controlled that windows 240 toward the wind are opened and other windows 240 are closed, thereby a proper amount of power generation is obtained. As described above, in the power generator 220, it is possible to secure a proper amount of power generation as a matter of course when the wind blows, but also in the weak wind or in calm.

As the supporting part 224 and the power generator 225, for example, a linear type of those shown in FIG. 70 is suitable. In this embodiment, as the supporting part 224, a linear slide ball bearing is used. This linear slide ball bearing is composed of a stator side linear guide 242 and plural sliders 243 mounted on the guide slidably. The linear guide 242 is annularly aligned on the base 244 continuously and is fixed by a screw 242a. The slider 243 is provided with a ball line 33a aligned along the running direction. The ball line 243a rolls an endless guide groove in which the running side guide groove contacted to the linear guide 242 and the return side guide groove is continued. The linear guide 242 and the slider 243 are enclosed by a cover 245 having a slit 245a on its upper surface.

On the upper surface of the slider 243, a rotating plate 248 is fixed via supporting plate 246 having U-shaped cross section and a spacer block 247. The rotating plate 248 is fixed to the supporting plate 246 by a bolt 248a and a nut 248b of the underside of the supporting plate 246. On the upper surface of the supporting plate 246, the supporting loop (see reference numeral 236 of FIG. 67) is mounted, thereby the impeller can rotate around the center shaft of the annular guide formed by the linear guide 242.

Between the supporting plate 246 and the cover 245, a linear type power generator(linear generator) 225 is provided. The power generator 225 comprises magnets 250 mounted on the both sides of a spacer block 247 and a pair of coils 251 mounted on the upper surface of the cover 245 so as to place the magnets in between from the outside and the inside. As the magnets 250, permanent magnets are used, but it may be electromagnets. The each coil 251 is the one in which a coil wire is wound around a core 252 composed of laminated silicon steel plates. The outer and the inner coil 251 are fixed to the cover 245 by a screw 253, and on the upper end of the screw 253 the guide roller 254 is mounted rotatably. And on the bolt 248a, a guide plate 255 intervening between the outer guide roller 254 and the inner guide roller 254 is mounted. The guide plate 255 serves together with the guide roller 254 to adjust the gap between the magnets 250 and the coils 251.

The inside and the outside of the above power generator 225 are enclosed by the cover 256, 257. In the gap between the cover 256, 257 and the rotating plate 248, a labyrinth seal 258 for preventing the invasion of dust to the inside of the power generator 225 is provided.

In the linear type power generator 225 composed as above, when the rotating plate 248 rotates with the rotation of the impeller, the magnets 250 pass through the gap between the right and the left coils 251, thereby an electromotive force is generated in the coils 251 enabling to take out electric powers from the end of the wire of the coils 251. The taken out electric powers are transmitted as described above. Such linear type power generator 225 as described above does not need a center shaft and can support the weight of the impeller with a wide range, thereby enabling stable support of the impeller weight. For example, even in the case that the impeller 223 of FIG. 67 and FIG. 69 weighs several tons, the friction resistance is low allowing smooth rotation. Regarding the impeller 226 for side winds, it is preferable to use the similar linear type power generator. But a rotation shaft can be provided in the center of the impeller for ascending airflow and for side winds, and also usual rotation type power generator can be provided.

Figure 71:
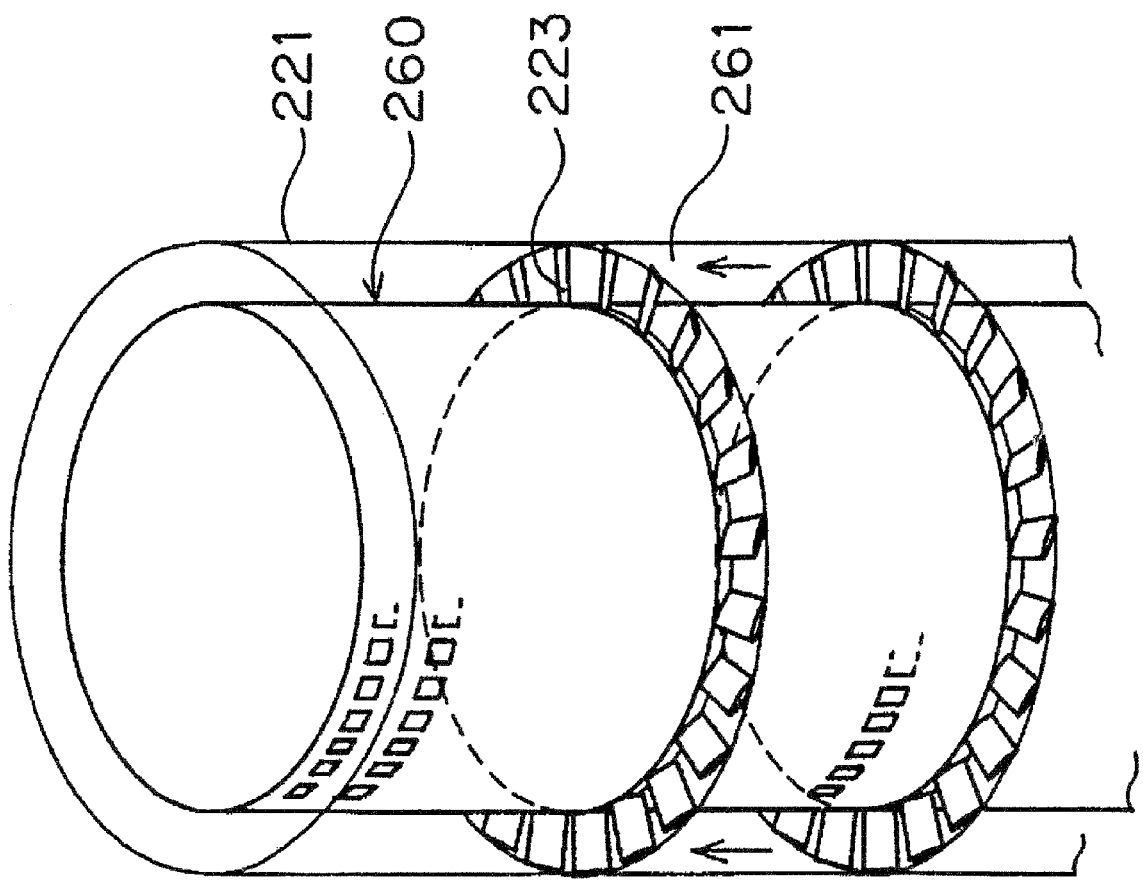
FIG. 71 is a rough perspective view and a rough cross section showing the embodiment of the case that the power generator of this invention is combined with a building.
Figure 72:
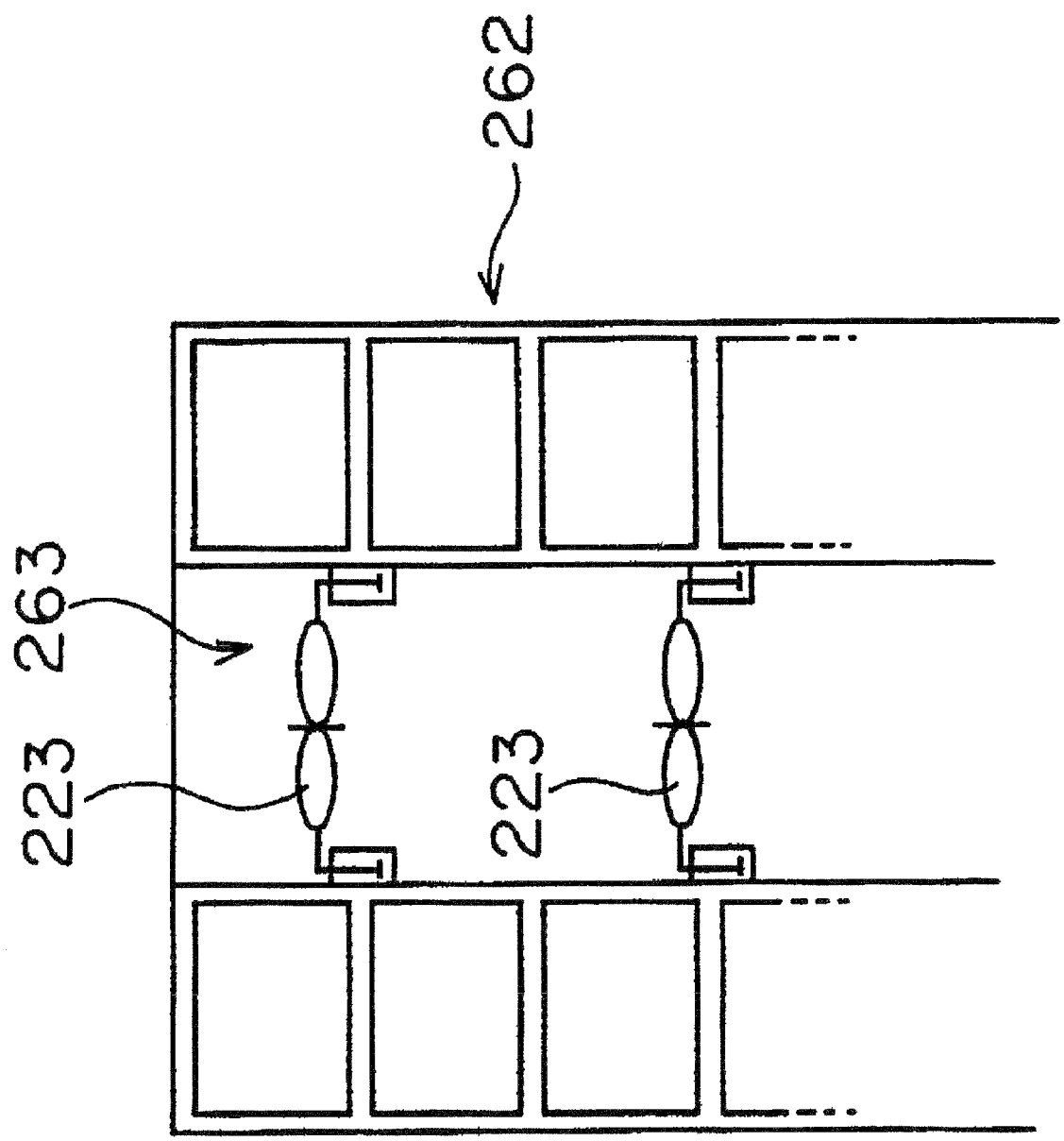
FIG. 72 is a rough perspective view and a rough cross section showing the embodiment of the case that the power generator of this invention is combined with a building.

The outer wall 221 of the above power generator 220 can be simply like chimney to generate ascending airflow, but it can be integrated with a building as shown in FIG. 71 and FIG. 72. In the case of FIG. 71, the building body 260 is cylindrical and the outside wall 221 is provided with a gap 261 around the wall. The impeller 223 is annularly disposed around the building body so as to receive the ascending airflow passing the gap 261. In the case that the building body 260 is the one that accommodates communication equipment etc. and does not need windows, and that is built in the under earth, the wall 221 may be opaque. However, in the case that the building is occupied by person, the outside wall 221 is preferable to be composed by transparent panels. In the case that the outside wall 221 is composed by such transparent panels, it is preferable to apply transparent films to the surface or inside of the outside wall 221, which traject infrared rays coming from the outside and do not traject infrared rays coming from the inside. As such films having so-called hothouse effect, synthetic resin films applied, for example, to the glass of hothouses can be cited. Thereby, heat is kept in the gap between the outside wall 221 and the building body 260 to enhance the generation of ascending airflow.

The building body 262 shown in FIG. 71, has cylindrical space 263 inside, and has impellers 223 rotated by the ascending airflow inside of the space 263. In the building 262, the inside space 263 composes an airflow path generating ascending airflow to rotate the impeller 223. The whole of the building means herein the wall body described in the patent claim. Since the outside of the building 262 is not shielded by panels, it is normal in appearance and is free to open the windows. Both in the building body 260 in FIG. 71 and the building 262 in FIG. 72, when exhaust air path of air conditioners for the ventilation of the building is opened to the airflow path, ascending air flow is generated by the exhausted warm air, thereby the rotation of the impellers 223 are enhanced and the efficient use of the waste heat is achieved saving the energy.

Figure 73:
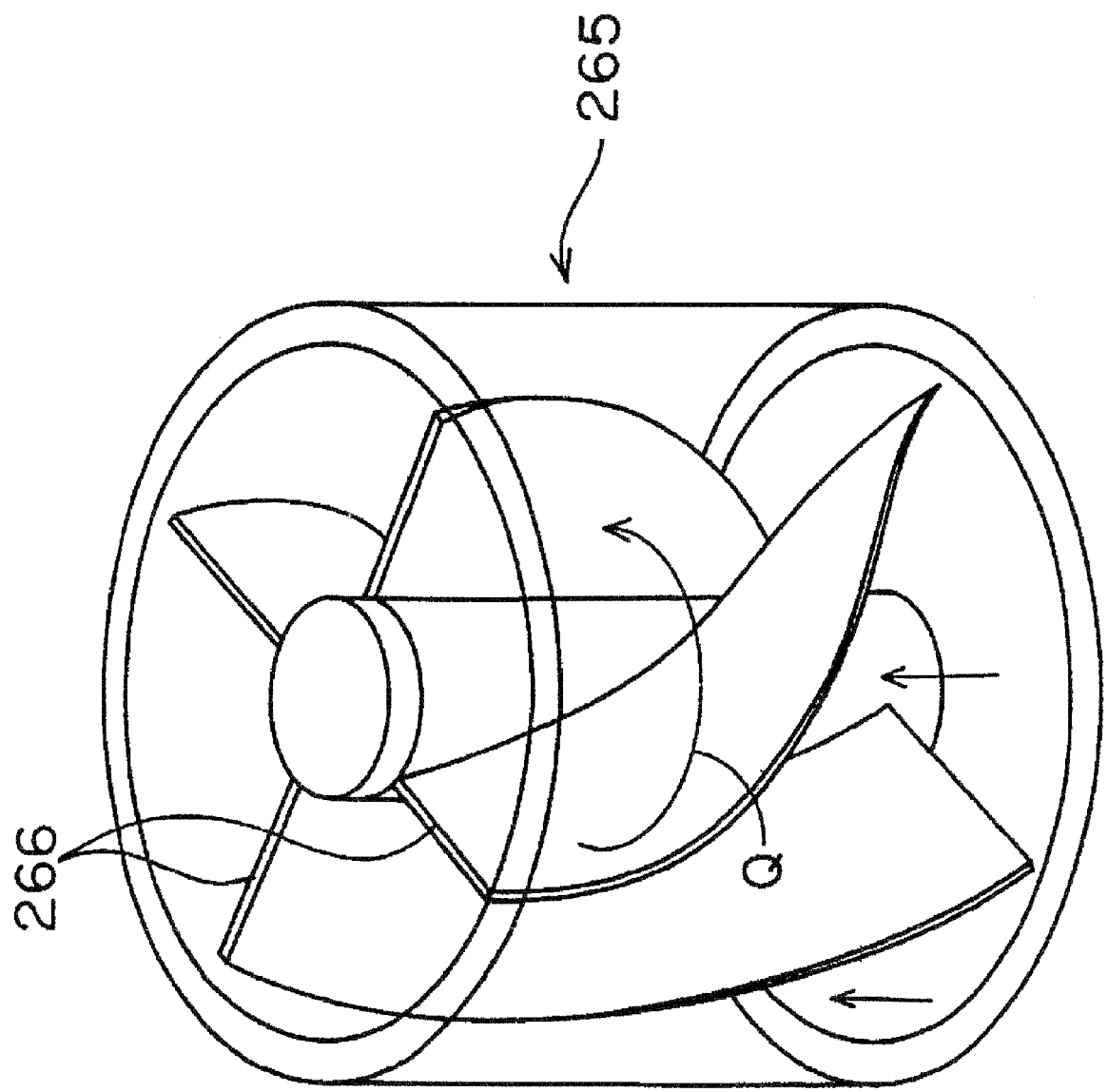
FIG. 73 is a perspective view showing the other embodiment of the impeller of this invention.

In the above embodiment, the impeller for ascending airflow and the impeller for side winds are separate, but, as shown in FIG. 73, one impeller can serve both for side winds and ascending airflow. This impeller 265 is made by twisting the impeller 226 for side winds provided with the longitudinal blades of FIG. 67 and FIG. 68. More specifically, the each impeller 266 has a shape of screw conveyer and rotates in the direction of the arrowhead Q when the ascending airflow strikes from underside. Further, when side winds strike, the winds are made to pass through upward; the impeller rotates inversely to the arrowhead Q. Therefore, when it is used in place of the impeller 226 of the case of FIG. 67, it is rotated by both the side winds and the ascending airflow. As well, when the winds are made to pass through downward, the impeller 265 rotates in the direction of the arrowhead Q with enhanced rotation struck by the ascending airflow and the side winds. Further, the impeller 265 can be also employed for the impeller 223 for ascending airflow of the power generator 220 that is a type of receiving side winds by opening the windows 240 shown in FIG. 67. In this case also, the impeller can be rotated by both of the side winds and the ascending airflow coming from beneath achieving high efficiency.

Figure 74:
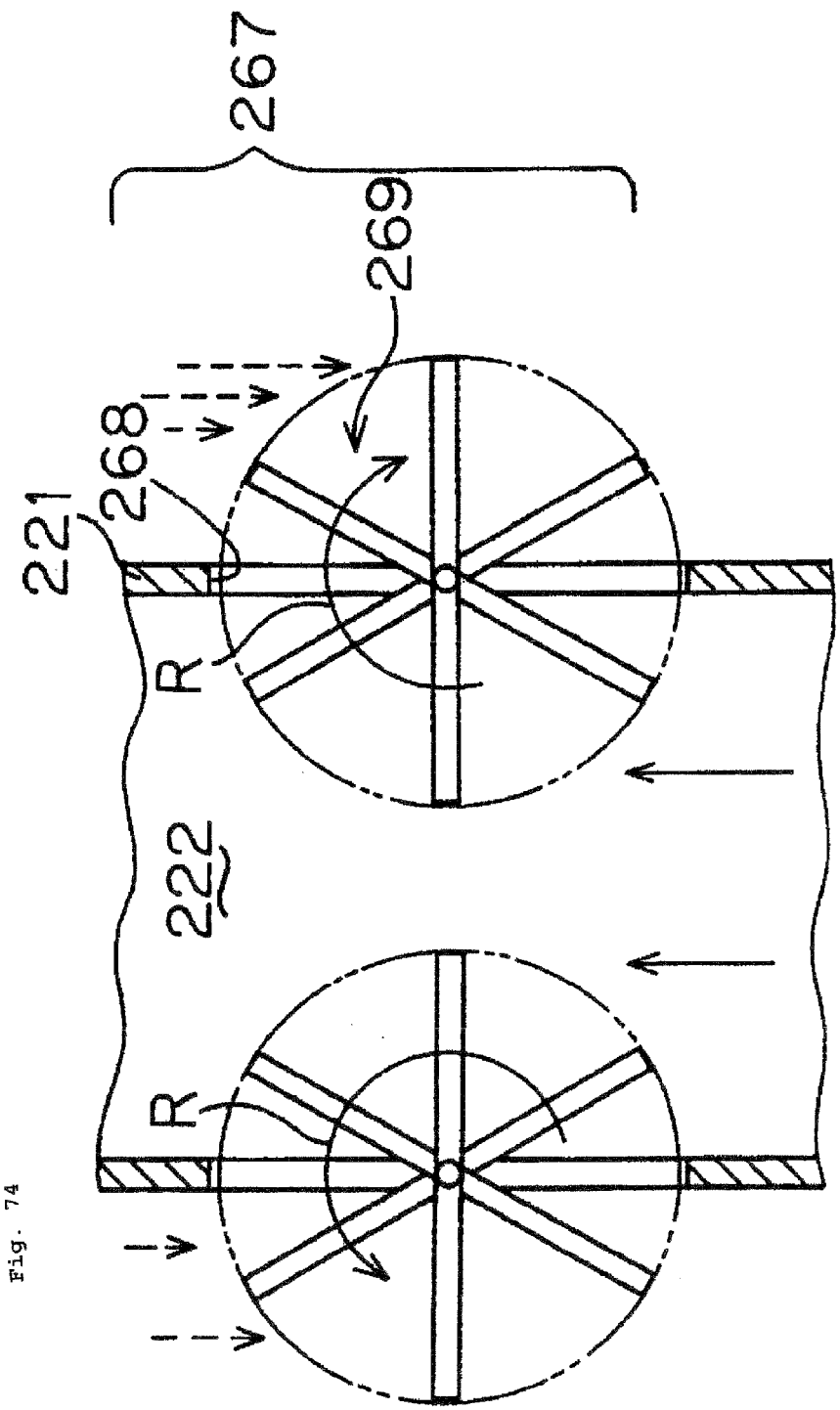
FIG. 74 is a perspective view showing further the other embodiment of the power generator of this invention.

The power generator 267 shown in FIG. 74 comprises an impeller 269 disposed at an opening 268 formed in the outside wall 221 and rotated around the center shaft extending horizontally and a power generator rotated by the rotation of the impeller. The rotation center of the impeller 269 is along the outside wall 221. Therefore, a part of the blade of the impeller 268 is inside of the outside wall 221 and other blades are out of the outside wall 221. Accordingly, by the ascending airflow flowing in the airflow path 222 of the outside wall 221, the inside blades of the impeller 269 are energized upward, and the impeller rotates in the direction of the arrowhead R. When the outside blades are beaten by rain, the outside blades of the impeller 269 are energized downward, thereby the impeller 269 further rotates in the direction of the arrowhead R.

In the above embodiment, a cylindrical airflow path is employed, but angulated tube, such as rectangular tube, hexagonal tube air flow path can be also employed. Further, the airflow path is one fold path, but it can be coaxially overlapped two fold or more than threefold path. The impeller provided in the outside airflow path in this case is, for example, the annular impeller 223 shown in FIG. 71. Furthermore, for example, inside of pipe columns composing the buildings can be employed as an airflow path.

Figure 75:
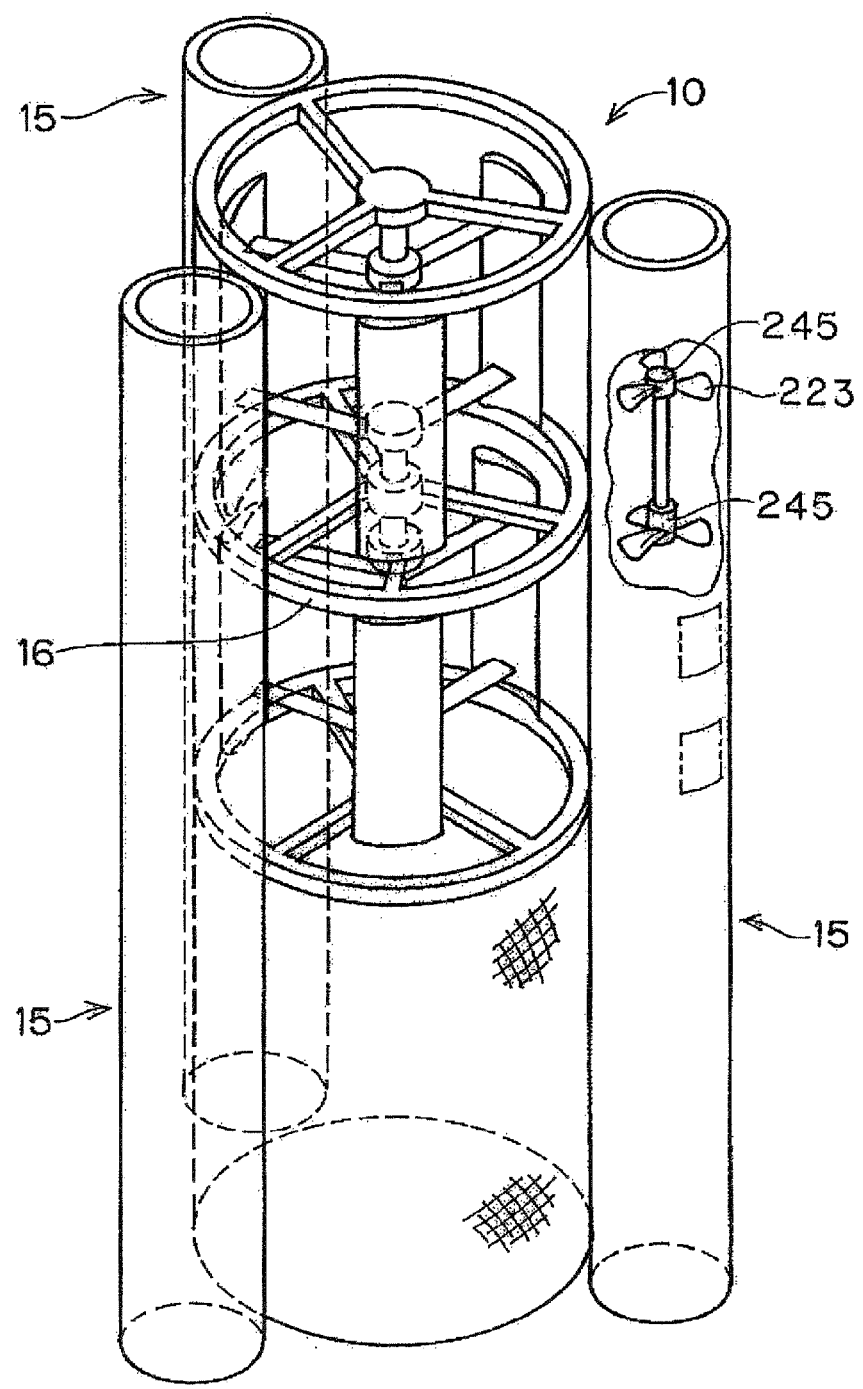
FIG. 75 is a partially notched perspective view showing further the other embodiment of the power generator of this invention.

In FIG. 75, in the power generator 10 of FIG. 2, the legs 15 are pipes, and the inside of the legs 15 is made to be an airflow path. In these cases, the legs 15 of the columns of the building and the power generation system 10 are formed using plural steel pipes, and the buildings and the power generation system 10 is built in the space surrounded by those columns and legs, wherein the impeller 223 is disposed inside of the each steel pipe, and the power is generated by the power generator 245 coupled with the impeller. In this case, the columns made of steel pipes reaches high temperature, the ascending airflow is generated in the steel pipes enhancing the power generation efficiency. The steel pipes are so provided as to surround the building with several to several tens of them.

Further in FIG. 75, infrared absorption sheets and an area (heat absorption part) 270 enclosed by panels for enhancing the thermal storage performance are provided under the legs 15, and the heat absorbing part 270 and the lower part of the legs 15 made of steel pipe are communicated. Thereby hot air heated by the heat absorbing part ascends the airflow path in the leg 15 to generate powers efficiently. In the case that thin airflow path such as steel pipe is employed, there may be a case that it is better to employ rotation type power generators whose input shaft is the center shaft of the impeller than to employ the linear type power generator shown in FIG. 70 etc.

In the above embodiment of the power generator having the cylindrical airflow path provided with the openable and closable windows, it is described that the windows are closed in strong winds such as typhoon, but contrary all windows can be opened and panels for closing the windows can be hidden behind the portion of frames having high strength. Further, the cylindrical outside wall can be composed of a portion of frames having high strength and a portion of wall panels that are movable between the normal position covering the surface of the portion of frames and the sheltered position hidden behind the portion of frames. In such embodiment, in the normal operation condition, panels compose the outside wall that is an airflow path of the ascending airflow, and in strong winds the wall panels can be sheltered behind the portion of frames in order to pass through the winds. In the case that the panels covering the windows and the wall panels are composed as above, the wall can be composed of panels having low strength. When the panels are sheltered, since the impellers etc. are exposed to strong winds, it is preferable to lock the rotation of the impeller by providing a lock mechanism using hydraulic cylinder etc., thereby the outside wall and the impellers are protected from strong winds.

The above frame structure is, for example, same as the power generator 10 shown in FIG. 10, comprises plural column support 15 extending vertically and ring-shaped member 16 interconnecting the column support disposed above and below with a given interval. In this case, the vertical width of the ring-shaped member 16 may be wide to some extent and the wall panels may be hidden inside of the ring-shaped member 16. The wall panels are preferable to be foldable or to be stowed in pile because the width of the ring-shaped member 16 can be narrowed to widen the opening when opened.

In the embodiment shown in FIG. 70, the linear slide ball bearing supports the weight of the impeller and squeezes the rotation center, but, same as shown in FIG. 63, the weight of the impeller can be supported by the repelling force or attractive force of the magnets. For example, permanent magnets can be disposed on the supporting ring of the impeller and on the ring-shaped frame disposed so as to face the supporting ring, and the whole or almost of the weight of the impeller can be supported by the repelling force. This case is preferable because no excess electric power is consumed compared with the case using electromagnets. Further, it is also possible to dispose electromagnets in the frame side or in the impeller side to make the both to repel each other. In this case, adjusting the current flowing in the electromagnets makes it easy to adjust the repelling forces and the gaps Further, it is possible to make one side to be permanent magnets and the other side to be electromagnets. In this case, it is better for the easy wiring to make the impeller side to be permanent magnets. Furthermore, it is possible to provide permanent magnets in the frame and the impeller side, and weak electromagnets for adjusting the gap are disposed in the other side. In this case, it is better for the easy wiring to make the frame side to be permanent magnets. Thereby, the used electric power can be reduced and the gap can be easily adjusted. The repelling force of the permanent magnets becomes weak particularly in a long-term use, but it is possible to maintain the gap in an optimum condition by increasing the current of electromagnets. Together with the magnets, rollers or bearings, sliding shoes etc. can be used to support the weight. These rollers etc. may be provided in the impeller side or in the frame side.

Further, permanent magnets or electromagnets may be provided on the impeller, and so as to face those magnets to be energized by attracting each other, permanent magnets or electromagnets may be provided on the frame. In this case, the magnetic force is made to be a degree not to attract actually, or it is guided by the rollers etc. In the case that the attractive force of the magnets is utilized, the one side may be steel attracted by magnets, particularly soft iron. In the case that the impeller is floated by the magnetic force, the above magnets etc. can be provided between the supporting ring provided on the upper end of the impeller and the ring-shaped frame located on the upper side.

In the power generator 220 shown in FIG. 67, one set of impeller 226 for side winds is provided on the upper end of the wall body 221, but plural impellers and plural power generators may be provided in multi stages, which are rotated around the center shaft by extending the center column support upward. Or plural impellers and plural power generators may be provided in many stages by extending plural center column supports upward from the upper end of the wall body 221 and by providing plural stages of the annular supports 224. Further, those impeller 226 for side winds and the impeller 223 for an ascending airflow in the wall body 221 may be interconnected by a connecting rod 239, and in strong side winds, the power generator for the ascending airflow may be driven by the rotation force of the impeller 226 for side winds. In this case, it is preferable to intervene a clutch etc. in the connecting rod 239 for coupling/uncoupling to allow coupling/uncoupling as occasion demands.

Figure 76:
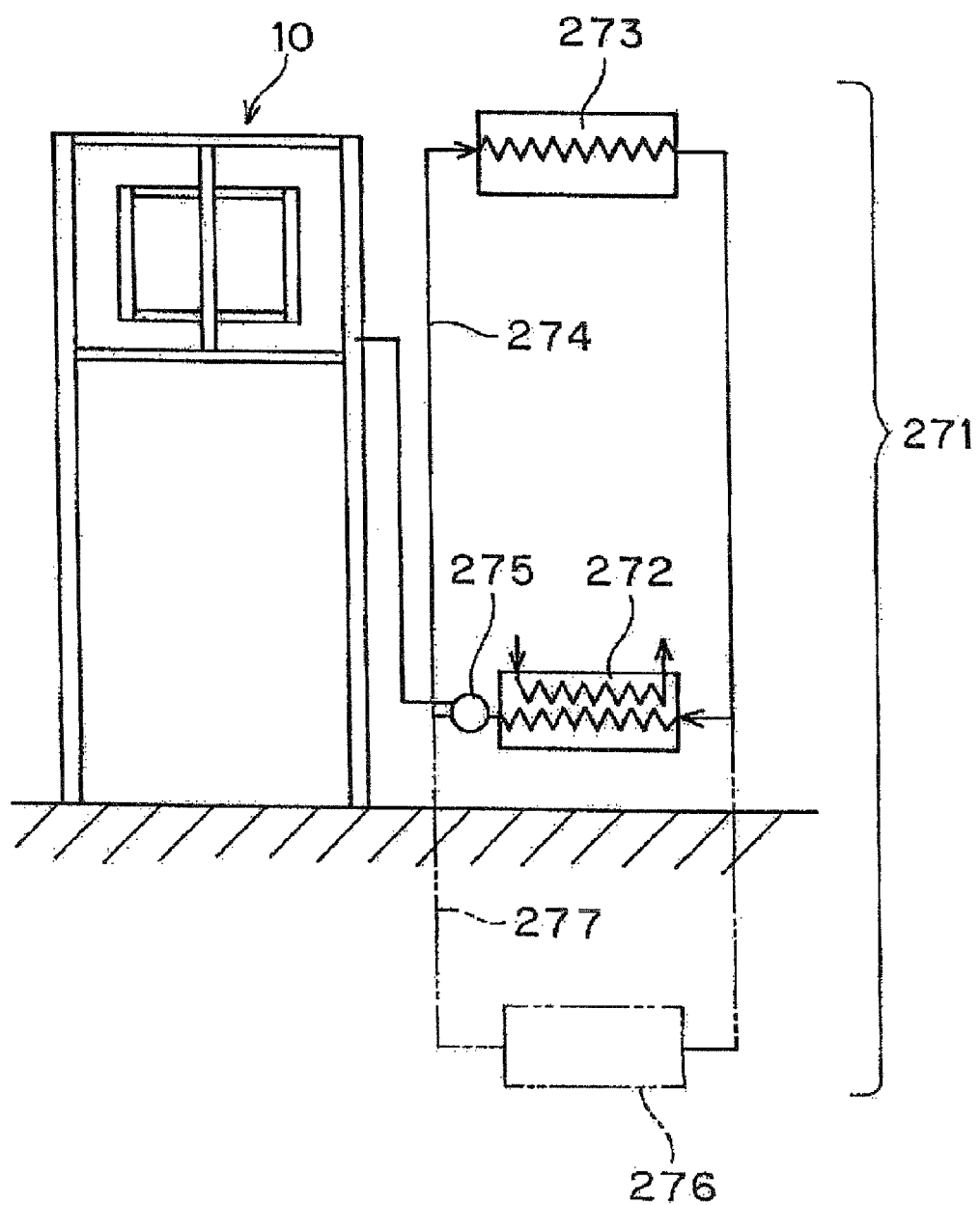
FIG. 76 is a block diagram showing the embodiment of the heat conversion system of this invention.

The heat exchange system 271 shown in FIG. 76 comprises the first heat exchanger 272 installed on the ground, the second heat exchanger 273 installed in the upper air where the temperature is lower than the ground, a pipe line 274 interconnecting the both in a loop, and a pump 275 to circulate a heating medium through the looped pipeline 274. The driving source of the pump 275 is preferable to use the electric power generated by the above described wind power generation system 10. It is also possible to employ the wind power generation system shown in FIG. 67. Further, it is also possible to couple the rotating shaft of the wind power generation system 10 and the wind power generation system 220 with the rotation shaft of the pump 275.

The heat exchange system 271 cools the heating medium by the second heat exchanger 273 in the upper air and can extract the cooled medium heat via the ground heat exchange system 272. Further, as shown by the imaginary line, the pipe line can be so composed that it is interchangeable with a pipe line 277 of the buried third heat exchanger 276 to extract the heat of the heated medium in the winter season. Employing such ground, upper air, and the underground heat exchanger 271 can reduce the energy used in air conditioners.

The wind power generator (electric power-mechanical force converter) 280 shown in FIG. 76 is that the wind power generator 205 shown in FIG. 63 is partially changed. In this wind power generator 280, a cylindrical reinforcing wall 281 is provided inside of a flat rotating plate 191, and wheels or rollers 282 are provided under the reinforcing wall 281, and a ring-shaped guide rail 283 on which the rollers 282 roll is disposed under the rollers. The reinforcing wall 281 may be provided on the periphery of the rotating plate 191. Provision of such reinforcing wall 281 increases rigidity of the rotating plate 191. Further, in this embodiment, the rollers 282 are provided also on the upper end of the reinforcing wall 281 and guided by the guide rail (omitted the figure). The upper and the lower guide rails 283 are fixed to the frame. Other portions are the same as the case shown in FIG. 63. More specifically, the permanent magnets 31 for power generation are provided on the rotating plate 191, and the coils (stators) 200 are disposed above and below together with a gap so as to place the magnets in between the gap. In order to adjust the gaps between the coil 200 and the rotating plate 191, the coil 200 is held by screw shaft 207, and the screw shaft 207 is screwed together with a nut 208 which is retained at a bracket 209 rotatably and not movable along the axis. The nut 208 can be driven by, for example, a sprocket 210 and a chain (see FIGS. 63, 64).

Further, as shown by the imaginary line, the guide roller 285 may be mounted on the coil 200 and faced to the guide 191a provided on the rotating plate 191a, thereby the minimum gap between the coil 200 and the rotating plate 191 can be secured to avoid the interference in between them. In other words, the guide roller 285 and the guide 191a serve as a stopper in regard to the movement of the coil 200. Further, the guide roller 285 can be disposed in the rotating plate 191 side and the guide facing the guide roller 285 can be provided.

Figure 77:
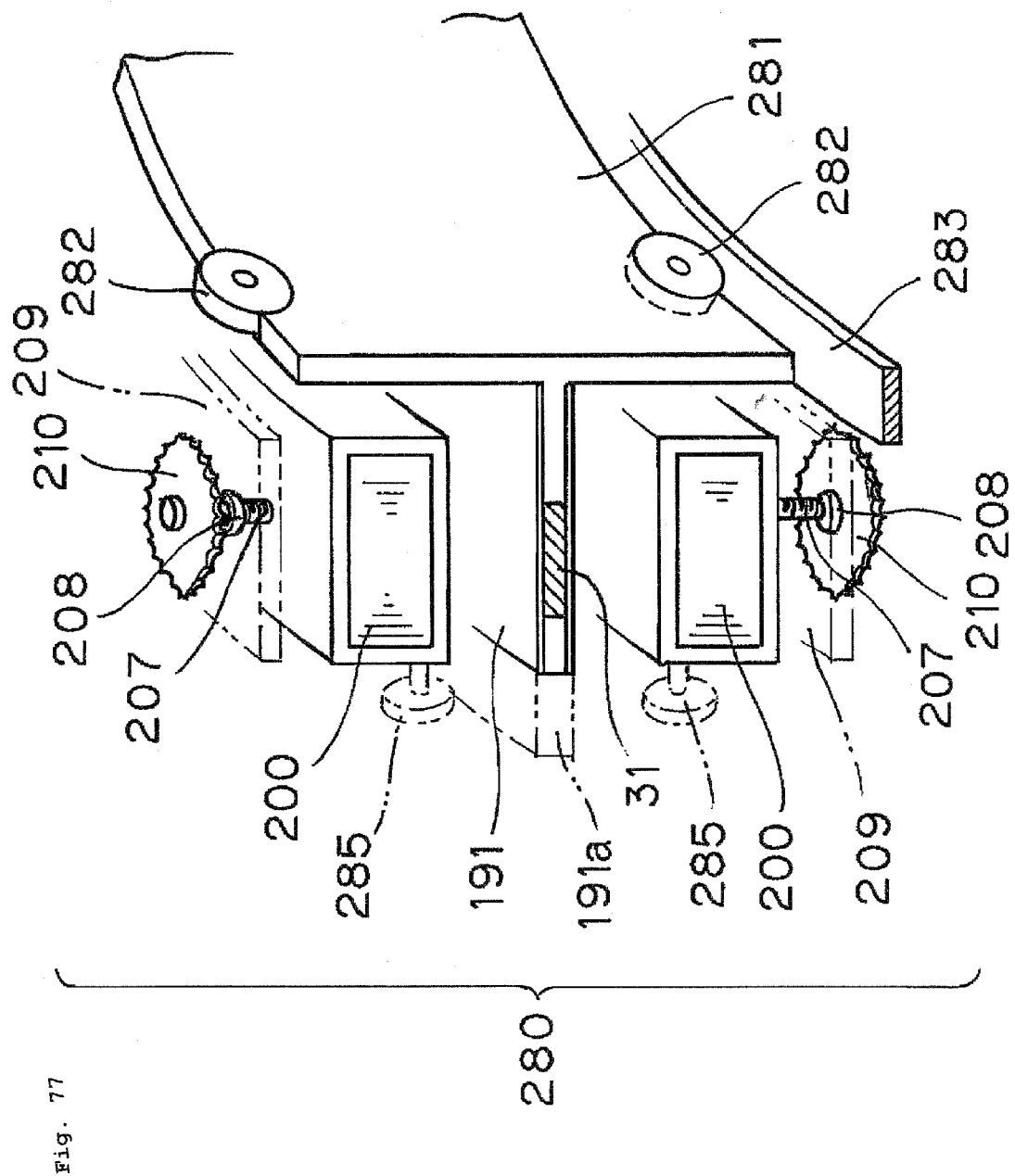
FIG. 77 is a perspective view of the substantial part showing further the other embodiment of the wind power generation system of this invention.

The wind power generation system 287 shown in FIG. 77 is so composed that coils (stator) 200 are provided only in the outside of the thin cylindrical rotating plate(rotor) 191 and the gap in between the rotating plate can be adjustable by the screw 207. And the supporting members 288 shaped like a spoke of the bicycle are mounted on the rotating plate 191 and connected to a center boss 23. Since the supporting members 288 are composed of wires and thin rods, they cannot hold the weight of the rotating plate 191 and the impeller connected to the rotating plate. Therefore, the roller 282 provided under the rotating plate 191 and the guide rail 283 provided under the roller support the weight. The rollers may be provided under the lower end of the impeller or under the lower end of the longitudinal blades. In the case that such spoke like supporting members 288 are used, it is possible to support the center position of the rotating plate 191 not to move, and to make the rotating portion light.

Figure 78:
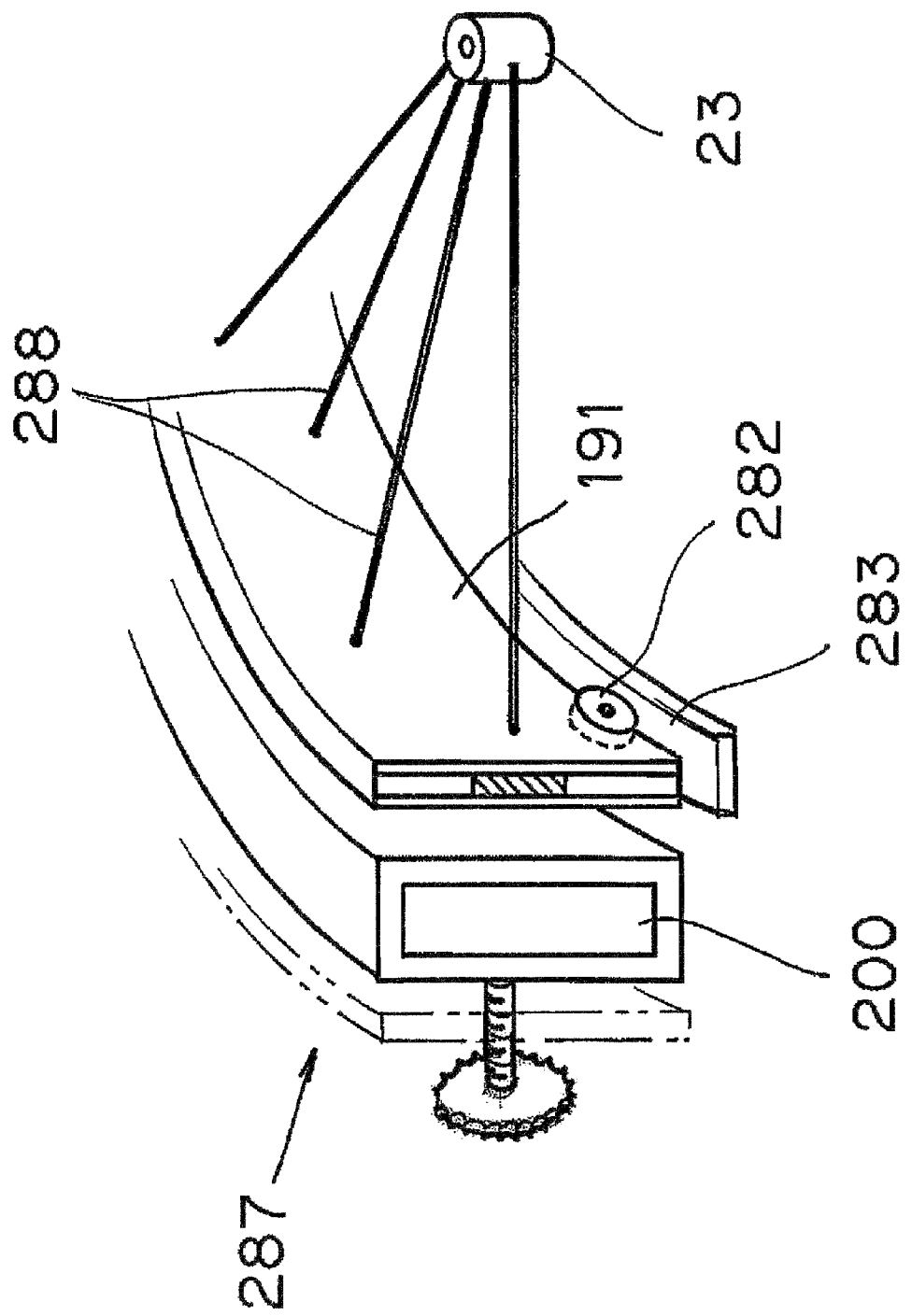
FIG. 78 is a rough perspective view of the substantial part showing further the other embodiment of the wind power generation system of this invention.
Figure 79:
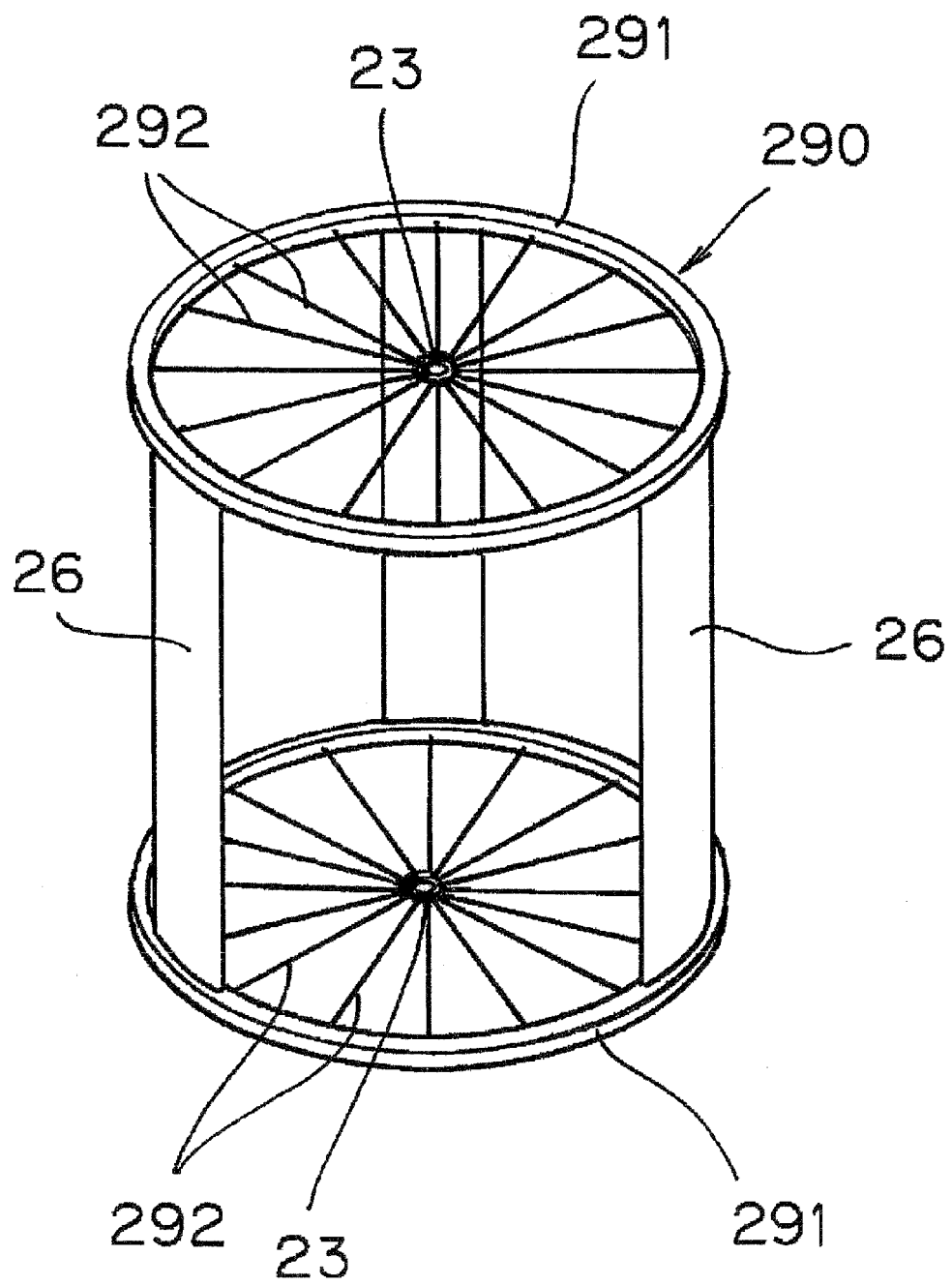
FIG. 79 is a rough perspective view showing further the other embodiment of the impeller used in the wind power generation system of this invention

In the impeller 290 shown in FIG. 78, the longitudinal blades 26 are supported by the upper and the lower ring 291 and the spoke like supporting members 292 are provided on the each ring, and the center bosses 23 supports the impeller wholly. Those bosses 23 can be supported, same as the wind power generation system 10 shown in FIG. 2, by bearings and shafts. On the periphery, or from the upper face to the lower face of the upper or the lower ring 291, any of the above electrical power-mechanical force converter shown in FIG. 76, FIG. 77 etc. is provided. More specifically, the rotor provided with magnets is mounted on the ring side, and the stator provided with coils adjacently to the rotor. Further, in place of the spoke like supporting member 292, or together with the supporting member 292, the transverse blades (reference numeral 25 of FIG. 2) same as FIG. 6 can be provided. In the case that the longitudinal blades are supported by the ring like supporting member 292 as above, the impeller can be made lightweight.

The invention claimed is:

1. An electric power-mechanical force converter, comprising;
    an impeller configured to rotate in response to movement of wind,
    a moving member fixed to the impeller, having a plurality of field magnets aligned in a circle around a central axis, the moving member being configured and arranged to rotate about the central axis of the plurality of the field magnets when the impeller rotates,
    two stators, each stator having coils aligned in a circle around the central axis, a first one of the stators disposed on a first side of the moving member, and a second one of the stators disposed on a second side of the moving member, each stator disposed so that there is a gap between the coils on the stator and the field magnets,
    wherein the moving member is a tubular body,
    wherein the stators are movable with respect to the moving member,
    wherein a size of the gap between the magnets and the coils is adjustable.

2. An electric power-mechanical force converter according to claim 1, further comprising a gap adjusting apparatus for moving the stators up and down with respect to the moving member.

3. An electric power-mechanical force converter according to claim 1, further comprising a gap adjusting apparatus for moving the stators in a radial direction with respect to the moving member.

4. An electric power generator comprising the power-mechanical force converter according to claim 1, further comprising power storing apparatus for storing power generated by the coils in response to rotation of the moving member.

5. An electric motor comprising the power-mechanical force converter according to claim 1, further comprising a storage part to store power generated by the coils in response to rotation of the moving member.

6. A rotating machine comprising the power-mechanical force converter according to claim 1.

* * * * *